(12) United States Patent
Talbot et al.

(10) Patent No.: US 12,495,838 B2
(45) Date of Patent: Dec. 16, 2025

(54) SMOKING SUBSTITUTE DEVICES AND ASSOCIATED METHODS, SYSTEMS AND APPARATUSES

(71) Applicant: Imperial Tobacco Limited

(72) Inventors: Oliver Talbot, Liverpool (GB); Daniel Fard, Liverpool (GB); Kaikai Liu, Liverpool (GB); Daniel Harden, San Jose, CA (US); Britt Jensen, San Jose, CA (US); Brian Leach, San Jose, CA (US)

(73) Assignee: Imperial Tobacco Limited

( * ) Notice: Subject to any disclaimer, the term of this patent is extended or adjusted under 35 U.S.C. 154(b) by 619 days.

(21) Appl. No.: 17/549,455

(22) Filed: Dec. 13, 2021

(65) Prior Publication Data

US 2022/0095698 A1     Mar. 31, 2022

Related U.S. Application Data

(63) Continuation of application No. PCT/EP2020/066385, filed on Jun. 12, 2020.
(Continued)

(30) Foreign Application Priority Data

Jun. 13, 2019   (EP) ...................... 19179881
Jun. 13, 2019   (EP) ...................... 19179891
(Continued)

(51) Int. Cl.
   *A24F 40/65*    (2020.01)
   *G06F 8/65*     (2018.01)
   *G06F 21/60*    (2013.01)

(52) U.S. Cl.
   CPC ............... *A24F 40/65* (2020.01); *G06F 8/65* (2013.01); *G06F 21/602* (2013.01)

(58) Field of Classification Search
   CPC .......... A24F 40/10; A24F 40/65; A24F 40/50; A24F 40/60
   See application file for complete search history.

(56) References Cited

U.S. PATENT DOCUMENTS 8,478,196 B1   7/2013   Hewinson
9,743,691 B2   8/2017   Minskoff et al.
(Continued)

FOREIGN PATENT DOCUMENTS

EP    3 108 758 A1    12/2016
EP    3 357 260 A1    8/2018
(Continued)

OTHER PUBLICATIONS

International Search Report and Written Opinion (PCT/EP2020/066385), dated Sep. 21, 2020, 8 pages.
(Continued)

*Primary Examiner* — Michael H. Wilson
*Assistant Examiner* — Stephanie Lynn Moore
(74) *Attorney, Agent, or Firm* — DUNLAP CODDING, P.C.

(57) ABSTRACT

A system for managing a smoking substitute device, the system comprising; a smoking substitute device comprising; a control unit; a memory configured to store firmware for operating the smoking substitute device and a device-specific encryption key; and a communications interface; and an application server configured to communicate to the smoking substitute device a firmware update message that is encrypted with the device-specific encryption key, wherein the smoking substitute device is configured to obtain an encrypted firmware image, wherein the firmware update message includes a firmware key for decrypting the encrypted firmware image, and wherein the smoking substitute device is configured to use the device-specific encryp-
(Continued)

tion key to decrypt the firmware update message, to obtain the firmware key for decrypting the encrypted firmware image.

14 Claims, 38 Drawing Sheets

Related U.S. Application Data

(60) Provisional application No. 62/893,706, filed on Aug. 29, 2019.

(30) Foreign Application Priority Data

| Jun. 13, 2019 | (EP) | 19179902 |
|---|---|---|
| Jun. 13, 2019 | (EP) | 19179907 |
| Jun. 13, 2019 | (EP) | 19179909 |
| Jun. 13, 2019 | (EP) | 19179917 |
| Jun. 13, 2019 | (EP) | 19179925 |
| Jun. 13, 2019 | (EP) | 19179935 |
| Sep. 11, 2019 | (EP) | 19196733 |

(56) References Cited

U.S. PATENT DOCUMENTS

| 9,864,947 | B1 | 1/2018 | Sur et al. |
|---|---|---|---|
| 2008/0184341 | A1* | 7/2008 | Sebesta ............ H04L 63/0807 726/4 |
| 2013/0005354 | A1 | 1/2013 | Sheilendra |
| 2013/0284192 | A1 | 10/2013 | Peleg et al. |
| 2013/0319439 | A1 | 12/2013 | Gorelick et al. |
| 2014/0209105 | A1 | 7/2014 | Sears et al. |
| 2014/0246035 | A1* | 9/2014 | Minskoff ............ A24F 40/65 131/329 |
| 2015/0136158 | A1 | 5/2015 | Stevens et al. |
| 2015/0181945 | A1 | 7/2015 | Tremblay |
| 2015/0257448 | A1 | 9/2015 | Lord |
| 2016/0029698 | A1 | 2/2016 | Xiang |
| 2016/0036814 | A1* | 2/2016 | Conrad ............ H04L 9/0891 713/171 |
| 2016/0063849 | A1 | 3/2016 | Hasegawa et al. |
| 2016/0143361 | A1 | 5/2016 | Juster et al. |
| 2016/0284197 | A1 | 9/2016 | Liu |
| 2016/0309787 | A1 | 10/2016 | Hawes et al. |
| 2016/0331037 | A1* | 11/2016 | Cameron ............ A24F 40/50 |
| 2016/0337362 | A1 | 11/2016 | Cameron |
| 2017/0013883 | A1 | 1/2017 | Han et al. |
| 2017/0023952 | A1 | 1/2017 | Henry, Jr. et al. |
| 2017/0092106 | A1 | 3/2017 | Cameron |
| 2017/0135402 | A1 | 5/2017 | Zitzke |
| 2017/0150756 | A1 | 6/2017 | Rexroad et al. |
| 2017/0259170 | A1 | 9/2017 | Bowen et al. |
| 2017/0279808 | A1 | 9/2017 | Kwon et al. |
| 2017/0318861 | A1 | 11/2017 | Thorens |
| 2018/0043114 | A1 | 2/2018 | Bowen et al. |
| 2018/0070632 | A1 | 3/2018 | Sur et al. |
| 2018/0263283 | A1 | 9/2018 | Popplewell et al. |
| 2018/0270311 | A1 | 9/2018 | Baker et al. |
| 2019/0000147 | A1 | 1/2019 | Koc et al. |
| 2019/0052468 | A1 | 2/2019 | Ngoc-Ai Lu |
| 2020/0000143 | A1* | 1/2020 | Anderson ............ A24F 40/65 |

FOREIGN PATENT DOCUMENTS

| EP | 3 435 345 A1 | 1/2019 |
|---|---|---|
| WO | WO 2014/195805 A2 | 12/2014 |
| WO | WO 2017/066409 A1 | 4/2017 |
| WO | WO 2017/205692 A1 | 11/2017 |
| WO | WO 2018/202651 | 11/2018 |
| WO | WO 2019/162155 A1 | 8/2019 |

OTHER PUBLICATIONS

European Search Report (19179881.8-1022), dated Jan. 2, 2020, 6 pages.
European Search Report (19179891.7-1022), dated Dec. 20, 2019, 7 pages.
European Search Report (19179902.2-1022), dated Dec. 20, 2019, 7 pages.
European Search Report (19179907.1-1213), dated Nov. 21, 2019, 96 pages.
European Search Report (19179909.7-1214), dated Aug. 7, 2019, 9 pages.
European Search Report (19179917.0-1213), dated Nov. 25, 2019, 7 pages.
European Search Report (19179925.3-1218), dated Nov. 22, 2019, 6 pages.
European Search Report (19179935.2-1218), dated Aug. 1, 2019, 8 pages.
European Search Report (19196733.0-1218), dated Feb. 24, 2020, 8 pages.

* cited by examiner

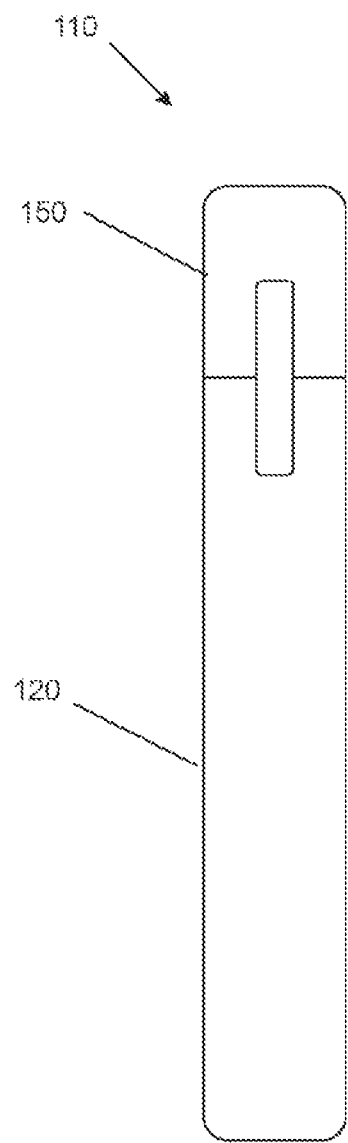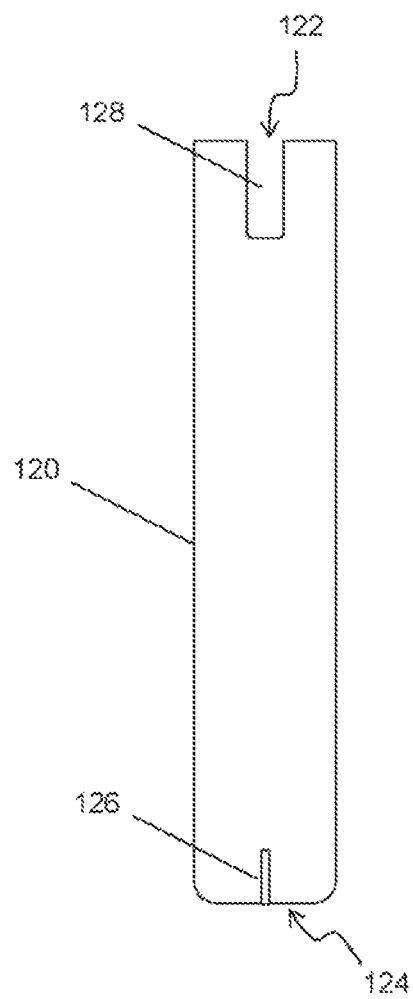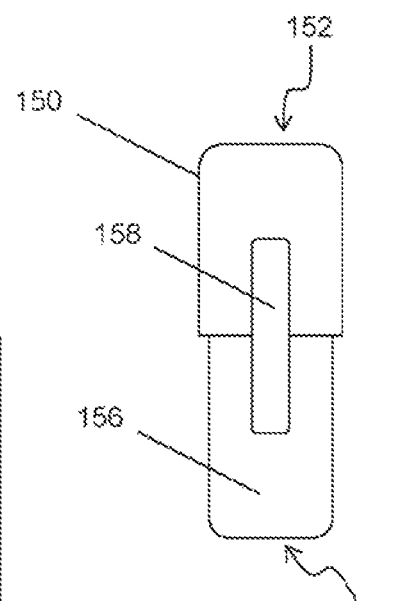
Fig. 2A
Fig. 2B
Fig. 2C

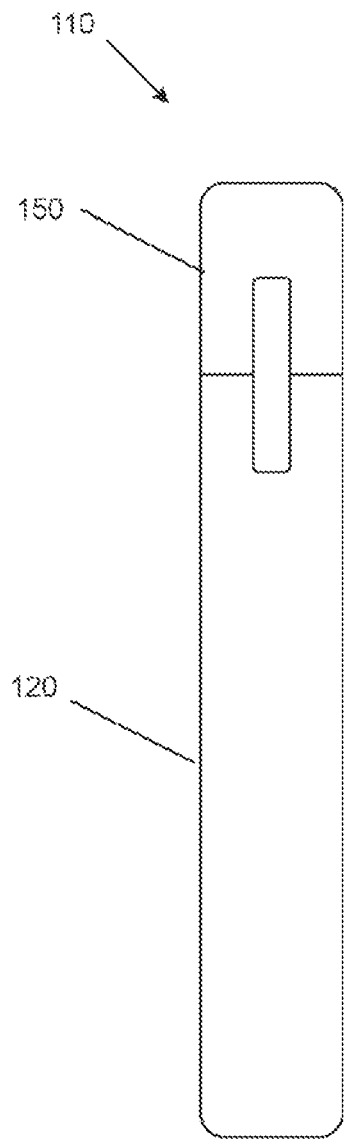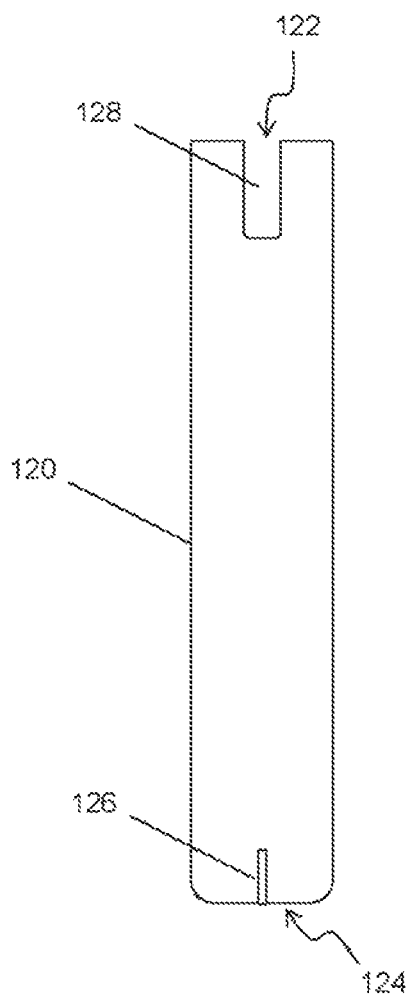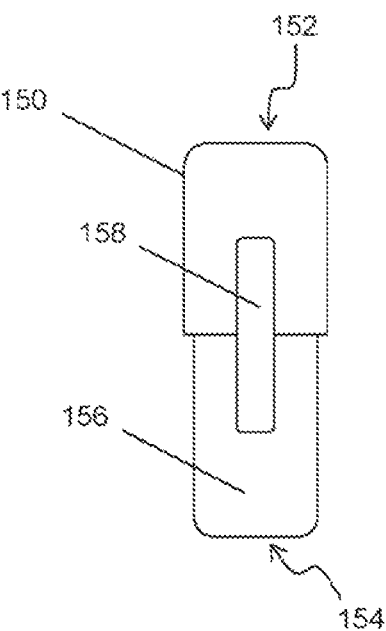
Fig. 10A
Fig. 10B
Fig. 10C

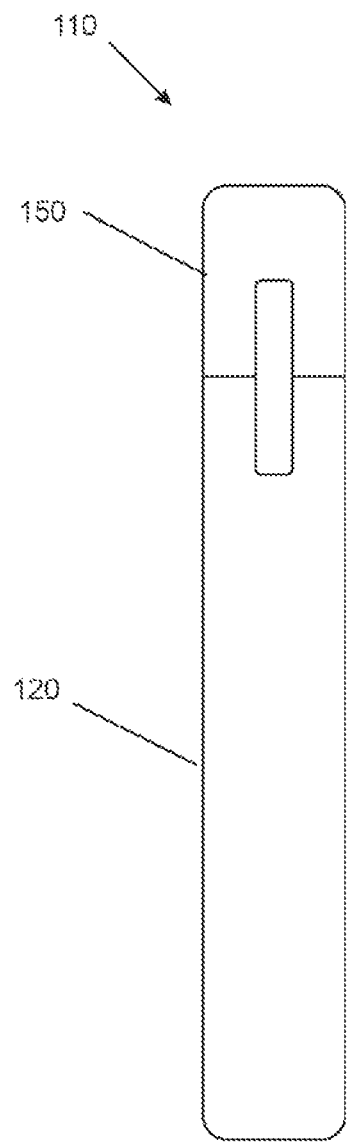
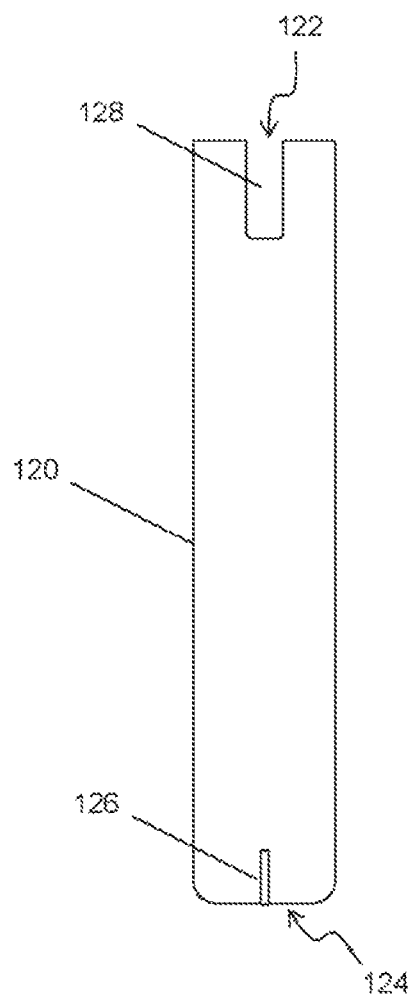
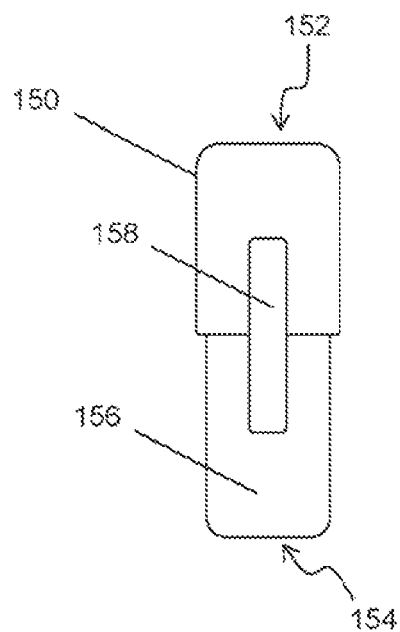
Fig. 14A
Fig. 14B
Fig. 14C

SMOKING SUBSTITUTE DEVICES AND ASSOCIATED METHODS, SYSTEMS AND APPARATUSES

INCORPORATION BY REFERENCE

This application claims priority from PCT/EP2020/066385, filed on Jun. 12, 2020, which claims priority to the following: EP19179881.8, filed 13 Jun. 2019 (P01043EP; 7489545), EP19179935.2, filed 13 Jun. 2019 (P01038EP; 7485568), EP19179925.3, filed 13 Jun. 2019 (P01020EP; 7478654), EP19179917.0, filed 13 Jun. 2019 (P01019EP; 7478647), EP19179909.7, filed 13 Jun. 2019 (P01017EP; 7478639), US62/893,706, filed 29 Aug. 2019 (P01111US; 7542749), EP19196733.0, filed 11 Sep. 2019 (P01111EP; 7549546), EP19179907.1, filed 13 Jun. 2019 (P01015EP, 7478613), EP19179902.2, filed 13 Jun. 2019 (P01014EP; 7478597), and EP19179891.7, filed 13 Jun. 2019 (P01011EP; 7478548).

The contents and elements of these application are herein incorporated by reference for all purposes.

The following description is divided into multiple parts (A-H). A skilled person would appreciate that the statements and features described in each of these parts may be combined together in any combination, except where such a combination is clearly impermissible or expressly avoided.

SUMMARY OF THE FIGURES

Embodiments and experiments illustrating the principles of the disclosure will now be discussed with reference to the accompanying figures in which:

FIG. 2A shows an example smoking substitute device for use as the smoking substitute device in the system of FIG. 1.

FIG. 2B shows the main body of the smoking substitute device of FIG. 2A without the consumable.

FIG. 2C shows the consumable of the smoking substitute device of FIG. 2A without the main body.

Figure 5:
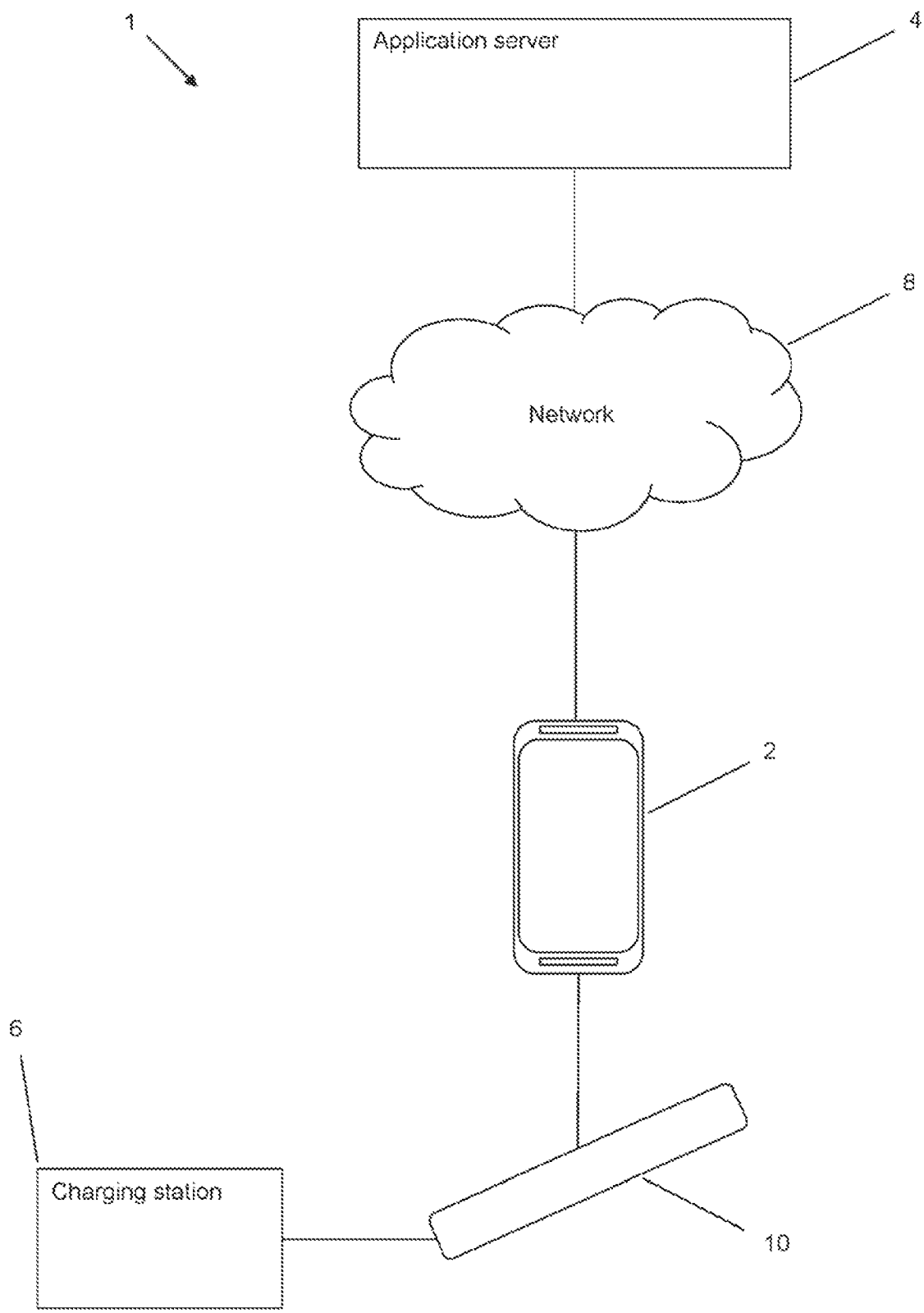

Embodiments and experiments illustrating the principles of the disclosure will now be discussed with reference to the accompanying figures in which:

FIG. 5 shows an example system for managing a smoking substitute device.

Figure 6A:
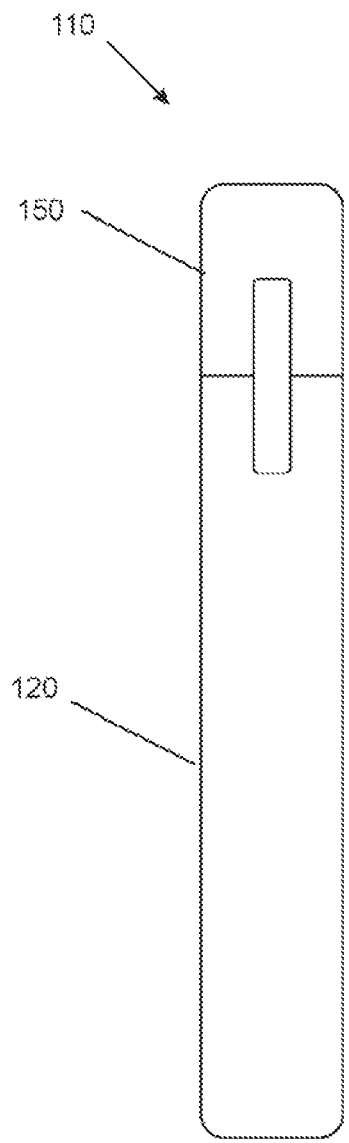

FIG. 6A shows an example smoking substitute device for use as the smoking substitute device in the system of FIG. 5.

Figure 6B:
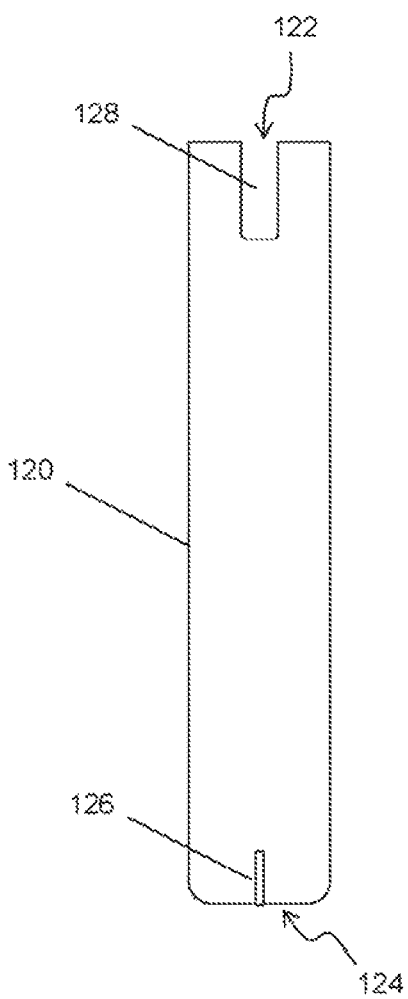

FIG. 6B shows the main body of the smoking substitute device of FIG. 6A without the consumable.

Figure 6C:
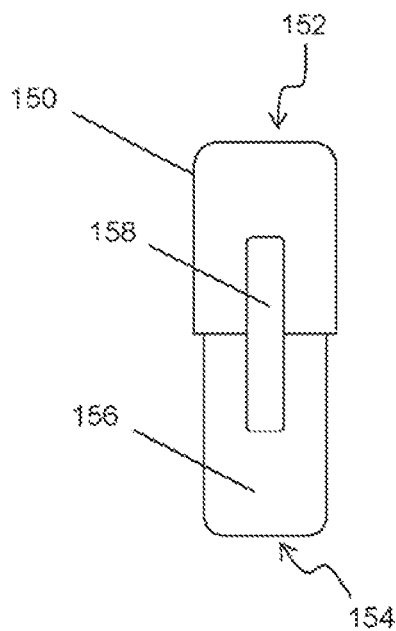

FIG. 6C shows the consumable of the smoking substitute device of FIG. 6A without the main body.

Figure 7A:
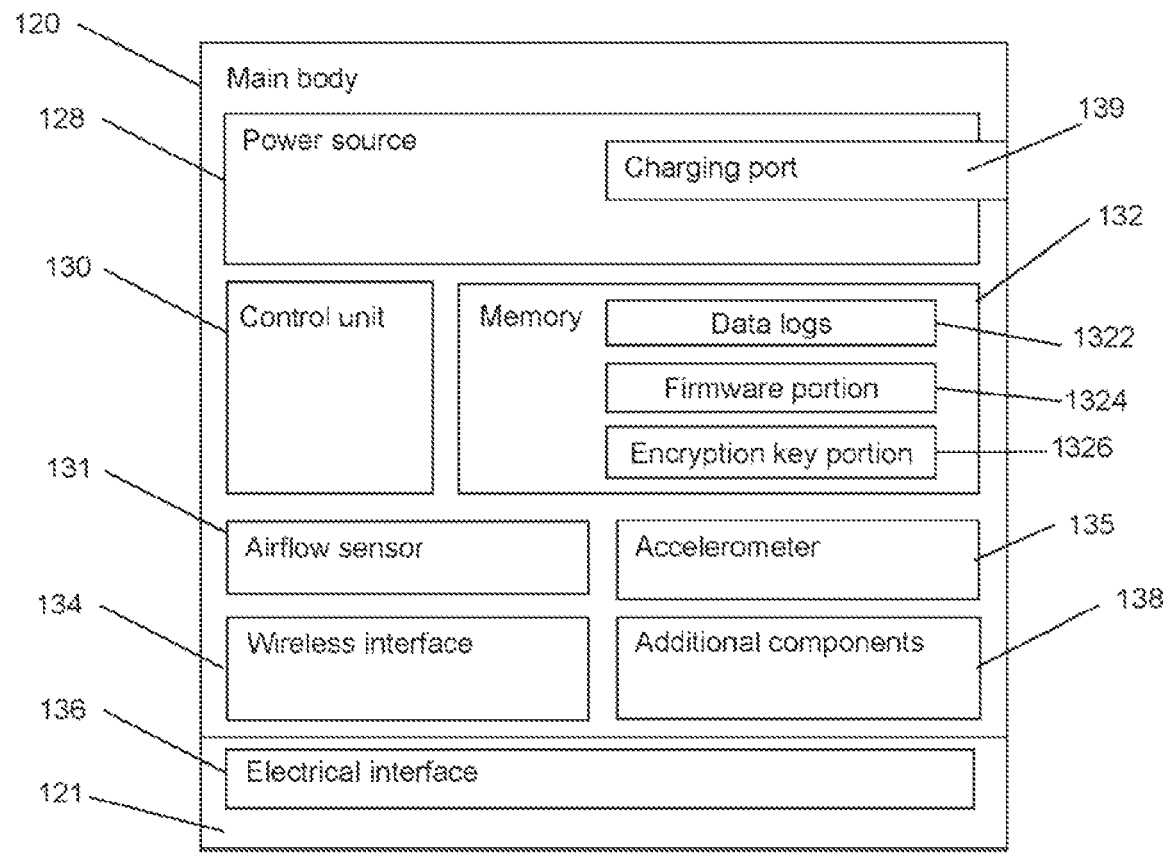

FIG. 7A is a schematic view of the main body of the smoking substitute device of FIG. 6A that is an embodiment of the disclosure.

Figure 7B:
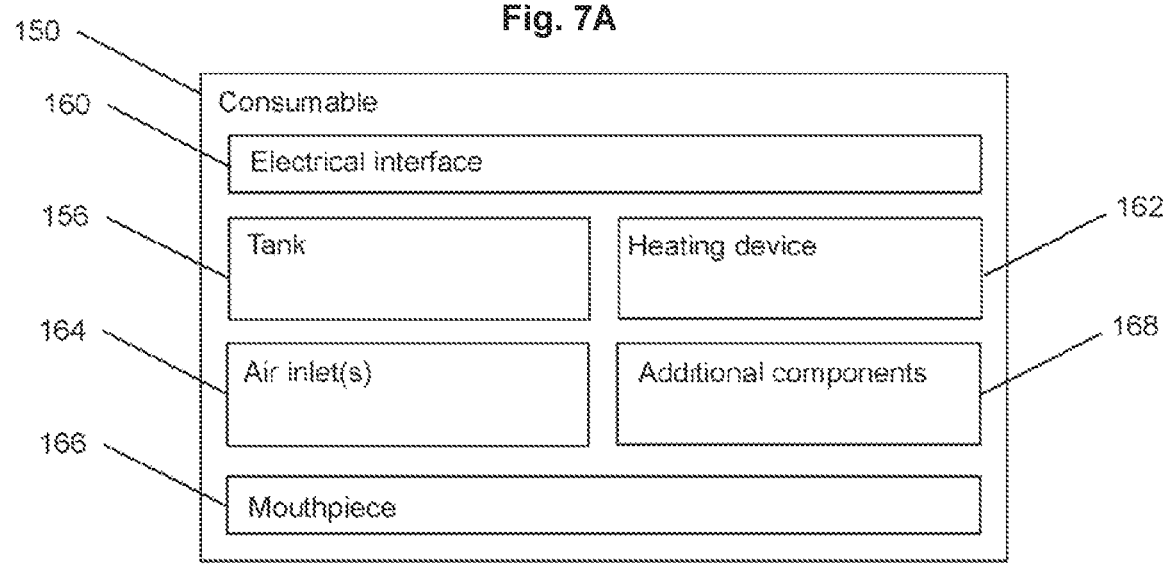

FIG. 7B is a schematic view of the consumable of the smoking substitute device of FIG. 6A.

Figure 8:
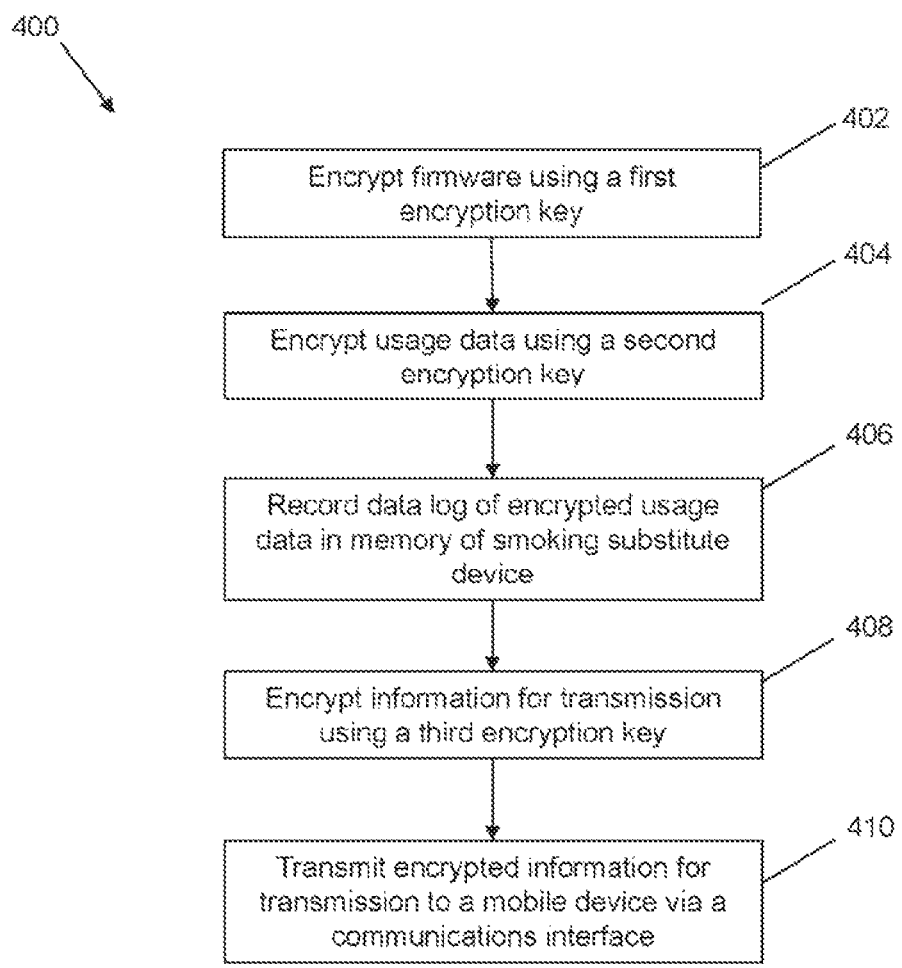

FIG. 8 is a flow diagram of encryption operations carried out by the control unit of a smoking substitute device, according to an embodiment of the present disclosure.

Figure 9:
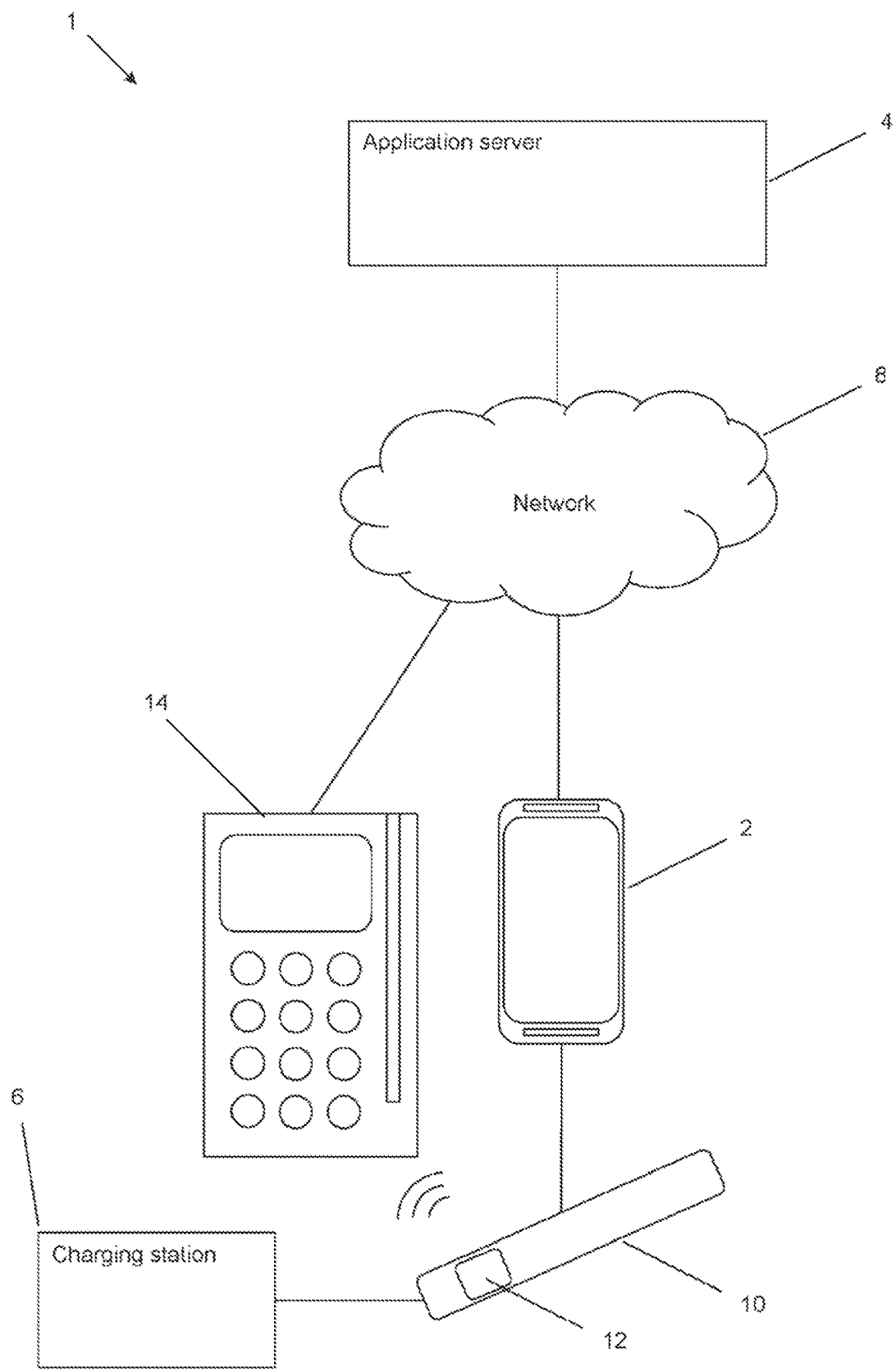

FIG. 9 shows an example system for managing a smoking substitute device.

FIG. 10A shows an example smoking substitute device for use as the smoking substitute device in the system of FIG. 9.

FIG. 10B shows the main body of the smoking substitute device of FIG. 10A without the consumable.

FIG. 10C shows the consumable of the smoking substitute device of FIG. 10A without the main body.

Figure 11A:
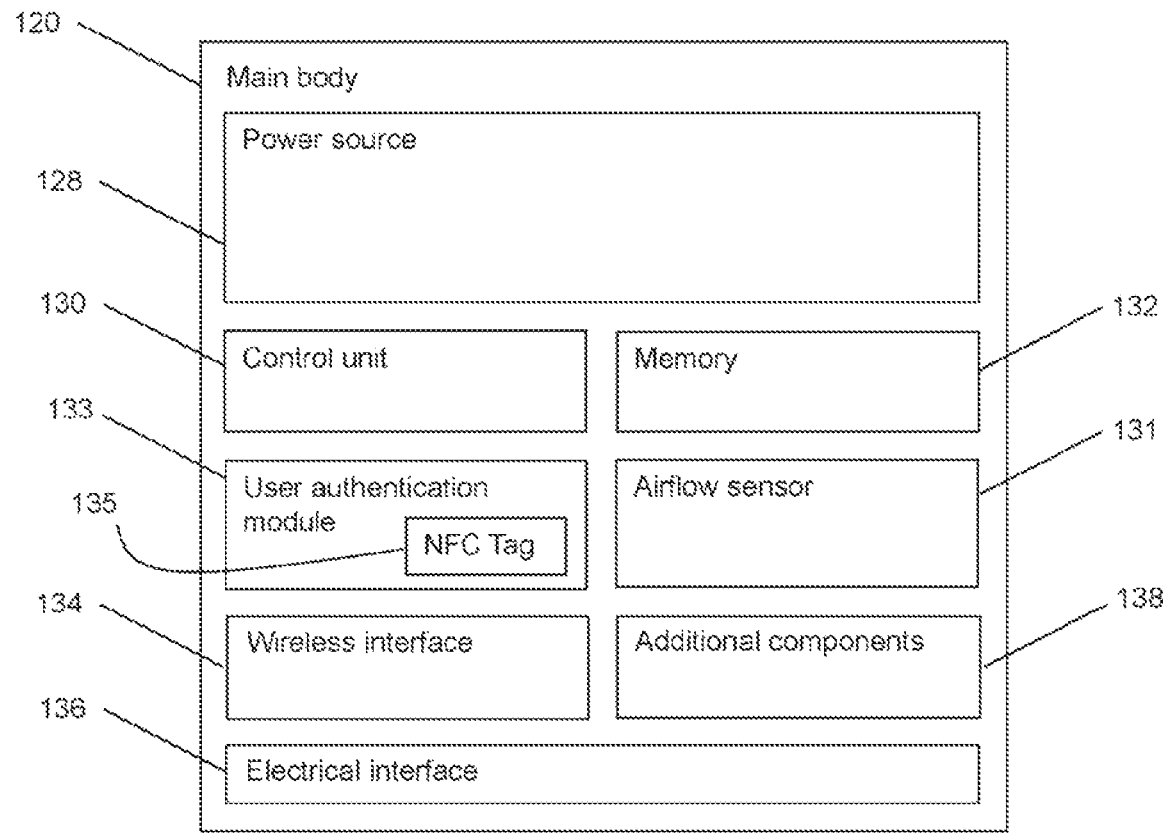

FIG. 11A is a schematic view of the main body of the smoking substitute device of FIG. 10A, according to an embodiment of the disclosure.

Figure 11B:
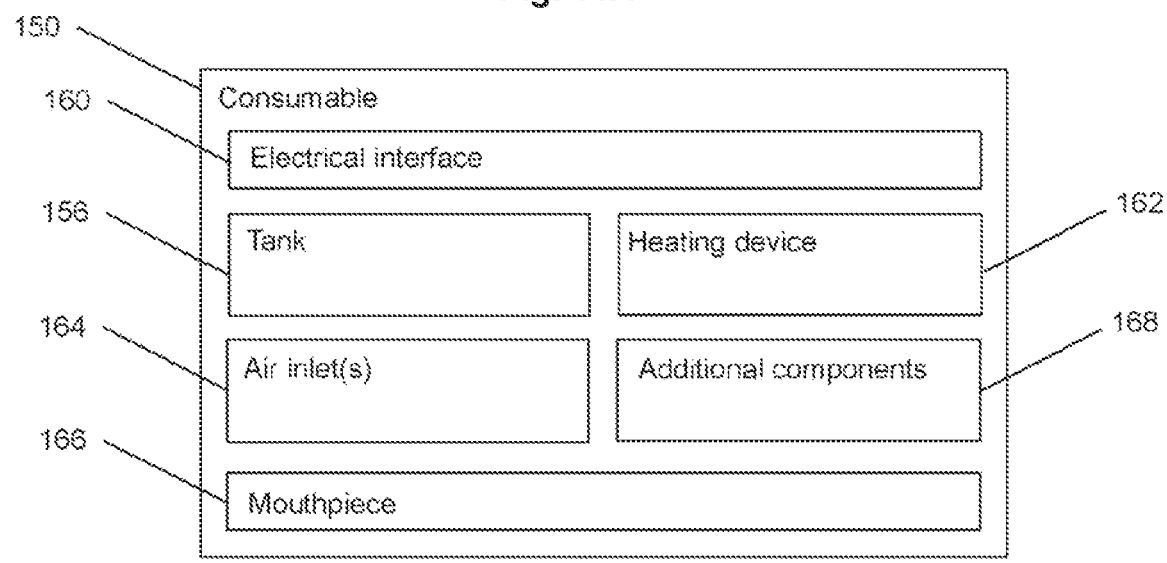

FIG. 11B is a schematic view of the consumable of the smoking substitute device of FIG. 10A.

Figure 12:
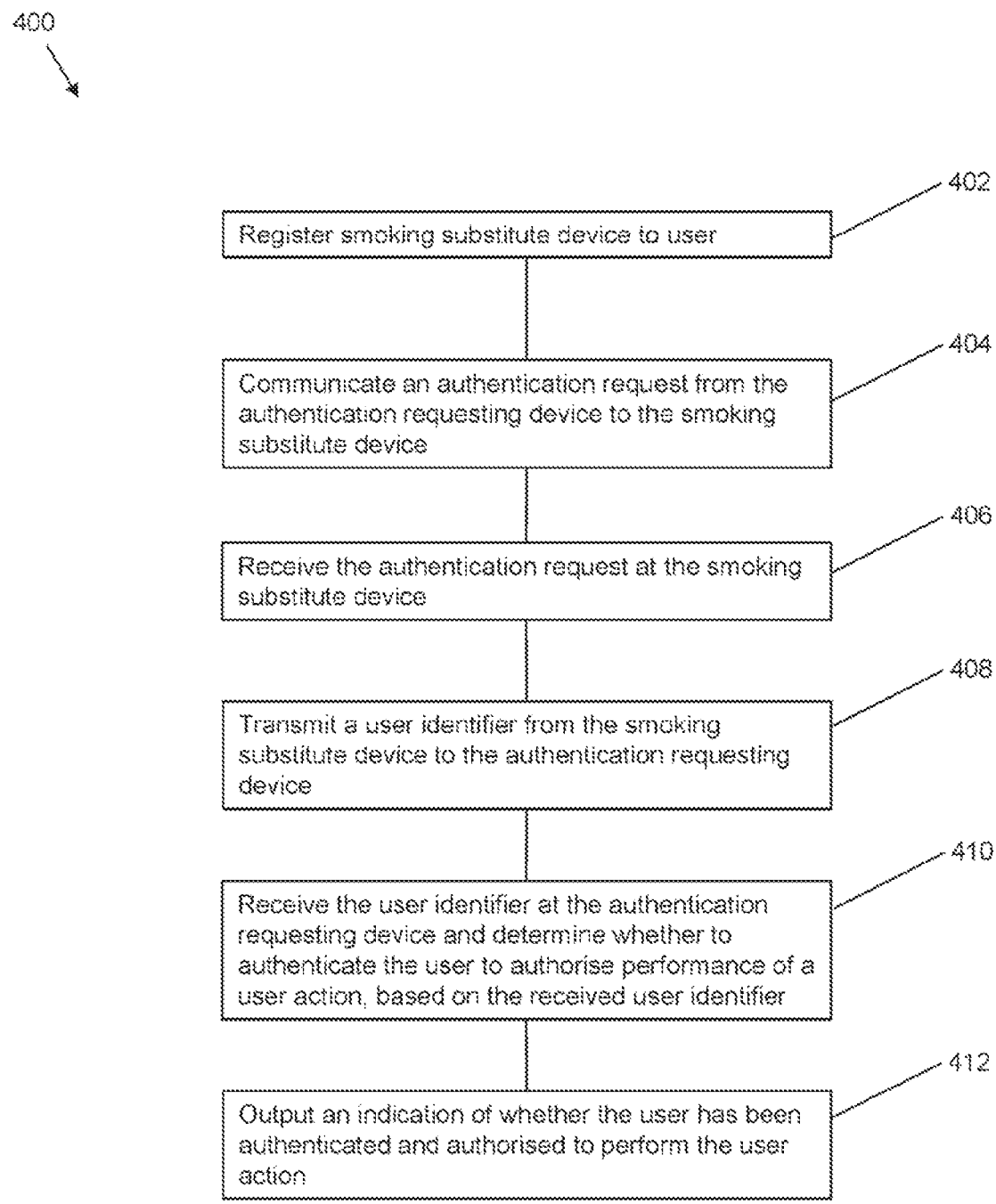

FIG. 12 is a flow diagram of operations carried out by a smoking substitute device and an authentication requesting device, according to an embodiment of the present disclosure.

Figure 13:
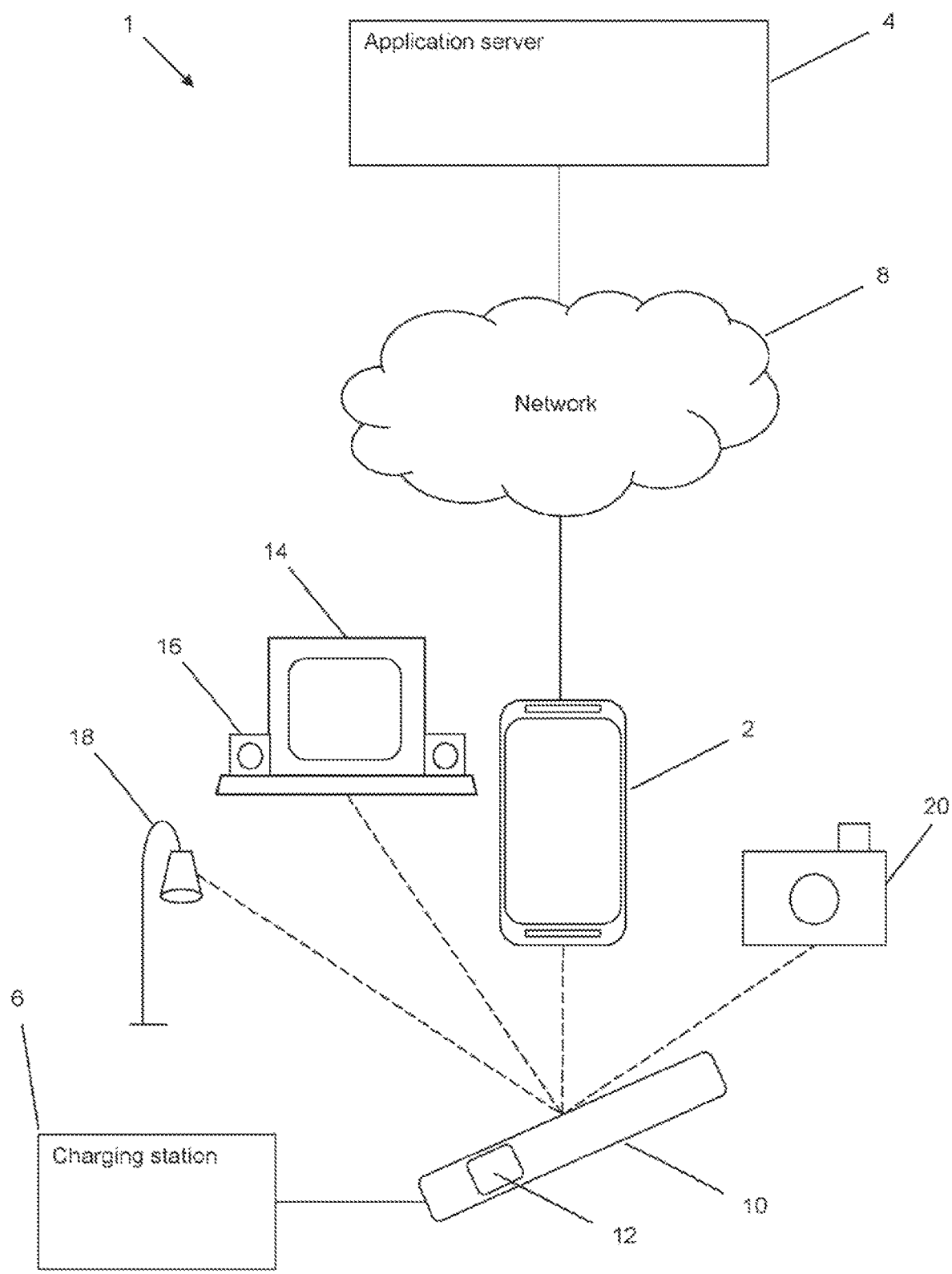

FIG. 13 shows an example system for managing a smoking substitute device.

FIG. 14A shows an example smoking substitute device for use as the smoking substitute device in the system of FIG. 13.

FIG. 14B shows the main body of the smoking substitute device of FIG. 14A without the consumable.

FIG. 14C shows the consumable of the smoking substitute device of FIG. 14A without the main body.

Figure 15A:
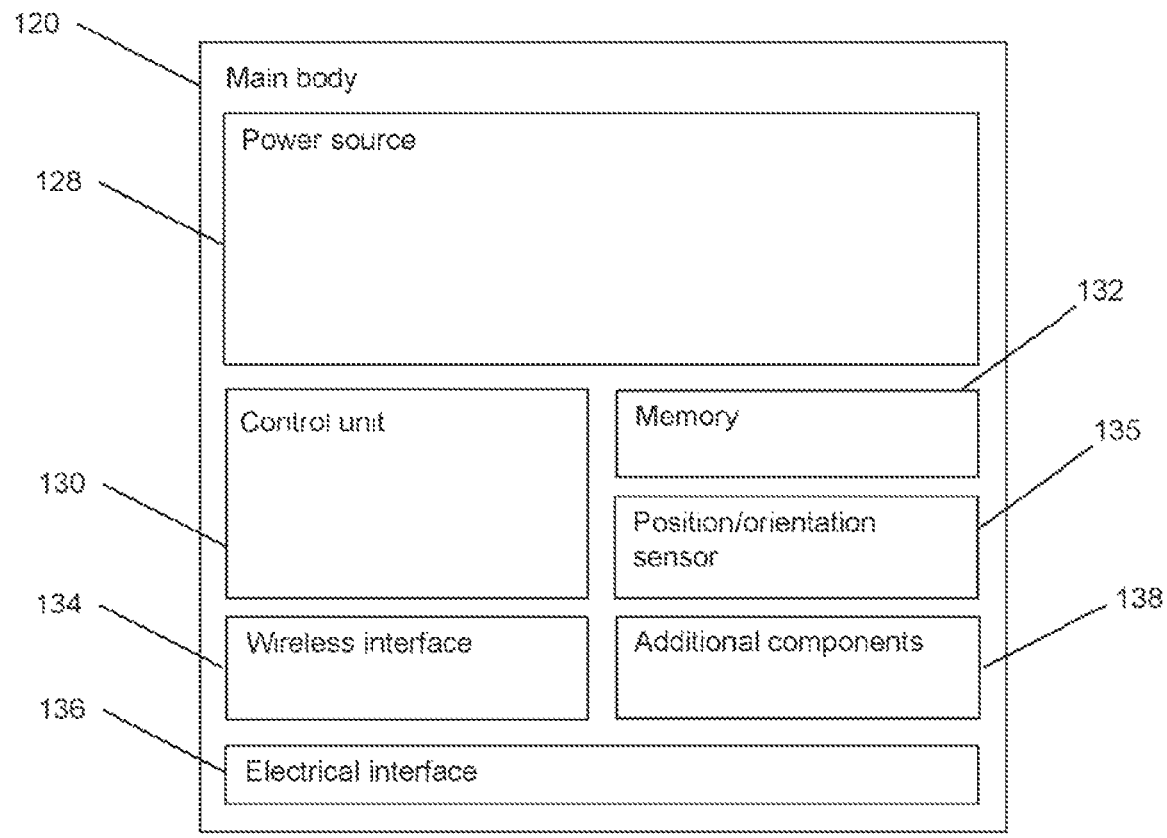

FIG. 15A is a schematic view of the main body of the smoking substitute device of FIG. 14A.

Figure 15B:
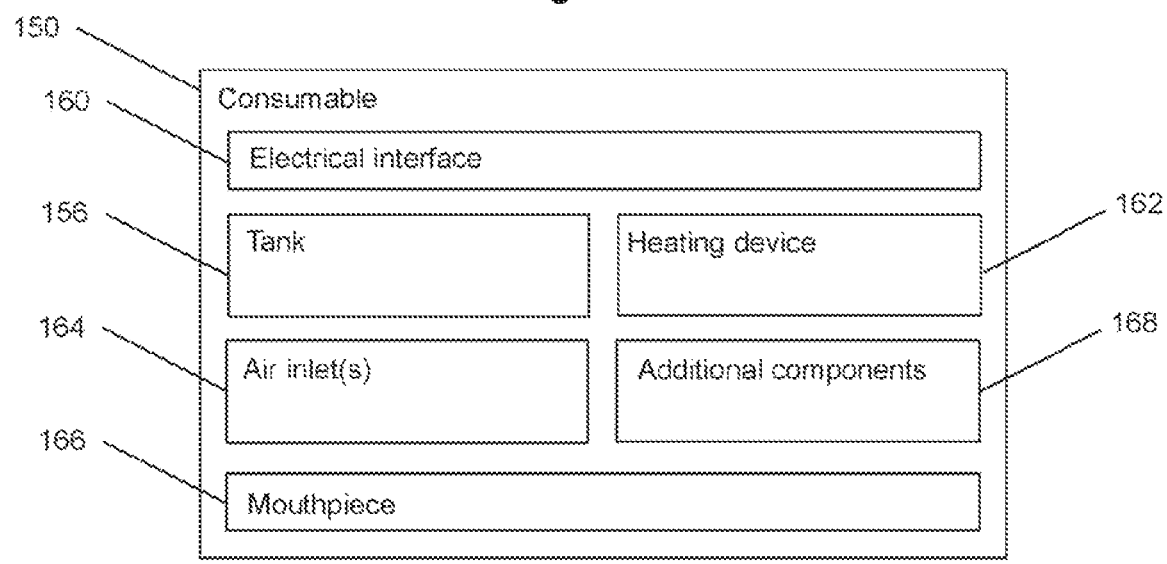

FIG. 15B is a schematic view of the consumable of the smoking substitute device of FIG. 14A.

Figure 16:
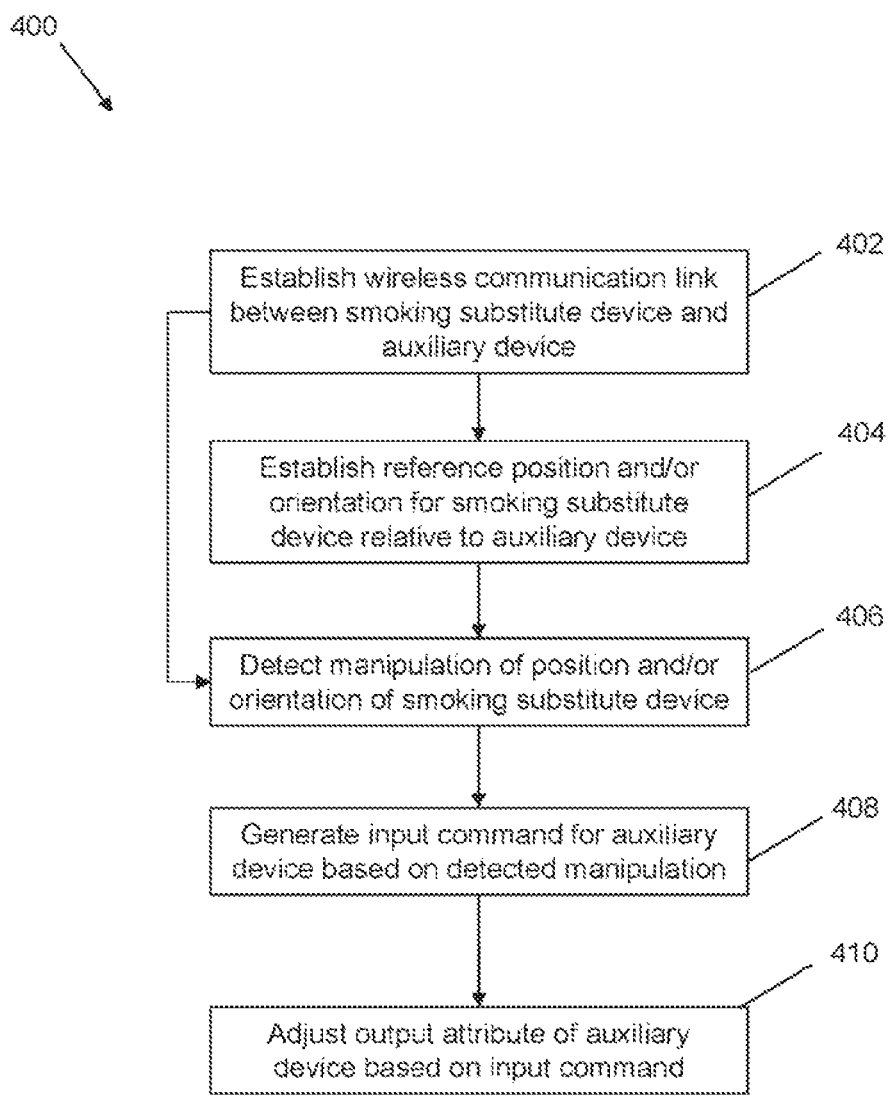

FIG. 16 is a flow diagram of a method of controlling an auxiliary device that is an embodiment of the disclosure.

Figure 17:
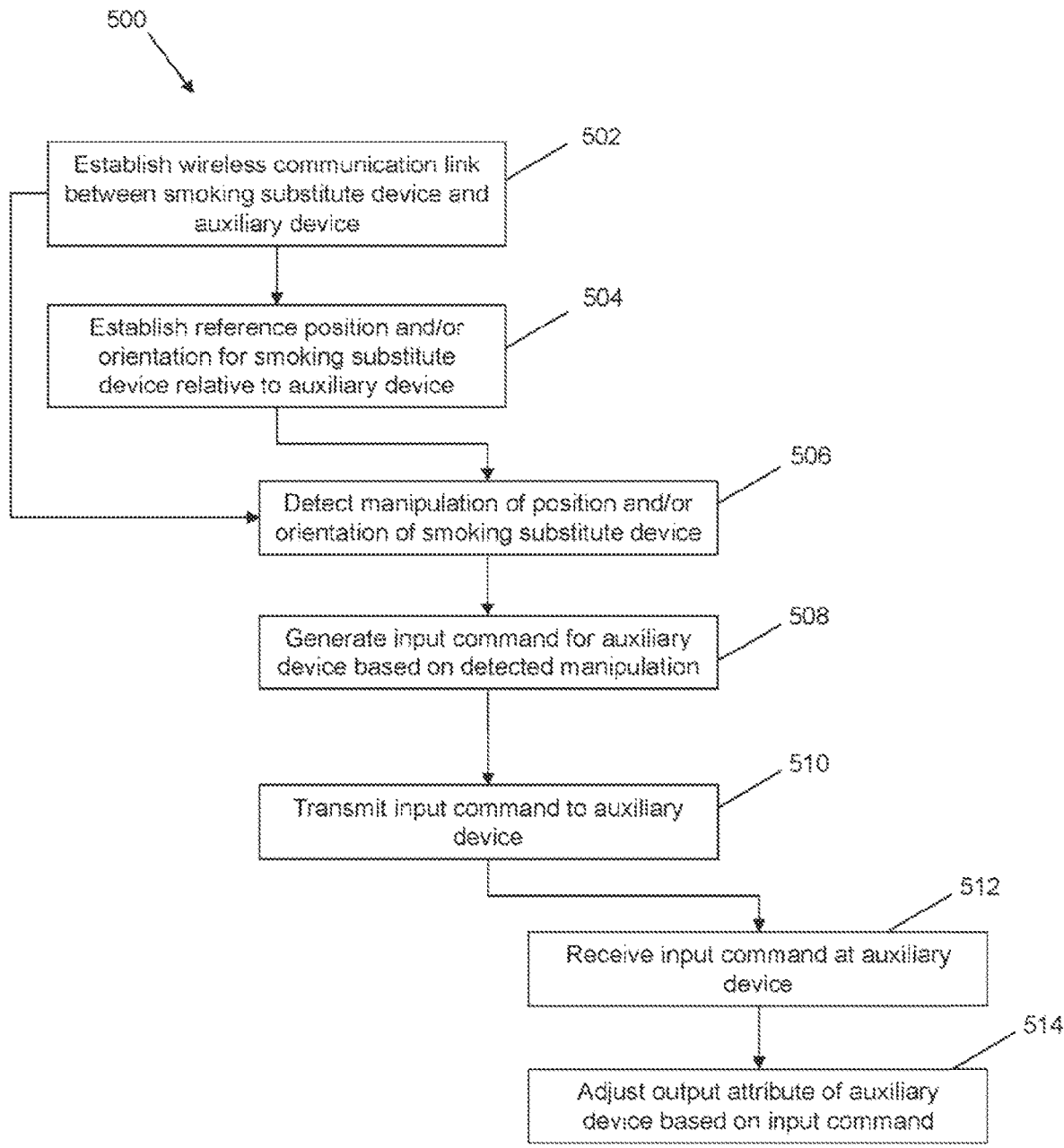

FIG. 17 is a flow diagram of a method of controlling an auxiliary device that is another embodiment of the disclosure.

Figure 18:
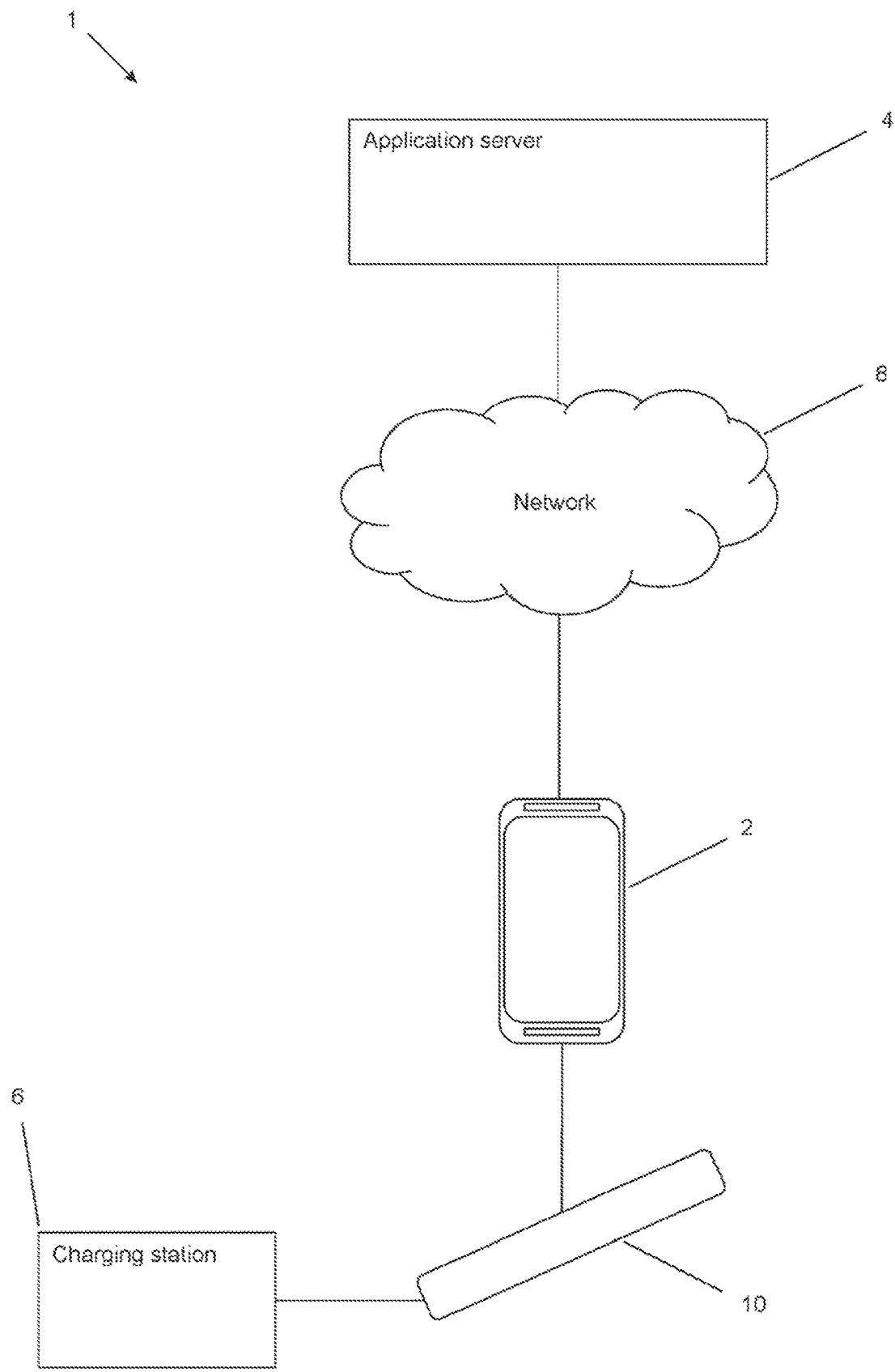

FIG. 18 shows an example system for managing a smoking substitute device.

Figure 19A:
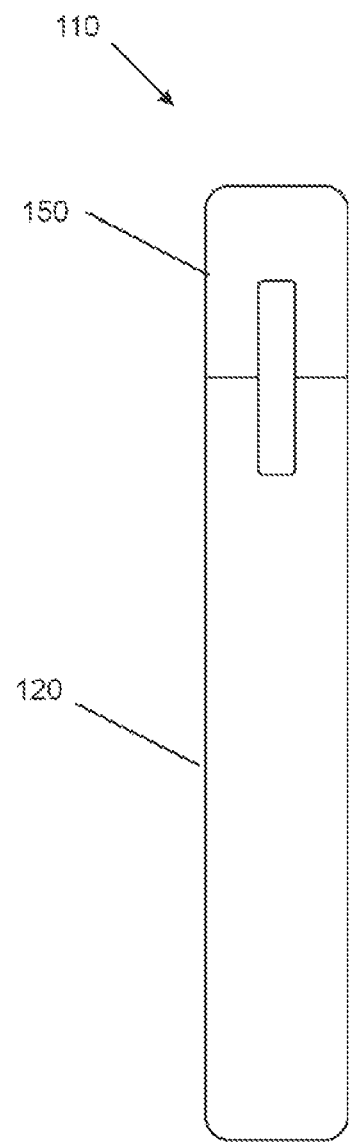

FIG. 19A shows an example smoking substitute device for use as the smoking substitute device in the system of FIG. 18.

Figure 19B:
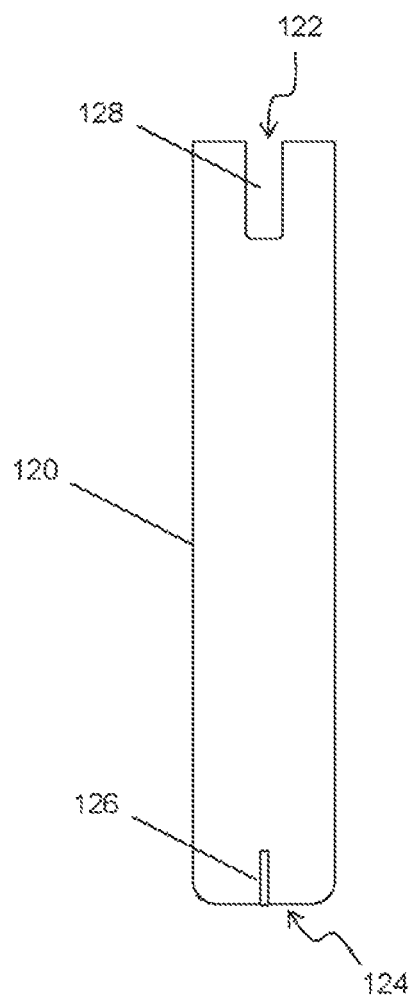

FIG. 19B shows the main body of the smoking substitute device of FIG. 19A without the consumable.

Figure 19C:
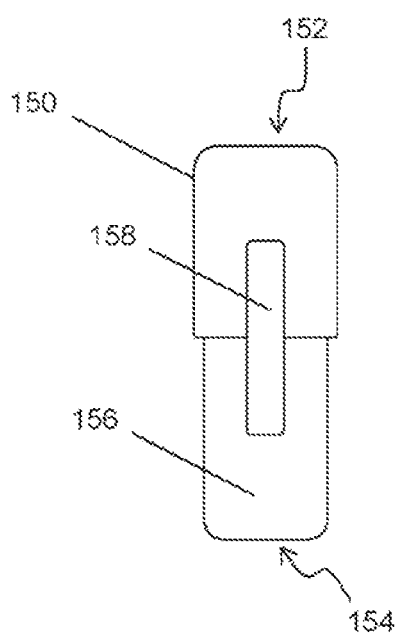

FIG. 19C shows the consumable of the smoking substitute device of FIG. 19A without the main body.

Figure 20A:
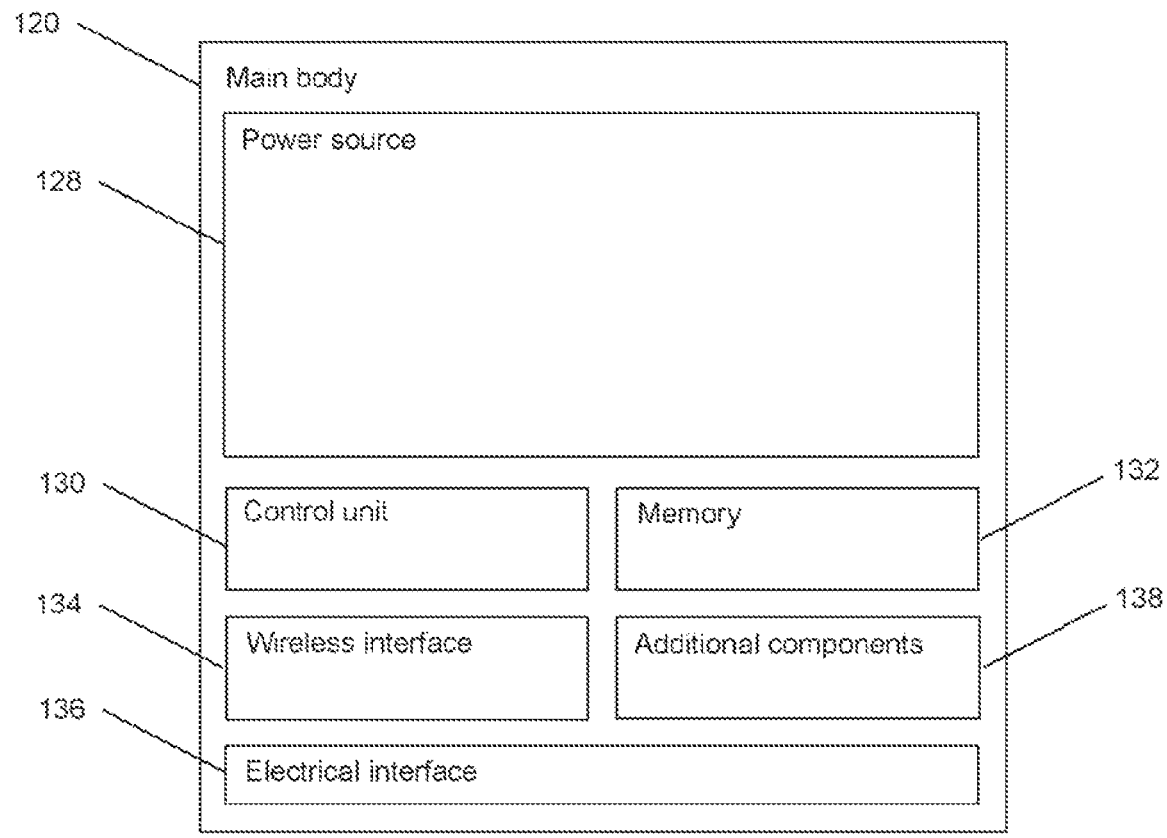

FIG. 20A is a schematic view of the main body of the smoking substitute device of FIG. 19A.

Figure 20B:
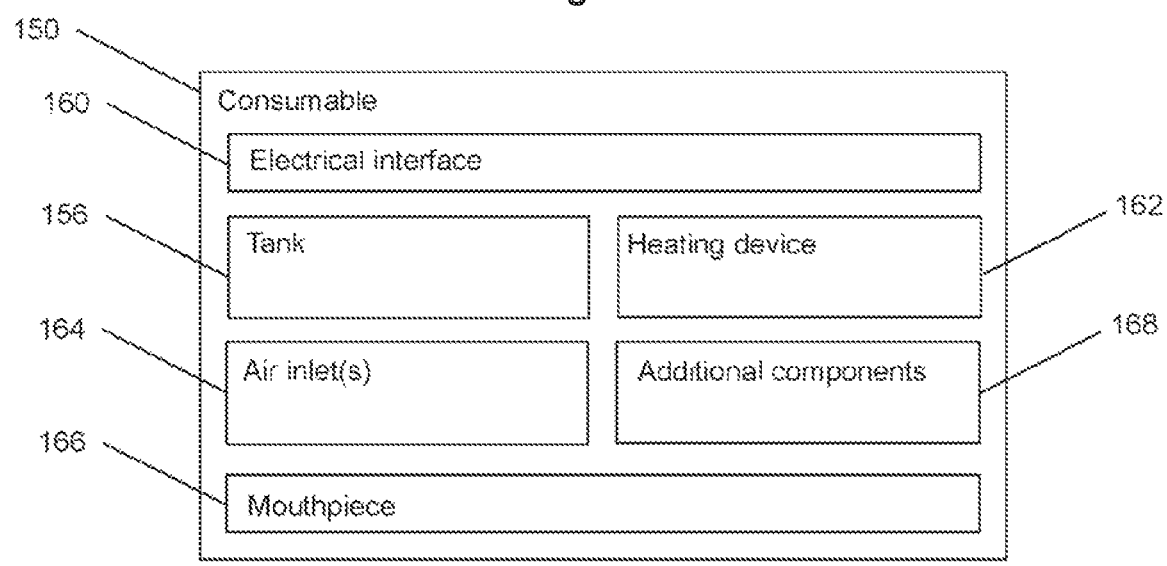

FIG. 20B is a schematic view of the consumable of the smoking substitute device of FIG. 19A.

Figure 21:
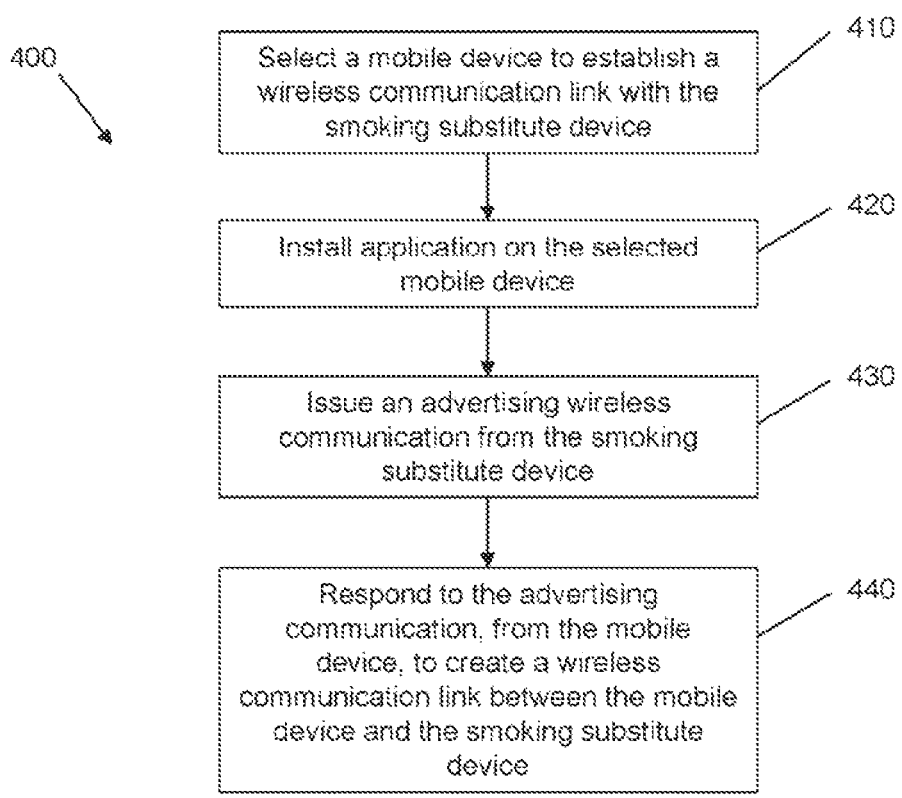

FIG. 21 is a flowchart of a method for establishing a wireless communication link between a smoking substitute device and a mobile device.

Figure 22:
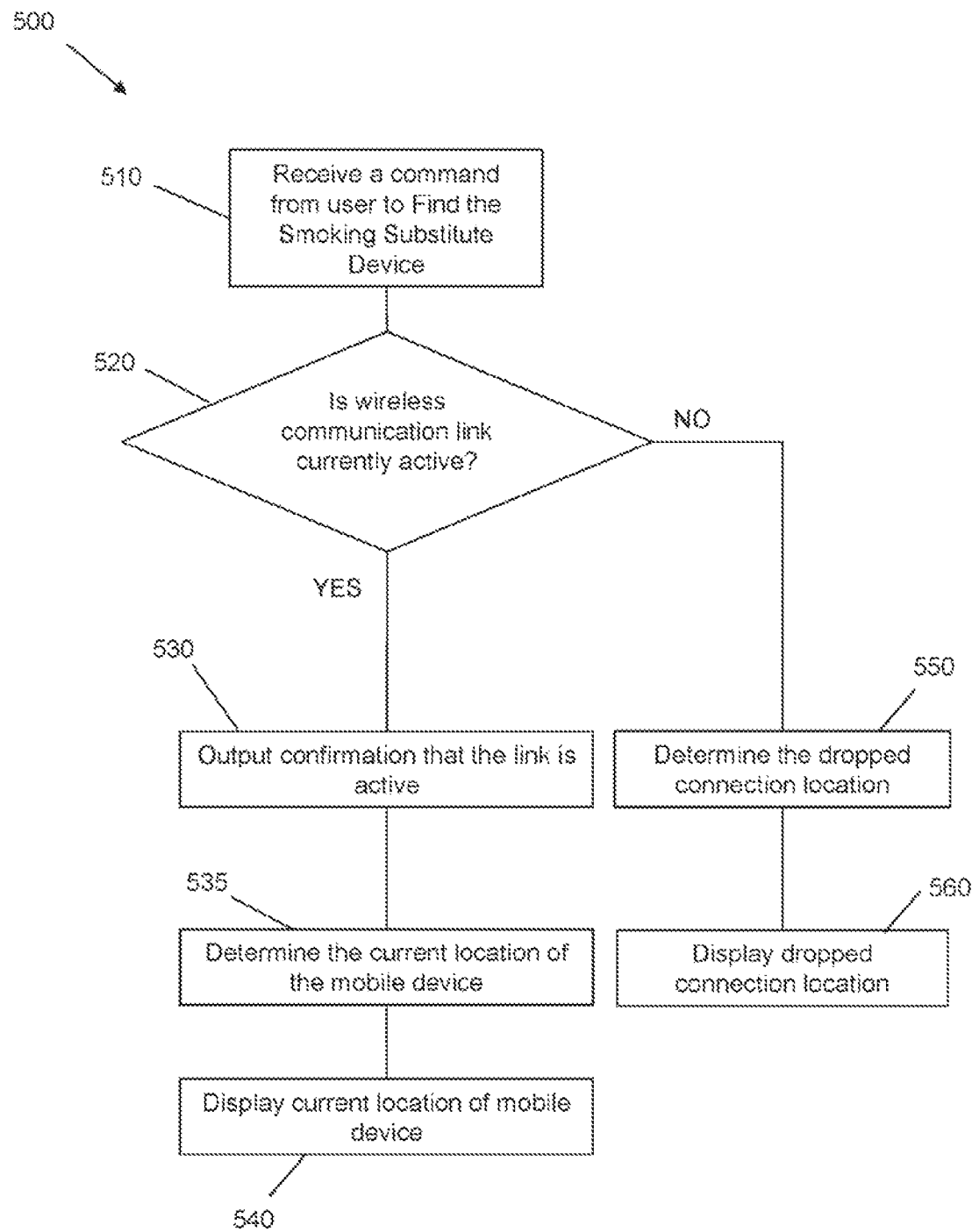

FIG. 22 is a flowchart of a method for locating a smoking substitute device, according to an embodiment of the disclosure.

Figure 23:
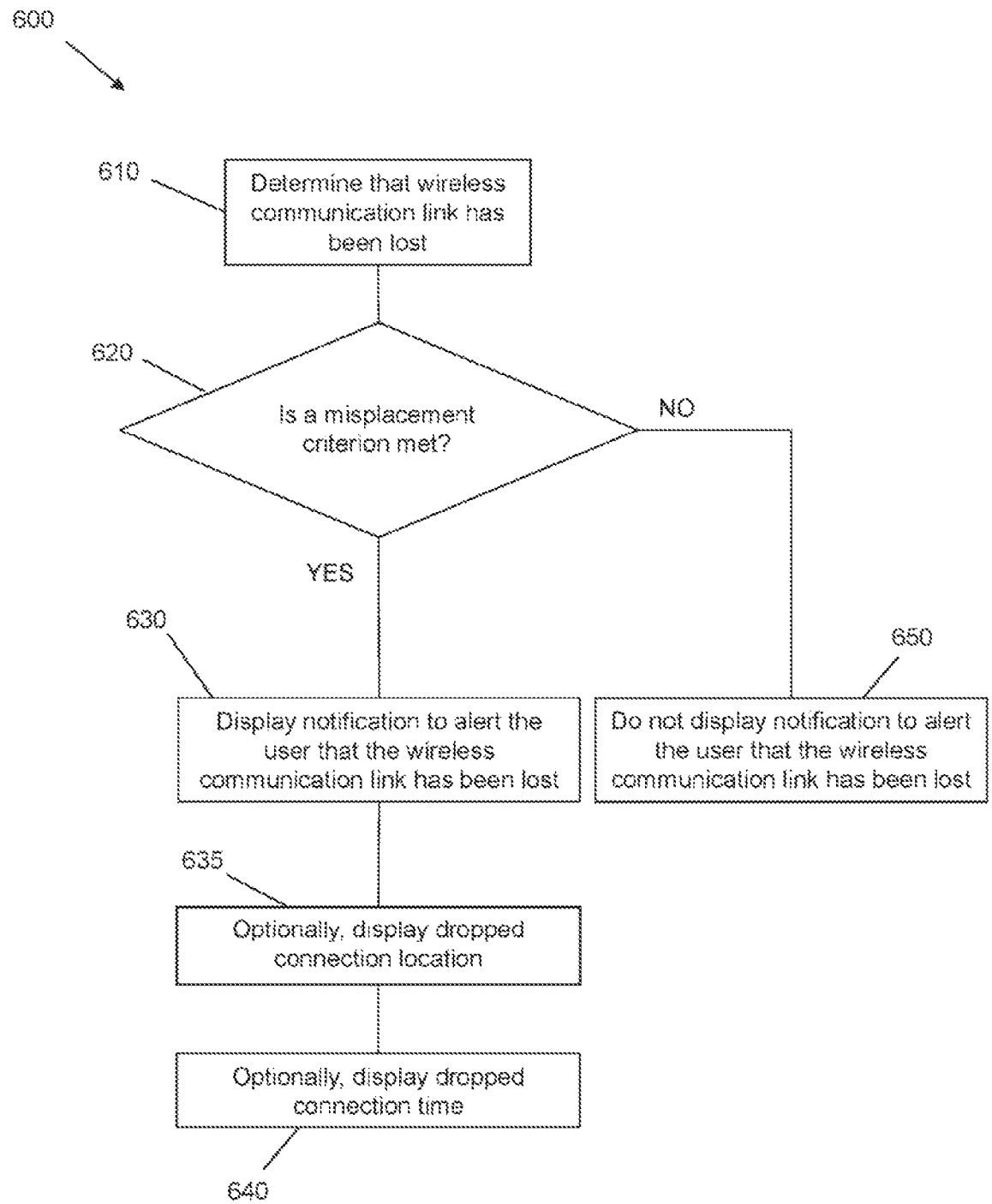

FIG. 23 is a flowchart of a method for displaying the dropped connection location to a user, according to an embodiment of the disclosure.

Figure 24A:
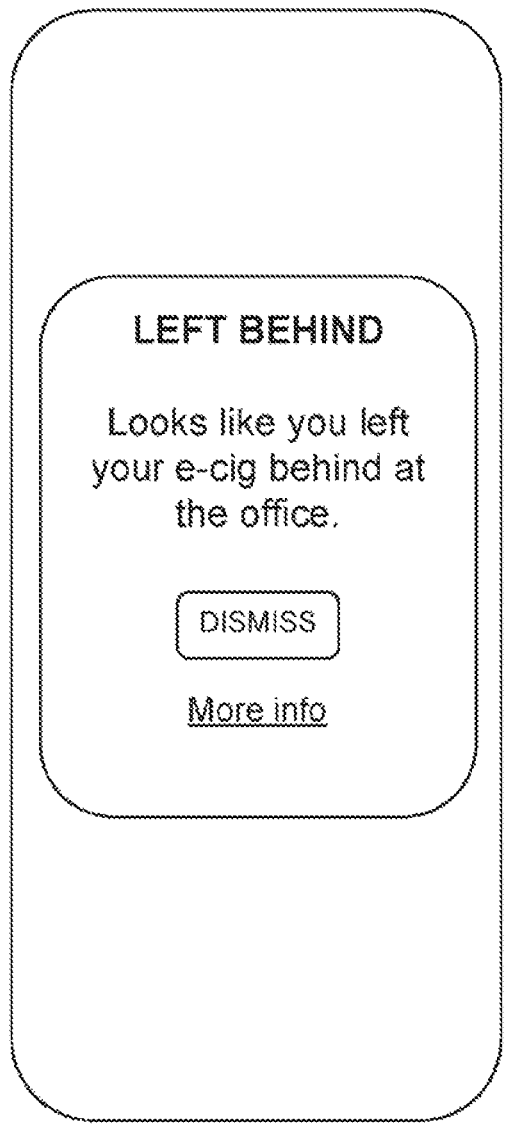
Figure 24B:
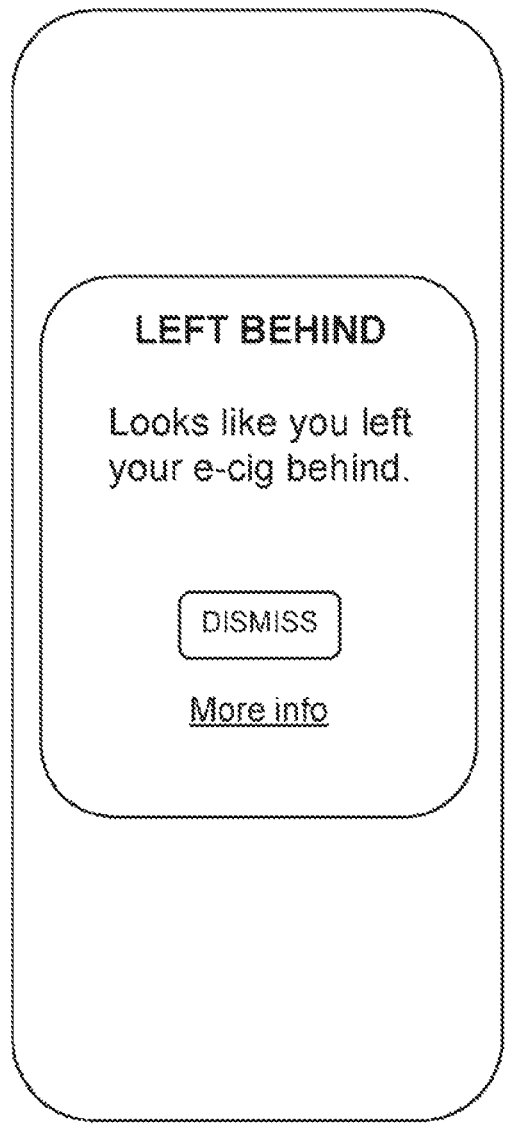

FIGS. 24A-B depict example notifications which could be displayed using a display of a mobile device, according to an embodiment of the disclosure.

Figure 25:
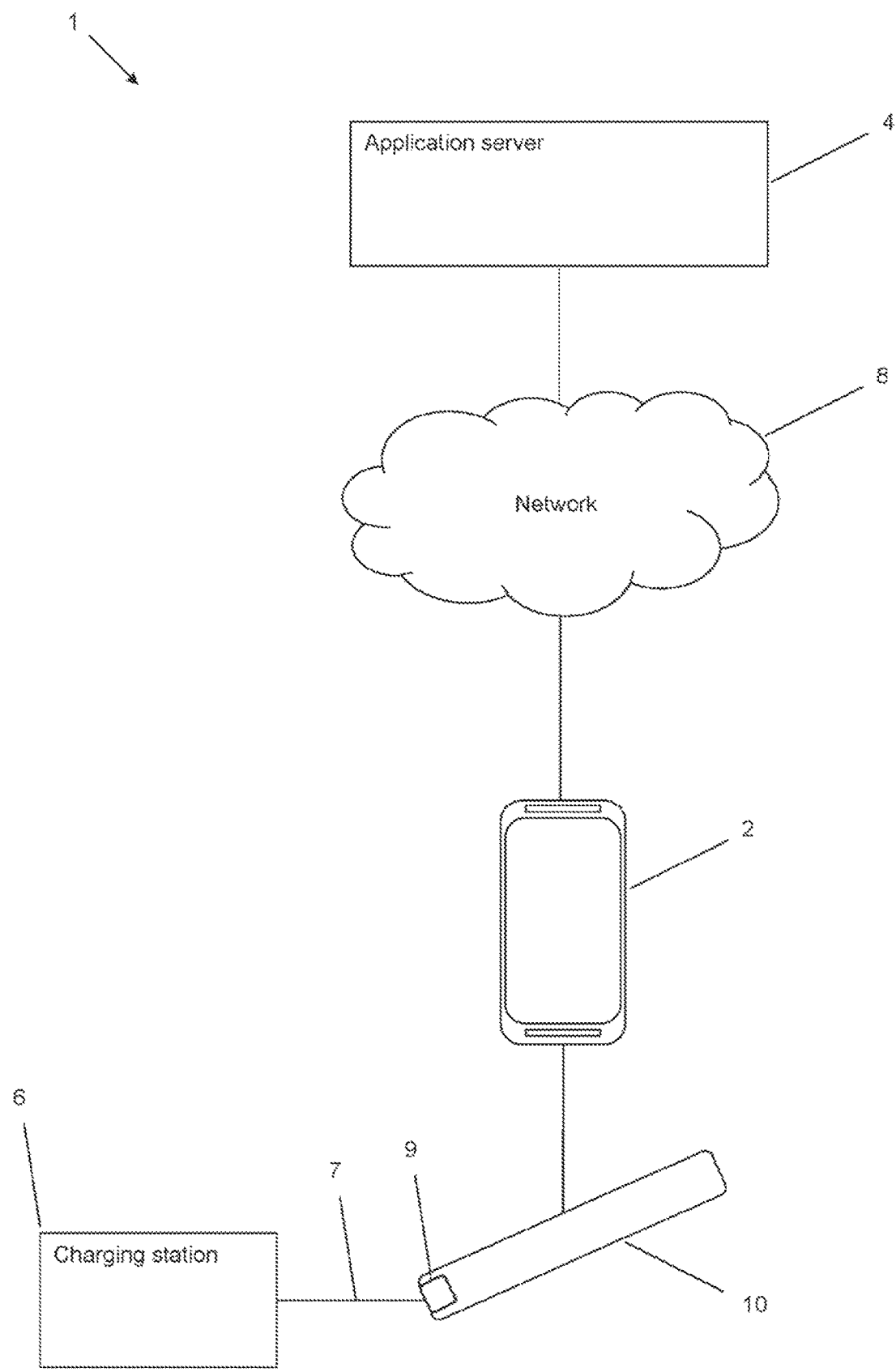

FIG. 25 shows an example system for managing a smoking substitute device.

Figure 26A:
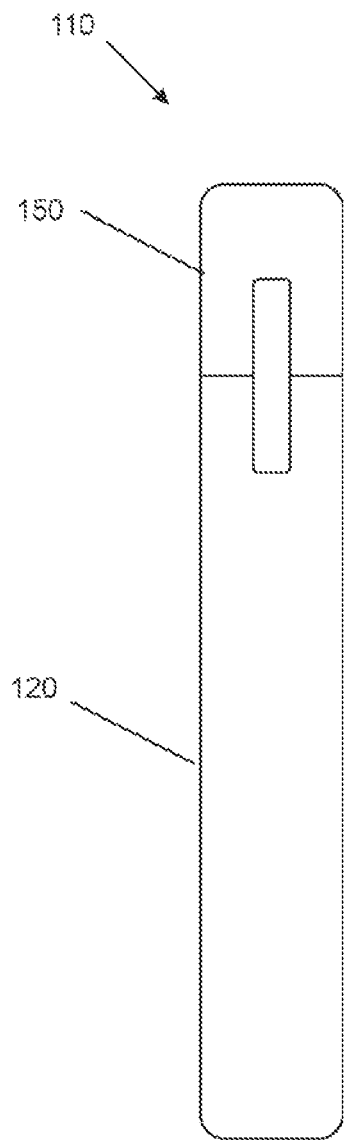

FIG. 26A shows an example smoking substitute device for use as the smoking substitute device in the system of FIG. 25.

Figure 26B:
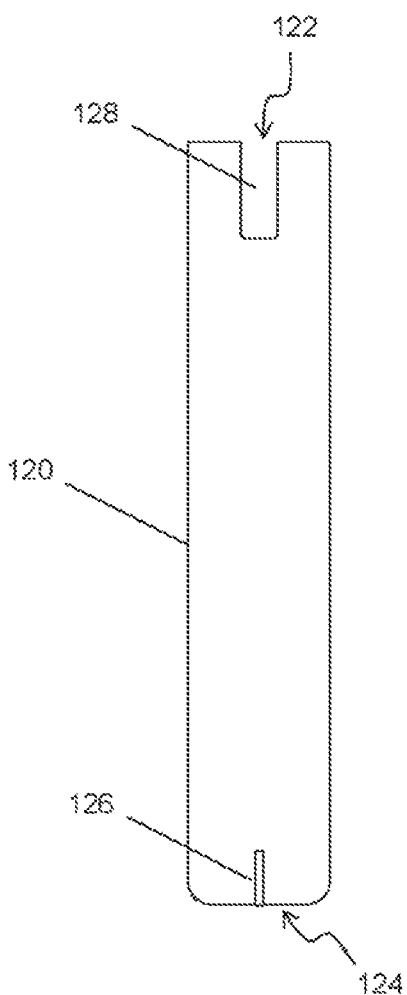

FIG. 26B shows the main body of the smoking substitute device of FIG. 26A without the consumable.

Figure 26C:
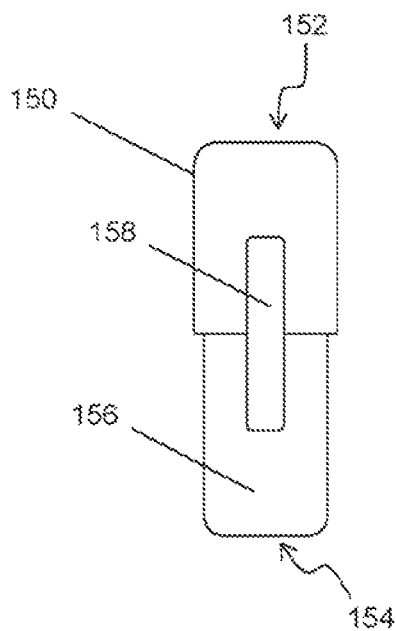

FIG. 26C shows the consumable of the smoking substitute device of FIG. 26A without the main body.

Figure 27A:
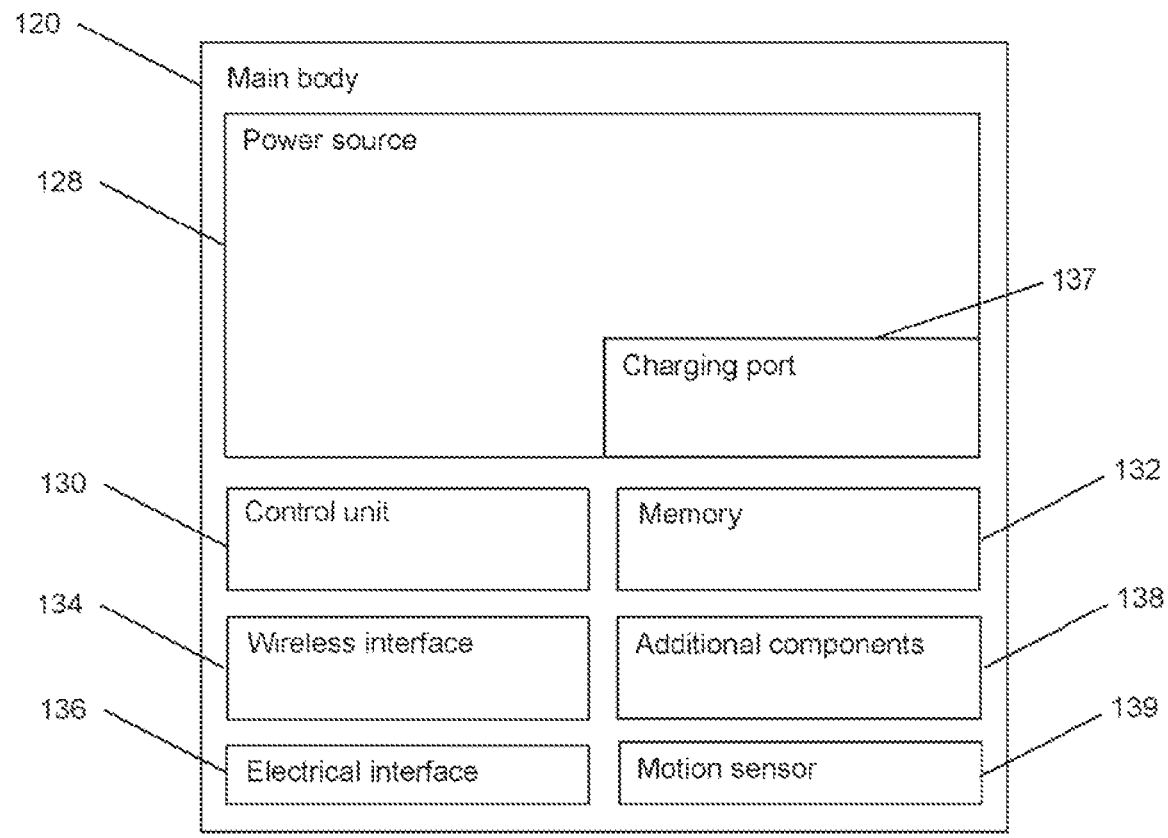

FIG. 27A is a schematic view of the main body of the smoking substitute device of FIG. 26A.

Figure 27B:
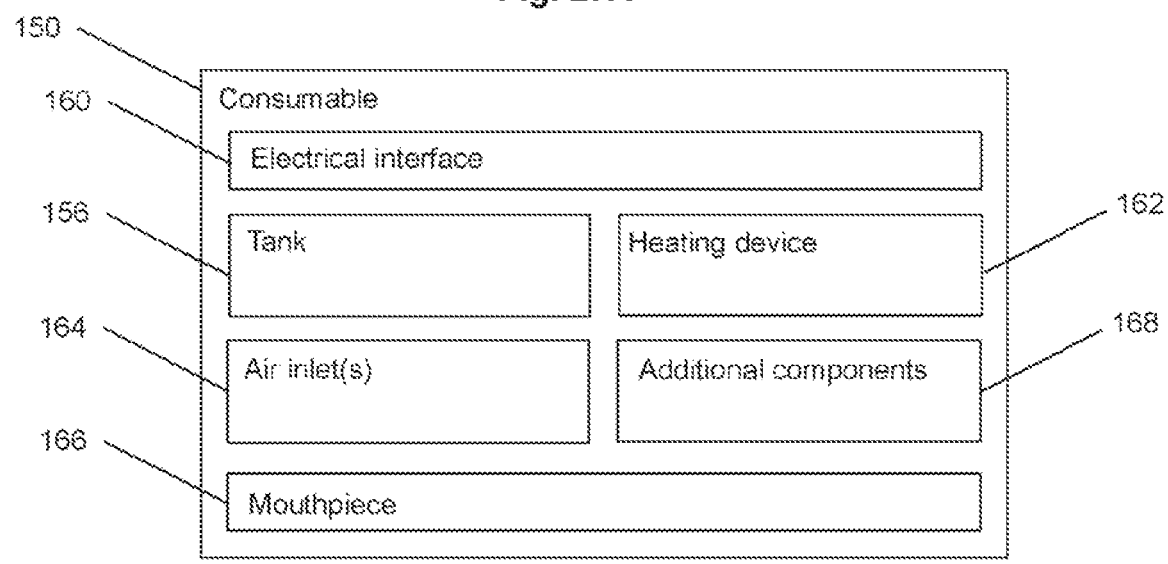

FIG. 27B is a schematic view of the consumable of the smoking substitute device of FIG. 26A.

Figure 28:
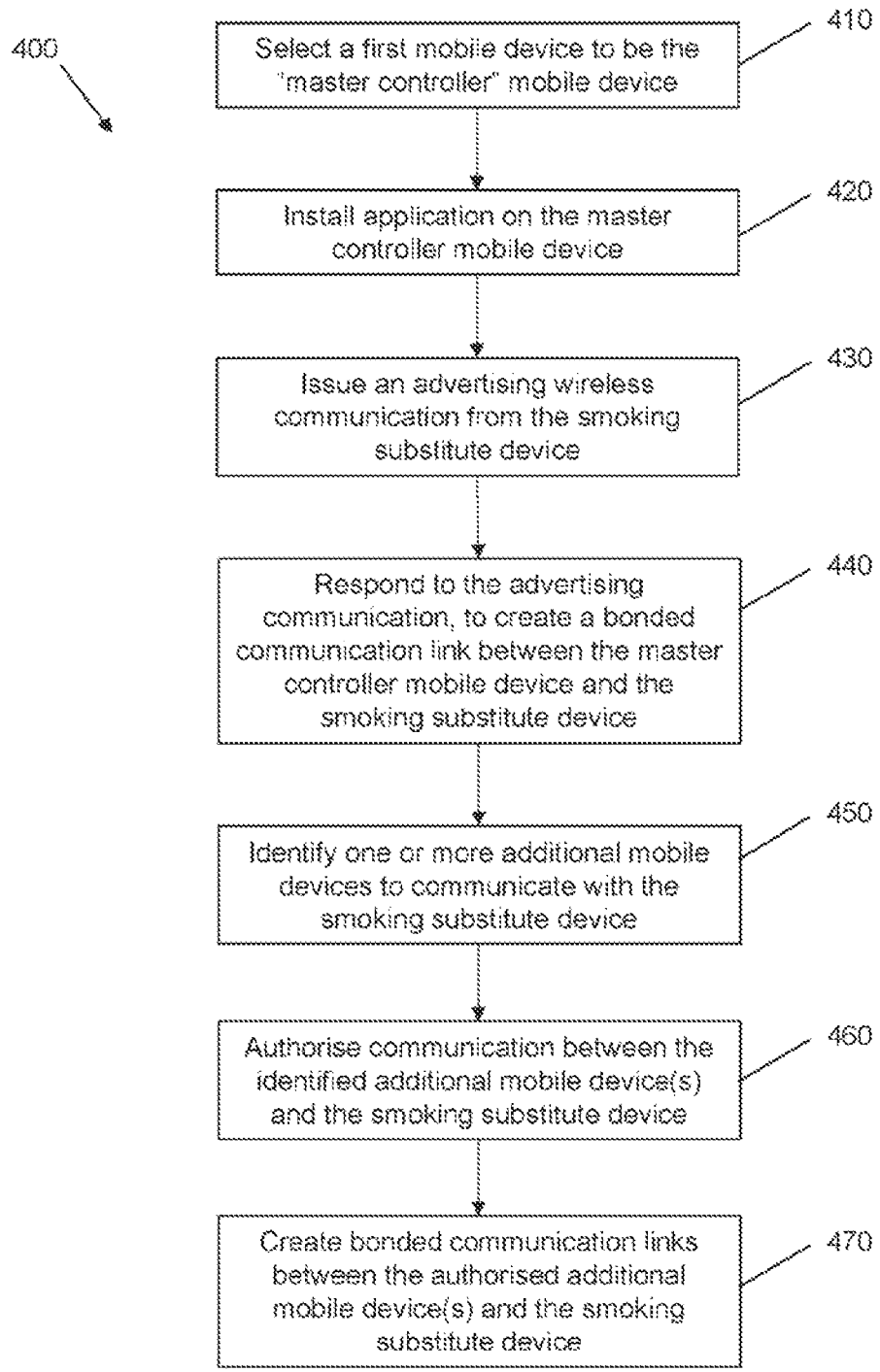

FIG. 28 is a flowchart of a method for controlling bi-directional communication between a smoking substitute device and a plurality of mobile devices.

Figure 29:
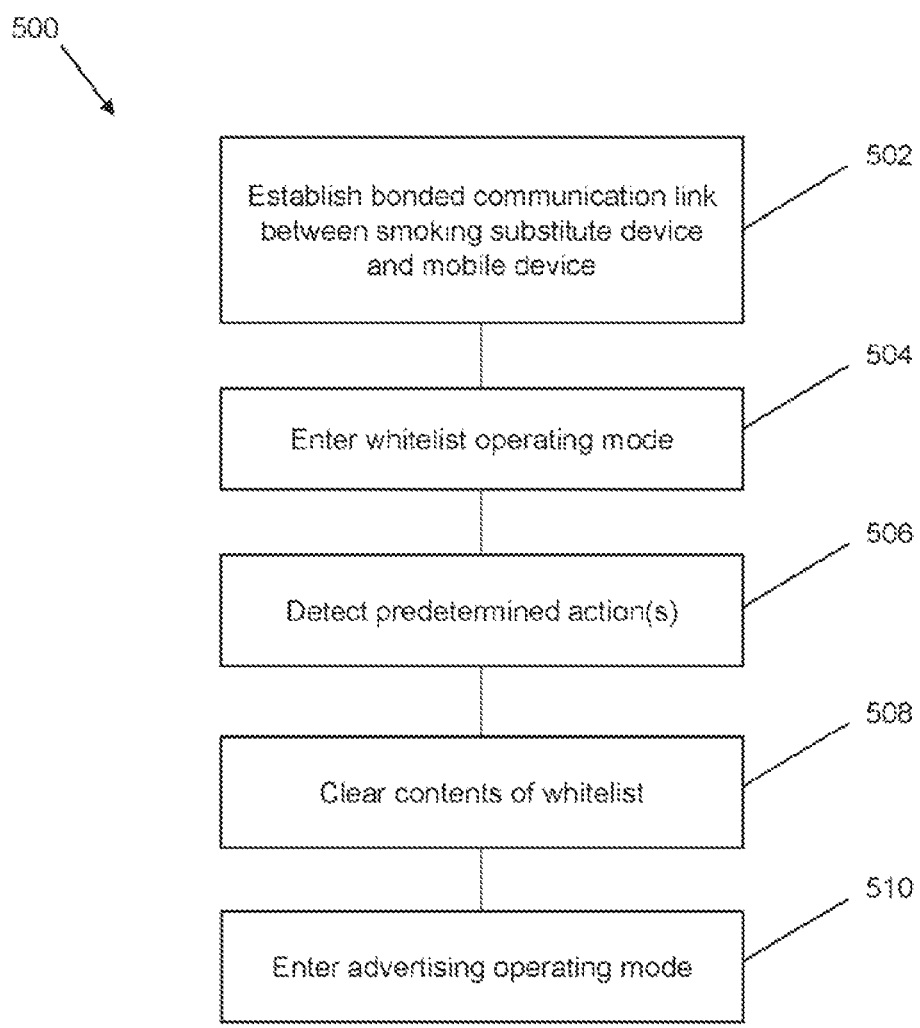

FIG. 29 is a flowchart of a method for resetting a whitelist in a smoking substitute device that is an embodiment of the disclosure.

Figure 30:
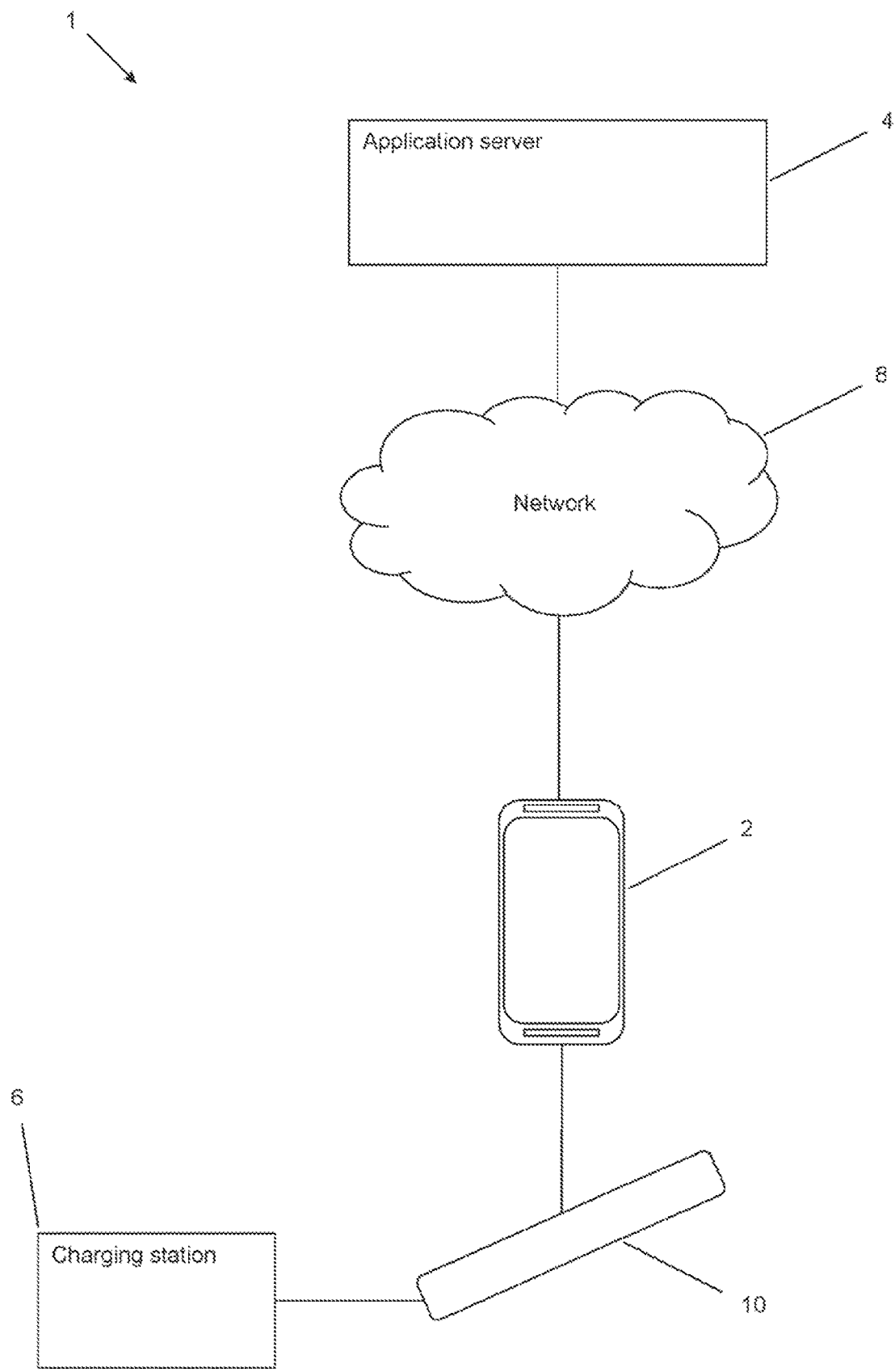

FIG. 30 shows an example system for managing a smoking substitute device.

Figure 31A:
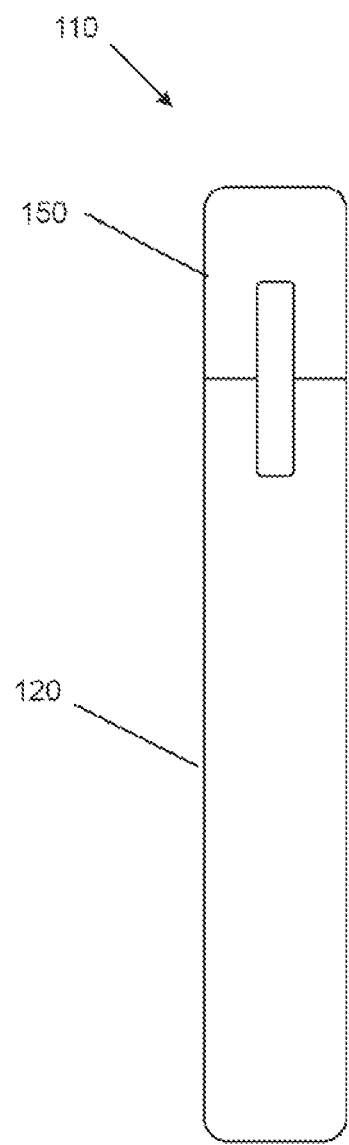

FIG. 31A shows an example smoking substitute device for use as the smoking substitute device in the system of FIG. 30.

Figure 31B:
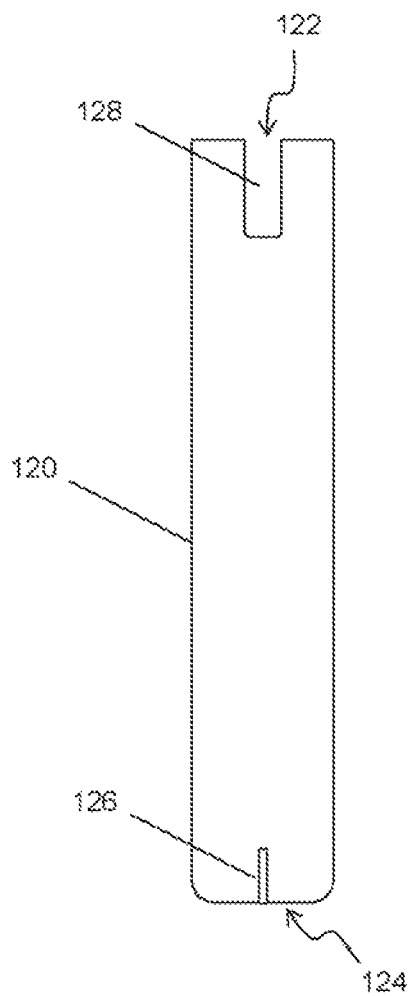

FIG. 31B shows the main body of the smoking substitute device of FIG. 31A without the consumable.

Figure 31C:
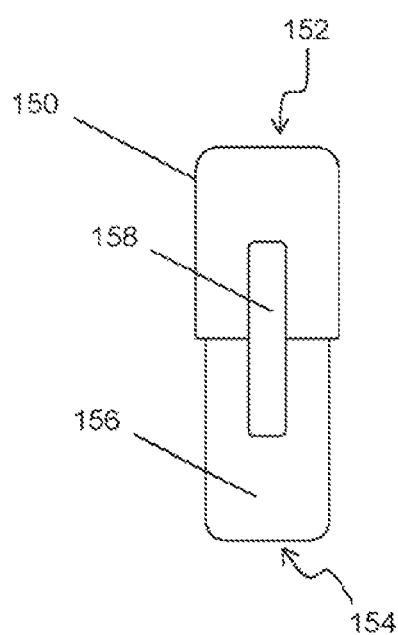

FIG. 31C shows the consumable of the smoking substitute device of FIG. 31A without the main body.

Figure 32A:
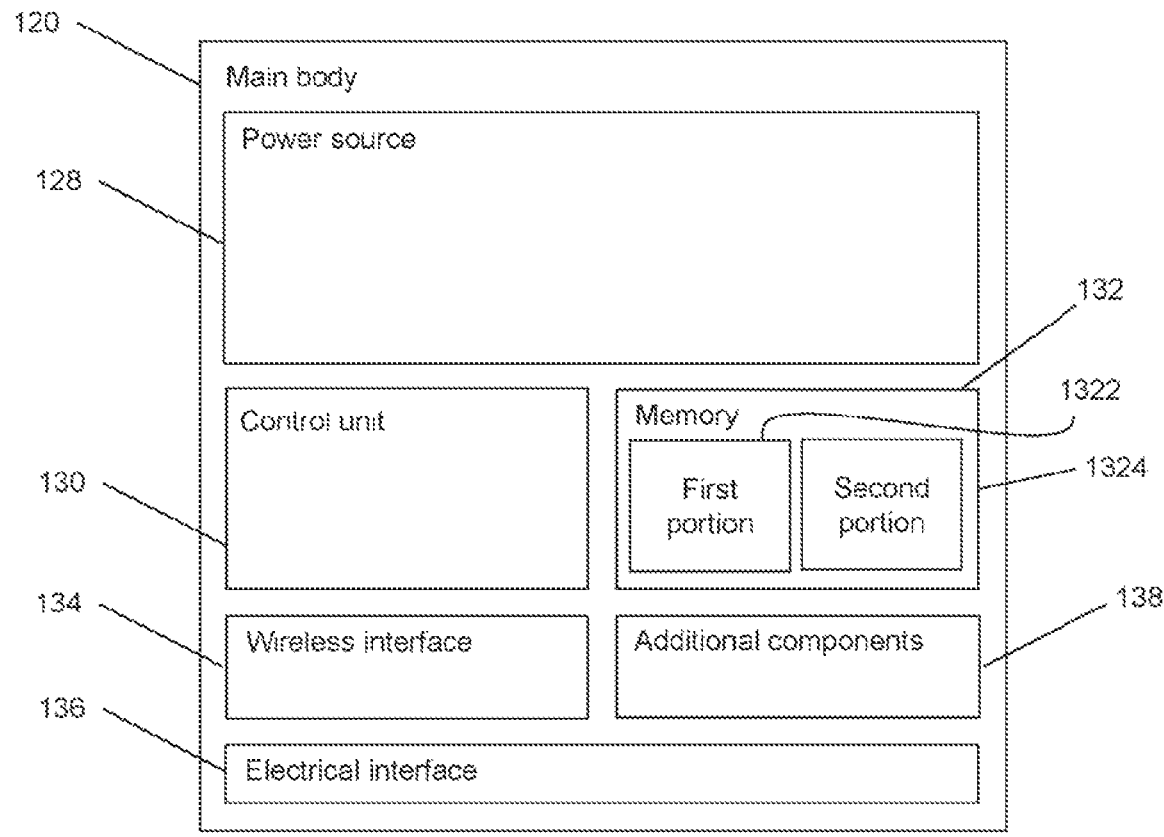

FIG. 32A is a schematic view of the main body of the smoking substitute device of FIG. 31A.

Figure 32B:
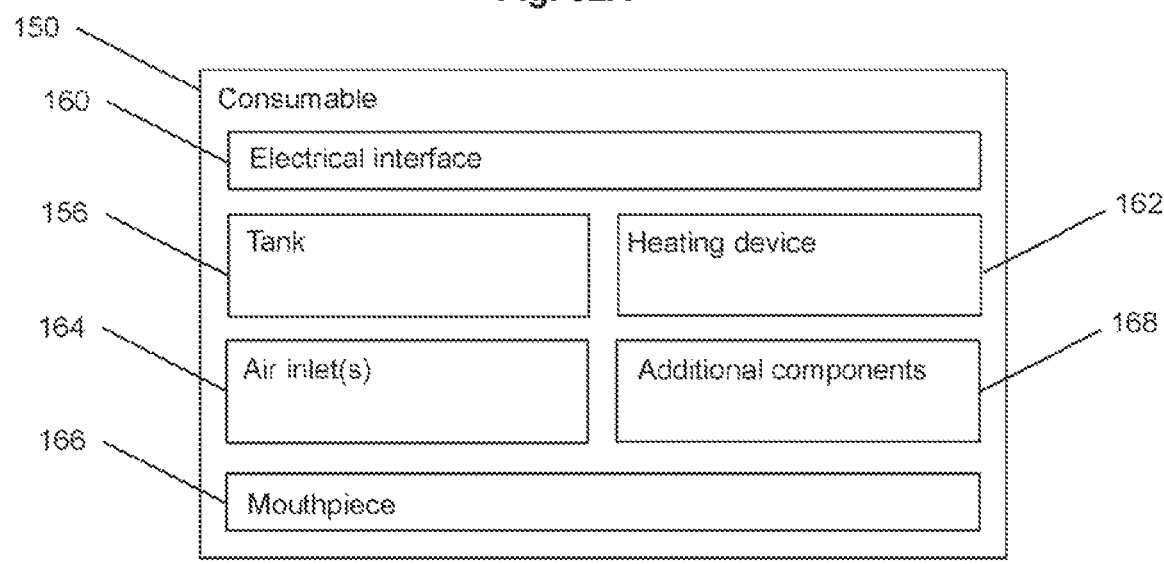

FIG. 32B is a schematic view of the consumable of the smoking substitute device of FIG. 31A.

Figure 33:
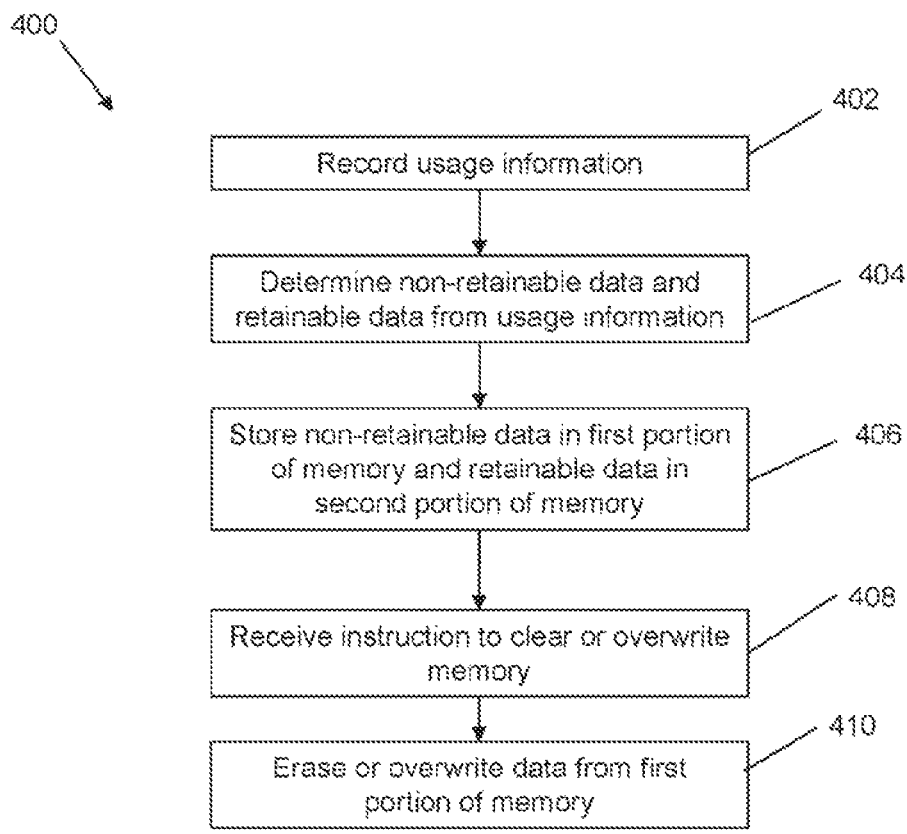

FIG. 33 is a flow diagram depict a method of managing a smoking substitute device that is an embodiment of the disclosure.

Figure 34:
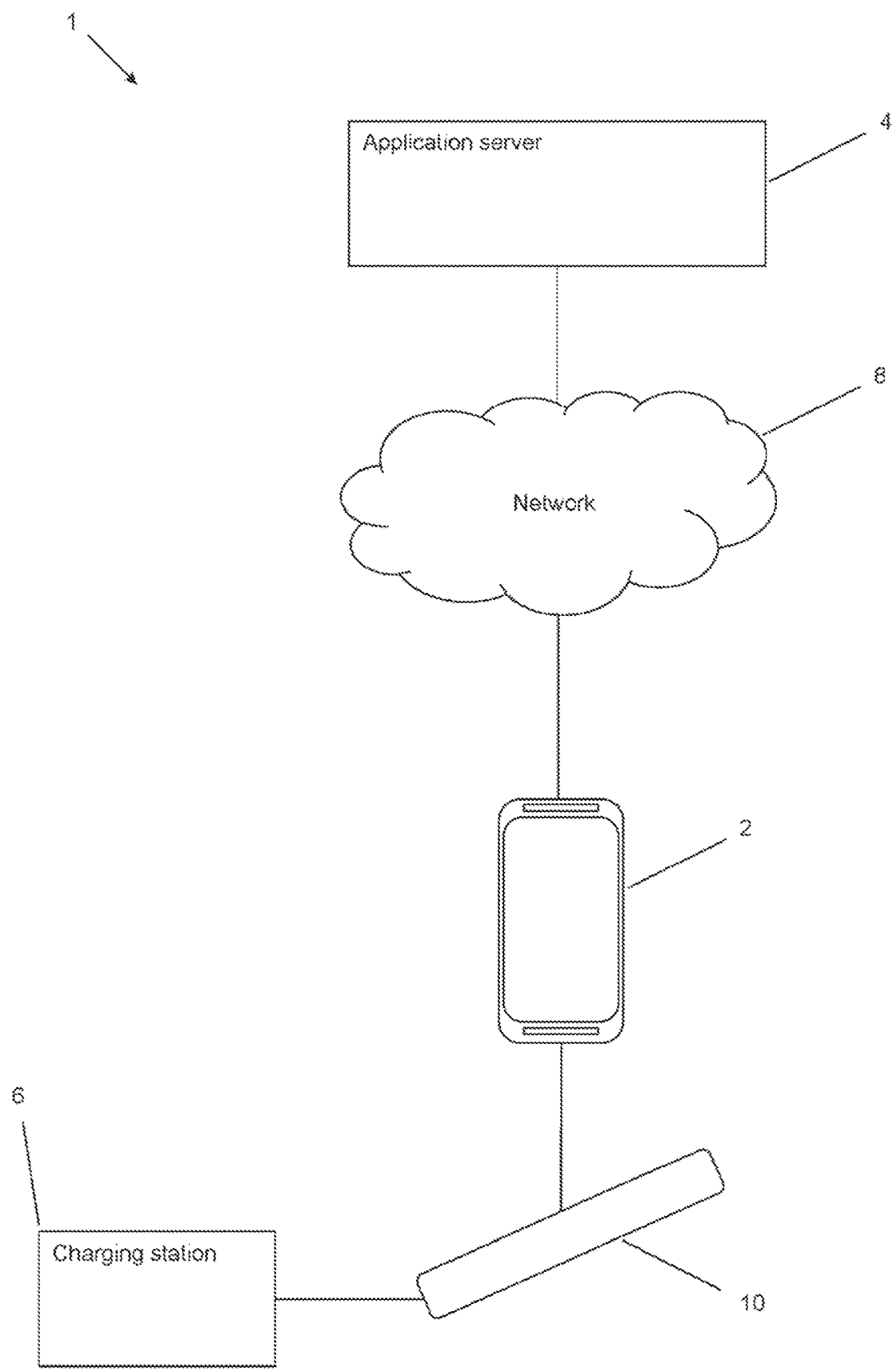

FIG. 34 shows an example system for managing a smoking substitute device.

Figure 35A:
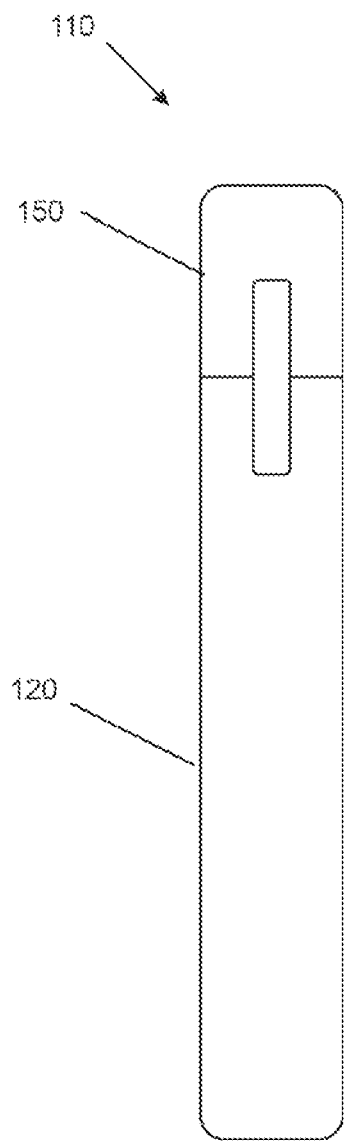

FIG. 35A shows an example smoking substitute device for use as the smoking substitute device in the system of FIG. 34.

Figure 35B:
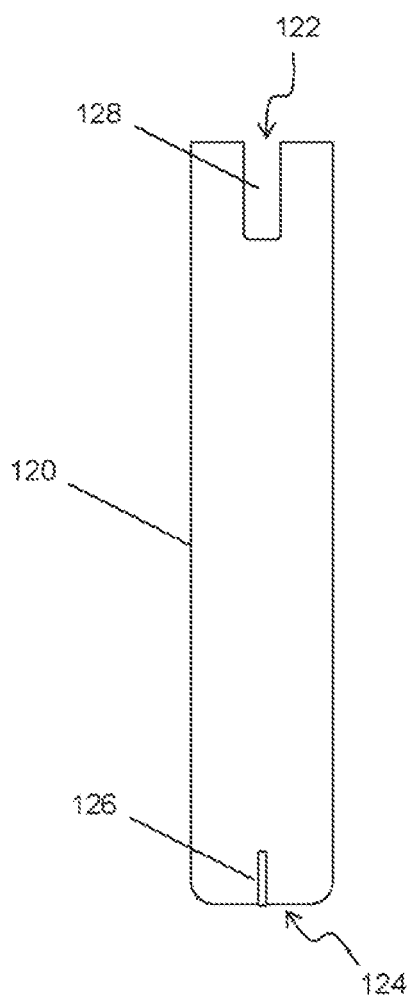

FIG. 35B shows the main body of the smoking substitute device of FIG. 35A without the consumable.

Figure 35C:
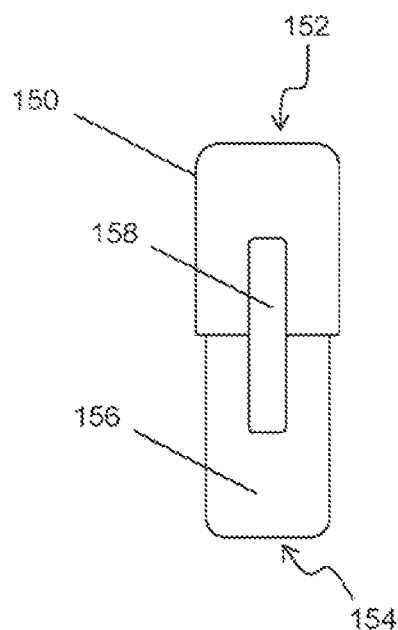

FIG. 35C shows the consumable of the smoking substitute device of FIG. 35A without the main body.

Figure 36A:
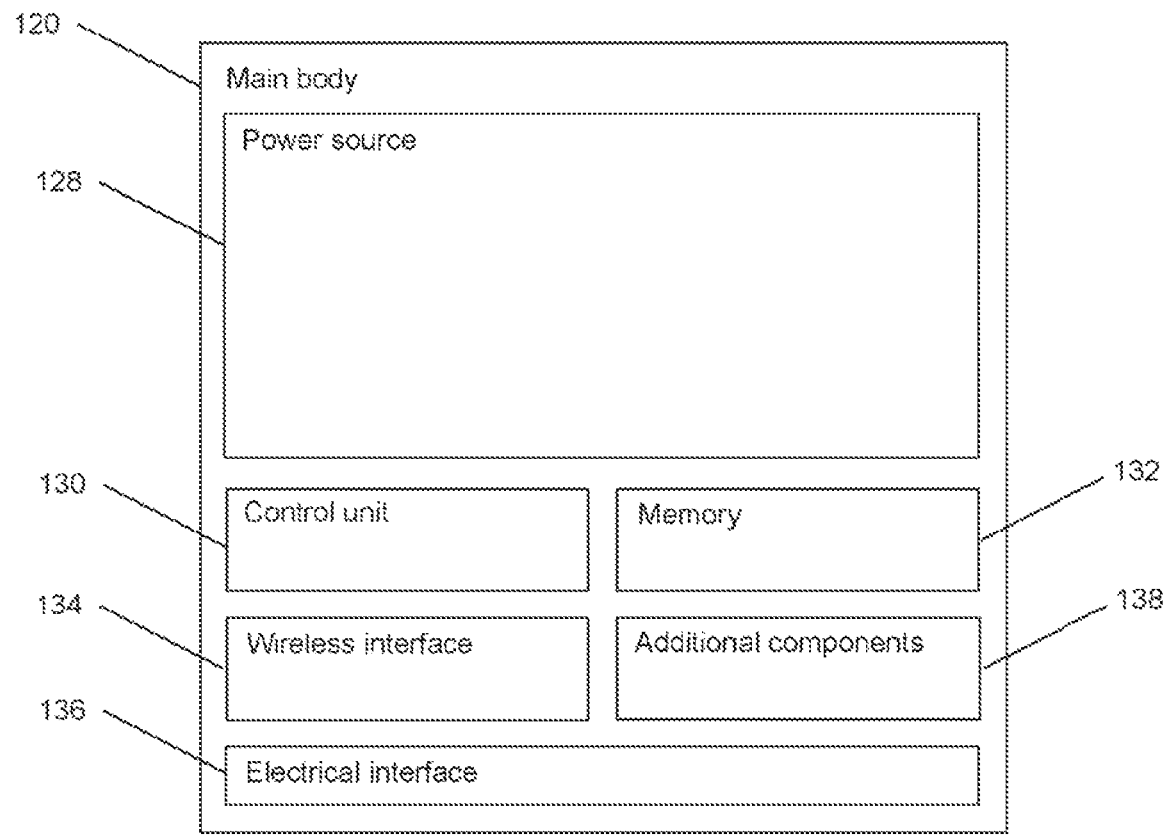

FIG. 36A is a schematic view of the main body of the smoking substitute device of FIG. 35A.

Figure 36B:
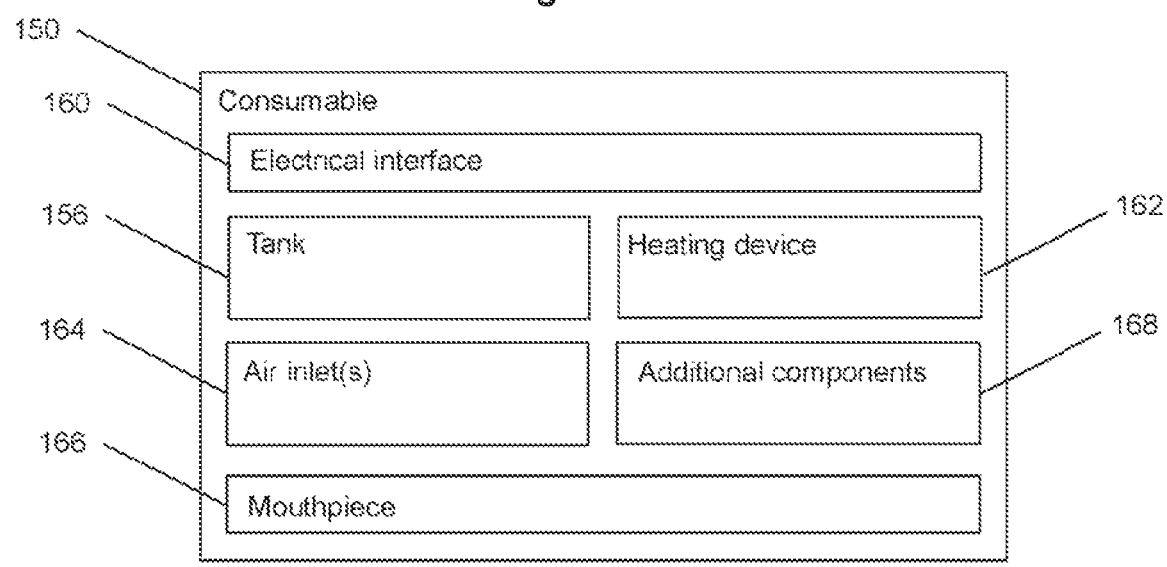

FIG. 36B is a schematic view of the consumable of the smoking substitute device of FIG. 35A.

Figure 37:
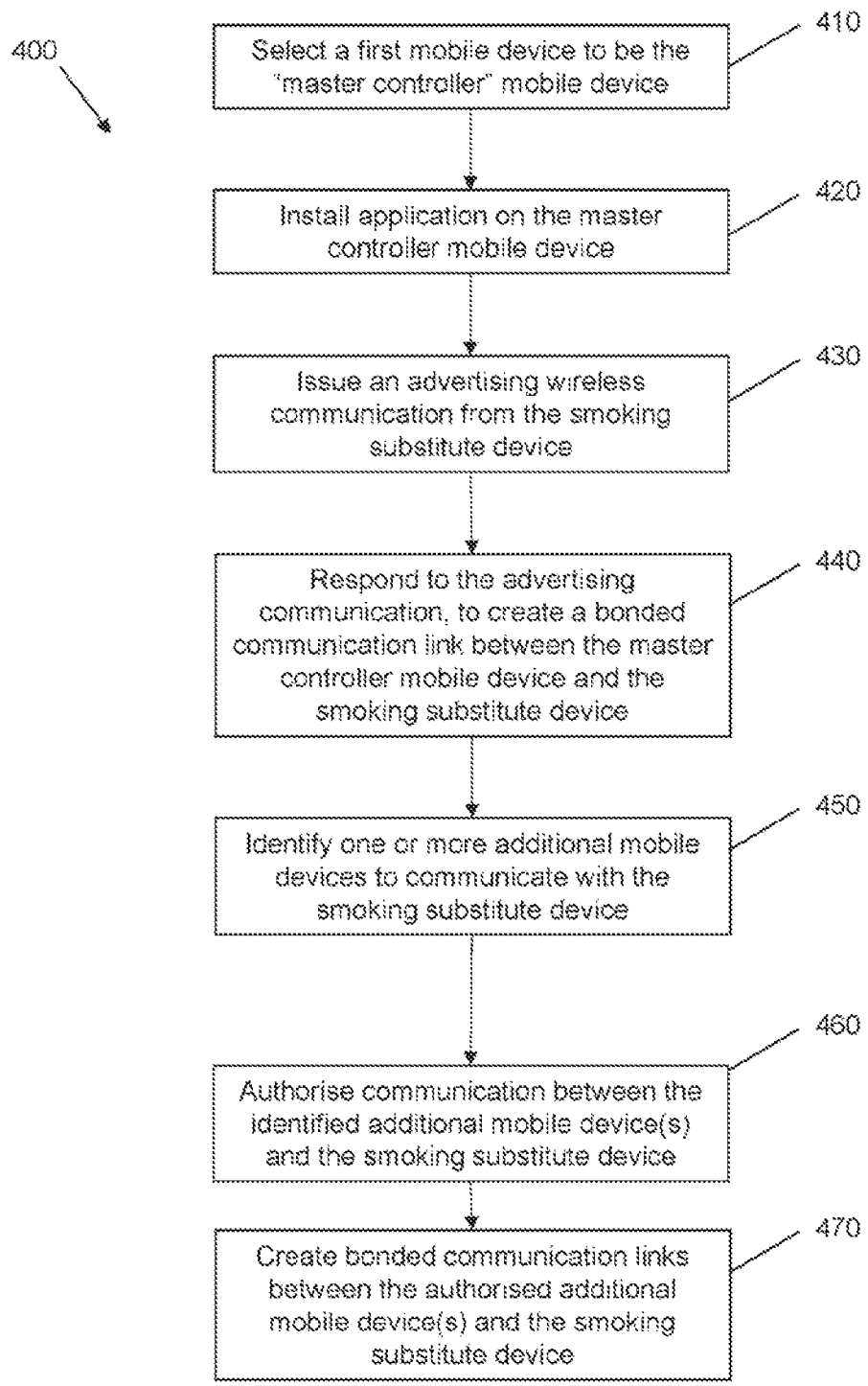

FIG. 37 is a flowchart of a method for controlling bi-directional communication between a smoking substitute device and a plurality of mobile devices, which is an embodiment of the disclosure.

PART A (P01043EP)

A System and Method for Managing a Smoking Substitute Device

Technical Field

The present disclosure relates to smoking substitute and particularly, although not exclusively, to controlling and updating operation of a smoking substitute device.

Background

The smoking of tobacco is generally considered to expose a smoker to potentially harmful substances. It is generally thought that a significant amount of the potentially harmful substances are generated through the heat caused by the burning and/or combustion of the tobacco and the constituents of the burnt tobacco in the tobacco smoke itself.

Conventional combustible smoking articles, such as cigarettes, typically comprise a cylindrical rod of tobacco comprising shreds of tobacco which is surrounded by a wrapper, and usually also a cylindrical filter axially aligned in an abutting relationship with the wrapped tobacco rod. The filter typically comprises a filtration material which is circumscribed by a plug wrap. The wrapped tobacco rod and the filter are joined together by a wrapped band of tipping paper that circumscribes the entire length of the filter and an adjacent portion of the wrapped tobacco rod. A conventional cigarette of this type is used by lighting the end opposite to the filter, and burning the tobacco rod. The smoker receives mainstream smoke into their mouth by drawing on the mouth end or filter end of the cigarette.

Combustion of organic material such as tobacco is known to produce tar and other potentially harmful by-products. There have been proposed various smoking substitute devices in order to avoid the smoking of tobacco.

Such smoking substitute devices can form part of nicotine replacement therapies aimed at people who wish to stop smoking and overcome a dependence on nicotine.

Smoking substitute devices may comprise electronic systems that permit a user to simulate the act of smoking by producing an aerosol (also referred to as a "vapour") that is drawn into the lungs through the mouth (inhaled) and then exhaled. The inhaled aerosol typically bears nicotine and/or flavourings without, or with fewer of, the odour and health risks associated with traditional smoking.

In general, smoking substitute devices are intended to provide a substitute for the rituals of smoking, whilst providing the user with a similar experience and satisfaction to those experienced with traditional smoking and tobacco products. Some smoking substitute systems use smoking substitute articles (also referred to as a "consumables") that are designed to resemble a traditional cigarette and are cylindrical in form with a mouthpiece at one end.

The popularity and use of smoking substitute devices has grown rapidly in the past few years. Although originally marketed as an aid to assist habitual smokers wishing to quit tobacco smoking, consumers are increasingly viewing smoking substitute devices as desirable lifestyle accessories. Some smoking substitute devices are designed to resemble a traditional cigarette and are cylindrical in form with a mouthpiece at one end. Other smoking substitute devices do not generally resemble a cigarette (for example, the smoking substitute device may have a generally box-like form).

There are a number of different categories of smoking substitute devices, each utilising a different smoking substitute approach. A smoking substitute approach corresponds to the manner in which the substitute system operates for a user.

One approach for a smoking substitute device is the so-called "vaping" approach, in which a vapourisable liquid, typically referred to (and referred to herein) as "e-liquid", is heated by a heating device to produce an aerosol vapour which is inhaled by a user. An e-liquid typically includes a base liquid as well as nicotine and/or flavourings. The resulting vapour therefore typically contains nicotine and/or flavourings. The base liquid may include propylene glycol and/or vegetable glycerin.

A typical vaping smoking substitute device includes a mouthpiece, a power source (typically a battery), a tank for containing e-liquid, as well as a heating device. In use, electrical energy is supplied from the power source to the heating device, which heats the e-liquid to produce an aerosol (or "vapour") which is inhaled by a user through the mouthpiece.

Vaping smoking substitute devices can be configured in a variety of ways. For example, there are "closed system" vaping smoking substitute devices which typically have a sealed tank and heating element which is pre-filled with e-liquid and is not intended to be refilled by an end user. One subset of closed system vaping smoking substitute devices include a main body which includes the power source, wherein the main body is configured to be physically and electrically coupled to a consumable including the tank and the heating element. In this way, when the tank of a consumable has been emptied, the main body can be reused by connecting it to a new consumable. Another subset of closed system vaping smoking substitute devices are completely disposable, and intended for one-use only.

There are also "open system" vaping smoking substitute devices which typically have a tank that is configured to be refilled by a user, so the device can be used multiple times.

An example vaping smoking substitute device is the Myblu™ e-cigarette. The Myblu™ e-cigarette is a closed system device which includes a main body and a consumable. The main body and consumable are physically and electrically coupled together by pushing the consumable into the main body. The main body includes a rechargeable battery. The consumable includes a mouthpiece, a sealed tank which contains e-liquid, as well as a heating device, which for this device is a heating filament coiled around a portion of a wick which is partially immersed in the e-liquid. The device is activated when a microprocessor on board the main body detects a user inhaling through the mouthpiece. When the device is activated, electrical energy is supplied from the power source to the heating device, which heats e-liquid from the tank to produce a vapour which is inhaled by a user through the mouthpiece.

Another example vaping smoking substitute device is the blu PRO™ e-cigarette. The blu PRO™ e-cigarette is an open system device which includes a main body, a (refillable) tank, and a mouthpiece. The main body and tank are physically and electrically coupled together by screwing one to the other. The mouthpiece and refillable tank are physically coupled together by screwing one of the other, and detaching the mouthpiece from the refillable tank allows the tank to be refilled with e-liquid. The device is activated by a button on the main body. When the device is activated, electrical energy is supplied from the power source to a heating device, which heats e-liquid from the tank to produce a vapour which is inhaled by a user through the mouthpiece.

Another approach for a smoking substitute system is the so-called Heated Tobacco ("HT") approach in which tobacco (rather than an "e-liquid") is heated or warmed to release vapour. HT is also known as "heat not burn" ("HNB"). The tobacco may be leaf tobacco or reconstituted tobacco. The vapour may contain nicotine and/or flavourings. In the HT approach the intention is that the tobacco is heated but not burned, i.e., the tobacco does not undergo combustion.

A typical HT smoking substitute system may include a device and a consumable. The consumable may include the tobacco material. The device and consumable may be configured to be physically coupled together. In use, heat may be imparted to the tobacco material by a heating element of the device, wherein airflow through the tobacco material causes components in the tobacco material to be released as vapour. A vapour may also be formed from a carrier in the tobacco material (this carrier may for example include propylene glycol and/or vegetable glycerine) and additionally volatile compounds released from the tobacco. The released vapour may be entrained in the airflow drawn through the tobacco.

As the vapour passes through the consumable (entrained in the airflow) from the location of vaporisation to an outlet of the consumable (e.g., a mouthpiece), the vapour cools and condenses to form an aerosol for inhalation by the user. The aerosol will normally contain the volatile compounds.

In HT smoking substitute systems, heating as opposed to burning the tobacco material is believed to cause fewer, or smaller quantities, of the more harmful compounds ordinarily produced during smoking. Consequently, the HT approach may reduce the odour and/or health risks that can arise through the burning, combustion and pyrolytic degradation of tobacco.

There may be a need for improved design of smoking substitute systems, in particular HT smoking substitute systems, to enhance the user experience and improve the function of the HT smoking substitute system.

An example of the HT approach is the IQOS™ smoking substitute device from Philip Morris Ltd. The IQOS™ smoking substitute device uses a consumable, including reconstituted tobacco located in a wrapper. The consumable includes a holder incorporating a mouthpiece. The consumable may be inserted into a main body that includes a heating device. The heating device has a thermally conductive heating knife which penetrates the reconstituted tobacco of the consumable, when the consumable is inserted into the heating device. Activation of the heating device heats the heating element (in this case a heating knife), which, in turn, heats the tobacco in the consumable. The heating of the tobacco causes it to release nicotine vapour and flavourings which may be drawn through the mouthpiece by the user through inhalation.

A second example of the HT approach is the device known as "Gb"™ from British American Tobacco p.l.c. Glo™ comprises a relatively thin consumable. The consumable includes leaf tobacco which is heated by a heating device located in a main body. When the consumable is placed in the main body, the tobacco is surrounded by a heating element of the heating device. Activation of the heating device heats the heating element, which, in turn, heats the tobacco in the consumable. The heating of the tobacco causes it to release nicotine vapour and flavourings which may be drawn through the consumable by the user through inhalation. The tobacco, when heated by the heating device, is configured to produce vapour when heated rather than when burned (as in a smoking apparatus, e.g., a cigarette). The tobacco may contain high levels of aerosol formers (carrier), such as vegetable glycerine ("VG") or propylene glycol ("PG").

The present inventor(s) have observed that most smoking substitute devices currently on the market are configured to operate in isolation of other devices, which limits the functions the smoking substitute devices can perform.

The present inventor(s) have observed that, as smoking substitute devices become more sophisticated, the management of smoking substitute devices should also improve. In particular, when smoking substitute devices have software installed, for controlling operation of the device, that software requires management. Moreover, the present inventor(s) have observed that potential security concerns must be taken into account, in the management of software.

The present disclosure has been devised in light of the above considerations.

SUMMARY OF THE DISCLOSURE

At its most general, the present disclosure provides a device, system and method that enable firmware updates to be provided for a smoking substitute device in a secure, streamlined and reliable manner.

The disclosure enables a server to provide a firmware update, comprising a new firmware version that may comprise a new firmware image, to one or more smoking substitute devices. The new firmware image may be communication directly to the smoking substitute device from an application server, e.g., over a wireless communication link established between the application server and the smoking substitute device. Alternatively, the new firmware image may be provided via an application installed on a mobile device. The application may comprise one or more application instances, each running on a different respective mobile device. An application or application instance may be configured to communicate with more than one smoking substitute device.

The application server is part of a back end system, which may include a secure portion (e.g., signing server or the like) that is has knowledge or access to a set of device-specific encryption keys, wherein each of said device-specific encryption keys is unique to a single smoking substitute device. Each smoking substitute device is configured to store its device-specific encryption key in a secure location, within its memory. No intermediate device or other entity between the smoking substitute device and the back end system has access to the device-specific encryption key. For example, the application is configured not to have access to the set of device-specific encryption keys. Moreover, the server and the smoking substitute device are configured not to transmit, or provide access to, the device-specific encryption key(s), to any other device, application or entity.

The server can use the set of device-specific encryption keys in order to encrypt a part of a firmware update notification, which is intended for updating the firmware on one or more smoking substitute devices, which the server has identified as requiring or being permitted to obtain the firmware update. That part of the firmware update notification is encrypted differently for each smoking substitute device, using the respective device-specific encryption keys.

The server does not have to encrypt the actual firmware (i.e., the new firmware version that may comprise a new firmware image) differently for each smoking substitute device. Instead, it applies a single firmware encryption key to the new firmware version, to produce a single encrypted new firmware version, which is provided to all of the smoking substitute devices, via the application. It then stores the single firmware encryption key in a part of the firmware update notification referred to herein as a firmware update message. The device-specific encryption keys are applied to the firmware update message. The resulting encrypted firmware update notifications are applicable to, and can be transmitted to, the different respective smoking substitute devices, according to which device-specific key has been applied to which notification. But the same single encrypted new firmware image can be transmitted to all of the smoking substitute devices, because no device can decrypt the encrypted new firmware image without accessing the firmware encryption key, and that firmware encryption key is securely stored in a part of the firmware update notification that has been encrypted on a device-by-device basis, using the device-specific encryption keys that are known only to the server and to the individual respective devices.

Therefore, only the smoking substitute devices that have been identified by the server as requiring (or being permitted to obtain) the firmware update will be able to access, decrypt and use that firmware update. Moreover, each device will only be able to access the firmware update via the specific firmware update notification that the server has identified as being intended for that device—it cannot use a different firmware update notification that was intended for a second, different smoking substitute device, even if that second, different smoking substitute device has also been identified by the server as an intended recipient of the same firmware update.

Therefore, a highly secure but computationally streamlined method for updating the firmware on a smoking substitute device is provided.

The smoking substitute device can be configured to run a verification process on a new firmware image that it has obtained from the application server, via an application. It can also send confirmation of firmware update success via a wireless message to the mobile device, in which it transmits an identifier of the version of the firmware that it is now running. The application server can, when it receives that confirmation via the application, respond with a command to set the secure time on the device.

The disclosure relates in particular to network-enabled smoking substitute devices, where in a network-enabled device has a wireless interface for communicating with the wireless interface of another device. For example, the other device may be a mobile device such as a mobile phone, smartphone, laptop computer or tablet computer or a television or gaming device. The wireless interface may comprise any suitable type of wireless communication interface, or terminal, for example a Wi-Fi or Bluetooth™ or Bluetooth™ Low Energy (BLE) interface. The wireless interface may be configured to establish a communication link between the smoking substitute device and an application server.

According to a first aspect of the disclosure, there is provided a system for managing a smoking substitute device, the system comprising: a smoking substitute device comprising: a control unit; a memory configured to store firmware for operating the smoking substitute device and a device-specific encryption key; and a communications interface. The system further comprises an application server configured to communicate to the smoking substitute device a firmware update message that is encrypted with the device-specific encryption key, wherein the smoking substitute device is configured to obtain an encrypted firmware image, wherein the firmware update message includes a firmware key for decrypting the encrypted firmware image, and wherein the smoking substitute device is configured to use the device-specific encryption key to decrypt the firmware update message, to obtain the firmware key for decrypting the encrypted firmware image.

The smoking substitute device may be configured to use the device-specific encryption key to decrypt the firmware update message, in order to obtain the firmware key for decrypting the encrypted firmware image. The smoking substitute device may be further configured to: decrypt the encrypted firmware image using the firmware key; and update the firmware for operating the smoking substitute device using the decrypted firmware image.

The device-specific encryption key may be different to the firmware (encryption) key. For example, they may be of different respective forms and/or they may have been created in accordance with different respective encryption protocols.

The memory of the smoking substitute device may comprise a non-volatile memory, for example a flash memory. The smoking substitute device may be configured so that the step of updating the firmware for operating the smoking substitute device comprises using the decrypted firmware image in order to overwrite an invalid previously-stored firmware image or to overwrite the oldest previously-stored firmware image, stored on the memory of the smoking substitute device.

The memory of the smoking substitute device may comprise more than one sub-section or portion. The device-specific encryption key may be stored in a memory portion that is distinct from a memory portion in which the firmware for the device is stored.

The firmware may be updated multiple times, for the same smoking substitute device.

The smoking substitute device may be in direct communication with the application server (e.g., via a wireless communication link or other suitable connection), whereby the firmware update process is handled directly using communications between those entities.

However, in another arrangement, the system may further comprises a mobile device on which an application is installed, wherein the smoking substitute device is in wireless communication with the mobile device via the communications interface. The application server may be configured to communicate with the mobile device via the application.

The application server may be configured to transmit a firmware update notification to the application on the mobile device or to the smoking substitute device. The firmware update notification may include a firmware image location identifier and the firmware update message that is encrypted with the device-specific encryption key. The application on the mobile device may be configured to: obtain an encrypted firmware image using the firmware image location identifier, and communicate the encrypted firmware image and firmware update message to the smoking substitute device.

The firmware image location identifier may comprise, for example, a Uniform Resource Locator (URL). A URL, which is also referred to as a 'web address' or a 'link', is a web resource that specifies its location on a computer network and a mechanism for retrieving it. For example, the firmware image location identifier may be a Content Delivery Network (CDN) URL. In other examples, the encrypted firmware image may be part of the firmware update notification transmitted by the application server.

The smoking substitute device is further configured to: verify the update firmware using identification data in the firmware update message; and report an outcome of verification, e.g., to the application or application server. The smoking substitute device may thus perform a firmware verification process, after it has used the decrypted firmware image in order to update the firmware for operating the smoking substitute device. The control unit of the smoking substitute device may first reboot, or restart, the device, before the firmware verification process is performed.

The smoking substitute device may be configured to report an outcome of the firmware verification process. For example, the smoking substitute device may have a bonded wireless communication link with the mobile device or the application server, and wherein the outcome of verification is reported in a hello message sent via the communication interface. The hello message may be a message of the type used to establish and maintain an active wireless connection between the two devices.

The application server may issue a set secure time command, to be transmitted to the smoking substitute device, either directly or via the application. For example, the smoking substitute device may, in its message, transmit a firmware version number, to identify the version of the firmware that it is currently running. The application server may read the firmware version number from the message and detect a change in version, as compared to the version that the smoking substitute device had most recently transmitted. This change in firmware version number may trigger the application to relay a 'firmware update successful' update to server.

The application server may form part of a back end (server side) system that comprises more than one portion or sub-section. For example, it may comprise a signing server that is responsible for encrypting the firmware and/or encrypting parts of the firmware update notifications, that are to be provided to the smoking substitute device(s) e.g., via the application(s). In contrast to the signing server, the application server may not be responsible for encrypting or decrypting data but be responsible for communicating with the application or smoking substitute device.

The back end system may include a geographically distributed Content Delivery Network (CDN) for stored the encrypted firmware image.

The firmware update message may combine the firmware key and a communication header for the smoking substitute device in a single data structure. The signing server may be configured to encrypt the data structure using the device-specific encryption key. The communication header may include information used in the verification process, e.g., to determine the authenticity of the source of the firmware update message. The communication header may include message authentication code (MAC) data for the smoking substitute device.

The system may comprise a plurality of smoking substitute devices. The same firmware key may be used in the firmware update message for each of the plurality of smoking substitute devices. The signing server may be configured to apply a single firmware key to encrypt a firmware image, in order to provide a single encrypted firmware image. The same encrypted firmware image may thus be obtained, e.g., via the application, at each of the plurality of smoking substitute devices. However, the firmware update notifications that are provided to the smoking substitute devices may nonetheless be individually encrypted. That is, the single firmware key that is required to decrypt the single encrypted firmware image may be encrypted differently for each device, using respective device-specific encryption keys. The application on the mobile device may be configured not to have access to the device-specific encryption key or to the firmware key. Instead, the application may act as an intermediary, on a secure communication channel, between the server and the smoking substitute device. The mobile device on which the application is installed may also be configured not to have access to the device-specific encryption key or to the firmware key. That is, neither the application server nor the mobile device may have access to the device-specific encryption key or to the firmware key.

The smoking substitute device may be configured to transition into an update mode, e.g., upon receiving a suitable command from the application or application server. This may be done before the application server communicates an encrypted firmware image and a firmware update message to the smoking substitute device. The update mode may comprise a Software Update Over the Air (SUOTA) mode. The application or application server may transmit a separate message (e.g., a Ctrl message) to the smoking substitute device to cause the transition. The application or application server may be configured to communicate the encrypted firmware image and firmware update message to the smoking substitute device when the smoking substitute device is in the update mode.

The mobile device may be configured to store or 'cache' an encrypted firmware image that it receives from the server. For example, if the application (or application instance) is associated with multiple smoking substitute devices, it can use the stored encrypted firmware image to avoid repeatedly having to download the same image, for multiple smoking substitute devices.

According to a second aspect of the disclosure, there is provided a method for managing a system, the method comprising: encrypting, using a device-specific encryption key, a firmware update message, wherein the firmware update message includes a firmware key; transmitting the encrypted firmware update message to a smoking substitute device; obtaining, by the smoking substitute device, an encrypted firmware image; and decrypting, by the smoking substitute device using the device-specific encryption key, the firmware update message in order to obtain the firmware key, wherein the firmware key is for decrypting the encrypted firmware image.

The method may include transmitting a firmware update notification from an application server to an application on a mobile device, the firmware update notification including a firmware image location identifier and the encrypted firmware update message. The method may include receiving, at the application, the firmware update notification, and obtaining, by the application, an encrypted firmware image using the firmware image location identifier. The method may include communicating, from the application to the smoking substitute device, the encrypted firmware image and the encrypted firmware update message, wherein the firmware update message includes a firmware key for decrypting the encrypted firmware image.

The method may include decrypting, by the smoking substitute device using the device-specific encryption key, the firmware update message in order to obtain the firmware key; decrypting, by the smoking substitute device, the firmware image using the firmware key; and updating the firmware of the smoking substitute device using the decrypted firmware image.

The method may include verifying the update firmware using identification data in the firmware update message; and reporting an outcome of verification to the application. The method may be a computer-implemented method, e.g., performed using the system described above.

In another aspect, there may be provided a computer readable medium storing computer readable instructions, which when executed, cause one or more devices to operate as a system as set out above.

In another aspect, there is provided smoking substitute device comprising: a control unit; a memory configured to store firmware for operating the smoking substitute device, and to store a device-specific encryption key; and a communications interface. The smoking substitute device may be configured to obtain an encrypted firmware image, and receive, from an application server, a firmware update message. The firmware update message includes a firmware key for decrypting the encrypted firmware image. The firmware update message may be decryptable using the device-specific encryption key. The smoking substitute device may thus be configured to: decrypt, with the device-specific encryption key, the firmware update message in order to obtain the firmware key; decrypt, with the firmware key, the encrypted firmware image; and update, with the decrypted firmware image, the firmware for operating the smoking substitute device.

The disclosure includes the combination of the aspects and preferred features described except where such a combination is clearly impermissible or expressly avoided.

The skilled person will appreciate that except where mutually exclusive, a feature or parameter described in relation to any one of the above aspects may be applied to any other aspect. Furthermore, except where mutually exclusive, any feature or parameter described herein may be applied to any aspect and/or combined with any other feature or parameter described herein.

DETAILED DESCRIPTION OF THE DISCLOSURE

Aspects and embodiments of the present disclosure will now be discussed with reference to the accompanying figures. Further aspects and embodiments will be apparent to those skilled in the art. All documents mentioned in this text are incorporated herein by reference.

Figure 1:
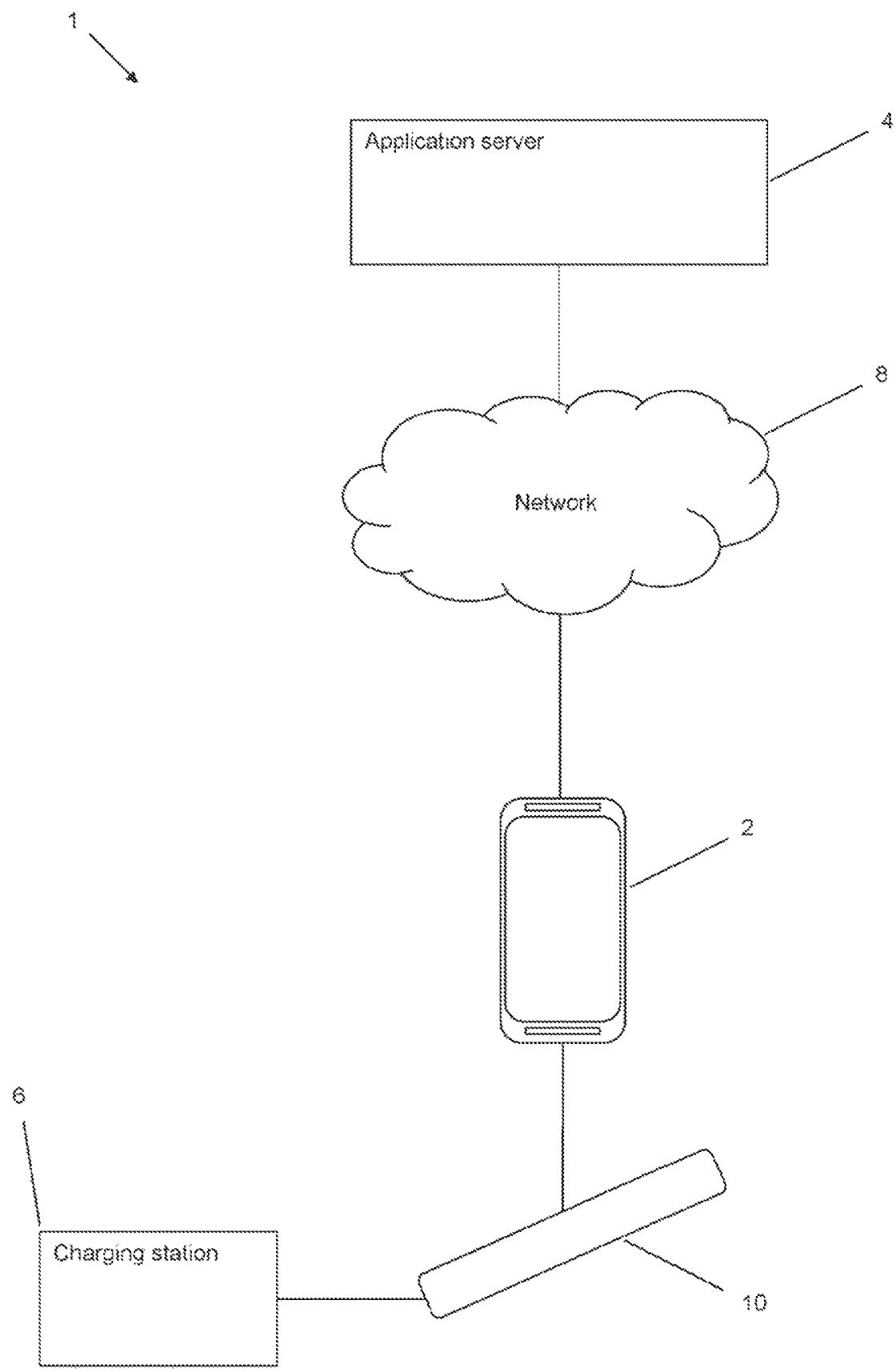
FIG. 1 shows an example system for managing a smoking substitute device.

FIG. 1 shows an example system 1 for managing a smoking substitute device 10.

The system 1 as shown in FIG. 1 includes a mobile device 2, an application server 4, an optional charging station 6, as well as the smoking substitute device 10.

The smoking substitute device 10 is configured to communicate wirelessly, e.g., via Bluetooth™, with an application (or "app") installed on the mobile device 2, e.g., via a suitable wireless interface (not shown) on the mobile device 2. The mobile device 2 may be a mobile phone, for example. The application on the mobile phone is configured to communicate with the application server 4, via a network 8. The application server 4 may utilise cloud storage, for example.

The network 8 may include a cellular network and/or the internet.

A skilled person would readily appreciate that the mobile device 2 may be configured to communicate via the network 8 according to various communication channels, preferably a wireless communication channel such as via a cellular network (e.g., according to a standard protocol, such as 3G or 4G) or via a WiFi network.

The app installed on the mobile device and the application server 4 may be configured to assist a user with their smoking substitute device 10, based on information communicated between the smoking substitute device 10 and the app and/or information communicated between the app and the application server 4.

The charging station 6 (if present) may be configured to charge (and optionally communicate with) the smoking substitute device 10, via a charging port on the smoking substitute device 10. The charging port on the smoking substitute device 10 may be a USB port, for example, which may allow the smoking substitute device to be charged by any USB-compatible device capable of delivering power to the smoking substitute device 10 via a suitable USB cable (in this case the USB-compatible device would be acting as the charging station 6). Alternatively, the charging station could be a docking station specifically configured to dock with the smoking substitute device 10 and charge the smoking substitute device 10 via the charging port on the smoking substitute device 10.

FIG. 2A shows an example smoking substitute device 110 for use as the smoking substitute device 10 in the system 1 of FIG. 1.

In this example, the smoking substitute device 110 includes a main body 120 and a consumable 150. The consumable 150 may alternatively be referred to as a "pod".

In this example, the smoking substitute device 110 is a closed system vaping device, wherein the consumable 150 includes a sealed tank 156 and is intended for one-use only.

FIG. 2A shows the smoking substitute device 110 with the main body 120 physically coupled to the consumable 150.

FIG. 2B shows the main body 120 of the smoking substitute device 110 without the consumable 150.

FIG. 2C shows the consumable 150 of the smoking substitute device 110 without the main body 120.

The main body 120 and the consumable 150 are configured to be physically coupled together, in this example by pushing the consumable 150 into an aperture in a top end 122 of the main body 120, e.g., with the consumable 150 being retained in the aperture via an interference fit. In other examples, the main body 120 and the consumable could be physically coupled together by screwing one onto the other, through a bayonet fitting, or through a snap engagement mechanism, for example. An optional light 126, e.g., an LED located behind a small translucent cover, is located a bottom end 124 of the main body 120. The light 126 may be configured to illuminate when the smoking substitute device 110 is activated.

The consumable 150 includes a mouthpiece (not shown) at a top end 152 of the consumable 150, as well as one or more air inlets (not shown in FIG. 2) so that air can be drawn into the smoking substitute device 110 when a user inhales through the mouthpiece. At a bottom end 154 of the consumable 150, there is located a tank 156 that contains e-liquid. The tank 156 may be a translucent body, for example.

The tank 156 preferably includes a window 158, so that the amount of e-liquid in the tank 156 can be visually assessed. The main body 120 includes a slot 128 so that the window 158 of the consumable 150 can be seen whilst the rest of the tank 156 is obscured from view when the consumable 150 is inserted into the aperture in the top end 122 of the main body 120.

In this present embodiment, the consumable 150 is a "single-use" consumable. That is, upon exhausting the e-liquid in the tank 156, the intention is that the user disposes of the whole consumable 150. In other embodiments, the e-liquid (i.e., aerosol former) may be the only part of the system that is truly "single-use". In such embodiments, the tank 156 may be refillable with e-liquid or the e-liquid may be stored in a non-consumable component of the system. For example, the e-liquid may be stored in a tank located in the device or stored in another component that is itself not single-use (e.g., a refillable tank).

The tank 156 may be referred to as a "clearomizer" if it includes a window 158, or a "cartomizer" if it does not.

Figure 3A:
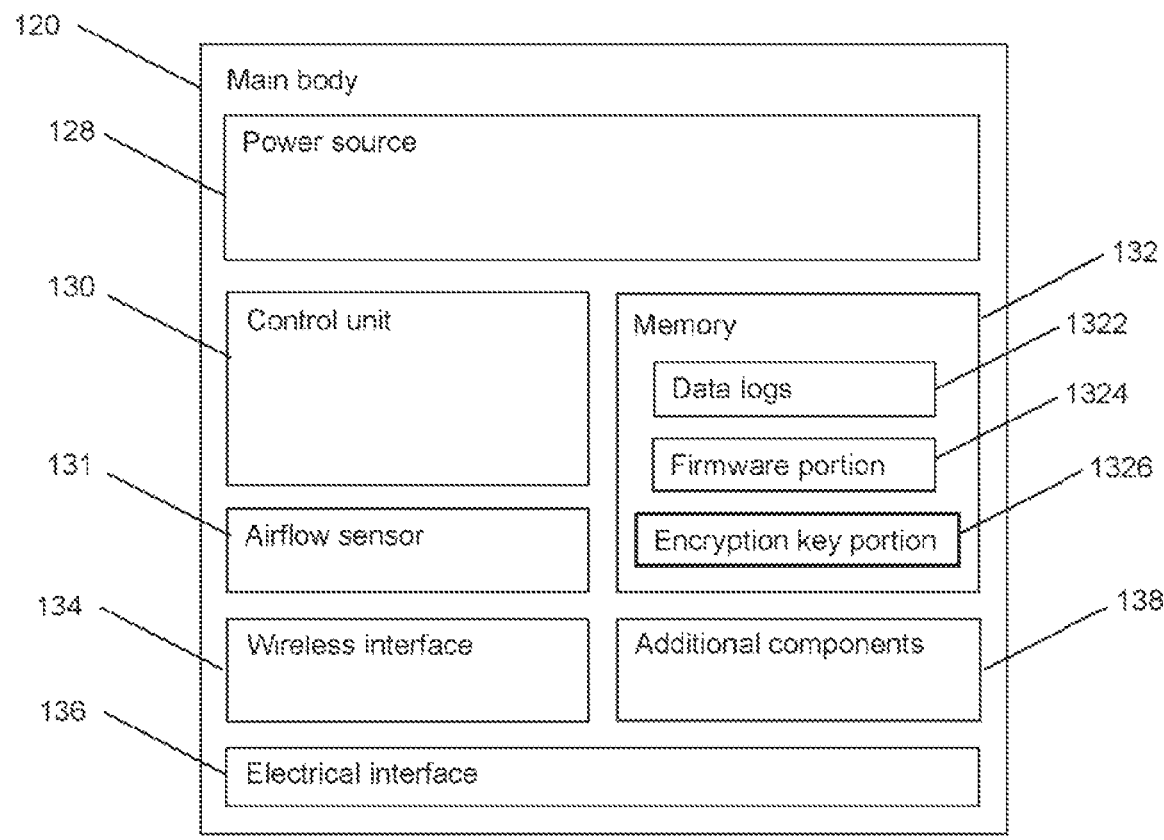
FIG. 3A is a schematic view of the main body of the smoking substitute device of FIG. 2A, which is suitable for use in an embodiment of the disclosure.

FIG. 3A is a schematic view of the main body 120 of the smoking substitute device 110.

Figure 3B:
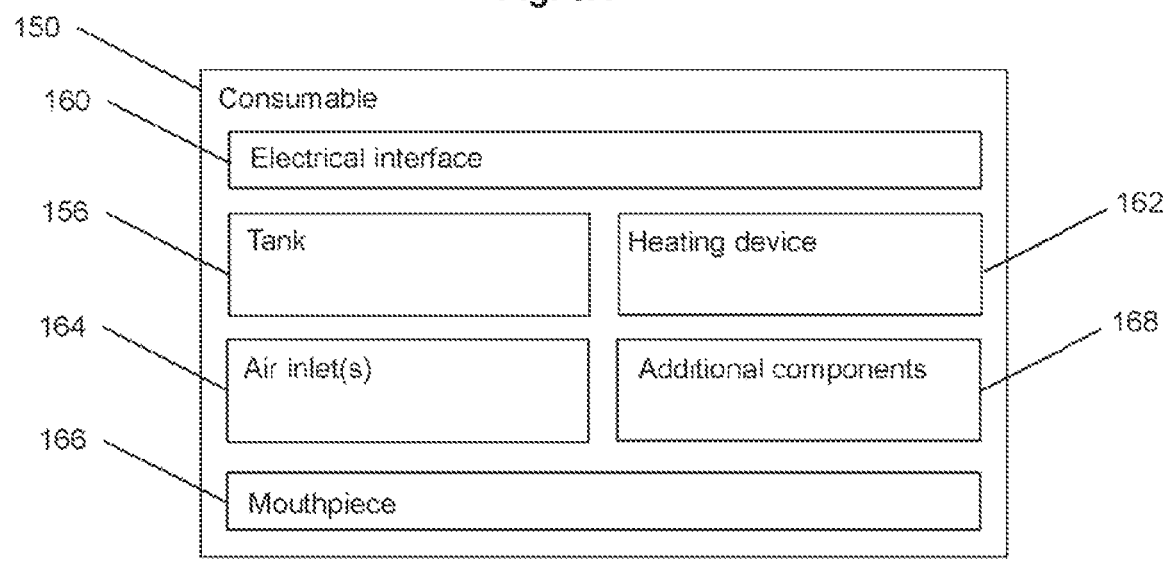
FIG. 3B is a schematic view of the consumable of the smoking substitute device of FIG. 2A.

FIG. 3B is a schematic view of the consumable 150 of the smoking substitute device 110.

As shown in FIG. 3A, the main body 120 includes a power source 128, a control unit 130, an airflow sensor 131, a memory 132, a wireless interface 134, an electrical interface 136, and one or more optional additional components 138.

The power source 128 is preferably a battery, more preferably a rechargeable battery.

The control unit 130 may include a microprocessor, for example.

The memory 132 is preferably includes non-volatile memory, such as flash memory or the like. The memory may include a plurality of memory portions that serve differing functions or store particular types of data. The different portions may be separate partitions or logical volumes with the same memory, or may be provided by separate physical hardware. A first portion 1324 of the memory 132 is configured to store firmware. The first portion 1324 may also be referred to herein as the "firmware portion" of the memory 132. The firmware may be stored in an encrypted form, e.g., using a first encryption key. The initial encryption and storage of the firmware may be carried out during manufacture and assembly of the smoking substitute device. The first encryption key may also be stored in the memory 132 at the manufacture stage. The first encryption key is preferably stored in a different portion of the memory to the encrypted firmware. In particular, the first encryption key may be stored in a secure portion of the memory 132, which is referred to herein as an encryption key portion 1326. Herein the term "secure portion" may refer to computer storage that is configured to prevent unauthorised access. The secure portion may be a protected region of memory, e.g., under the control of a memory protection unit that forms part of the control unit 130. The memory protection unit may control access to the memory 132, and can prohibit access to the secure portion expect under certain circumstances. Alternatively, the secure portion may be provided on an entity that is a physically or logically separate from the first portion 1324. For example, the encryption key portion 1326 may be a suitably configured hardware security module, or the like.

The memory 132 also includes data log portion 1322 for storing a data log or a plurality of data logs. The data log portion 1322 may be distinct from the firmware portion 1324 and the encryption key portion 1326. As will be understood from the detail descriptions above, various detectors and other functional components within the smoking substitute device provide operational data that can usefully be stored, monitored and in some cases used to make determinations regarding control and subsequent operations of the smoking substitute device. The data logs 1322 may include data pertaining to the operation of the power source 128, the air flow sensor 131, the wireless interface 134 and the electrical interface 136 of the smoking substitute device. The data logs, or at least some of the data within those data logs, may be transmitted to a mobile device if the smoking substitute device is paired or bonded to a mobile device. It may be desirable to protect the data logs from being hacked, altered or deleted by a non-authorised user, in order to protect the integrity of the device's operation and to keep the user's information safe and private to him or her. The data logs may thus be encrypted before storage in the memory 132. The control unit 130 may be configured to use a second encryption key stored within the encryption key portion 1326 for this purpose.

The wireless interface 134 is preferably configured to communicate wirelessly with the mobile device 2, e.g., via Bluetooth. To this end, the wireless interface 134 could include a Bluetooth™ antenna. Other wireless communication interfaces, e.g., WiFi, are also possible.

The electrical interface 136 of the main body 120 may include one or more electrical contacts. The electrical interface 136 may be located in, and preferably at the bottom of, the aperture in the top end 122 of the main body 120. When the main body 120 is physically coupled to the consumable 150, the electrical interface 136 may be configured to pass electrical power from the power source 128 to (e.g., a heating device of) the consumable 150 when the smoking substitute device 110 is activated, e.g., via the electrical interface 160 of the consumable 150 (discussed below). When the main body 120 is not physically coupled to the consumable 150, the electrical interface may be configured to receive power from the charging station 6.

The additional components 138 of the main body 120 may include the optional light 126 discussed above.

The additional components 138 of the main body 120 may, if the power source 128 is a rechargeable battery, include a charging port configured to receive power from the charging station 6. This may be located at the bottom end 124 of the main body 120. Alternatively, the electrical interface 136 discussed above is configured to act as a charging port configured to receive power from the charging station 6 such that a separate charging port is not required.

The additional components 138 of the main body 120 may, if the power source 128 is a rechargeable battery, include a battery charging control circuit, for controlling the charging of the rechargeable battery. However, a battery charging control circuit could equally be located in the charging station 6 (if present).

The additional components 138 of the main body 120 may include an airflow sensor for detecting airflow in the smoking substitute device 110, e.g., caused by a user inhaling through a mouthpiece 166 (discussed below) of the smoking substitute device 110. The smoking substitute device 110 may be configured to be activated when airflow is detected by the airflow sensor. This optional sensor could alternatively be included in the consumable 150 (though this is less preferred where the consumable 150 is intended to be disposed of after use, as in this example).

The airflow sensor 131 is configured to detecting airflow in the smoking substitute device 110, e.g., caused by a user inhaling through a mouthpiece 166 (discussed below) of the smoking substitute device 110. The smoking substitute device 110 may be configured to be activated when airflow is detected by the airflow sensor.

The additional components 138 of the main body 120 may include an actuator, e.g., a button. The smoking substitute device 110 may be configured to be activated when the actuator is actuated. This provides an alternative to the airflow sensor noted, as a mechanism for activating the smoking substitute device 110.

The additional components 138 may include an accelerometer configured to function as a motion sensor to receive inputs for controlling the device.

The additional components 138 of the main body 120 may include a reader configured to read information associated with the consumable from a machine readable data source included in (e.g., contained in the body of, or attached to) the consumable 150.

The reader may be configured to read information from the machine readable data source wirelessly, e.g., via electromagnetic waves or optically. Thus, for example, the machine readable data source included in the consumable 150 could be an RFID tag (in which case the reader included in the main body 120 may be an RFID reader) or a visual data source such as a barcode (in which case the reader included in the main body may be an optical reader, e.g., a barcode scanner). Various wireless technologies and protocols may be employed to allow the reader to wirelessly read information from a machine readable data source included in or attached to the consumable 150, e.g., NFC, Bluetooth, Wi-Fi, as would be appreciated by a skilled person.

For avoidance of any doubt, the reader (if present) may be configured to read information from the machine readable data source non-wirelessly, e.g., using a direct electrical connection between the main body 120 and consumable 150.

As shown in FIG. 3B, the consumable 150 includes the tank 156, an electrical interface 160, a heating device 162, one or more air inlets 164, a mouthpiece 166 and, optionally, one or more additional components 168.

The electrical interface 160 of the consumable 150 may include one or more electrical contacts. The electrical interface 136 of the main body 120 and an electrical interface 160 of the consumable 150 are preferably configured to contact each other and therefore electrically couple the main body 120 to the consumable 150 when the main body 120 is physically coupled to the consumable 150. In this way, electrical energy (e.g., in the form of an electrical current) is able to be supplied from the power source 128 in the main body 120 to the heating device 162 in the consumable 150.

The heating device 162 is preferably configured to heat e-liquid contained in the tank 156, e.g., using electrical energy supplied from the power source 128. In one example, the heating device 162 may include a heating filament and a wick, wherein a first portion of the wick extends into the tank 156 in order to draw e-liquid out from the tank 156, and wherein the heating filament coils around a second portion of the wick located outside the tank 156. In this example, the heating filament is configured to heat up e-liquid drawn out of the tank 156 by the wick to produce an aerosol vapour.

The one or more air inlets 164 are preferably configured to allow air to be drawn into the smoking substitute device 110, when a user inhales through the mouthpiece 166.

The additional components 168 of the consumable 150 may include a machine readable data source, which may e.g., be contained in the body of, or attached to the consumable 150. The machine readable data source may store information associated with the consumable. The information associated with the consumable may include information concerning the content of the consumable (e.g., e-liquid type, batch number) and/or a unique identifier, for example.

The machine readable data source may be rewritable, e.g., a rewritable RFID chip, or read only, e.g., a visual data source such as a barcode. As indicated above, the additional components 138 of the main body 120 may include a reader configured to read information associated with the consumable from the machine readable data source.

In use, a user activates the smoking substitute device 110, e.g., through actuating an actuator included in the main body 120 or by inhaling through the mouthpiece 166 as described above. Upon activation, the control unit 130 may supply electrical energy from the power source 128 to the heating device 162 (via electrical interfaces 136, 166), which may cause the heating device 162 to heat e-liquid drawn from the tank 156 to produce a vapour which is inhaled by a user through the mouthpiece 166.

Of course, a skilled reader would readily appreciate that the smoking substitute device 110 shown in FIGS. 2A-C and 3A-B shows just one example implementation of a smoking substitute device, and that other forms of smoking substitute device could be used as the smoking substitute device 10 of FIG. 1.

By way of example, a HNB smoking substitute device including a main body and a consumable could be used as the smoking substitute device 10 of FIG. 1, instead of the smoking substitute device 110. One such HNB smoking substitute device is the IQOS™ smoking substitute device discussed above.

As another example, an open system vaping device which includes a main body, a refillable tank, and a mouthpiece could be used as the smoking substitute device 10 of FIG. 1, instead of the smoking substitute device 110. One such open system vaping device is the blu PROT™ e-cigarette discussed above.

As another example, an entirely disposable (one use) smoking substitute device could be used as the smoking substitute device 10 of FIG. 1, instead of the smoking substitute device 110.

The present disclosure relates to a technique of performing a wireless update of firmware stored in the memory 132 of the smoking substitute device 110. The firmware may comprise software that comprises instructions for operation of the smoking substitute device, which can be executed by the control unit 130 to control operation of the smoking substitute device 110. In the disclosure, a firmware update originates at the server-side of the system 1 shown in FIG. 1, e.g., at the application server 4 or on a development server that may be associated with the application server 4. The server-side may be referred to generally herein as a "back end" of the system, and a "back end server" may refer generally to a server that operates on the server side of the system 1.

The disclosure is concerned with a wireless firmware procedure in which a firmware update (also referred herein as a firmware image) is communicated wirelessly to the smoking substitute device by an application running on a mobile device using a wireless communication link established between the smoking substitute device and the mobile device. The application running on the mobile device is in communication with the back end of the system.

The firmware updates may be issued for a variety of reasons. For example, a firmware update may fix errors or bugs that have been detected in the current firmware, and/or it may improve the efficiency of the device's operation and/or provide additional functionality to the smoking substitute device. A firmware update may also be required in order to enable the smoking substitute device to interface more effectively with an application running on a mobile device, for example if the application software or operating system of the mobile device has also been updated or changed.

The firmware update process discussed herein is particularly suitable for updating multiple smoking substitute devices. For example, a given firmware update may be applicable to some or all of a set of existing devices of a particular brand, type, make or model. Embodiments of the disclosure aim to provide a firmware update process for multiple device that is both efficient (in terms of processing load at the back end) and secure (in terms of prevent access to an unencrypted firmware image by unauthorised devices). This is achieved by using the same encrypted firmware image (stored in the back end) for an update on multiple smoking substitute devices. Security is preserved in this scheme by providing the key for decrypting the firmware image (referred to herein as the "firmware decryption key") to each smoking substitute device in a data structure that is encrypted with a device-specific key (e.g., the firmware encryption key mentioned above). The data structure in which the firmware decryption key is provided may be a header be within a header of a message sent to the smoking substitute device from the application running on the mobile device to trigger a firmware update procedure.

By encrypting the firmware decryption key with device-specific key, the mobile device cannot access the firmware decryption key as part of the firmware update process. This means that the mobile device cannot access a decrypted version of the firmware update image, even when that image is relayed to the smoking substitute device via the application running on the mobile device.

The back end of the system 1 may comprise several different computing devices (e.g., different servers or other processing entities). These different devices may be physically or logically separated from each another. For example, they may comprise distinct hardware devices. In the process flow depicted in FIGS. 4A and 4B below, the back end comprises a software signing server 402 and an application server 404. The signing server 402 may be configured to operate as a central control entity for providing firmware updates for one or more smoking substitute devices. The application server 404 may correspond to the application server 4 discussed above with reference to FIG. 1. As discussed below, the application server 404 may not be involved with encryption or decryption of a firmware update but is operable to communicate with an application that is running on a mobile device, e.g., in order to control an update procedure.

More generally, a user of a smoking substitute device never sees or directly interacts with the application server 404. Instead, the user interacts with the "front end" of the system (i.e., the application running on the mobile device), usually via one or more user interfaces of the mobile device on which the application is running.

Figure 4A:
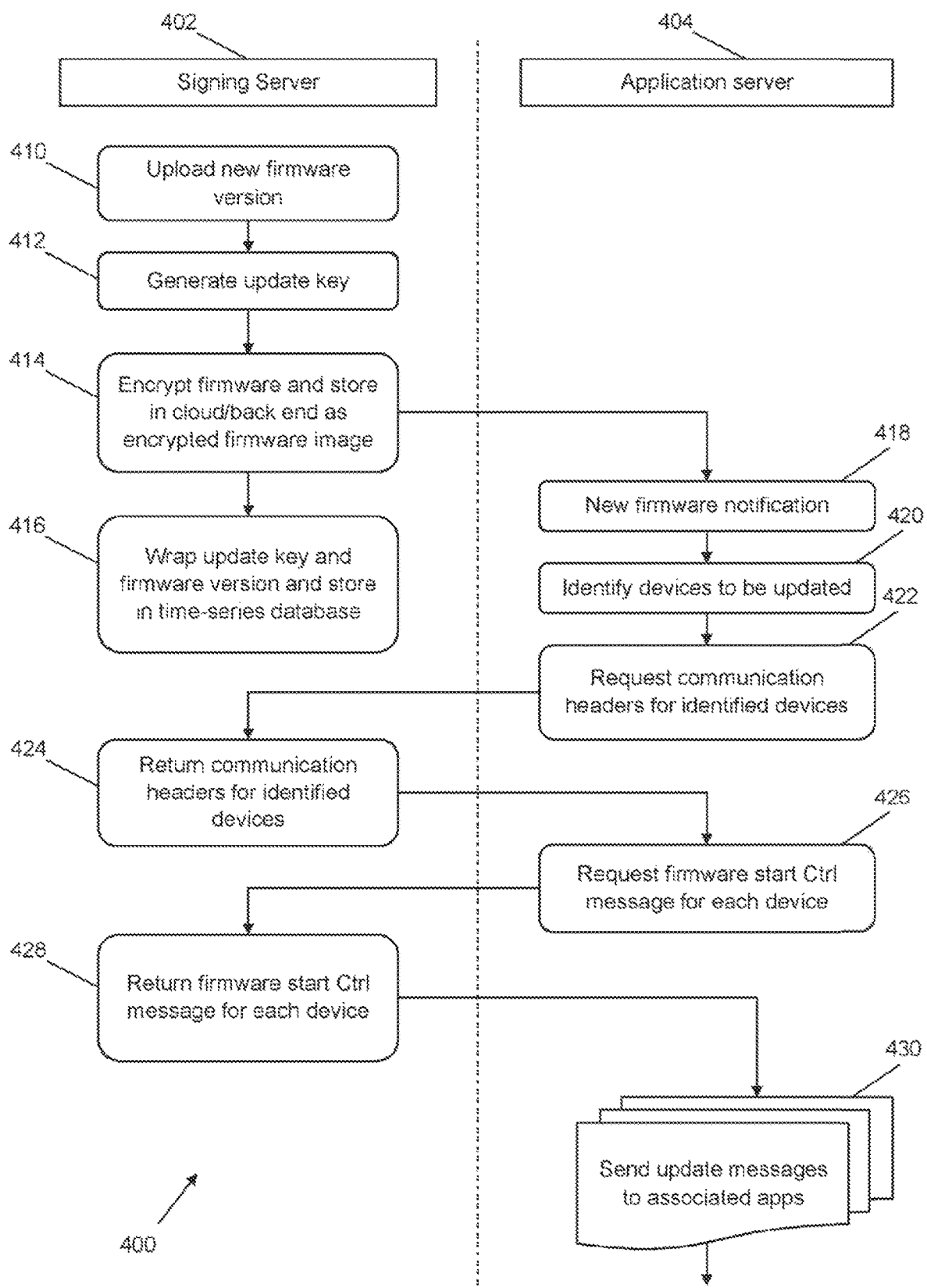
FIGS. 4A and 4B depict a flow diagram of a firmware update method that are performed by aspects of a system according to an embodiment of the present disclosure.
Figure 4B:
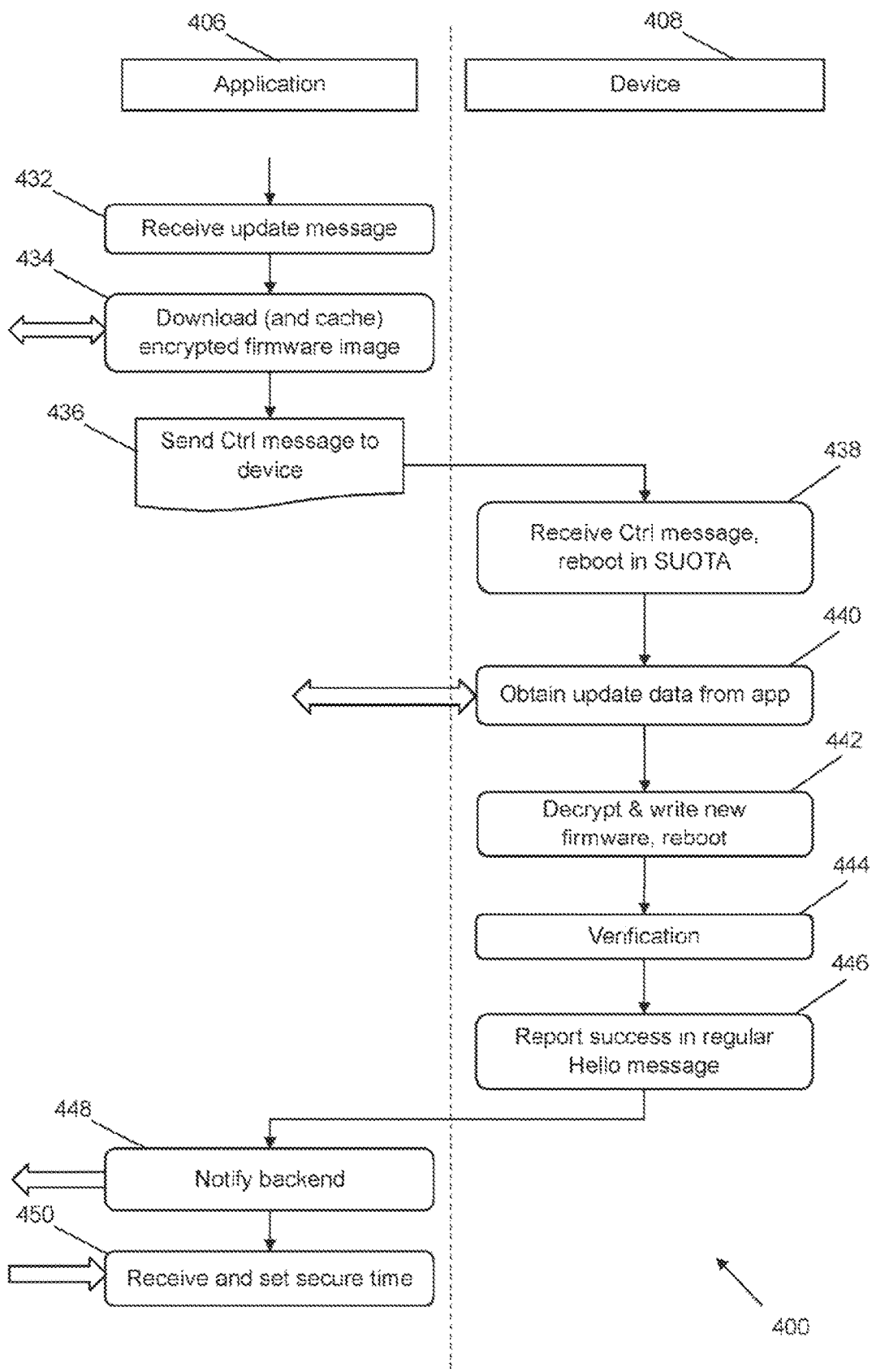

A firmware update process 400 that is an embodiment of the disclosure is now discussed with reference to FIGS. 4A and 4B. The process steps in FIGS. 4A and 4B are associated with various system entities. In this example, the system entities include the signing server 402 and the application server 404 discussed above, as well as (in FIG. 4B) an application 406 running on a mobile device (such as the mobile device 2 shown in FIG. 1) and a smoking substitute device 408 (such as the device discussed above with reference to FIG. 3A). FIG. 4B shows a single application 406 but it can be understood that this process is applicable to multiple application instances running on a plurality of mobile devices. Similarly, a single smoking substitute device 408 is shown in FIG. 4B, but it can be understood that the process can also apply to a plurality of smoking substitute devices. For example, one application 406 (on a single mobile device) may be used to update a plurality of smoking substitute devices. Or each smoking substitute device may be associated with an application running on one (or more) mobile devices.

In a development of this embodiment, the application server 404 may communicate directly with the smoking substitute device 408, i.e., the application 406 may run on the smoking substitute device such that a separate intermediary (e.g., the mobile device) is not required. In the discussion below, it is therefore to be understood that the functions described with reference to the application 406 can be performed on the smoking substitute device itself.

Where the application 406 is on a separate mobile device, the smoking substitute device 408 and the mobile device have Bluetooth™ interfaces, for wirelessly communicating with one another. The manner in which wireless communications are sent and received between devices is well known and will not be discuss in detail herein. In one example, the smoking substitute device 408 is configured to form a bonded wireless communication link, with a mobile device 2. The protocols for forming bonded Bluetooth™ links are generally well known, to the skilled reader, but are nonetheless described in brief below.

In this embodiment the user selects a mobile device 2 that he or she would like to be bonded to the smoking substitute device 408 and usually downloads an application for managing the smoking substitute device 408, on to the mobile device 2, before the mobile device 2 is bonded to the smoking substitute device 408. However, it is not essential to download the application before the bonding process happens—it can be done afterwards instead. The user activates the Bluetooth™ wireless interface of the smoking substitute device 408, so that it emits an advertising message, seeking a mobile device 2 to bond with. The user will also activate the Bluetooth™ wireless interface of the mobile device 2, so that it can receive the advertising message from the smoking substituted device 410 and respond thereto by identifying itself to the smoking substitute device 408. The two devices will then share pairing encryption keys with one another.

When the smoking substitute device 408 and the mobile device 2 have received and accepted one another's pairing encryption keys, a paired wireless communication link is formed between them. The paired wireless communication link is an exclusive link, meaning that the devices will each direct subsequent wireless communication signals only to one another (unless the user instructs otherwise, either directly at the smoking substitute device 408 or via the application—but those methods will not be discussed in detail herein.) The two devices will remember one another's pairing encryption keys and reuse them each time a wireless connection is to be formed between them—this remembering and re-using of the pairing encryption keys establishes a bonded wireless communication link between the two devices.

Once it has been bonded thereto, the smoking substitute device 408 can begin to transmit wireless messages to, and receive wireless messages from, the mobile device 2. The wireless messages transmitted by the smoking substitute device 408 can comprise commands or requests, issued to the mobile device 2 and/or to an application that is running on the mobile device 2. The wireless messages transmitted by the smoking substitute device 408 can also comprise data relating to the usage of the smoking substitute device 408. For example, the smoking substitute device 408 may be configured to regularly transmit a data log comprising data obtained from the airflow sensor 131 within the smoking substitute device 408, to the mobile device 2. That data obtained from the airflow sensor 131 can be accessed by the application, running on the mobile device 2, and used inter alia to monitor user smoking substitute behaviour patterns.

As mentioned above, it is likely to be appropriate (and perhaps necessary) to update the firmware of a smoking substitute device 408 during its operational life. For example, updated firmware may enable the device 408 to perform different, or additional, functions, and/or it may improve its operational efficiency and/or it may address so-called 'bugs' or other problems that have been detected, inherent to the first version of the firmware.

A firmware update process may thus begin with a step 410 of uploading a new version of firmware software to the signing server 402. The new version may be developed in a separate back end entity, e.g., by the manufacturer or an associated developer that is responsible for maintaining the software. As mentioned above, the signing server 402 behaves, according to this embodiment, as a central control entity for the firmware update.

The signing server 402 may be configured as a secure entity that generates and stores the keys used for encrypting data used in the firmware update process. The update process thus continues with a step 412 of generating a AES (Advanced Encryption Standard) key for the new version of the firmware software. Although AES is using in this example, any suitable symmetric encryption process may be used. Because the encryption process is symmetrical, the same AES key can be used for decryption, and hence the AES key may be referred to herein as the firmware decryption key. In principle any type of encryption may be applied as long as the signing server 402 generates a firmware decryption key that can be communicated to devices to perform decryption. The firmware decryption key may be common to all smoking substitute devices 408 to which the firmware update is to be applied.

The update process then continues with a step 414 of encrypting the new version of the firmware software and storing the encrypted firmware image in suitable memory means within the back end. The encrypted firmware image may be stored in a manner that means it is readily accessible to be downloaded by the application on a mobile device associated with a smoking substitute device to be updated. For example, the encrypted firmware image may be stored in BLOB (Binary Large Object) storage or a content distribution network (CDN), e.g., in the cloud.

To ensure security at the signing server 402, the process may include a step 416 of wrapping the firmware decryption key and firmware image using an suitable security software to prevent access by unauthorised applications or other devices. The wrapped key may be stored in a dedicated hardware security module, or may be wrapped via "Azure Key Vault", which is a known software security product. The wrapped key may be stored within a suitable time-series database that is within (or associated with) the signing server 402. The database may be a column-based relational time series database such as a KDB database, that is capable of processing large data sets at high speed.

The update process continues with a step 418 in which the signing server 402 issues a communication to the application server 404, to notify the application server 404 of the existence of new or updated firmware. The manner in which the two servers 402, 404 communicate with one another will depend on the particular details of the two servers 402, 404, but the skilled reader will appreciate that such communication can be achieved by a suitable combination of hardware and software, and may be via either a wired or wireless connection.

At step 420, the application server 404 identifies the smoking substitute devices that are to be updated. This may comprise identifying the particular devices that embody a specific make, model, generation or type of smoking substitute device, that the manufacturer/developer has previously created. Step 420 may comprise identifying devices that were manufactured within a certain time period, or whose firmware was last updated more than a predefined time ago. The notification that the backend server 404 has received at step 418, from the signing server 402, may have included, or been accompanied by, an indicator to inform the application server 404 as to which type or group of smoking substitute devices the update should apply to. The application server 404 may, at step 420, access one or more database(s) and identify the individual devices. As a result of this step, the application server 404 may generate a set of device identities that will be upgraded to the new firmware software version.

At step 422, the application server 404 requests a communication header for each of the identified devices from the signing server 402. At step 424 the communication headers for the identified devices are returned by the signing server 402 to the application server 404. The communication header may be a data structure capable of addressing a message to a given device. For example, the communication header may comprise MAC (message authentication code) information for each device to be update. The communication header (authentication code) for each individual device and the firmware decryption key may form a common data structure (also referred to herein as a firmware update message) to be sent to each device, wherein the common data structure is encrypted by the signing server 402 using a device-specific encryption key. Thus, each device may receive a uniquely encrypted data structure that includes the firmware decryption key.

The device-specific encryption may be performed using the first encryption key discussed above. This means that the application server 404 cannot itself decrypt the communication header, nor can it access the firmware decryption key. But it can include the encrypted communication headers in its subsequent communications to the smoking substitute devices, via the application, as detailed below.

At step 426, the application server 404 submits a request to the signing server 402, asking for the control (Ctrl) message that must be sent to each device, in order to start the firmware update process. The signing server provides the requested Ctrl messages, for each device, at step 428. The Ctrl message is provided in a form that is accessible (e.g., readable) by the application server. For example, it may be encrypted by the signing server 402 in a way that permits decryption at the application server 404. Encryption of communication between the signing server 402 and application server 404 may ensures that the application server 404 acts only on authorised information.

At step 430, the application server 404 sends a message to the application 406 running on a mobile device (see FIG. 4B). The application server 404 may transmit a message for each smoking substitute device that is to be updated. This message is received by each application 406 at step 432. Again, the possible ways in which a server communicates with an application are well known and will not be discussed in detail herein. The communication is via any suitable network, for example 4G or Wi-Fi, and may comprise a cloud-to-device message, if the application server 404 comprises a cloud-based server.

The message sent and received at steps 430 and 432 may be or be similar to a JSON (JavaScript Object Notation) envelope for a known type of Ctrl message. The message comprises the Ctrl message that the application server 404 has retrieved for each smoking substitute device at step 428. However, in this example, the message also includes the following additional information to assist in the firmware update process: (a) an indication of which version of the software is to be provided, via the intended update; (b) a location identifier for the encrypted firmware image (e.g., CDN URL or the like), which the application 406 can subsequently use to download the encrypted firmware image; and/or (c) the encrypted common data structure that comprises the firmware decryption key and the communication header.

The application 406 cannot decrypt the common data structure, and therefor does not have access to the firmware decryption key or the communication header.

At step 434, each application instance 406 that receives an update message downloads the encrypted firmware image using the location identifier. The application 406 may cache the encrypted firmware image (i.e., in a buffer or cache memory on the mobile device). This may enable an application instance 406 to update multiple smoking substitute devices without having to repeatedly retrieve the encrypted firmware image. The ability to use cached version of the encrypted firmware image is made possible because the same firmware decryption key is used across multiple devices. There would be no benefit in caching an encrypted firmware image in an update process in which the firmware image is uniquely encrypted for each device.

At step 436, each application instance 406 sends the Ctrl message that it has obtained (from the signing server 402, via the application server 404) for its respective smoking substitute device 408, to that smoking substitute device 408. In this particular embodiment the application 406 communicates with the smoking substitute device 408 via the bonded wireless communication link that has been established between the smoking substitute device 408 and the mobile device on which the application 406 is installed.

At step 438, the smoking substitute device 438 receives the Ctrl message and, as a result, the smoking substitute device 408 reboots (or restarts) itself in a pre-configured SUOTA (Software Update Over The Air) mode. The skilled reader will appreciate that the reading of the Ctrl message, and subsequent rebooting of the smoking substitute device in SUOTA mode, will be controlled by the control unit 130, which in this embodiment comprises a microprocessor. Any suitable combination of hardware and software means can be employed, within the smoking substitute device 408, in order for the microprocessor 430 to execute the necessary steps to read, understand and act in response to the received Ctrl message.

Once it is operating in SUOTA mode, the smoking substitute device 408 obtains the encrypted firmware image, version indicator, and encrypted common data structure from the application 406. Again, this information is transmitted via the bonded wireless communication link that has been established between the smoking substitute device 408 and the associated mobile device, on which the application 406 is installed.

At step 442, the smoking substitute device 408 uses its stored device-specific encryption key in order to decrypt the encrypted common data structure that it has obtained from the application 406. Once the common data structure is decrypted, the smoking substitute device can decrypt and store the firmware image using the firmware decryption key and perform a verification process using the communication header.

In detail, the smoking substitute device 408 may program (i.e., write or otherwise store) the decrypted firmware image into the firmware portion 1324 of the memory 132. As mentioned above, the firmware should be stored securely within the firmware portion 1324 of the memory, wherein the firmware portion 1324 is separate to other sections of the memory such as the data log portion 1322, and is not accessible to the user or to the application running on the corresponding mobile device or to any other devices, to ensure that the integrity of the new firmware is maintained, whilst it is in use for controlling the operation of the smoking substitute device 408.

In common with conventional firmware update procedure, the smoking substitute device 408 may be configured to overwrite an invalid previous firmware image with the new firmware image. If no invalid image is present, the smoking substitute device 408 may be configured to overwrite the oldest firmware image that it has stored in its memory. According to the present embodiment, the smoking substitute device 408 is configured to retain the most recent previous firmware image in the firmware portion 1324, after it has been updated with a new firmware image, unless that most recent previous firmware image is invalid. In some embodiments, several previous firmware images will be stored within the memory of the smoking substitute device at least for a pre-determined period of time and or up to a predetermined maximum number of previous firmware images. When the pre-determined period of time has finished or when the pre-determined maximum number of stored previous firmware images has been reached, the next new firmware image that the smoking substitute device receives will replace the oldest stored previous firmware image within the memory.

Step 442 further includes rebooting or restarting the smoking substitute device 408 after the new firmware image has been programmed into the firmware portion 1324 of the smoking substitute device's memory 132. The smoking substitute device 408 may reboot using the updated firmware and become available for normal operation.

The smoking substitute device 408 is configured so that, as soon as it restarts after a firmware update, it runs a step 444 of verifying the new firmware image. This is to ensure that the new firmware image has come from an authentic source and does not comprise any bugs or errors. If the verification yields a positive result, indicating that it has verified the new firmware image, the control unit 130 is configured to automatically 'run' the new firmware, in order to operate the device 408 in accordance with its instructions. If, however the verification yields a negative result, indicating that it has not verified the new firmware image, the control unit 130 is configured to automatically revert back to running the most recent previous firmware image.

As will be known to the skilled reader, when two Bluetooth™ interfaces are have a bonded wireless communication link between them, as is the case for the smoking substitute device 408 and the mobile device running the application in the present embodiment, those interfaces are configured to submit regular messages to one another—which can be referred to as 'hello' messages—in order to regularly open up the communication link and maintain it as active. At step 446 of the method in the present embodiment, the smoking substitute device 408 is configured to report the success (or, as may be the case, the failure) of the attempted firmware update to the application 406. In this embodiment, the message reporting the outcome of the attempted firmware update also includes the decrypted new firmware image.

At step 448, when the application 406 has received notification that the firmware update has been successful, the application 406 notifies the backend server 404. This notification may include information identifying the firmware update, e.g., its version number or the like.

In response to receiving notification that the firmware update has been successful, the application server 404 issues a command, to the application 406, at step 450, to set the secure time on the smoking substitute device 408. This is an example of a secure command that can be relayed between the smoking substitute device 408 and the backend (e.g., application server 404) via the application 406 in a way that can reduce or eliminate any security concerns that may be inherent with the use of an application on a mobile device that is outside the control of the backend.

Thus, a sophisticated system and method is provided, for updating the firmware for a smoking substitute device in a secure and streamlined manner. The method is secure because the backend server and the application (and the mobile device on which the application is running) do not have access to the new firmware image, except in encrypted form. The method is streamlined because the signing server only has to encrypt and distribute one firmware image per update, no matter how many devices that update is applicable to. This reduces processing burden on the signing server and application server. The method also reduces the amount of data that an application instance would have to download from the servers, if a single application instance is used to connect to multiple smoking substitute devices. The only thing that is encrypted separately for each device is the newly-generated encryption key that has been used by the signing server to encrypt the new firmware image. That newly-generated encryption key is stored in communications headers for each device, wherein each communications header is separately encrypted with a device-specific encryption key that only the signing server and the smoking substitute device have access to.

It will be appreciated that, in alternative embodiments of the present disclosure, variations are possible as compared to the specific embodiment described hereabove. For example, the memory of a smoking substitute device may comprise different, and/or additional, sub-divisions or portions. For example, the portion of the memory that stores the firmware may be accessible in circumstances other than the particular circumstances described in detail above, for updating the firmware. But, as a general principle, firmware should usually be protected from being changed by end users, except as prescribed by the manufacturer or firmware developer.

A single instance of the application (running on a single mobile device) may be configured to communicate with more than one smoking substitute device. That application instance may be configured to provide firmware updates to each of a plurality of smoking substitute devices, wherein the communication headers for those firmware updates are each encrypted with a different respective device-specific encryption key.

The encryption key that is newly-generated and use to decrypt the new firmware image may be of a different type, other than an AES key. It may be referred to generally as a firmware key. In general, the encryption and decryption methods employed in the described method may be in accordance with any suitable or standard protocol.

The smoking substitute device does not have to form a bonded wireless communication link with the mobile device on which the application ins installed. But there should preferably be some security or identification steps followed, before the smoking substitute device accepts firmware update messages from the application, via the wireless interface of a mobile device.

Terms such as "firmware", "signing server", "backend server", "firmware portion", "data log portion", "encryption key portion", "SUOTA" and so on, are intended to be illustrative of the functions described herein only and need not to be limited to specific type of device or structure.

The features disclosed in the foregoing description, or in the following claims, or in the accompanying drawings, expressed in their specific forms or in terms of a means for performing the disclosed function, or a method or process for obtaining the disclosed results, as appropriate, may, separately, or in any combination of such features, be utilised for realising the disclosure in diverse forms thereof.

While the disclosure has been described in conjunction with the exemplary embodiments described above, many equivalent modifications and variations will be apparent to those skilled in the art when given this disclosure. Accordingly, the exemplary embodiments of the disclosure set forth above are considered to be illustrative and not limiting. Various changes to the described embodiments may be made without departing from the spirit and scope of the disclosure.

For the avoidance of any doubt, any theoretical explanations provided herein are provided for the purposes of improving the understanding of a reader. The inventors do not wish to be bound by any of these theoretical explanations.

Any section headings used herein are for organizational purposes only and are not to be construed as limiting the subject matter described.

Throughout this specification, including the claims which follow, unless the context requires otherwise, the word "comprise" and "include", and variations such as "comprises", "comprising", and "including" will be understood to imply the inclusion of a stated integer or step or group of integers or steps but not the exclusion of any other integer or step or group of integers or steps.

It must be noted that, as used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by the use of the antecedent "about," it will be understood that the particular value forms another embodiment. The term "about" in relation to a numerical value is optional and means for example +/− 10%.

The following statements, which form part of the description, provide general expressions of the disclosure herein:

A1. A system for managing a smoking substitute device, the system comprising:
a smoking substitute device comprising:
a control unit;
a memory configured to store firmware for operating the smoking substitute device and a device-specific encryption key; and
a communications interface; and
an application server configured to communicate to the smoking substitute device a firmware update message that is encrypted with the device-specific encryption key,
wherein the smoking substitute device is configured to obtain an encrypted firmware image,
wherein the firmware update message includes a firmware key for decrypting the encrypted firmware image, and
wherein the smoking substitute device is configured to use the device-specific encryption key to decrypt the firmware update message, to obtain the firmware key for decrypting the encrypted firmware image.

A2. The system of statement A1, wherein the application server is configured to communicate a firmware update notification that includes a firmware image location identifier and the firmware update message, and wherein the encrypted firmware image is obtainable using the firmware image location identifier.

A3. The system of statement A1 or A2 further comprising a mobile device on which an application is installed, wherein the smoking substitute device is in wireless communication with the mobile device via the communications interface, wherein the application server is configured to be communicate to the smoking substitute device via the application.

A4. The system of statement A1 or A2, wherein the smoking substitute device is in wireless communication with the application server.

A5. The system of any preceding statement, wherein the smoking substitute device is further configured to:

decrypt the encrypted firmware image using the firmware key; and
update the firmware for operating the smoking substitute device using the decrypted firmware image.

A6. The system of statement A5, wherein the smoking substitute device is further configured to:
verify the update firmware using identification data in the firmware update message; and
report an outcome of verification.

A7. The system of statement A6, wherein the smoking substitute device has a wireless communication link with an application server or a mobile device running an application, and wherein the outcome of verification is reported in a hello message sent via the wireless communication link.

A8. The system of any preceding statement further comprising a signing server in communication with the application server, wherein the signing server is configured to encrypt the firmware image with the firmware key, and wherein access to the firmware key by the application server is prohibited.

A9. The system of any preceding statement, wherein the system comprises a plurality of smoking substitute devices, and wherein the same firmware key is included in the firmware update message for each of the plurality of smoking substitute devices.

A10. The system of any preceding statement, wherein the smoking substitute device is configured to transition into an update mode, and wherein the smoking substitute device is configured to receive the encrypted firmware image and firmware update message when in the update mode.

A11. A method for managing a system, the method comprising:
encrypting, using a device-specific encryption key, a firmware update message, wherein the firmware update message includes a firmware key;
transmitting the encrypted firmware update message to a smoking substitute device;
obtaining, by the smoking substitute device, an encrypted firmware image; and
decrypting, by the smoking substitute device using the device-specific encryption key, the firmware update message in order to obtain the firmware key,
wherein the firmware key is for decrypting the encrypted firmware image.

A12. The method of statement A11 further comprising:
decrypting, by the smoking substitute device, the firmware image using the firmware key; and
updating the firmware of the smoking substitute device using the decrypted firmware image.

A13. The method of statement A12 further comprising:
verifying the update firmware using identification data in the firmware update message; and
reporting an outcome of verification.

A14. A smoking substitute device comprising:
a control unit;
a memory configured to store firmware for operating the smoking substitute device, and to store a device-specific encryption key; and
a communications interface;
wherein:
the smoking substitute device is configured to obtain an encrypted firmware image;
the smoking substitute device is configured to receive, from an application server, a firmware update message;
the firmware update message includes a firmware key for decrypting the encrypted firmware image; and
the firmware update message is decryptable using the device-specific encryption key.

A15. The smoking substitute device of statement A14, wherein the smoking substitute device is configured to:
  decrypt, with the device-specific encryption key, the firmware update message in order to obtain the firmware key;
  decrypt, with the firmware key, the encrypted firmware image; and
  update, with the decrypted firmware image, the firmware for operating the smoking substitute device.

PART B (P01038EP)

A System and Method for Managing a Smoking Substitute Device

Technical Field

The present disclosure relates to smoking substitute devices. In particular, although not exclusively, it relates to the management of security for smoking substitute devices.

Background

The smoking of tobacco is generally considered to expose a smoker to potentially harmful substances. It is generally thought that a significant amount of the potentially harmful substances are generated through the heat caused by the burning and/or combustion of the tobacco and the constituents of the burnt tobacco in the tobacco smoke itself.

Conventional combustible smoking articles, such as cigarettes, typically comprise a cylindrical rod of tobacco comprising shreds of tobacco which is surrounded by a wrapper, and usually also a cylindrical filter axially aligned in an abutting relationship with the wrapped tobacco rod. The filter typically comprises a filtration material which is circumscribed by a plug wrap. The wrapped tobacco rod and the filter are joined together by a wrapped band of tipping paper that circumscribes the entire length of the filter and an adjacent portion of the wrapped tobacco rod. A conventional cigarette of this type is used by lighting the end opposite to the filter, and burning the tobacco rod. The smoker receives mainstream smoke into their mouth by drawing on the mouth end or filter end of the cigarette.

Combustion of organic material such as tobacco is known to produce tar and other potentially harmful by-products. There have been proposed various smoking substitute devices in order to avoid the smoking of tobacco.

Such smoking substitute devices can form part of nicotine replacement therapies aimed at people who wish to stop smoking and overcome a dependence on nicotine.

Smoking substitute devices may comprise electronic systems that permit a user to simulate the act of smoking by producing an aerosol (also referred to as a "vapour") that is drawn into the lungs through the mouth (inhaled) and then exhaled. The inhaled aerosol typically bears nicotine and/or flavourings without, or with fewer of, the odour and health risks associated with traditional smoking.

In general, smoking substitute devices are intended to provide a substitute for the rituals of smoking, whilst providing the user with a similar experience and satisfaction to those experienced with traditional smoking and tobacco products. Some smoking substitute systems use smoking substitute articles (also referred to as a "consumables") that are designed to resemble a traditional cigarette and are cylindrical in form with a mouthpiece at one end.

The popularity and use of smoking substitute devices has grown rapidly in the past few years. Although originally marketed as an aid to assist habitual smokers wishing to quit tobacco smoking, consumers are increasingly viewing smoking substitute devices as desirable lifestyle accessories. Some smoking substitute devices are designed to resemble a traditional cigarette and are cylindrical in form with a mouthpiece at one end. Other smoking substitute devices do not generally resemble a cigarette (for example, the smoking substitute device may have a generally box-like form).

There are a number of different categories of smoking substitute devices, each utilising a different smoking substitute approach. A smoking substitute approach corresponds to the manner in which the substitute system operates for a user.

One approach for a smoking substitute device is the so-called "vaping" approach, in which a vapourisable liquid, typically referred to (and referred to herein) as "e-liquid", is heated by a heating device to produce an aerosol vapour which is inhaled by a user. An e-liquid typically includes a base liquid as well as nicotine and/or flavourings. The resulting vapour therefore typically contains nicotine and/or flavourings. The base liquid may include propylene glycol and/or vegetable glycerin.

A typical vaping smoking substitute device includes a mouthpiece, a power source (typically a battery), a tank for containing e-liquid, as well as a heating device. In use, electrical energy is supplied from the power source to the heating device, which heats the e-liquid to produce an aerosol (or "vapour") which is inhaled by a user through the mouthpiece.

Vaping smoking substitute devices can be configured in a variety of ways. For example, there are "closed system" vaping smoking substitute devices which typically have a sealed tank and heating element which is pre-filled with e-liquid and is not intended to be refilled by an end user. One subset of closed system vaping smoking substitute devices include a main body which includes the power source, wherein the main body is configured to be physically and electrically coupled to a consumable including the tank and the heating element. In this way, when the tank of a consumable has been emptied, the main body can be reused by connecting it to a new consumable. Another subset of closed system vaping smoking substitute devices are completely disposable, and intended for one-use only.

There are also "open system" vaping smoking substitute devices which typically have a tank that is configured to be refilled by a user, so the device can be used multiple times.

An example vaping smoking substitute device is the Myblu™ e-cigarette. The Myblu™ e-cigarette is a closed system device which includes a main body and a consumable. The main body and consumable are physically and electrically coupled together by pushing the consumable into the main body. The main body includes a rechargeable battery. The consumable includes a mouthpiece, a sealed tank which contains e-liquid, as well as a heating device, which for this device is a heating filament coiled around a portion of a wick which is partially immersed in the e-liquid. The device is activated when a microprocessor on board the main body detects a user inhaling through the mouthpiece. When the device is activated, electrical energy is supplied from the power source to the heating device, which heats e-liquid from the tank to produce a vapour which is inhaled by a user through the mouthpiece.

Another example vaping smoking substitute device is the blu PRO™ e-cigarette. The blu PRO™ e-cigarette is an open system device which includes a main body, a (refillable) tank, and a mouthpiece. The main body and tank are physically and electrically coupled together by screwing one to the other. The mouthpiece and refillable tank are physically coupled together by screwing one of the other, and detaching the mouthpiece from the refillable tank allows the tank to be refilled with e-liquid. The device is activated by a button on the main body. When the device is activated, electrical energy is supplied from the power source to a heating device, which heats e-liquid from the tank to produce a vapour which is inhaled by a user through the mouthpiece.

Another approach for a smoking substitute system is the so-called Heated Tobacco ("HT") approach in which tobacco (rather than an "e-liquid") is heated or warmed to release vapour. HT is also known as "heat not burn" ("HNB"). The tobacco may be leaf tobacco or reconstituted tobacco. The vapour may contain nicotine and/or flavourings. In the HT approach the intention is that the tobacco is heated but not burned, i.e., the tobacco does not undergo combustion.

A typical HT smoking substitute system may include a device and a consumable. The consumable may include the tobacco material. The device and consumable may be configured to be physically coupled together. In use, heat may be imparted to the tobacco material by a heating element of the device, wherein airflow through the tobacco material causes components in the tobacco material to be released as vapour. A vapour may also be formed from a carrier in the tobacco material (this carrier may for example include propylene glycol and/or vegetable glycerine) and additionally volatile compounds released from the tobacco. The released vapour may be entrained in the airflow drawn through the tobacco.

As the vapour passes through the consumable (entrained in the airflow) from the location of vaporisation to an outlet of the consumable (e.g., a mouthpiece), the vapour cools and condenses to form an aerosol for inhalation by the user. The aerosol will normally contain the volatile compounds.

In HT smoking substitute systems, heating as opposed to burning the tobacco material is believed to cause fewer, or smaller quantities, of the more harmful compounds ordinarily produced during smoking. Consequently, the HT approach may reduce the odour and/or health risks that can arise through the burning, combustion and pyrolytic degradation of tobacco.

There may be a need for improved design of smoking substitute systems, in particular HT smoking substitute systems, to enhance the user experience and improve the function of the HT smoking substitute system.

An example of the HT approach is the IQOS™ smoking substitute device from Philip Morris Ltd. The IQOS™ smoking substitute device uses a consumable, including reconstituted tobacco located in a wrapper. The consumable includes a holder incorporating a mouthpiece. The consumable may be inserted into a main body that includes a heating device. The heating device has a thermally conductive heating knife which penetrates the reconstituted tobacco of the consumable, when the consumable is inserted into the heating device. Activation of the heating device heats the heating element (in this case a heating knife), which, in turn, heats the tobacco in the consumable. The heating of the tobacco causes it to release nicotine vapour and flavourings which may be drawn through the mouthpiece by the user through inhalation.

A second example of the HT approach is the device known as "Gb"™ from British American Tobacco p.l.c. Glo™ comprises a relatively thin consumable. The consumable includes leaf tobacco which is heated by a heating device located in a main body. When the consumable is placed in the main body, the tobacco is surrounded by a heating element of the heating device. Activation of the heating device heats the heating element, which, in turn, heats the tobacco in the consumable. The heating of the tobacco causes it to release nicotine vapour and flavourings which may be drawn through the consumable by the user through inhalation. The tobacco, when heated by the heating device, is configured to produce vapour when heated rather than when burned (as in a smoking apparatus, e.g., a cigarette). The tobacco may contain high levels of aerosol formers (carrier), such as vegetable glycerine ("VG") or propylene glycol ("PG").

The present inventor(s) have observed that most smoking substitute devices currently on the market are configured to operate in isolation of other devices, which limits the functions the smoking substitute devices can perform.

The present inventor(s) have observed that it is important for security to be considered in relation to smoking substitute devices. This can be particularly important as the number of functional components provided in smoking substitute devices, and as the data stored about component operation and about the user and his or her usage behaviour, increases. It can be particularly important for network-enabled smoking substitute devices that are configured to wirelessly communicate with one or more other devices and/or with a server such as an application server.

The present disclosure has been devised in light of the above considerations.

SUMMARY OF THE DISCLOSURE

At its most general, the present disclosure provides a device, system and method that enables secure and reliable storage and transmission of data for a smoking substitute device. The present inventor(s) have identified three important types (or facets, or streams) of data relating to a smoking substitute that should be protected, for device security and user peace of mind. Those data types are: (1) firmware stored on the smoking substitute device, (2) usage data recorded during operation of the smoking substitute device, and (3) data to be transmitted wirelessly from the smoking substitute device to a mobile device or remote server.

According to the disclosure, each of these data types is assigned its own encryption key. The three encryption keys assigned to a particular smoking substitute device will be different to one another and each individual smoking substitute device may have its own unique combination of three encryption keys.

The three encryption keys will be stored securely within the memory of the smoking substitute device. For example, they can be stored in a portion of the memory that is ring fenced from other portions of the memory and which cannot be read by another device, such as a mobile device with which the smoking substitute device can wirelessly communicate. They may be stored in a dedicated hardware security module or within a protected region of the memory. The three encryption keys may be stored separately to one another, in different respective secure portions of the memory, to further enhance the robustness of the security architecture of the smoking substitute device.

The three encryption keys may also be stored in a server, for example an application server, with which the smoking substitute device can be configured to communicate, either directly or via a mobile device on which an application is being run. The server may be configured to decrypt encrypted data, for example encrypted data that the smoking substitute device has wirelessly transmitted to the mobile device, and the server may provide the decrypted data to the mobile device. However, the server will not provide an encryption key itself to the mobile device or to any other device.

The disclosure relates in particular to network-enabled smoking substitute devices, where in a network-enabled device has a wireless interface for communicating with the wireless interface of another device. For example, the other device may be a mobile device such as a mobile phone, smartphone, laptop computer or tablet computer or a television or gaming device. The wireless interface may comprise any suitable type of wireless communication interface, or terminal, for example a Wi-Fi or Bluetooth™ or Bluetooth™ Low Energy (BLE) interface.

The disclosure thus provides an improved security architecture for a smoking substitute device that ensures that the data stored within the device and the transfer of that data is secure and inaccessible to a third-party device, except where the user permits some access, for example by inputting commands into an application running on a mobile device. The security architecture has an increased level of security, as compared to known smoking substitute devices, because it provides three unique encryption keys, per device. If a device were to be "hacked" (i.e., if the security architecture were to be penetrated by a non-authorised user) and the encryption keys discovered, the "hacker" would only have discovered the encryption keys that are applicable to that sole smoking substitute device and all other devices of its type (e.g., of the same make, model, brand etc) would remain secure. Moreover, each of three data streams—relating to each of the firmware, the data logs and the wireless messaging respectively—would have to be individually hacked, in order to obtain all the encryption key for a single device. The effort involved in doing this, for an individual device, will act as a deterrent for many potential hackers.

According to a first aspect of the disclosure, there is provided smoking substitute device comprising: a control unit; a communications interface; and a memory configured to store firmware for controlling the smoking substitute device. The firmware is encrypted by a first encryption key. The control unit is configured to: encrypt data relating to the use of the smoking substitute device (also referred to herein as usage data) using a second encryption key; and record in the memory a data log comprising the encrypted data relating to the use of the smoking substitute device. The smoking substitute device is configured to transmit information to and receive information from a mobile device via the communications interface, wherein the information transmitted to or received from the mobile device via the communications interface is encrypted using a third encryption key.

The first encryption key, second encryption key and third encryption keys may be different from one another. Moreover, the particular combination of first encryption key, second encryption key and third encryption keys that is assigned to a particular respective smoking substitute device may be unique to that device alone. Therefore, if the smoking substitute device is a first smoking substitute device, within a plurality of similar smoking substitute devices, the first, second and third encryption keys for the first smoking substitute device may be different to the first, second and third encryption keys for each of the respective other smoking substitute devices, within the plurality of smoking substitute devices.

The first, second and third encryption keys may each be stored in a secure memory location (also referred to herein as a secure region in the memory) within the smoking substitute device. The first, second and third encryption keys may be stored in the same secure memory location, or in respective independent secure memory locations. The secure memory location may be a non-readable portion of memory, e.g., to which access is controlled by a memory protection unit operating in any conventional manner. Alternatively the secure memory location may be a hardware security module provided within the smoking substitute device.

The firmware may comprise software that is stored on the smoking substitute device and that provides the control instructions for operation of the device's specific hardware components. The control unit of the smoking substitute device can be configured to run the firmware, to control operation of the device. The control unit may be configured to run the firmware by decrypting the encrypted firmware stored in the memory using the first encryption key stored in the secure memory location.

According to an embodiment, the control unit may access the first encryption key, and/or may decrypt the firmware, in response to a command being received at the communications interface of the smoking substitute device from a corresponding communications interface of a mobile device with which the smoking substitute device wirelessly communicates. For example, the mobile device may transmit a command from an application running on the mobile device, wherein the command may have been generated by software components of the application and/or may comprise a user command that has been input to the application via a user interface of the mobile device.

The usage data may comprise one or more or a portion of one or more data logs. Each data log may comprise a record of data, stored within the memory of the smoking substitute device. A data log may be a list, a grouping or any other suitable type of record. A data log may be stored permanently or temporarily, for example using a buffer. The data that is encrypted using the second encryption key, and stored within a data log, comprises data relating to the use of the smoking substitute device. Data relating to the use of the smoking substitute device may comprise data pertaining to one or more of a plurality of components within the device and/or statistical data relating to user behaviour with respect to the device.

For example, the data that is encrypted using the second encryption key may relate to any of: a battery or other power source, an air flow sensor, a wireless interface, a position or orientation sensor such as an accelerometer or gyroscope, a charging port via which the device can be electrically recharged, or a coupling portion that interfaces with a consumable, wherein the coupling portion usually comprises a mechanical interface and an electrical interface via which power can be supplied to the consumable. The data may comprise an output from one or more of the sensors, which can be used either in isolation or in combination with other data in order to determine control instructions for the device. For example, if the data comprises output voltage levels from the battery, which are indicative of battery power level, such data can be used by the control unit to determine when the battery level is reaching a low threshold level at which operation of all of the components within the device may not be possible and thus at which operation of certain components may have to be temporarily compromised or suspended. For example, if the data comprises a detection output from the air flow sensor, this may be understood by the control unit to comprise an indication that and inhale action is being carried out using the device. The data that is logged and encrypted using the second encryption key may comprise time components such as indicators of when inhalations took place and their duration.

The information that is transmitted to or received from a mobile device, via the communications interface of the smoking substitute device, and that is encrypted using a third encryption key, may be of a number of different types. For example, the information transmitted to the mobile device may comprises the data relating to the use of the smoking substitute device encrypted by the second encryption key, e.g., any of the usage data referred to above. In other examples, the information transmitted or received via the communications interface may comprise a command issued to the mobile device or to an application that is running on the mobile device, or a request from the mobile device or from an application that is running on the mobile device.

The control unit of the smoking substitute device may be configured to encrypt the information that is to be transmitted to the mobile device, via the communications interface, using the third encryption key that is stored in the secure memory location. The control unit may be further configured to decrypt information received, by the communications interface, from a mobile device or application, using the third encryption key that is stored in the secure memory location.

The smoking substitute device may be configured to transmit information to and receive information from a server, wherein the information transmitted to or received from the server via the communications interface is encrypted using the third encryption key. The transmission and receipt of encrypted information to and from the server may be direct or may be via an intermediate such as a mobile device with which the smoking substitute device is configured to wirelessly communicate.

According to a second aspect of the disclosure, there is provided a system for managing a smoking substitute device, the system comprising a mobile device in network communication with a remote server, and a smoking substitute device. The mobile device comprises: a first control unit; a first communications interface; and a first memory. The smoking substitute device comprises: a second control unit; a second communications interface; and a second memory configured to store firmware for controlling the smoking substitute device. The firmware is encrypted by a first encryption key. The second control unit is configured to: encrypt data relating to the use of the smoking substitute device using a second encryption key; and record in the second memory a data log comprising the encrypted data relating to the use of the smoking substitute device. The mobile device and the smoking substitute device are in communication via the first communications interface and second communications interface to exchange information therebetween. The information exchanged between the mobile device and the smoking substitute device is encrypted using a third encryption key. The system may comprise the server, which may be, for example, an application server. An application running on the mobile device may be configured to communicate with the server, via a network. The server may utilise a virtual memory means such as cloud storage, for example.

The mobile device may be configured to: transmit encrypted information received from the smoking substitute device to the server; and receive, from the server, encrypted data to be transmitted to the smoking substitute device. The server may be configured to decrypt the encrypted information received from the mobile device, using the third encryption key stored on the server. The server may process the decrypted information to determine data, commands or other information to be returned to the mobile device (e.g., for display on the application) or to be relayed to the smoking substitute device. Information for the smoking substitute device that is sensitive (e.g., firmware updates or the like) may be encrypted with the third encryption key so that it remains encrypted during relay via the mobile device.

The three encryption keys for the smoking substitute device should not be stored on, transmitted to or otherwise accessible by a mobile device, with which the smoking substitute device and/or the sever wirelessly communicates, or by any other third-party device. If the smoking substitute device is sending a command or other information to the mobile device, which is encrypted using the second encryption key, the mobile device will have to transmit that encrypted command or other information to the server, for it to be decrypted and sent back to the mobile device. It is possible that the mobile device will also have its own encryption keys that is applies to data transmissions between the mobile device and the server. However, any such mobile device encryption keys will be independent from the three encryption keys that have been implemented for the smoking substitute device.

The information transmitted to the mobile device from the smoking substitute device comprises the data relating to the use of the smoking substitute device encrypted by the second encryption key. The server may thus possess the third encryption key to decrypt the transmitted encrypted information received by the mobile device from the smoking substitute device, and the second encryption key to decrypt the data relating to the use of the smoking substitute device. The server may store all of the first encryption key, second encryption key, and third encryption key. For example, the server may be configured to transmit a firmware update to the smoking substitute device, and wherein the firmware update is encrypted with the first encryption key.

The smoking substitute device may be configured to transmit information to and receive information from the server, wherein the information transmitted to or received from the server, from or to the smoking substitute device, is encrypted using the third encryption key. The server may be configured to store the first encryption key, second encryption key, and third encryption key. The server may be configured to decrypt the information received from the smoking substitute device, using the third encryption key stored on the server, and is to transmit the decrypted information to the mobile device. In this manner, therefore, the encrypted data may bypass the mobile device and be submitted directly to the server, for use by the server and/or for decryption, after which, if appropriate, the decrypted data may be sent to the mobile device.

In another aspect, the disclosure provides a method of managing a smoking substitute device, wherein the smoking substitute device comprises a control unit, a communications interface, and a memory configured to store firmware for controlling the smoking substitute device, the method comprising: encrypting the firmware using a first encryption key; encrypting data relating to use of the smoking substitute device using a second encryption key; recording, in the memory, a data log comprising the encrypted data relating to the use of the smoking substitute device; encrypting information that is to be transmitted to a mobile device, via the communications interface, using a third encryption key; and transmitting encrypted information to a mobile device, via the communications interface. The method may be a computer implemented method. It may be implemented by the control unit of the smoking substitute device which may be, for example, a microprocessor.

The smoking substitute device may be configured to form a paired or bonded wireless communication link with a mobile device, wherein signals may be transmitted between the smoking substitute device and a mobile device via the paired or bonded wireless communication link. The process for pairing or bonding the two devices may comprise any suitable security protocol, for example the identification of each to the other and the sharing of encryption keys. If the smoking substitute device does form a paired or bonded communication link with a mobile device, the encryption key that it provides to the mobile device for pairing should be distinct from the three encryption keys detailed herein, that are specifically directed to encrypting the firmware, data log and transmitted and received messages for the smoking substitute device. Moreover, those three encryption keys should not be submitted to or stored on a mobile device, even if it is securely paired or bonded to the smoking substitute device, for wireless communication.

The method may include transmitting, from the mobile device to a remote server, encrypted information received from the smoking substitute device; and receiving, by the mobile device from the remote server, encrypted data to be transmitted to the smoking substitute device.

Although three encryption keys are detailed herein, it is possible that more than three encryption keys may be used, each directed to encrypting a different respective data facet or datastream for a smoking substitute device.

The disclosure includes the combination of the aspects and preferred features described except where such a combination is clearly impermissible or expressly avoided.

The skilled person will appreciate that except where mutually exclusive, a feature or parameter described in relation to any one of the above aspects may be applied to any other aspect. Furthermore, except where mutually exclusive, any feature or parameter described herein may be applied to any aspect and/or combined with any other feature or parameter described herein.

SUMMARY OF THE FIGURES

Embodiments and experiments illustrating the principles of the disclosure will now be discussed with reference to the accompanying figures in which:

FIG. 5 shows an example system for managing a smoking substitute device.

FIG. 6A shows an example smoking substitute device for use as the smoking substitute device in the system of FIG. 5.

FIG. 6B shows the main body of the smoking substitute device of FIG. 6A without the consumable.

FIG. 6C shows the consumable of the smoking substitute device of FIG. 6A without the main body.

FIG. 7A is a schematic view of the main body of the smoking substitute device of FIG. 6A that is an embodiment of the disclosure.

FIG. 7B is a schematic view of the consumable of the smoking substitute device of FIG. 6A.

FIG. 8 is a flow diagram of encryption operations carried out by the control unit of a smoking substitute device, according to an embodiment of the present disclosure.

DETAILED DESCRIPTION OF THE DISCLOSURE

Aspects and embodiments of the present disclosure will now be discussed with reference to the accompanying figures. Further aspects and embodiments will be apparent to those skilled in the art. All documents mentioned in this text are incorporated herein by reference.

FIG. 5 shows an example system 1 for managing a smoking substitute device 10.

The system 1 as shown in FIG. 5 includes a mobile device 2, an application server 4, an optional charging station 6, as well as the smoking substitute device 10.

The smoking substitute device 10 is configured to communicate wirelessly, e.g., via Bluetooth™, with an application (or "app") installed on the mobile device 2, e.g., via a suitable wireless interface (not shown) on the mobile device 2. The mobile device 2 may be a mobile phone, for example. The application on the mobile phone is configured to communicate with the application server 4, via a network 8. The application server 4 may utilise cloud storage, for example.

The network 8 may include a cellular network and/or the internet.

A skilled person would readily appreciate that the mobile device 2 may be configured to communicate via the network 8 according to various communication channels, preferably a wireless communication channel such as via a cellular network (e.g., according to a standard protocol, such as 3G or 4G) or via a WiFi network.

The app installed on the mobile device and the application server 4 may be configured to assist a user with their smoking substitute device 10, based on information communicated between the smoking substitute device 10 and the app and/or information communicated between the app and the application server 4.

The charging station 6 (if present) may be configured to charge (and optionally communicate with) the smoking substitute device 10, via a charging port on the smoking substitute device 10. The charging port on the smoking substitute device 10 may be a USB port, for example, which may allow the smoking substitute device to be charged by any USB-compatible device capable of delivering power to the smoking substitute device 10 via a suitable USB cable (in this case the USB-compatible device would be acting as the charging station 6). Alternatively, the charging station could be a docking station specifically configured to dock with the smoking substitute device 10 and charge the smoking substitute device 10 via the charging port on the smoking substitute device 10.

FIG. 6A shows an example smoking substitute device 110 for use as the smoking substitute device 10 in the system 1 of FIG. 5.

In this example, the smoking substitute device 110 includes a main body 120 and a consumable 150. The consumable 150 may alternatively be referred to as a "pod".

In this example, the smoking substitute device 110 is a closed system vaping device, wherein the consumable 150 includes a sealed tank 156 and is intended for one-use only.

FIG. 6A shows the smoking substitute device 110 with the main body 120 physically coupled to the consumable 150.

FIG. 6B shows the main body 120 of the smoking substitute device 110 without the consumable 150.

FIG. 6C shows the consumable 150 of the smoking substitute device 110 without the main body 120.

The main body 120 and the consumable 150 are configured to be physically coupled together, in this example by pushing the consumable 150 into an aperture in a top end 122 of the main body 120, e.g., with the consumable 150 being retained in the aperture via an interference fit. In other examples, the main body 120 and the consumable could be physically coupled together by screwing one onto the other, through a bayonet fitting, or through a snap engagement mechanism, for example. An optional light 126, e.g., an LED located behind a small translucent cover, is located a bottom end 124 of the main body 120. The light 126 may be configured to illuminate when the smoking substitute device 110 is activated.

The consumable 150 includes a mouthpiece (not shown) at a top end 152 of the consumable 150, as well as one or more air inlets (not shown in FIG. 6) so that air can be drawn into the smoking substitute device 110 when a user inhales through the mouthpiece. At a bottom end 154 of the consumable 150, there is located a tank 156 that contains e-liquid. The tank 156 may be a translucent body, for example.

The tank 156 preferably includes a window 158, so that the amount of e-liquid in the tank 156 can be visually assessed. The main body 120 includes a slot 128 so that the window 158 of the consumable 150 can be seen whilst the rest of the tank 156 is obscured from view when the consumable 150 is inserted into the aperture in the top end 122 of the main body 120.

In this present embodiment, the consumable 150 is a "single-use" consumable. That is, upon exhausting the e-liquid in the tank 156, the intention is that the user disposes of the whole consumable 150. In other embodiments, the e-liquid (i.e., aerosol former) may be the only part of the system that is truly "single-use". In such embodiments, the tank 156 may be refillable with e-liquid or the e-liquid may be stored in a non-consumable component of the system. For example, the e-liquid may be stored in a tank located in the device or stored in another component that is itself not single-use (e.g., a refillable tank).

The tank 156 may be referred to as a "clearomizer" if it includes a window 158, or a "cartomizer" if it does not.

FIG. 7A is a schematic view of the main body 120 of the smoking substitute device 110.

FIG. 7B is a schematic view of the consumable 150 of the smoking substitute device 110.

As shown in FIG. 7A, the main body 120 includes a power source 128, a control unit 130, an airflow sensor 131, a memory 132, a wireless interface 134, an electrical interface 136, and, optionally, an accelerometer 135 and/or one or more additional components 138.

The power source 128 is preferably a battery, more preferably a rechargeable battery. A charging port 139 may be provided for connecting the rechargeable battery to an external power source.

The control unit 130 may include a microprocessor, for example.

The memory 132 is preferably includes non-volatile memory, such as flash memory or the like.

The wireless interface 134 is preferably configured to communicate wirelessly with the mobile device 2, e.g., via Bluetooth. To this end, the wireless interface 134 could include a Bluetooth™ antenna. Other wireless communication interfaces, e.g., WiFi, are also possible.

The accelerometer 135 may function as a motion sensor to receive inputs for controlling the device.

The main body 120 comprises a coupling portion 121 that includes the electrical interface 136. The electrical interface 136 may include one or more electrical contacts. The electrical interface 136 may be located in, and preferably at the bottom of, the aperture in the top end 122 of the main body 120. When the main body 120 is physically coupled to the consumable 150, the electrical interface 136 may be configured to pass electrical power from the power source 128 to (e.g., a heating device of) the consumable 150 when the smoking substitute device 110 is activated, e.g., via the electrical interface 160 of the consumable 150 (discussed below). As an alternative to the charging port 139, the electrical interface may be configured to receive power from the charging station 6 when the main body 120 is not physically coupled to the consumable 150.

The electrical interface 136 of the main body 120 may include one or more electrical contacts. The electrical interface 136 may be located in, and preferably at the bottom of, the aperture in the top end 122 of the main body 120. When the main body 120 is physically coupled to the consumable 150, the electrical interface 136 may be configured to pass electrical power from the power source 128 to (e.g., a heating device of) the consumable 150 when the smoking substitute device 110 is activated, e.g., via the electrical interface 160 of the consumable 150 (discussed below). When the main body 120 is not physically coupled to the consumable 150, the electrical interface may be configured to receive power from the charging station 6.

The additional components 138 of the main body 120 may include the optional light 126 discussed above.

The additional components 138 of the main body 120 may, if the power source 128 is a rechargeable battery, include a charging port configured to receive power from the charging station 6. This may be located at the bottom end 124 of the main body 120. Alternatively, the electrical interface 136 discussed above is configured to act as a charging port configured to receive power from the charging station 6 such that a separate charging port is not required.

The additional components 138 of the main body 120 may, if the power source 128 is a rechargeable battery, include a battery charging control circuit, for controlling the charging of the rechargeable battery. However, a battery charging control circuit could equally be located in the charging station 6 (if present).

The airflow sensor 131 is configured to detecting airflow in the smoking substitute device 110, e.g., caused by a user inhaling through a mouthpiece 166 (discussed below) of the smoking substitute device 110. The smoking substitute device 110 may be configured to be activated when airflow is detected by the airflow sensor.

The additional components 138 of the main body 120 may include an actuator, e.g., a button. The smoking substitute device 110 may be configured to be activated when the actuator is actuated. This provides an alternative to the airflow sensor noted, as a mechanism for activating the smoking substitute device 110.

The additional components 138 of the main body 120 may include a reader configured to read information associated with the consumable from a machine readable data source included in (e.g., contained in the body of, or attached to) the consumable 150.

The reader may be configured to read information from the machine readable data source wirelessly, e.g., via electromagnetic waves or optically. Thus, for example, the machine readable data source included in the consumable 150 could be an RFID tag (in which case the reader included in the main body 120 may be an RFID reader) or a visual data source such as a barcode (in which case the reader included in the main body may be an optical reader, e.g., a barcode scanner). Various wireless technologies and protocols may be employed to allow the reader to wirelessly read information from a machine readable data source included in or attached to the consumable 150, e.g., NFC, Bluetooth, Wi-Fi, as would be appreciated by a skilled person.

For avoidance of any doubt, the reader (if present) may be configured to read information from the machine readable data source non-wirelessly, e.g., using a direct electrical connection between the main body 120 and consumable 150.

As shown in FIG. 7B, the consumable 150 includes the tank 156, an electrical interface 160, a heating device 162, one or more air inlets 164, a mouthpiece 166, and, optionally, one or more additional components 168.

The electrical interface 160 of the consumable 150 may include one or more electrical contacts. The electrical interface 136 of the main body 120 and an electrical interface 160 of the consumable 150 are preferably configured to contact each other and therefore electrically couple the main body 120 to the consumable 150 when the main body 120 is physically coupled to the consumable 150. In this way, electrical energy (e.g., in the form of an electrical current) is able to be supplied from the power source 128 in the main body 120 to the heating device 162 in the consumable 150.

The heating device 162 is preferably configured to heat e-liquid contained in the tank 156, e.g., using electrical energy supplied from the power source 128. In one example, the heating device 162 may include a heating filament and a wick, wherein a first portion of the wick extends into the tank 156 in order to draw e-liquid out from the tank 156, and wherein the heating filament coils around a second portion of the wick located outside the tank 156. In this example, the heating filament is configured to heat up e-liquid drawn out of the tank 156 by the wick to produce an aerosol vapour.

The one or more air inlets 164 are preferably configured to allow air to be drawn into the smoking substitute device 110, when a user inhales through the mouthpiece 166.

The additional components 168 of the consumable 150 may include a machine readable data source, which may e.g., be contained in the body of, or attached to the consumable 150. The machine readable data source may store information associated with the consumable. The information associated with the consumable may include information concerning the content of the consumable (e.g., e-liquid type, batch number) and/or a unique identifier, for example.

The machine readable data source may be rewritable, e.g., a rewritable RFID chip, or read only, e.g., a visual data source such as a barcode. As indicated above, the additional components 138 of the main body 120 may include a reader configured to read information associated with the consumable from the machine readable data source.

In use, a user activates the smoking substitute device 110, e.g., through actuating an actuator included in the main body 120 or by inhaling through the mouthpiece 166 as described above. Upon activation, the control unit 130 may supply electrical energy from the power source 128 to the heating device 162 (via electrical interfaces 136, 166), which may cause the heating device 162 to heat e-liquid drawn from the tank 156 to produce a vapour which is inhaled by a user through the mouthpiece 166.

Of course, a skilled reader would readily appreciate that the smoking substitute device 110 shown in FIGS. 6 and 7 shows just one example implementation of a smoking substitute device, and that other forms of smoking substitute device could be used as the smoking substitute device 10 of FIG. 5.

By way of example, a HNB smoking substitute device including a main body and a consumable could be used as the smoking substitute device 10 of FIG. 5, instead of the smoking substitute device 110. One such HNB smoking substitute device is the IQOS™ smoking substitute device discussed above.

As another example, an open system vaping device which includes a main body, a refillable tank, and a mouthpiece could be used as the smoking substitute device 10 of FIG. 5, instead of the smoking substitute device 110. One such open system vaping device is the blu PROT™ e-cigarette discussed above.

As another example, an entirely disposable (one use) smoking substitute device could be used as the smoking substitute device 10 of FIG. 5, instead of the smoking substitute device 110.

Embodiments of the present disclosure relate to the secure storage and/or transmission of different data types, for a smoking substitute device. The present inventors have recognised that it is desirable to control and manage the way in which particular types of data are stored, and separated from one another, and protected, within a smoking substitute device. In one example, the disclosure proposes encrypting three types of data using different encryption keys:

(1) firmware stored on the smoking substitute device,
(2) usage data recorded during operation of the smoking substitute device, and
(3) data to be transmitted wirelessly from the smoking substitute device to a mobile device or remote server.

In a preferred embodiment, each device has a unique set of three encryption keys for these data types. This is advantageous because the discovery of one key or a set of keys for a given smoking substitute device does not compromise the security of other smoking substitute devices.

Before the details of encryption techniques are discussed, the operation of the device is briefly discussed to provide an examples of usage data that may be recorded and stored on a smoking substitute device.

In use, the airflow sensor 131 is configured to transmit a detection signal to the control unit 130 when it detects an airflow in the airflow channel. The control unit 130 can then use that detection signal, either in isolation or in combination with other signals or other factors, to control operation of the smoking substitute device.

The signal emitted by the airflow sensor 131 may comprise a time component. For example, it may include an instantaneous time at which an airflow was initially detected, and/or a time period throughout which an airflow was detected, and/or a duration of an airflow—which would respectively correspond to an instantaneous time at which a user began an inhale action, the time period for which the inhale action lasted and the length of the inhale.

In the present embodiment, usage data may be obtained from any of the wireless interface 134, the accelerometer 135, or any of the optional additional components 138.

The wireless interface 134 may be configured to wirelessly communicate with a Bluetooth™ interface of another device (not shown), such as a mobile device, for example a smartphone. The Bluetooth™ interface can be configured to form a paired or bonded wireless communication link with the mobile device. It can further be configured to transmit data to the mobile device, and/or to an application running on the mobile device. The transmitted data may comprise usage data, e.g., telemetry data from components of the smoking substitute device, such as the wireless communication link itself. The transmitted data may also include activity/operation of the wireless communication link.

The usage data may comprise operational data for the smoking substitute device, for example voltage level readouts from the power source 128, which are indicative of remaining battery power or for example position and/or orientation data from the accelerometer, which are indicative of movements or physical actions made using the smoking substitute device. The mobile device may have an application running thereon that is configured to monitor received usage data from the smoking substitute device and to make calculations or determinations using the received data, and to transmit control signals or notifications to the smoking substitute device, based on the received data. For example, the application may be configured to send the smoking substitute device a notification when it is at low battery level, and possibly to send instructions regarding how various components within the smoking substitute device should be controlled at low battery level. As discussed below, however, for security reasons the application may not be able to decrypt encrypted data from the smoking substitute device on the mobile device. Instead, the encrypted data may be relayed by the mobile device to a remote server (which possesses a relevant decryption key), which decrypts the data and performs the necessary calculations. In this example, the raw (decrypted) usage data from the smoking substitute device may never exist in that form on the mobile device.

The accelerometer 135 may be configured to measure dynamic acceleration forces, in order to sense movement or vibrations. The outputs of the accelerometer 135 may be used to determine position factors and/or orientation factors such as tilt, tilt angle, and incline, as well as being used to determine actions or events such as rotation, vibration and collision. The accelerometer 135 may be a piezoelectric accelerometer or a capacitance accelerometer. The accelerometer 135 may comprise a three-axis model, to enable it to sense rotational tilt, as well as movement in a two-dimensional plane.

In this embodiment, the accelerometer 135 is configured to detect movement and collisions, and to provide one or more voltage outputs to the control unit 130, as a result of what it has detected. The accelerometer 135 can, for example, detect the action of the smoking substitute device being tapped against (i.e., relatively gently colliding with) a surface. When the user taps the smoking substitute device, the accelerometer 135 transmits a corresponding voltage signal to the control unit 130. The control unit 130 may store (at least temporarily) in memory a measure of the voltage signal, along with an indicator of the time at which it was received. This is an example of usage data that may be encrypted before being stored in the memory of the smoking substitute device in a manner discussed below.

If the smoking substitute device is currently paired with, or bonded to, a mobile device, it may also submit a signal to the mobile device, via the wireless communication link that has been established between them, regarding the detection that the accelerometer 135 has made. This can be very useful as the smoking substitute device may be preconfigured for a tap (or a plurality of taps) to form part of a sequence for the user to convey instructions to the smoking substitute device and/or to the connected mobile device or application. For example, there may be a predetermined sequence of hardware-related actions, which a user can make in order to reset a portion of the memory 132 of the smoking substitute device. Or the smoking substitute device may be used as a gaming input, for a game being running on a connected mobile device, wherein the accelerometer 135 is employed to control direction of movements being made by the user, within the game. The control unit 130 may record a log of the actions above. Such a log is an example of usage data that may be encrypted before being stored in the memory of the smoking substitute device in a manner discussed below.

The present inventors have observed that, in a smoking substitute device that is as sophisticated and functionally advanced as the smoking substitute device discussed above, the usage data may include sensitive data which it is desirable to protect from unauthorised access. Therefore, there is a need to apply security measures to the storage of, and to any transmission of, the data for a smoking substitute device.

We now discuss in more detail the use of three different encryption keys for three different respective data types.

A first data type (or facet, or datastream) that is protected using a first unique encryption key is the firmware. The firmware comprises the software instructions that can be implemented by the control unit 130 in order to control operation of components of the smoking substitute device, including those components discussed in detail hereabove. It is important to protect the firmware and to ensure that a non-authorised user cannot infiltrate or change the firmware, in order to ensure correct functioning of the smoking substitute device and to protect the user's data and ensure improved user peace of mind, particularly in the event that his or her smoking substitute device is lost or stolen.

For example, if a non-authorised user changed the firmware, he or she might be able to change the control instructions for controlling the heating device 162 of an inserted consumable 150, which could cause safety issues. For example, if an unauthorised user change the firmware, he or she might be able to change the address or other identifier of the mobile device, to which the wireless interface 134 of the smoking substitute device is linked for wireless communication, and as a result important operational data from the smoking substitute device may not reach the user's mobile device and corresponding important commands from the mobile device or application may not be transmitted to the user's smoking substitute device.

According to the present embodiment, the firmware is stored in a first portion 1324 of the memory 132. The first portion 1324 may also be referred to herein as the "firmware portion" of the memory 132. The firmware is stored in an encrypted form, which uses a first encryption key. The initial encryption and storage of the firmware may be carried out during manufacture and assembly of the smoking substitute device. The first encryption key is also stored in the memory 132 at this stage. The first encryption key is stored in a different portion of the memory to the encrypted firmware. In particular, the first encryption key is stored in a secure portion of the memory 132, which is referred to herein as an encryption key portion 1326. Herein the term "secure portion" may refer to computer storage that is configured to prevent unauthorised access. The secure portion may be a protected region of memory, e.g., under the control of a memory protection unit that forms part of the control unit 130. The memory protection unit may control access to the memory 132, and can prohibit access to the secure portion expect under certain circumstances. Alternatively, the secure portion may be provided on an entity that is a physically or logically separate from the first portion 1324. For example, the encryption key portion 1326 may be a suitably configured hardware security module, or the like.

The secure region protects the first encryption key against be read by an external device. The secure module may not be addressable by an external device, such as a mobile device with which the smoking substitute device can wirelessly communicate.

In operation, the control unit 130 is configured to decrypt the encrypted firmware with the first encryption key to enable the firmware to be executed. According to the present embodiment, the control unit 130 will thus has the ability to use the encryption key portion 1326 of the memory 132 to decrypt the encrypted firmware.

The second data type (or facet, or datastream) that is protected using a second unique encryption key is the usage data discussed above, which may take the form or a data log or a plurality of data logs 1322 stored in the memory 132. As will be understood from the detail descriptions above, various detectors and other functional components within the smoking substitute device provide operational data that can usefully be stored, monitored and in some cases used to make determinations regarding control and subsequent operations of the smoking substitute device. It is important to protect such data from being hacked, altered or deleted by a non-authorised user, in order to protect the integrity of the device's operation and to keep the user's information safe and private to him or her.

In the present embodiment, the memory 132 stores a plurality of data logs 1322 in a second portion thereof, which may be distinct from the firmware portion 1324 and the encryption key portion 1326. The data logs 1322 may include data pertaining to the operation of the power source 128, the air flow sensor 131, the accelerometer 135, the wireless interface 134 and the electrical interface 136 within the coupling portion 121 of the smoking substitute device. The data logs, or at least some of the data within those data logs, may be transmitted to a mobile device if the smoking substitute device is paired or bonded to a mobile device, as detailed further below.

The control unit 130 is configured to coordinate storage of data in the data logs, including determining what is to be stored, whether certain data should be combined to, for example, add a time component to a detection signal from a detector, and so on. The control unit is further configured to encrypt the data logs before storage in the memory 132. The control unit 130 may be configured to use a second encryption key stored within the encryption key portion 1326 for this purpose. Similarly to the firmware example above, the control unit 130 will not copy or store the second encryption key during this process, nor will it transmit the second encryption key to any other component within the smoking substitute device or to any device external to the smoking substitute device.

The second encryption key is different to the first encryption key. In the present embodiment the first and second encryption keys are stored along with a third encryption key detailed below in the encryption key portion 1326 of the memory 132, where in the encryption key portion 1326 is secure and non-readable by an external device. However, in some embodiments the first, second, and third encryption keys will be stored separately in first, second, and third respective secure regions of the memory 132.

In the present embodiment, all of the data within the data logs 1322 in the second portion of the memory 132 is encrypted using the second encryption key. However, in other embodiments the control unit may be configured only to apply the second encryption key to certain data logs 1322, for example if particular data logs 132 are deemed to be more sensitive and/or more useful than others. In other embodiments the control unit may be configured to apply multiple different encryption keys to multiple different respective data logs 132.

The third data type (or facet, or datastream) that is protected using a third unique encryption key is the information that is to be transmitted wirelessly from the wireless interface 134 of the smoking substitute device to a corresponding wireless interface of an external device, such as a mobile device, for example the mobile device 2 shown in FIG. 5 herein. In this embodiment, the wireless interface 134 is a Bluetooth™ interface. The smoking substitute device is configured to form a bonded wireless communication link, with a mobile device 2. The protocols for forming bonded Bluetooth™ links are generally well known, to the skilled reader, but are nonetheless described in brief below.

In this embodiment the user selects a mobile device 2 that he or she would like to be bonded to the smoking substitute device and usually downloads an application for managing the smoking substitute device, on to the mobile device 2, before the mobile device 2 is bonded to the smoking substitute device. However, it is not essential to download the application before the bonding process happens—it can be done afterwards, to control subsequent operation of the smoking substitute device, via the application running on the mobile device 2. The user activates the Bluetooth™ wireless interface 134 of the smoking substitute device, so that it emits an advertising message, seeking a mobile device 2 to bond with. The user will also activate the Bluetooth™ wireless interface of the mobile device 2, so that it can receive the advertising message from the smoking substituted device and respond thereto by identifying itself to the smoking substitute device. The two devices will then share pairing encryption keys with one another, wherein those pairing encryption keys are different to the first, second and third encryption keys detailed herein for encrypting data, and wherein the pairing encryption key that the smoking substitute device transmits to the mobile device 2 is stored in the memory 132 in a different location, away from the encryption key portion 1326 that stores the first second and third encryption keys.

When the smoking substitute device and the mobile device 2 have received and accepted one another's pairing encryption keys, a paired wireless communication link is formed between them. The paired link is an exclusive link, meaning that they will each direct subsequent wireless communication signals only to one another (unless the user instructs otherwise, either directly at the smoking substitute device or via the application—but those methods will not be discussed in detail herein.) The two devices will remember one another's pairing encryption keys and reuse them each time a wireless connection is to be formed between them— this remembering and re-using of the pairing encryption keys establishes a bonded wireless communication link between the two devices.

Once it has been bonded thereto, the smoking substitute device will begin to transmit wireless messages to, and receive wireless messages from, the mobile device 2. The wireless messages transmitted by the smoking substitute device can comprise commands or requests, issued to the mobile device 2 or to an application that is running on the mobile device 2. The wireless messages transmitted by the smoking substitute device can also comprise data relating to the usage of the smoking substitute device—i.e., comprise data that is stored in one or more of the data logs 1322. For example, in this embodiment the smoking substitute device is configured to regularly transmit a data log comprising data obtained from the airflow sensor 131, to the mobile device 2. That data obtained from the airflow sensor 131 can by accessed by the application, running on the mobile device 2, and used inter alia to monitor user smoking substitute behaviour patterns.

In this embodiment, before any information (including commands, requests and data log data) is transmitted by the wireless interface 134 of the smoking substitute device, to the mobile device 2, it is first encrypted using a third encryption key. The third encryption key is different to each of the first and second encryption keys. The control unit 130 may be configured to use a third encryption key stored within the encryption key portion 1326 for this purpose. Similarly to the firmware example above, the control unit 130 will not copy or store the third encryption key during this process, nor will it transmit the third encryption key to any other component within the smoking substitute device or to any device external to the smoking substitute device.

The third encryption key is not stored on, or known to, or directly accessible by, the mobile device 2. Therefore, the mobile device 2 will not (itself) be able to decrypt the information that it receives from the smoking substitute device. According to this embodiment, however, the mobile device 2 that the smoking substitute device is bonded with has an application installed thereon that is configured for managing the smoking substitute device. The application running on the mobile device 2 will be—as shown in FIG. 5 herein—configured to communicate with an application server 4 via a network 8, such as a Wi-Fi or 4G network. Moreover, in this embodiment, the server 4 is configured to store the first encryption key, second encryption key, and third encryption key. The server 4 stores the encryption keys securely, in a similar manner to how they are stored within the memory 132 of the smoking substitute device, so that the encryption keys themselves, as stored on the server 4, are not directly accessible by the application or the mobile device 2.

With the application installed on it, the mobile device 2 is configured to transmit information to and receive information from the server 4. Therefore the mobile device 2 can transmit the encrypted information received from the smoking substitute device to the server 4 and the server 4 can decrypt the encrypted information received from the mobile device 2, using the third encryption key stored on the server 4, and transmit the decrypted information to the mobile device 2. The mobile device 2 and/or the application running on the mobile device 2, can then store and/or use the information as appropriate.

According to a variant of this particular embodiment, the smoking substitute device itself may be able to communicate wirelessly with the application server 4 directly, not via the mobile device 2. In such an embodiment, the wireless interface 134 may be configured for network communication via a cellular or wireless data network (e.g., 3G, 4G, 5G, WiFi, etc.). In such a configuration, the smoking substitute device would encrypt information that is to be transmitted, using the third encryption key, and then transmit that encrypted information directly to the server 4, for it to be decrypted and transmitted to the application running on the mobile device 2.

In the present embodiment, the messages that the smoking substitute device receives from the mobile device 2, and/or directly from the server 4, should also be encrypted, using the third encryption key.

Such information may be generated at the server, whereby the mobile device 2 is used merely as a relay by which the application transmits information to the smoking substitute device. Alternatively, if the mobile device determines that a commend or other information is to be send to the smoking substitute device, the mobile device may notify the server 4, which may issue a corresponding information that is encrypted using the third encryption key. The control unit 130 may be configured to use a third encryption key stored within the encryption key portion 1326 for this purpose. The control unit can then process the information—be it a request, command, or other data—in the usual fashion.

FIG. 8 is a flow chart depicting a method 400 of managing a smoking substitute device that is an embodiment of the disclosure. The method 400 relates to encryption operations performed by the control unit 130 of the smoking substitute device, in order to provide a secure data for storage and transmission architecture. It will be appreciated that the steps shown in FIG. 8 are not necessarily always done in the order shown—for example, data other than data log data, which is to be transmitted to a mobile device, may be encrypted using the third encryption key before other data is encrypted for storage in a data log. Moreover, it will be appreciated that encryption of data for storage in data logs and of information for wireless transmission (using the second and third encryption keys, respectively) will be carried out on a much more regular basis than encrypting of the firmware will be. However, there may be firmware updates, issued via the application and transmitted wirelessly via the mobile device 2 to the wireless interface 134 of the smoking substitute device, which the control unit 130 will have to decrypt with the third encryption key and apply using the first encryption key.

The encryption operations of the method can be summarised are as follows:

At step 402, encrypt the firmware, that is stored in the firmware portion of the memory, using a first encryption key.

At step 404, encrypt the data relating to the use of the smoking substitute device using a second encryption key.

At step 406, record, in the memory a data log comprising the encrypted data relating to the usage of the smoking substitute device.

At step 408, encrypt information that is to be transmitted to a mobile device, via the communications interface, using a third encryption key.

At step 410, transmit the encrypted information to a mobile device, via the communications interface.

As a result of these encryptions—and of the corresponding decryptions, which are either performed by the server at the other end and/or by the smoking substitute device when it receives wireless messages—a secure means of storing and transmitting data is provided. It applies to different types of data including firmware, operational data and instructions and commands for and from other devices. Because the three encryption keys are different from one another and stored in a non-readable portion of the memory, and not stored anywhere else except at the server, a high level of data security is achieved. This is important to ensure the smoking substitute device can operate accurately and to avoid data breaches.

The embodiments described above are exemplary. Variations are possible. For example, according to an alternative embodiment, all the messages that the mobile device send to the smoking substitute device may not be encrypted. The application may be configured to determine whether certain messages are not sufficiently security sensitive as to require encryption. According to another variation, the smoking substitute device and mobile device may not have to be paired or bonded in order to communicate wirelessly, using messages encrypted as described herein.

Terms such as "first", "second" and "third" as used herein are intended to be illustrative and not to be limiting. The encryption keys should comprise (at least) three different encryption keys, each allocated to a different respective type of data, within a smoking substitute device. Moreover, each smoking substitute device should have its own unique set of three encryption keys.

Terms such as "firmware portion", "data logs" and "encryption key portion" as used herein are intended to be illustrative and not to be limiting. They are used to identify different sections, for storing different types of data, within the memory of the smoking substitute device. The actual logical and/or physical infrastructure and organisation of a memory of a smoking substitute device will depend inter alia on the particular make, model and type of the smoking substitute device.

The features disclosed in the foregoing description, or in the following claims, or in the accompanying drawings, expressed in their specific forms or in terms of a means for performing the disclosed function, or a method or process for obtaining the disclosed results, as appropriate, may, separately, or in any combination of such features, be utilised for realising the disclosure in diverse forms thereof.

While the disclosure has been described in conjunction with the exemplary embodiments described above, many equivalent modifications and variations will be apparent to those skilled in the art when given this disclosure. Accordingly, the exemplary embodiments of the disclosure set forth above are considered to be illustrative and not limiting. Various changes to the described embodiments may be made without departing from the spirit and scope of the disclosure.

For the avoidance of any doubt, any theoretical explanations provided herein are provided for the purposes of improving the understanding of a reader. The inventors do not wish to be bound by any of these theoretical explanations.

Any section headings used herein are for organizational purposes only and are not to be construed as limiting the subject matter described.

Throughout this specification, including the claims which follow, unless the context requires otherwise, the word "comprise" and "include", and variations such as "comprises", "comprising", and "including" will be understood to imply the inclusion of a stated integer or step or group of integers or steps but not the exclusion of any other integer or step or group of integers or steps.

It must be noted that, as used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by the use of the antecedent "about," it will be understood that the particular value forms another embodiment. The term "about" in relation to a numerical value is optional and means for example +/− 10%.

The following statements, which form part of the description, provide general expressions of the disclosure herein:

B1. A smoking substitute device comprising:
a control unit;
a communications interface; and
a memory configured to store firmware for controlling the smoking substitute device,
wherein the firmware is encrypted by a first encryption key,
wherein the control unit is configured to:
  encrypt data relating to the use of the smoking substitute device using a second encryption key; and
  record in the memory a data log comprising the encrypted data relating to the use of the smoking substitute device,
wherein the smoking substitute device is configured to transmit information to and receive information from a mobile device via the communications interface,
wherein the information transmitted to or received from the mobile device via the communications interface is encrypted using a third encryption key.

B2. The smoking substitute device of statement B1, wherein the first encryption key, second encryption key and third encryption keys are different from one another B3. The smoking substitute device of statement B1 of statement B2, wherein the smoking substitute device is a first smoking substitute device within a plurality of smoking substitute devices according to statement B1 or statement B2 and wherein the first, second and third encryption keys for the first smoking substitute device are different to the first, second and third encryption keys for each of the respective other smoking substitute devices, within the plurality of smoking substitute devices.

B4. The smoking substitute device of any preceding statement, wherein the first, second and third encryption keys are stored in a secure memory location within the smoking substitute device.

B5. The smoking substitute device of any preceding statement, wherein the control unit is configured to run the firmware by decrypting the encrypted firmware stored in the memory using the first encryption key stored in the secure memory location.

B6. The smoking substitute device of any preceding statement, wherein the information transmitted to the mobile device comprises the data relating to the use of the smoking substitute device encrypted by the second encryption key.

B7. The smoking substitute device of any preceding statement, wherein the communications interface is further configured to transmit information directly to and receive information directly from a server, wherein the information transmitted to or received from the server via the communications interface is encrypted using the third encryption key B8. A system for managing a smoking substitute device, the system comprising:
a mobile device in network communication with a remote server; and
a smoking substitute device,
wherein the mobile device comprises:
  a first control unit;
  a first communications interface; and
  a first memory,
wherein the smoking substitute device comprises:
  a second control unit;
  a second communications interface; and
  a second memory configured to store firmware for controlling the smoking substitute device, wherein the firmware is encrypted by a first encryption key,
wherein the second control unit is configured to:
  encrypt data relating to the use of the smoking substitute device using a second encryption key; and
  record in the second memory a data log comprising the encrypted data relating to the use of the smoking substitute device,
wherein the mobile device and the smoking substitute device are in communication via the first communications interface and second communications interface to exchange information therebetween,
wherein the information exchanged between the mobile device and the smoking substitute device is encrypted using a third encryption key.

B9. The system of statement B8, wherein the mobile device is configured to:
transmit encrypted information received from the smoking substitute device to the server; and
receive, from the server, encrypted data to be transmitted to the smoking substitute device.

B10. The system of statement B9, wherein the information transmitted to the mobile device from the smoking substitute device comprises the data relating to the use of the smoking substitute device encrypted by the second encryption key, and wherein the server possesses:

the third encryption key to decrypt the transmitted encrypted information received by the mobile device from the smoking substitute device; and the second encryption key to decrypt the data relating to the use of the smoking substitute device.

B11. The system of any one of statements B8 to B10, wherein the second communications interface is further configured to transmit information directly to and receive information directly from the server, wherein the information transmitted to or received from the server via the communications interface is encrypted using the third encryption key.

B12. The system of any one of statements B8 to B11, wherein the server stores the first encryption key, second encryption key, and third encryption key.

B13. The system of statement B12, wherein the server is configured to transmit a firmware update to the smoking substitute device, and wherein the firmware update is encrypted with the first encryption key.

B14. A method of managing a smoking substitute device, wherein the smoking substitute device comprises a control unit, a communications interface, and a memory configured to store firmware for controlling the smoking substitute device, the method comprising:

encrypting the firmware using a first encryption key;

encrypting data relating to use of the smoking substitute device using a second encryption key;

recording, in the memory, a data log comprising the encrypted data relating to the use of the smoking substitute device;

encrypting information that is to be transmitted to a mobile device, via the communications interface, using a third encryption key; and transmitting encrypted information to a mobile device, via the communications interface.

B15. The method of statement B14 further comprising:

transmitting, from the mobile device to a remote server, encrypted information received from the smoking substitute device; and receiving, by the mobile device from the remote server, encrypted data to be transmitted to the smoking substitute device.

PART C (P01020EP)

A Method for Managing a System with a Smoking Substitute Device

Technical Field

The present disclosure relates to smoking substitute devices. In particular, although not exclusively, it relates to the use of smoking substitute devices in communication with other devices.

Background

The smoking of tobacco is generally considered to expose a smoker to potentially harmful substances. It is generally thought that a significant amount of the potentially harmful substances are generated through the heat caused by the burning and/or combustion of the tobacco and the constituents of the burnt tobacco in the tobacco smoke itself.

Conventional combustible smoking articles, such as cigarettes, typically comprise a cylindrical rod of tobacco comprising shreds of tobacco which is surrounded by a wrapper, and usually also a cylindrical filter axially aligned in an abutting relationship with the wrapped tobacco rod. The filter typically comprises a filtration material which is circumscribed by a plug wrap. The wrapped tobacco rod and the filter are joined together by a wrapped band of tipping paper that circumscribes the entire length of the filter and an adjacent portion of the wrapped tobacco rod. A conventional cigarette of this type is used by lighting the end opposite to the filter, and burning the tobacco rod. The smoker receives mainstream smoke into their mouth by drawing on the mouth end or filter end of the cigarette.

Combustion of organic material such as tobacco is known to produce tar and other potentially harmful by-products. There have been proposed various smoking substitute devices in order to avoid the smoking of tobacco.

Such smoking substitute devices can form part of nicotine replacement therapies aimed at people who wish to stop smoking and overcome a dependence on nicotine.

Smoking substitute devices may comprise electronic systems that permit a user to simulate the act of smoking by producing an aerosol (also referred to as a "vapour") that is drawn into the lungs through the mouth (inhaled) and then exhaled. The inhaled aerosol typically bears nicotine and/or flavourings without, or with fewer of, the odour and health risks associated with traditional smoking.

In general, smoking substitute devices are intended to provide a substitute for the rituals of smoking, whilst providing the user with a similar experience and satisfaction to those experienced with traditional smoking and tobacco products. Some smoking substitute systems use smoking substitute articles (also referred to as a "consumables") that are designed to resemble a traditional cigarette and are cylindrical in form with a mouthpiece at one end.

The popularity and use of smoking substitute devices has grown rapidly in the past few years. Although originally marketed as an aid to assist habitual smokers wishing to quit tobacco smoking, consumers are increasingly viewing smoking substitute devices as desirable lifestyle accessories. Some smoking substitute devices are designed to resemble a traditional cigarette and are cylindrical in form with a mouthpiece at one end. Other smoking substitute devices do not generally resemble a cigarette (for example, the smoking substitute device may have a generally box-like form).

There are a number of different categories of smoking substitute devices, each utilising a different smoking substitute approach. A smoking substitute approach corresponds to the manner in which the substitute system operates for a user.

One approach for a smoking substitute device is the so-called "vaping" approach, in which a vapourisable liquid, typically referred to (and referred to herein) as "e-liquid", is heated by a heating device to produce an aerosol vapour which is inhaled by a user. An e-liquid typically includes a base liquid as well as nicotine and/or flavourings. The resulting vapour therefore typically contains nicotine and/or flavourings. The base liquid may include propylene glycol and/or vegetable glycerin.

A typical vaping smoking substitute device includes a mouthpiece, a power source (typically a battery), a tank for containing e-liquid, as well as a heating device. In use, electrical energy is supplied from the power source to the heating device, which heats the e-liquid to produce an aerosol (or "vapour") which is inhaled by a user through the mouthpiece.

Vaping smoking substitute devices can be configured in a variety of ways. For example, there are "closed system" vaping smoking substitute devices which typically have a sealed tank and heating element which is pre-filled with e-liquid and is not intended to be refilled by an end user. One subset of closed system vaping smoking substitute devices include a main body which includes the power source, wherein the main body is configured to be physically and electrically coupled to a consumable including the tank and the heating element. In this way, when the tank of a consumable has been emptied, the main body can be reused by connecting it to a new consumable. Another subset of closed system vaping smoking substitute devices are completely disposable, and intended for one-use only.

There are also "open system" vaping smoking substitute devices which typically have a tank that is configured to be refilled by a user, so the device can be used multiple times.

An example vaping smoking substitute device is the Myblu™ e-cigarette. The Myblu™ e-cigarette is a closed system device which includes a main body and a consumable. The main body and consumable are physically and electrically coupled together by pushing the consumable into the main body. The main body includes a rechargeable battery. The consumable includes a mouthpiece, a sealed tank which contains e-liquid, as well as a heating device, which for this device is a heating filament coiled around a portion of a wick which is partially immersed in the e-liquid. The device is activated when a microprocessor on board the main body detects a user inhaling through the mouthpiece. When the device is activated, electrical energy is supplied from the power source to the heating device, which heats e-liquid from the tank to produce a vapour which is inhaled by a user through the mouthpiece.

Another example vaping smoking substitute device is the blu PROT™ e-cigarette. The blu PROT™ e-cigarette is an open system device which includes a main body, a (refillable) tank, and a mouthpiece. The main body and tank are physically and electrically coupled together by screwing one to the other. The mouthpiece and refillable tank are physically coupled together by screwing one of the other, and detaching the mouthpiece from the refillable tank allows the tank to be refilled with e-liquid. The device is activated by a button on the main body. When the device is activated, electrical energy is supplied from the power source to a heating device, which heats e-liquid from the tank to produce a vapour which is inhaled by a user through the mouthpiece.

Another approach for a smoking substitute system is the so-called Heated Tobacco ("HT") approach in which tobacco (rather than an "e-liquid") is heated or warmed to release vapour. HT is also known as "heat not burn" ("HNB"). The tobacco may be leaf tobacco or reconstituted tobacco. The vapour may contain nicotine and/or flavourings. In the HT approach the intention is that the tobacco is heated but not burned, i.e., the tobacco does not undergo combustion.

A typical HT smoking substitute system may include a device and a consumable. The consumable may include the tobacco material. The device and consumable may be configured to be physically coupled together. In use, heat may be imparted to the tobacco material by a heating element of the device, wherein airflow through the tobacco material causes components in the tobacco material to be released as vapour. A vapour may also be formed from a carrier in the tobacco material (this carrier may for example include propylene glycol and/or vegetable glycerine) and additionally volatile compounds released from the tobacco. The released vapour may be entrained in the airflow drawn through the tobacco.

As the vapour passes through the consumable (entrained in the airflow) from the location of vaporisation to an outlet of the consumable (e.g., a mouthpiece), the vapour cools and condenses to form an aerosol for inhalation by the user. The aerosol will normally contain the volatile compounds.

In HT smoking substitute systems, heating as opposed to burning the tobacco material is believed to cause fewer, or smaller quantities, of the more harmful compounds ordinarily produced during smoking. Consequently, the HT approach may reduce the odour and/or health risks that can arise through the burning, combustion and pyrolytic degradation of tobacco.

There may be a need for improved design of smoking substitute systems, in particular HT smoking substitute systems, to enhance the user experience and improve the function of the HT smoking substitute system.

An example of the HT approach is the IQOS™ smoking substitute device from Philip Morris Ltd. The IQOS™ smoking substitute device uses a consumable, including reconstituted tobacco located in a wrapper. The consumable includes a holder incorporating a mouthpiece. The consumable may be inserted into a main body that includes a heating device. The heating device has a thermally conductive heating knife which penetrates the reconstituted tobacco of the consumable, when the consumable is inserted into the heating device. Activation of the heating device heats the heating element (in this case a heating knife), which, in turn, heats the tobacco in the consumable. The heating of the tobacco causes it to release nicotine vapour and flavourings which may be drawn through the mouthpiece by the user through inhalation.

A second example of the HT approach is the device known as "Gb"™ from British American Tobacco p.l.c. Glo™ comprises a relatively thin consumable. The consumable includes leaf tobacco which is heated by a heating device located in a main body. When the consumable is placed in the main body, the tobacco is surrounded by a heating element of the heating device. Activation of the heating device heats the heating element, which, in turn, heats the tobacco in the consumable. The heating of the tobacco causes it to release nicotine vapour and flavourings which may be drawn through the consumable by the user through inhalation. The tobacco, when heated by the heating device, is configured to produce vapour when heated rather than when burned (as in a smoking apparatus, e.g., a cigarette). The tobacco may contain high levels of aerosol formers (carrier), such as vegetable glycerine ("VG") or propylene glycol ("PG").

The present inventor(s) have observed that most smoking substitute devices currently on the market are configured to operate in isolation of other devices, which limits the functions the smoking substitute devices can perform.

The present inventor(s) have observed that there is an increasing demand and appreciation, amongst users, for smoking substitute devices having functionality beyond their core functionality.

The present disclosure has been devised in light of the above considerations.

SUMMARY OF THE DISCLOSURE

At its most general, the present disclosure provides a system, method, computer implemented method, computer program and devices, which enable a smoking substitute device to be used to authenticate a user in a secure and user-controllable manner. This enhances the usefulness of the smoking substitute device to the user and has the potential to reduce the number of separate devices that a user needs to own and use, in order to carry out the activities as part of his or her day-to-day life.

The smoking substitute device, once initially configured with suitable user-authentication data, may store that data (e.g., in an encrypted form) and provide it to an authentication requesting device, without requiring input from any additional device or network-based entity. Therefore, the smoking substitute device can be used as a standalone means of authenticating the identity of a user. A smoking substitute device configured in this way can provide user authentication to authorise certain user actions including: commercial transactions, which may require age or identity verification in addition to the provision of payment; entry to locations exclusively for users of the device, or for users who are members of a particular group; and signing for, or otherwise confirming safe receipt of, a delivery. It does this by receiving and responding to a user authentication request from a device that requires authentication, such as a payment terminal, electronic door release, or delivery recordal device, and wherein the device that requires authentication will only permit performance of the user action if the response from the smoking substitute device meets one or more predetermined criteria.

According to a first aspect of the present disclosure, there is provided a user authentication system comprising: a smoking substitute device comprising an authentication component; and an authentication requesting device configured to communicate an authentication request to the smoking substitute device to authorise a user action. The smoking substitute device is configured to: receive the authentication request; and in response to the received authentication request, communicate a identifier to the authentication requesting device. The authentication requesting device is capable of authenticating the user using the identifier to authorise performance of the user action.

Before the authentication requesting device communicates an authentication request to the smoking substitute device to authorise a user action, the smoking substitute device (or the user of the smoking substitute device) may make a request to perform the user action and/or may attempt to perform the user action and/or may make preparations to perform the user action. For example, when the authentication requesting device and the smoking substitute device communicate with one another via a proximity-based technology (discussed further below), the user may bring his or her smoking substitute device close to the authentication requesting device, to prompt it to issue the authentication request to the smoking substitute device. For example, when the user action is to purchase goods from a retailer, the user may proceed with the normal process of selecting the goods and having the goods processed at the 'checkout' or other payment point (which may be online or in person), and then, before payment can occur, the authentication requesting device may issue its authentication request to the smoking substitute device. The user action may thus be a commercial transaction and the authentication request may comprise a request to authenticate the user in order to authorise the performance of a commercial transaction.

The authentication requesting device may be configured to authenticate the user to authorise performance of the user action if the received identifier indicates that a user fulfils at least one predetermined criterion. For example, the predetermined criterion may be that the user's identity, or code, or membership number, or other identifying details, must be pre-stored on a database or other list. For example, the identifier may comprise information indicative of an age of the user and the predetermined criterion may be that the age of the user must equal or exceed a predetermined age limit. For example, the user may have to be at least 16 years of age, or at least 18 years of age, or at least 21 years of age, in order to carry out some user actions. Alternatively, there may be some user actions that are only permissible for users whose age is within a predetermined age range.

The identifier may comprise user identification information that can be verified, or for which evidence has previously been provided. For example, the identifier may comprise, or be based upon, a passport copy, a passport number, a birth certificate number, or a national insurance number. For example, the identifier may comprise user biometric data. For example, the identifier may have been previously stored by the user using codes, passwords or other data that are unique to the user.

The authentication component may be configured to provide an indication that the stored data is genuine or authorised. For example, the identifier may be stored in conjunction with a code or encryption or symbol that indicates that the identifier has been uploaded to the authentication component by an authorised person and or via an authorised means such as an official or accredited application.

The identifier may comprise information regarding the user's identity. The identifier may comprise information regarding the user's age. The identifier may comprise information regarding the user's authority to perform a task, for example to make a payment from a particular bank account or from a linked credit card. The identifier may comprise information regarding the user's membership of a particular club, group, institution, place of employment or business, that confers upon the user certain rights or authorities. The identifier may comprise information regarding the user's qualifications or permissions. The identifier may comprise information regarding the user's previous interaction with the authentication requesting device or with another linked authentication requesting device, for example to show that he or she is an existing customer of a retailer or has been granted permission previously to a particular location. The identifier may comprise information regarding the user's previous actions—for example it may comprise information confirming that the user has previously paid for a product or service.

The authentication requesting device may be configured to refuse to authorise performance of the user action if the received identifier indicates that a user does not fulfil at least one predetermined criterion. For example, it may reject the request if the user's age is not equal to or above a predetermined age limit, or if the identifier does not match with a predefined identifier, to which the authentication requesting device has access. For example, the request may be rejected if the user's name or other identifying data does not match with a list of names or other identifying data that is stored on, or accessible to, the authentication requesting device.

The authentication component may comprise a communication interface configured to communicate with the authentication requesting device. The communication interface may be separate from or use a different communication channel or modality from a wireless communication link to a mobile device that is used to control operation of the smoked substitute device. For example, in addition to a communication interface in the authentication component, the smoking substitute device may further comprise a wireless interface configured to wirelessly communicate with an application installed on a mobile device. The wireless interface may comprise any suitable type of wireless communication interface, or terminal, for example a Wi-Fi or Bluetooth™ or Bluetooth™ Low Energy (BLE) interface.

The communication interface of the authentication component may comprise a wireless or contactless interface. For example, the authentication requesting device and the smoking substitute may be configured to communicate with one another using Near-Field Communication (NFC). The smoking substitute device may comprise, as or in its authentication component, an NFC transceiver or an NFC tag. The NFC tag may act both as a data store and as a contactless interface.

As the skilled reader will know, NFC (Near Field Communication) is a communication technology that relies on physical proximity between two NFC-enabled devices, in order to exchange data between them. In broad terms; NFC employs electromagnetic induction between two loop antennas, which are comprised within the respective devices, when two NFC-enabled devices come to within a predetermined distance of one another.

An NFC transceiver is typically configured to both transmit and receive NFC data. On the other hand, an NFC tag is typically a read-only device that cannot read data from other devices, or request data or receive data, but an NFC tag can transmit data to an NFC-enabled device that has reading capabilities. It is known for an NFC tag to be registerable to a user, for example via a web-based process, in order to store a unique identifier on the NFC tag. As a result, the NFC tag (and any device in which it is comprised) may subsequently be used as means by which the user's identity (or authority or right of access) can be authenticated by a requesting NFC-enabled device.

The smoking substitute device may comprise, as its authentication component, an RFID transceiver or an RFID tag. As the skilled reader will know, RFID (Radio Frequency Identification) is another proximity-based communication technology, that uses electromagnetic interaction between two RFID-enabled devices. Both RFID and NFC communications operate regardless of whether the two enabled devices are in line of sight with one another. Therefore, an NFC tag or an RFID tag can be incorporated physically within a smoking substitute device, not visible from the outside, and will still enable communication.

Moreover, both NFC tags and RFID tags can be provided in physically compact form, and quite inexpensively, and thus can be incorporated into a relatively small device such as a smoking substitute device, without adding significantly to the device's overall size, weight, bulk or financial cost.

The authentication requesting device may be configured to reject the request for performance of the user action if the received identifier indicates that a user does not fulfil at least one predetermined criterion.

The authentication requesting device may have a communications interface of the same type as the communication interface of the smoking substitute device. For example, the two devices may be configured to communicate with one another using Near-Field Communication (NFC) or RFID (Radio Frequency Identification).

The authentication requesting device may comprise any of, for example: a contactless payment terminal, an electronic keypad or electronic reader, configured for unlocking a door or access point, or a device that is configured to obtain electronic signatures. The authentication requesting device may be configured to issue a human-readable signal and/or a computer-readable signal and/or a machine-readable signal, to indicate that it has authorised performance of a user action, upon receipt of the identifier from the smoking substitute device. For example, it may generate a message, bar code, password, URL or other data, that a human user or a computer or machine can use, to proceed with the requested action. The authentication requesting device may be configured to perform an action to indicate that it has authorised performance of a user action, upon receipt of the identifier from the smoking substitute device. For example, it may issue an electronic signal, to unlock a door or other access point. The authenticating requesting device may be configured to output a visible or audible signal, to convey whether or not it has authorised performance of a user action. For example, it may comprise a screen that shows a green 'tick' when a user action has been authorised or a red 'cross' when it has not been authorised.

The user action, for which authorisation is being sought, may be a commercial transaction. The authentication request may comprise a request to authenticate the user, to authorise the performance of a commercial transaction by the user. For example, the authentication request may comprise a request to authenticate the user, to authorise him or her to make an online purchase, or to pay for goods in person, via a bank account or a credit card or a payment website or application that is linked with the smoking substitute device. The identifier may, in some cases, perform a dual task of, for example, verifying the user's age to confirm that it is permissible or legal for him or her to make the transaction and verifying that the user is authorised to instruct a payment from the linked bank account or credit card or payment website or payment application.

The user action, for which authorisation is being sought, may be to obtain physical access to a specified location and the authentication request may comprise a request to authenticate the user, to authorise him or her to obtain physical access the specified location. For example, the user action may be to unlock a door, to permit access to an exclusive or restricted area, such as a lounge that is designated for use only by particular individuals or by members of a particular club or other group. The user action may be to unlock the door that provides access to that area. The authentication device may be configured to instruct the door to unlock if the received identifier, from the smoking substitute device, matches a identifier entry in a predetermined list of identifiers. For example, the identifier may comprise the user's name or membership number or membership code and the door may only be unlocked if the provided user's name or membership number or membership code matches one found on a pre-stored list or file.

The user action, for which authorisation is being sought, may be to provide a signature and the authentication request may comprise a request to authenticate the user, to authorise him or her to provide a signature. For example, a signature may be required to authorise receipt of a delivery. The identifier provided by the smoking substitute device may be provided, in place of the user physically signing for the delivery, for example using an electronic pen and touch screen receiver. The authentication device may be configured to authenticate the user and accept the identifier in lieu of a signature, if the received identifier matches a identifier entry in a predetermined list of identifiers.

According to another aspect, the disclosure may provide a user authentication method comprising: communicating an authentication request from an authentication requesting device to a smoking substitute device; receiving the authentication request at the smoking substitute device; in response to the received authentication request, communicating a identifier from the smoking substitute device to the authentication requesting device; receiving the identifier at the authentication requesting device; authenticating, by the authentication requesting device, the user using the identifier; and authorising, by the authentication requesting device, a user action if the user is successfully authenticated. The method may be performed by the system discussed above.

According to another aspect, the disclosure may provide authentication method comprising: receiving, at a smoking substitute device, an authentication request from an authentication requesting device; and in response to the received authentication request, communicating, by an authentication component on the smoking substituted device, a identifier from the smoking substitute device to the authentication requesting device.

According to another aspect, the disclosure may provide a computer-readable medium containing instructions configured to, when executed by a processor, perform any method disclosed herein.

According to another aspect, the disclosure may provide a smoking substitute device comprising an authentication component configured for communication with an authentication requesting device. The smoking substitute device is configured to: receive an authentication request from an authentication requesting device; and in response to the received authentication request, communicate an identifier to the authentication requesting device. As discussed above, the identifier may be suitable for use, by the authentication requesting device, to authenticate the user to authorise performance of the user action.

The authentication component may include a passive communication tag that on which the identifier is encoded. For example, the passive communication tag may be an NFC tag or an RFID tag. The smoking substitute device may thus operate as a contactless authentication unit. The unit may be energised via magnetic or electromagnetic means, for example based on proximity to an authentication requesting device.

The disclosure includes the combination of the aspects and preferred features described except where such a combination is clearly impermissible or expressly avoided.

The skilled person will appreciate that except where mutually exclusive, a feature or parameter described in relation to any one of the above aspects may be applied to any other aspect. Furthermore, except where mutually exclusive, any feature or parameter described herein may be applied to any aspect and/or combined with any other feature or parameter described herein.

DETAILED DESCRIPTION OF THE DISCLOSURE

Aspects and embodiments of the present disclosure will now be discussed with reference to the accompanying figures. Further aspects and embodiments will be apparent to those skilled in the art. All documents mentioned in this text are incorporated herein by reference.

FIG. 9 shows an example system 1 for managing a smoking substitute device 10.

The system 1 as shown in FIG. 9 includes a mobile device 2, an application server 4, an optional charging station 6, as well as the smoking substitute device 10. The system 1 further comprises an authentication requesting device 14, which in this example is a contactless payment terminal configured to obtain authentication information, e.g., from bank cards or suitably configured mobile devices, in order to authorise and process payment. The authentication requesting device 14 may be in communication via the network 8 with the application server 4 or another authorising entity capable of verifying identity information provided thereto.

In this example, the smoking substitute device 10 includes an authentication component 12 that is arranged to provide identification information about the user in response to an authentication request. The authentication component 12 may operate wirelessly over a short range. In particular, the authentication component 12 may be a passive component that is operable when in proximity to a suitable transceiver. The authentication component 12 may include a near field communication (NFC) tag or a radiofrequency identification (RFID) tag encoded with information that is indicative of the user's identity.

The smoking substitute device 10 is configured to communicate wirelessly, e.g., via Bluetooth™, with an application (or "app") installed on the mobile device 2, e.g., via a suitable wireless interface (not shown) on the mobile device 2. The mobile device 2 may be a mobile phone, for example. The application on the mobile phone is configured to communicate with the application server 4, via a network 8. The application server 4 may utilise cloud storage, for example.

The network 8 may include a cellular network and/or the internet.

A skilled person would readily appreciate that the mobile device 2 may be configured to communicate via the network 8 according to various communication channels, preferably a wireless communication channel such as via a cellular network (e.g., according to a standard protocol, such as 3G or 4G) or via a WiFi network.

The app installed on the mobile device and the application server 4 may be configured to assist a user with their smoking substitute device 10, based on information communicated between the smoking substitute device 10 and the app and/or information communicated between the app and the application server 4.

The charging station 6 (if present) may be configured to charge (and optionally communicate with) the smoking substitute device 10, via a charging port on the smoking substitute device 10. The charging port on the smoking substitute device 10 may be a USB port, for example, which may allow the smoking substitute device to be charged by any USB-compatible device capable of delivering power to the smoking substitute device 10 via a suitable USB cable (in this case the USB-compatible device would be acting as the charging station 6). Alternatively, the charging station could be a docking station specifically configured to dock with the smoking substitute device 10 and charge the smoking substitute device 10 via the charging port on the smoking substitute device 10.

FIG. 10A shows an example smoking substitute device 110 for use as the smoking substitute device 10 in the system 1 of FIG. 9.

In this example, the smoking substitute device 110 includes a main body 120 and a consumable 150. The consumable 150 may alternatively be referred to as a "pod".

In this example, the smoking substitute device 110 is a closed system vaping device, wherein the consumable 150 includes a sealed tank 156 and is intended for one-use only.

FIG. 10A shows the smoking substitute device 110 with the main body 120 physically coupled to the consumable 150.

FIG. 10B shows the main body 120 of the smoking substitute device 110 without the consumable 150.

FIG. 10C shows the consumable 150 of the smoking substitute device 110 without the main body 120.

The main body 120 and the consumable 150 are configured to be physically coupled together, in this example by pushing the consumable 150 into an aperture in a top end 122 of the main body 120, e.g., with the consumable 150 being retained in the aperture via an interference fit. In other examples, the main body 120 and the consumable could be physically coupled together by screwing one onto the other, through a bayonet fitting, or through a snap engagement mechanism, for example. An optional light 126, e.g., an LED located behind a small translucent cover, is located a bottom end 124 of the main body 120. The light 126 may be configured to illuminate when the smoking substitute device 110 is activated.

The consumable 150 includes a mouthpiece (not shown) at a top end 152 of the consumable 150, as well as one or more air inlets (not shown in FIG. 10) so that air can be drawn into the smoking substitute device 110 when a user inhales through the mouthpiece. At a bottom end 154 of the consumable 150, there is located a tank 156 that contains e-liquid. The tank 156 may be a translucent body, for example.

The tank 156 preferably includes a window 158, so that the amount of e-liquid in the tank 156 can be visually assessed. The main body 120 includes a slot 128 so that the window 158 of the consumable 150 can be seen whilst the rest of the tank 156 is obscured from view when the consumable 150 is inserted into the aperture in the top end 122 of the main body 120.

In this present embodiment, the consumable 150 is a "single-use" consumable. That is, upon exhausting the e-liquid in the tank 156, the intention is that the user disposes of the whole consumable 150. In other embodiments, the e-liquid (i.e., aerosol former) may be the only part of the system that is truly "single-use". In such embodiments, the tank 156 may be refillable with e-liquid or the e-liquid may be stored in a non-consumable component of the system. For example, the e-liquid may be stored in a tank located in the device or stored in another component that is itself not single-use (e.g., a refillable tank).

The tank 156 may be referred to as a "clearomizer" if it includes a window 158, or a "cartomizer" if it does not.

FIG. 11A is a schematic view of the main body 120 of the smoking substitute device 110.

FIG. 11B is a schematic view of the consumable 150 of the smoking substitute device 110.

As shown in FIG. 11A, the main body 120 includes a power source 128, a control unit 130, an airflow sensor 131, a memory 132, a user authentication module 133, a wireless interface 134, an electrical interface 136, and, optionally, one or more additional components 138.

The power source 128 is preferably a battery, more preferably a rechargeable battery.

The control unit 130 may include a microprocessor, for example.

The memory 132 is preferably includes non-volatile memory.

The wireless interface 134 is preferably configured to communicate wirelessly with the mobile device 2, e.g., via Bluetooth. To this end, the wireless interface 134 could include a Bluetooth™ antenna. Other wireless communication interfaces, e.g., WiFi, are also possible.

The electrical interface 136 of the main body 120 may include one or more electrical contacts. The electrical interface 136 may be located in, and preferably at the bottom of, the aperture in the top end 122 of the main body 120. When the main body 120 is physically coupled to the consumable 150, the electrical interface 136 may be configured to pass electrical power from the power source 128 to (e.g., a heating device of) the consumable 150 when the smoking substitute device 110 is activated, e.g., via the electrical interface 160 of the consumable 150 (discussed below). When the main body 120 is not physically coupled to the consumable 150, the electrical interface may be configured to receive power from the charging station 6.

The additional components 138 of the main body 120 may include the optional light 126 discussed above.

The additional components 138 of the main body 120 may, if the power source 128 is a rechargeable battery, include a charging port configured to receive power from the charging station 6. This may be located at the bottom end 124 of the main body 120. Alternatively, the electrical interface 136 discussed above is configured to act as a charging port configured to receive power from the charging station 6 such that a separate charging port is not required.

The additional components 138 of the main body 120 may, if the power source 128 is a rechargeable battery, include a battery charging control circuit, for controlling the charging of the rechargeable battery. However, a battery charging control circuit could equally be located in the charging station 6 (if present).

The additional components 138 of the main body 120 may include an airflow sensor for detecting airflow in the smoking substitute device 110, e.g., caused by a user inhaling through a mouthpiece 166 (discussed below) of the smoking substitute device 110. The smoking substitute device 110 may be configured to be activated when airflow is detected by the airflow sensor. This optional sensor could alternatively be included in the consumable 150 (though this is less preferred where the consumable 150 is intended to be disposed of after use, as in this example).

The airflow sensor 131 is configured to detecting airflow in the smoking substitute device 110, e.g., caused by a user inhaling through a mouthpiece 166 (discussed below) of the smoking substitute device 110. The smoking substitute device 110 may be configured to be activated when airflow is detected by the airflow sensor.

The additional components 138 of the main body 120 may include an actuator, e.g., a button. The smoking substitute device 110 may be configured to be activated when the actuator is actuated. This provides an alternative to the airflow sensor noted, as a mechanism for activating the smoking substitute device 110.

The additional components 138 of the main body 120 may include a reader configured to read information associated with the consumable from a machine readable data source included in (e.g., contained in the body of, or attached to) the consumable 150.

The reader may be configured to read information from the machine readable data source wirelessly, e.g., via electromagnetic waves or optically. Thus, for example, the machine readable data source included in the consumable 150 could be an RFID tag (in which case the reader included in the main body 120 may be an RFID reader) or a visual data source such as a barcode (in which case the reader included in the main body may be an optical reader, e.g., a barcode scanner). Various wireless technologies and protocols may be employed to allow the reader to wirelessly read information from a machine readable data source included in or attached to the consumable 150, e.g., NFC, Bluetooth, Wi-Fi, as would be appreciated by a skilled person.

For avoidance of any doubt, the reader (if present) may be configured to read information from the machine readable data source non-wirelessly, e.g., using a direct electrical connection between the main body 120 and consumable 150.

As shown in FIG. 11B, the consumable 150 includes the tank 156, an electrical interface 160, a heating device 162, one or more air inlets 164, a mouthpiece 166, and, optionally, one or more additional components 168.

The electrical interface 160 of the consumable 150 may include one or more electrical contacts. The electrical interface 136 of the main body 120 and an electrical interface 160 of the consumable 150 are preferably configured to contact each other and therefore electrically couple the main body 120 to the consumable 150 when the main body 120 is physically coupled to the consumable 150. In this way, electrical energy (e.g., in the form of an electrical current) is able to be supplied from the power source 128 in the main body 120 to the heating device 162 in the consumable 150.

The heating device 162 is preferably configured to heat e-liquid contained in the tank 156, e.g., using electrical energy supplied from the power source 128. In one example, the heating device 162 may include a heating filament and a wick, wherein a first portion of the wick extends into the tank 156 in order to draw e-liquid out from the tank 156, and wherein the heating filament coils around a second portion of the wick located outside the tank 156. In this example, the heating filament is configured to heat up e-liquid drawn out of the tank 156 by the wick to produce an aerosol vapour.

The one or more air inlets 164 are preferably configured to allow air to be drawn into the smoking substitute device 110, when a user inhales through the mouthpiece 166.

The additional components 168 of the consumable 150 may include a machine readable data source, which may e.g., be contained in the body of, or attached to the consumable 150. The machine readable data source may store information associated with the consumable. The information associated with the consumable may include information concerning the content of the consumable (e.g., e-liquid type, batch number) and/or a unique identifier, for example.

The machine readable data source may be rewritable, e.g., a rewritable RFID chip, or read only, e.g., a visual data source such as a barcode. As indicated above, the additional components 138 of the main body 120 may include a reader configured to read information associated with the consumable from the machine readable data source.

In use, a user activates the smoking substitute device 110, e.g., through actuating an actuator included in the main body 120 or by inhaling through the mouthpiece 166 as described above. Upon activation, the control unit 130 may supply electrical energy from the power source 128 to the heating device 162 (via electrical interfaces 136, 166), which may cause the heating device 162 to heat e-liquid drawn from the tank 156 to produce a vapour which is inhaled by a user through the mouthpiece 166.

Of course, a skilled reader would readily appreciate that the smoking substitute device 110 shown in FIGS. 10 and 11 shows just one example implementation of a smoking substitute device, and that other forms of smoking substitute device could be used as the smoking substitute device 10 of FIG. 9.

By way of example, a HNB smoking substitute device including a main body and a consumable could be used as the smoking substitute device 10 of FIG. 9, instead of the smoking substitute device 110. One such HNB smoking substitute device is the IQOS™ smoking substitute device discussed above.

As another example, an open system vaping device which includes a main body, a refillable tank, and a mouthpiece could be used as the smoking substitute device 10 of FIG. 9, instead of the smoking substitute device 110. One such open system vaping device is the blu PROT™ e-cigarette discussed above.

As another example, an entirely disposable (one use) smoking substitute device could be used as the smoking substitute device 10 of FIG. 9, instead of the smoking substitute device 110.

Embodiments of the present disclosure relate to use of a smoking substitute device for functions beyond its core function of enabling smoking substitute action. In particular, they relate to using a smoking substitute device to provide a identifier, that enables the user to be authenticated by an authentication requesting device, and thereby enables the user to be authorised to carry out or continue a particular action and/or to access a particular location and/or to take receipt of a particular item. The disclosure may permit the smoking substitute device to be used alone to authenticate the identity of the user. In other words, in the disclosure it need not be necessary to rely on knowledge of any other device that may be associated with the smoking substitute device, such as the mobile device 2 discussed above. All information needed to authenticate the user may be stored on and communicable by the smoking substitute device directly to an authentication requesting device.

The disclosure relates to various types of smoking substitute device, including those mentioned above.

In embodiments of the disclosure, the smoking substitute device 110 comprises a user authentication module 133. The user authentication module 133 is configured to permit the smoking substitute device 110 to be used as a means for confirming the identity or other information about the user, e.g., a registered user of the smoking substitute device. The user authentication module 133 may be arranged to operate in a contactless manner. For example, the user authentication module 133 may include an NFC (Near Field Communication) tag 135, that may be embedded within the main body 120 of the smoking substitute device 110. The user authentication module 133 may use other components for contactless or wireless transmission of identity information, e.g., an RFID tag or the like.

As the skilled reader will be aware, in general terms, NFC is a standard for very short-range radio transmission. NFC is similar to RFID but tends to have a much shorter physical range. This shorter range is not a problem for the implementations discussed herein—and in fact is an advantage for implementations such as contactless payment and unlocking of electronic locks, because the short range requires the user and his or her smoking substitute device 110 to be physically very close to the reader (i.e., to the authentication requesting device), and therefore it reduces the risk of the wrong NFC tag being read, in any particular situation. Therefore, it reduces the risk of fraud or other potential misuse.

Both NFC tags and RFIDS tags comprise a (relatively low capacity) memory, and a radio chip, in communication with an antenna. NFC tags such as the NFC tag 135 in this embodiment are passive, and do not include a power source. Instead, the NFC tag 135 is configured to draw power from an NFC-enabled device that reads it, through a process of magnetic induction. When an NFC-enabled reader comes within sufficiently close proximity to the tag 135, it will energise the tag 135 and enable transfer data from the tag 135 to the reader.

The user authentication module may be configured as an electronic identification card, and may be configured to comply with any relevant standard, e.g., ISO/IEC 7816.

Other types of NFC tag may be used, but the NFC tag 135 should be of a reliably secure standard.

The user authentication module 133 may be interrogated by any suitable authentication requesting device. For example, the authentication requesting device may be a contactless payment terminal or an electronic door release or an age verification means, configured to permit certain user actions only if the user is of a predefined age (or older). It may be comprised within an electronic recordal device, for recording receipt of delivered items.

The authentication requesting device may comprise an NFC transceiver, which is configured to read NFC tags such as the NFC tag 135 in the smoking substitute device 110. It may also include a display, on which an output indicating authentication confirmation (or refusal) may be output. In this embodiment, For example, the display may be configured to show a green 'tick' when a user action has been authorised or a red 'cross' when it has not been authorised. The authentication requesting device, may additional components, for example a memory, a control unit and a power source, but these are not discussed in detail herein. The authentication requesting device may be network enabled, for example comprising a Wi-Fi, 4G or Bluetooth™ interface, in order for it to access information stored on a server, website, or application. The authentication requesting device may comprise any suitable hardware and software means, in order to enable it to function as described herein.

The authentication requesting device in this embodiment may be comprised within, or linked to, another device or computer that is configured to perform or facilitate user actions. For example, it may be comprised within a 'cash register' or payment receipt computer, wherein an authentication output from the authentication requesting device determines whether a user's payment attempt, via his or her smoking substitute device 110, will be allowed to proceed.

In this embodiment, after first purchase of the smoking substitute device 110, the user can register the NFC tag 135, via a suitable web-based or application-based process. For example, the user may input information identifying their particular smoking substitute device with details relating to their identity, age, banking information via a secure website that is in communication with the application server 4 or another suitable server at the back end of the system 1. The smoking substitute device may include a serial number, bar code or other identification information. The back end of the system 1 may associate the (public) identification information of the smoking substitute device with a (private) identifier of the NFC tag 135. Upon receiving an authentication request, the NFC tag 135 may output its identifier, e.g., in encrypted form. The authentication requesting device may use the identifier to authenticate the user, e.g., by communicating with the back end to verify that the identifier is associated with user information that permits a certain action to be taken. In other examples, the identifier may be used to authorize other actions, e.g., contactless payment.

It is known for NFC tags to be customisable by an end user. In this example, a registration procedure may be performed to encode identity information into the NFC tag. For example, the NFC tag may include a flag that can be set to indicate that a user has completed an age verification procedure. In this example, the smoking substitute device itself can be used to confirm a user's age, which necessarily requiring communication to a back end system.

In one embodiment, the user can use an application running on a mobile device—for example, a mobile phone, smartphone tablet, or laptop computer—in order to record one or more unique identifiers on, or in association with, that individual NFC tag 135, wherein the application or a server may also securely store the one or more unique identifiers, so that they can be used as means by which the user's identity can be subsequently authenticated by an NFC-enabled requesting device. The process of recording the one or more unique identifiers should be secure, for example involving the exchange of encryption keys or other security codes, to ensure that the integrity of the data is maintained and to prevent misuse by non-authorised users. For example, the unique identifiers may be encrypted at a back end server, so that the mobile device cannot access the information therein.

In one example, the user may use an online banking application in order to register or otherwise link the NFC tag 135 to a bank account. The registration may include associating (public) identification information of the smoking substitute device with a (private) identifier of the NFC tag, as discussed above. It is known for a user to use a number of user-specific security means (for example codes, passwords, pre-stored answers to security questions, recognition of pre-stored images or fingerprint data) in order to securely access an online banking application on a mobile device, for example on his or her smartphone. According to this embodiment, when the user has securely accessed to his or her online banking application, he or she can link the NFC tag 135 to his or her bank account via a number of different methods, as detailed below.

If the mobile device on which the online banking application is installed itself has an NFC transceiver, then the user can activate the NFC capabilities of the mobile device, via the online banking application, bring the mobile device into close proximity with the smoking substitute device 110 in which the NFC tag 135 is comprised, and provide any further confirmation that the application demands in order to link that NFC tag 135 to the user's bank account. In response to the user confirming that the NFC tag 135 should be linked to the user's bank account, the NFC transceiver within the mobile device will use Near Field Communication to transfer secure account-specific data to the NFC tag 135, for storage thereon. The data should be stored in an encrypted manner, to prevent access to it by non-authorised persons. The stored secure account-specific data on the NFC tag 135 will enable it to be subsequently used in a similar manner to a contactless debit card, in that a suitable NFC-reader such as a retail payment terminal will be able to read the data, and from it ascertain the user's payment information. It will also be able to ascertain that the data has been securely stored, by the authorised user, so that the payment terminal can authenticate the user and authorise the payment.

An alternative method for registering the NFC tag 135 to a user's bank account is to use a unique serial number or other secure identifier for the NFC tag 135—which would be supplied by the manufacturer or supplier of the smoking substitute device 110, on purchase—and to register that serial number to the user's bank account, via the online banking application. If, subsequently, the NFC tag 135 (within the smoking substitute device 110) is brought into close proximity with a suitable NFC-reader, such as a retail payment terminal, the reader will be able to read the unique serial number and access a suitable database to check if it has been registered to a specific user or bank account, and from there, ascertain the user's payment information. It will also be able to ascertain that the data has been securely stored, by the authorised user, so that the payment terminal can authenticate the user and authorise the payment.

The user-specific data that is written to the tag 135 may comprise a URL or other link to an application or other database, on which one or more identifiers have been stored. Alternatively, actual user identification data may be stored locally on the NFC tag itself. Any locally stored data and any links should be stored in an encrypted form, or in another secure form to prevent potential misuse. For example, the user's name, a membership number for a particular club or association, passport information or banking information, may be stored in an encrypted form that can only be read by authorised NFC-enabled authentication requesting devices—such as contactless payment terminals, NFC-enabled electronic locks and so on.

The user identification data may include data that verifies the user's age—for example it may comprise passport information, or other age-related data, input by the user. According to an embodiment, when an authentication requesting device reads the NFC tag 135, it may derive both age data and payment data from the tag 135, in order to ascertain both that the user is of a permissible age to make the purchase and to obtain the banking/payment details for the transaction.

The identifier may be stored with a particular code or encryption or symbol that indicates that the identifier has been uploaded to the tag 135 by an authorised person and/or via an authorised means such as an official or accredited application.

Although an exemplary embodiment has been described herein, which makes use of an online banking application, for providing identifiers that relate to payment authorisation, it will be appreciated that other types of application, and other types of identifiers, may be made use of, according to the present disclosure. For example, a user may store identifiers on his or her NFC tag via a specific NFC tag customisation application, running on a mobile device, wherein those identifiers may subsequently be readable by more than one type of authentication requesting device, and/or may be used to authorise more than one type of user action. For example, a user may store identifiers on his or her NFC tag via an application that relates to a particular location, in order to grant the user access to that location, by using his or her NFC tag.

In an embodiment, the user may register his or her NFC tag, and upload identifier data to it, by instructing the manufacturer or developer of the smoking substitute device 110 to customise the NFC tag 135 for that user. This may be done by the manufacturer or developer issuing a user-specific firmware update, for the user to download via an application on a linked mobile device, or the manufacturer or developer may need physical access to the smoking substitute device, to make the customisation.

FIG. 12 shows the steps followed by the smoking substitute device 110 and the authentication requesting device in a method that is an embodiment of the present disclosure.

Step 402 comprises registering the smoking substitute device to a user. This step may involve linking the user with an output produced by the user authentication module, e.g., in the manner discussed above.

Once the user authentication module in the smoking substitute 110 is set up, the smoking substitute device may be ready to authenticate a user when the user requests or attempts to perform a certain user action. The request or attempt may simply comprise the user bringing the smoking substitute device into close proximity with the authentication requesting device, e.g., in response to a request the authentication requesting device that authentication data is required. For example, when the authentication requesting device comprises a payment terminal, the user bringing the smoking substitute device into close proximity with the authentication requesting device can be taken as a request by the user to obtain authentication in order to make a payment. When the authentication requesting device is an electronic door release, the user bringing the smoking substitute device into close proximity with the authentication requesting device can be taken as a request by the user to obtain authentication in order access the area or location that the door provides access to. In other cases, the nature of the user action for which authorisation is being sought will not be apparent or confirmed to the authentication requesting device merely by the smoking substitute device coming into close proximity with it.

At step 404 the authentication requesting device communicates an authentication request to the smoking substitute device. This request may be transmitted by a NFC transceiver to the NFC tag 135. As discussed above, by bringing the two devices into close proximity (e.g., within 5 cm or 10 cm) of one another, a magnetic induction loop will be formed between the transceiver and the tag 135. This magnetic induction loop has the effect of conveying energy to the NFC tag 135 and thereby enabling it to receive the authentication request, at step 406.

At step 408 the NFC tag 135 responds to the authentication request by transmitting an identifier to the NFC transceiver. As detailed above, the identifier may be pre-stored on the NFC tag 135 or may be written thereon as part of a registration process.

At step 410 the authentication requesting device receive the identifier and makes a determination regarding whether or not to authenticate the user to authorise performance of a user action. As detailed above, this process may involve an interim step whereby the authentication requesting device uses the information that it has received from the NFC tag 135 in order to access an application website or other database in order to obtain corresponding user identifying information. Such an interim step requires the authentication requesting device to be network enabled. In order to make a determination whether or not to authenticate the user, the authentication requesting device must determine whether the identifier that it has received meet a pre-determined criterion. For example, it may check whether the received identifier corresponds to a pre-stored identifier on a database. Alternatively, or additionally it may check whether the identifier includes a code or encryption or symbol that indicates that the identifier has been uploaded to the tag 135 by an authorised person and/or via an authorised means such as an official or accredited application. In another example, the identifier itself may be encoded with information that identifies the user or communicates certain information about them, e.g., age or the like. In such an example, the authentication requesting device may be able to determine whether or not to authenticate the user (or permit performance of a certain action) without having to communicate with a third party.

At step 412, if it has been determined that the user can be authenticated and thus authorisation can be given for performance of a user action, the authentication requesting device can output an indication accordingly. For example, the indication can be output on a visual display and/or as an audio signal. In addition, the authentication requesting device may be configured to output a command either to other components within the authentication requesting device itself and/or to components of a linked device or computer, to instruct it to carry out a particular action. For example, the particular action may be to complete a transaction or to open an electronic lock. For example, the particular action may be to provide an indication to a database such as a delivery database that an authenticated user has, in effect, signed for delivery of (or taken receipt of) an item.

Thus it can be seen that a system method and devices are provided that enable a smoking substitute device to communicate with an authentication requesting device such as a payment terminal, an electronic lock, or a delivery recordal device, in order to provide user authentication and thus to enable the user to perform an action for which he or she requires authorisation. Once the smoking substitute device has been initially configured to store one or more identifiers within an authentication component such as an NFC tag or RFID tag, the smoking substitute device can subsequently operate independently of any other devices in order to provide user authentication. The smoking substitute device does not need to wirelessly communicate with an application on a mobile device or with a server or with any other network entity in order to convey information from its authentication component to an authentication requesting device. However, it may require interaction with a mobile device, application, server or other network entity in order to be initially configured with the requisite identifier data for subsequent use in user authentication processes.

The hardware and software components required in order to put the present disclosure into effect are not computationally or physically burdensome on the smoking substitute device. They would not require any significant physical change to be made to an existing smoking substitute device configuration, in order to be comprised therewithin. Nor would their inclusion be expensive.

The smoking substitute device provided according to this disclosure enables the user to perform functions beyond smoking substitute action and thus enhances the potential usefulness of the device to the user. It also provides the potential for the user to carry fewer separate devices on their person in order to carry out day-to-day tasks. And it provides potential for the user to, for example, 'go cashless', which many users find attractive.

The terms 'authentication component', 'identifier', 'authentication requesting device' and so on are intended to be illustrative of the functions performed by those features and need not be limited to a particular device or structure.

The features disclosed in the foregoing description, or in the following claims, or in the accompanying drawings, expressed in their specific forms or in terms of a means for performing the disclosed function, or a method or process for obtaining the disclosed results, as appropriate, may, separately, or in any combination of such features, be utilised for realising the disclosure in diverse forms thereof.

While the disclosure has been described in conjunction with the exemplary embodiments described above, many equivalent modifications and variations will be apparent to those skilled in the art when given this disclosure. Accordingly, the exemplary embodiments of the disclosure set forth above are considered to be illustrative and not limiting. Various changes to the described embodiments may be made without departing from the spirit and scope of the disclosure.

For the avoidance of any doubt, any theoretical explanations provided herein are provided for the purposes of improving the understanding of a reader. The inventors do not wish to be bound by any of these theoretical explanations.

Any section headings used herein are for organizational purposes only and are not to be construed as limiting the subject matter described.

Throughout this specification, including the claims which follow, unless the context requires otherwise, the word "comprise" and "include", and variations such as "comprises", "comprising", and "including" will be understood to imply the inclusion of a stated integer or step or group of integers or steps but not the exclusion of any other integer or step or group of integers or steps.

It must be noted that, as used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by the use of the antecedent "about," it will be understood that the particular value forms another embodiment. The term "about" in relation to a numerical value is optional and means for example +/− 10%.

The following statements, which form part of the description, provide general expressions of the disclosure herein:

C1. A user authentication system comprising:
 a smoking substitute device comprising an authentication component; and
 an authentication requesting device configured to communicate an authentication request to the smoking substitute device to authorise a user action,
 wherein the smoking substitute device is configured to:
  receive the authentication request; and
  in response to the received authentication request, communicate a identifier to the authentication requesting device,
 wherein the authentication requesting device is capable of authenticating the user using the identifier to authorise performance of the user action.

C2. The system of statement C1, wherein the authentication requesting device is configured to authorise performance of the user action if the received identifier indicates that a user fulfils at least one predetermined criterion.

C3. The system of statement C1 or statement C2, wherein the user action is a commercial transaction and the authentication request comprises a request to authenticate the user in order to authorise the performance of a commercial transaction.

C4. The system of any preceding statement, wherein the authentication component comprises a communication interface configured to communicate with the authentication requesting device.

C5. The system of statement C4, wherein the communication interface comprises a wireless or contactless interface.

C6. The system of statement C5, wherein the authentication requesting device and the smoking substitute are configured to communicate with one another using Near-Field Communication (NFC).

C7. The system of any preceding statement, wherein the authentication requesting device is configured to reject the request for performance of the user action if the received identifier indicates that a user does not fulfil at least one predetermined criterion.

C8. The system of any preceding statement, wherein the user action is to obtain physical access to a specified location and the authentication request comprises a request to authenticate the user, to obtain physical access the specified location.

C9. The system of any preceding statement, wherein the user action is to provide a signature and the authentication request comprises a request to authenticate the user in order to provide a signature.

C10. A user authentication method comprising:
  communicating an authentication request from an authentication requesting device to a smoking substitute device;
  receiving the authentication request at the smoking substitute device;
  in response to the received authentication request, communicating a identifier from the smoking substitute device to the authentication requesting device;
  receiving the identifier at the authentication requesting device;
  authenticating, by the authentication requesting device, the user using the identifier; and
  authorising, by the authentication requesting device, a user action if the user is successfully authenticated.

C11. A user authentication method comprising:
  receiving, at a smoking substitute device, an authentication request from an authentication requesting device; and
  in response to the received authentication request, communicating, by an authentication component on the smoking substituted device, a identifier from the smoking substitute device to the authentication requesting device.

C12. A computer-readable medium containing instructions configured to, when executed by a processor, perform the method of statement C10 or statement C11.

C13. A smoking substitute device comprising:
  an authentication component configured for communication with an authentication requesting device, wherein the smoking substitute device is configured to:
  receive an authentication request from an authentication requesting device;
  in response to the received authentication request, communicate an identifier to the authentication requesting device.

C14. The smoking substitute device of statement C13, wherein the authentication component includes a passive communication tag that on which the identifier is encoded.

C15. The smoking substitute device of statement C14, wherein the passive communication tag is an NFC tag or an RFID tag.

PART D (P01019EP)

A Method for Managing a System with a Smoking Substitute Device

Technical Field

The present disclosure relates to smoking substitute devices. In particular, although not exclusively, it relates to the use of network-enabled smoking substitute devices and their communication with other devices.

Background

The smoking of tobacco is generally considered to expose a smoker to potentially harmful substances. It is generally thought that a significant amount of the potentially harmful substances are generated through the heat caused by the burning and/or combustion of the tobacco and the constituents of the burnt tobacco in the tobacco smoke itself.

Conventional combustible smoking articles, such as cigarettes, typically comprise a cylindrical rod of tobacco comprising shreds of tobacco which is surrounded by a wrapper, and usually also a cylindrical filter axially aligned in an abutting relationship with the wrapped tobacco rod. The filter typically comprises a filtration material which is circumscribed by a plug wrap. The wrapped tobacco rod and the filter are joined together by a wrapped band of tipping paper that circumscribes the entire length of the filter and an adjacent portion of the wrapped tobacco rod. A conventional cigarette of this type is used by lighting the end opposite to the filter, and burning the tobacco rod. The smoker receives mainstream smoke into their mouth by drawing on the mouth end or filter end of the cigarette.

Combustion of organic material such as tobacco is known to produce tar and other potentially harmful by-products. There have been proposed various smoking substitute devices in order to avoid the smoking of tobacco.

Such smoking substitute devices can form part of nicotine replacement therapies aimed at people who wish to stop smoking and overcome a dependence on nicotine.

Smoking substitute devices may comprise electronic systems that permit a user to simulate the act of smoking by producing an aerosol (also referred to as a "vapour") that is drawn into the lungs through the mouth (inhaled) and then exhaled. The inhaled aerosol typically bears nicotine and/or flavourings without, or with fewer of, the odour and health risks associated with traditional smoking.

In general, smoking substitute devices are intended to provide a substitute for the rituals of smoking, whilst providing the user with a similar experience and satisfaction to those experienced with traditional smoking and tobacco products. Some smoking substitute systems use smoking substitute articles (also referred to as a "consumables") that are designed to resemble a traditional cigarette and are cylindrical in form with a mouthpiece at one end.

The popularity and use of smoking substitute devices has grown rapidly in the past few years. Although originally marketed as an aid to assist habitual smokers wishing to quit tobacco smoking, consumers are increasingly viewing smoking substitute devices as desirable lifestyle accessories. Some smoking substitute devices are designed to resemble a traditional cigarette and are cylindrical in form with a mouthpiece at one end. Other smoking substitute devices do not generally resemble a cigarette (for example, the smoking substitute device may have a generally box-like form).

There are a number of different categories of smoking substitute devices, each utilising a different smoking substitute approach. A smoking substitute approach corresponds to the manner in which the substitute system operates for a user.

One approach for a smoking substitute device is the so-called "vaping" approach, in which a vapourisable liquid, typically referred to (and referred to herein) as "e-liquid", is heated by a heating device to produce an aerosol vapour which is inhaled by a user. An e-liquid typically includes a base liquid as well as nicotine and/or flavourings. The resulting vapour therefore typically contains nicotine and/or flavourings. The base liquid may include propylene glycol and/or vegetable glycerin.

A typical vaping smoking substitute device includes a mouthpiece, a power source (typically a battery), a tank for containing e-liquid, as well as a heating device. In use, electrical energy is supplied from the power source to the heating device, which heats the e-liquid to produce an aerosol (or "vapour") which is inhaled by a user through the mouthpiece.

Vaping smoking substitute devices can be configured in a variety of ways. For example, there are "closed system" vaping smoking substitute devices which typically have a sealed tank and heating element which is pre-filled with e-liquid and is not intended to be refilled by an end user. One subset of closed system vaping smoking substitute devices include a main body which includes the power source, wherein the main body is configured to be physically and electrically coupled to a consumable including the tank and the heating element. In this way, when the tank of a consumable has been emptied, the main body can be reused by connecting it to a new consumable. Another subset of closed system vaping smoking substitute devices are completely disposable, and intended for one-use only.

There are also "open system" vaping smoking substitute devices which typically have a tank that is configured to be refilled by a user, so the device can be used multiple times.

An example vaping smoking substitute device is the Myblu™ e-cigarette. The Myblu™ e-cigarette is a closed system device which includes a main body and a consumable. The main body and consumable are physically and electrically coupled together by pushing the consumable into the main body. The main body includes a rechargeable battery. The consumable includes a mouthpiece, a sealed tank which contains e-liquid, as well as a heating device, which for this device is a heating filament coiled around a portion of a wick which is partially immersed in the e-liquid. The device is activated when a microprocessor on board the main body detects a user inhaling through the mouthpiece. When the device is activated, electrical energy is supplied from the power source to the heating device, which heats e-liquid from the tank to produce a vapour which is inhaled by a user through the mouthpiece.

Another example vaping smoking substitute device is the blu PROT™ e-cigarette. The blu PROT™ e-cigarette is an open system device which includes a main body, a (refillable) tank, and a mouthpiece. The main body and tank are physically and electrically coupled together by screwing one to the other. The mouthpiece and refillable tank are physically coupled together by screwing one of the other, and detaching the mouthpiece from the refillable tank allows the tank to be refilled with e-liquid. The device is activated by a button on the main body. When the device is activated, electrical energy is supplied from the power source to a heating device, which heats e-liquid from the tank to produce a vapour which is inhaled by a user through the mouthpiece.

Another approach for a smoking substitute system is the so-called Heated Tobacco ("HT") approach in which tobacco (rather than an "e-liquid") is heated or warmed to release vapour. HT is also known as "heat not burn" ("HNB"). The tobacco may be leaf tobacco or reconstituted tobacco. The vapour may contain nicotine and/or flavourings. In the HT approach the intention is that the tobacco is heated but not burned, i.e., the tobacco does not undergo combustion.

A typical HT smoking substitute system may include a device and a consumable. The consumable may include the tobacco material. The device and consumable may be configured to be physically coupled together. In use, heat may be imparted to the tobacco material by a heating element of the device, wherein airflow through the tobacco material causes components in the tobacco material to be released as vapour. A vapour may also be formed from a carrier in the tobacco material (this carrier may for example include propylene glycol and/or vegetable glycerine) and additionally volatile compounds released from the tobacco. The released vapour may be entrained in the airflow drawn through the tobacco.

As the vapour passes through the consumable (entrained in the airflow) from the location of vaporisation to an outlet of the consumable (e.g., a mouthpiece), the vapour cools and condenses to form an aerosol for inhalation by the user. The aerosol will normally contain the volatile compounds.

In HT smoking substitute systems, heating as opposed to burning the tobacco material is believed to cause fewer, or smaller quantities, of the more harmful compounds ordinarily produced during smoking. Consequently, the HT approach may reduce the odour and/or health risks that can arise through the burning, combustion and pyrolytic degradation of tobacco.

There may be a need for improved design of smoking substitute systems, in particular HT smoking substitute systems, to enhance the user experience and improve the function of the HT smoking substitute system.

An example of the HT approach is the IQOS™ smoking substitute device from Philip Morris Ltd. The IQOS™ smoking substitute device uses a consumable, including reconstituted tobacco located in a wrapper. The consumable includes a holder incorporating a mouthpiece. The consumable may be inserted into a main body that includes a heating device. The heating device has a thermally conductive heating knife which penetrates the reconstituted tobacco of the consumable, when the consumable is inserted into the heating device. Activation of the heating device heats the heating element (in this case a heating knife), which, in turn, heats the tobacco in the consumable. The heating of the tobacco causes it to release nicotine vapour and flavourings which may be drawn through the mouthpiece by the user through inhalation.

A second example of the HT approach is the device known as "Gb"™ from British American Tobacco p.l.c. Glo™ comprises a relatively thin consumable. The consumable includes leaf tobacco which is heated by a heating device located in a main body. When the consumable is placed in the main body, the tobacco is surrounded by a heating element of the heating device. Activation of the heating device heats the heating element, which, in turn, heats the tobacco in the consumable. The heating of the tobacco causes it to release nicotine vapour and flavourings which may be drawn through the consumable by the user through inhalation. The tobacco, when heated by the heating device, is configured to produce vapour when heated rather than when burned (as in a smoking apparatus, e.g., a cigarette). The tobacco may contain high levels of aerosol formers (carrier), such as vegetable glycerine ("VG") or propylene glycol ("PG").

The present inventor(s) have observed that most smoking substitute devices currently on the market are configured to operate in isolation of other devices, which limits the functions the smoking substitute devices can perform.

The present inventor(s) have observed that there is an increasing demand and appreciation, amongst users, for smoking substitute devices having functionality beyond their core functionality.

The present disclosure has been devised in light of the above considerations.

SUMMARY OF THE DISCLOSURE

At its most general, the present disclosure provides a system, method, computer implemented method, computer program and devices, which enable a network-enabled smoking substitute device (that is, a smoking substitute device that is capable of wireless communication with other devices) to be managed in a secure and user-controllable manner. In particular, the smoking substitute device can be managed and manipulated by the user, to interact with one or more other devices and to perform functions beyond its core function. This enhances the usefulness of the smoking substitute device to the user and has the potential to reduce the number of separate devices that a user needs to own and use, in order to carry out the activities that the user may wish to carry out as part of his or her day-to-day life.

The user can use his or her smoking substitute device to interact with other devices, referred to herein as "auxiliary devices", such as mobile phones, smart phones, laptop computers, tablet computers, televisions, computer-based gaming devices, or any "smart" appliance. The auxiliary device should be network enabled, in order to establish a wireless communication link between an auxiliary device and the smoking substitute device. The auxiliary device may be configured to run an application or other computer program that can interface with the smoking substitute device, via the wireless communication link between the two devices.

It is known for a smoking substitute device to interface with an application on a mobile device, such as a smartphone, in order to provide output data regarding the operation of the smoking substitute device, which the application can use for managing onward operation of the smoking substitute device. Usually the output data from smoking substitute device is generated by, and is subsequently stored and/or analysed in relation to, the core function of the device, i.e., smoking substitute action. The output data may also relate to, and be used to help with, management and control of the smoking substitute by a mobile device.

The present inventor(s) have recognised that a smoking substitute device need not be limited to providing output data to an auxiliary device or application on an auxiliary device, wherein that output data relates, or is used in relation, only to the smoking substitute device itself. Instead, the inventor(s) have recognised that a smoking substitute device can have much greater functionality and that its outputs can be used as inputs to an auxiliary device, and/or to an application thereon, wherein those inputs have an effect on the outputs and/or the operation of the application, and/or of the auxiliary device. The outputs provided by the smoking substitute device, as inputs to the auxiliary device or application, need not necessarily have arisen from the use of the smoking substitute device for its core function, i.e., from smoking substitute action. Instead, the smoking substitute device can be specifically manipulated to provide inputs for controlling at least one output of an auxiliary device.

In some embodiments which may be preferred, the input command includes an instruction which requests an adjustment of the output attribute of the auxiliary device, based on at least one manipulation (e.g., a single manipulation or a sequence of manipulations) of the smoking substitute device sensed by the positional sensing component and/or the orientation sensing component. In such embodiments, the auxiliary device may be configured to adjust the output attribute according to the instruction. Including such an instruction in the input command may be preferable to ensure that the command achieves the desired effect.

In other embodiments which may be less preferred, the input command does not include an explicit instruction that requests the auxiliary device to do something, but simply indicates the occurrence of at least one manipulation (e.g., a single manipulation or a sequence of manipulations) of the smoking substitute device sensed by the positional sensing component and/or the orientation sensing component. In these embodiments, the auxiliary device may be configured to adjust the output attribute based on the indicated occurrence of the at least one manipulation, even those the input command has not explicitly instructed the auxiliary device to do so.

The present disclosure makes use of position and/or orientation sensing components that may already be found in smoking substitute devices, or that could reasonably be incorporated therein, and extends the usefulness of those components, by using them to control the outputs of an application that is being run on, or of another component that is operating as part of, a separate auxiliary device. For example, it can make use of any of: a gyroscope, an accelerometer and a magnetometer, within a smoking substitute device, for controlling the outputs from an auxiliary device.

Therefore, the usefulness of a smoking substitute device, to a user, is improved, by extending its functionality. But this is done in a streamlined and efficient way, which does not place any significant processing demands or physical space demands on the smoking substitute device.

According to a first aspect of the disclosure, there is provided control system comprising a smoking substitute device having a positional sensing component and/or an orientation sensing component, and an auxiliary device configured to communicate with the smoking substitute device. The positional sensing component and/or the orientation sensing component is manipulatable by a user of the smoking substitute device to cause generation of an input command. The auxiliary device is configured to receive the input command, whereby an output attribute of the auxiliary device is adjustable based on the manipulation of the smoking substitute device.

The smoking substitute device may be network-enabled, in that it comprises a wireless interface which can communicate wirelessly, via a wireless network, with an auxiliary device or a computing component configured to control the auxiliary device. Communication can be, for example, over any suitable short-range network or protocol, such as Wi-Fi, RFID tag, NFC (Near Field Communication), cellular network, or Bluetooth™.

The "auxiliary device", may comprise any of a mobile phone, a smart phone, a laptop computer, a tablet computer, a television, a computer-based gaming device, or a smart (i.e., network enabled) appliance. The auxiliary device may comprise a plurality of components. For example, an auxiliary device may include any combination of a visual display, an audio emitter, a vibrating component and an image capture apparatus. The auxiliary device may comprise, or include, a television having a transceiver component and/or a lightbulb having a transceiver component.

The auxiliary device is preferably network-enabled, so that it can communicate wirelessly, via its wireless interface, with the smoking substitute device or the computing component.

The computing component may be used to reduce a processing burden on the smoking substitute device. For example, the computing component may be configured to interpret, recognise or otherwise determine that a signal from the smoking substitute device corresponds to a manipulation that triggers an input command for the auxiliary device. The smoking substitute device may thus be configured to output the signal, which is indicative of position and/or orientation sensed by the positional sensing component and/or the orientation sensing component, to the computing component, and the computing component may be configured to perform the subsequent processing. The computing component may be any suitable intermediary between the smoking substitute device and the auxiliary device, e.g., a mobile phone that has a bonded communication link with the smoking substitute device. Alternatively, the computing component may be in the auxiliary device itself.

The steps for establishing a wireless communication link between the smoking substitute device and the auxiliary device or the computing component may follow any suitable protocol. For example, if Bluetooth™ is used, the user can activate the Bluetooth™ functionalities of the smoking substitute device and of his or her selected auxiliary device or computing component, with which a wireless communication link is to be established, and the two devices can identify themselves to one another, exchange Bluetooth™ messages, and form a wireless communication link. The exchange should preferably involve suitable security steps, to ensure that the correct two devices form the wireless communication link. For example, the two devices may form a paired wireless communication link, which is secure, and which is an exclusive communication link, between those two individual devices. In order to form a paired wireless communication link, the devices should exchange security data such as encryption keys, passwords or codes. The devices may each be configured to store the encryption key received from the respective other, and to re-use that encryption key each time a connection between the two devices is required. This is known as establishing a bonded wireless communication link.

The steps for establishing a wireless communication link between the smoking substitute device and the auxiliary device or computing component may comprise any suitable combination of user-implemented, computer-implemented and hardware-implemented steps. For example, specific user input should be required in order to identify the auxiliary device, with which the smoking substitute device is to establish a wireless communication link. However, some or all of the steps involved in actually establishing wireless communication links between the smoking substitute device and the auxiliary device(s) or computing component, and the subsequent wireless transmissions between the devices, may happen without any specific user input being required.

When an auxiliary device or computing component has established a wireless communication link with a smoking substitute device, the devices may share data via that link. For example, if the auxiliary device comprises a mobile device on which the user has installed an application for management of the smoking substitute device, the smoking substitute device may submit data regarding some of its hardware components, such as its battery, to the auxiliary device. An application running on the auxiliary device may access some of that data for storage, or possibly for making determinations—for example, for determining remaining battery power from battery output voltage levels. The application, or the auxiliary device, may transmit control signals to the smoking substitute device.

According to the present disclosure, the data transmitted by the smoking substitute device to the auxiliary device or computing component need not be limited to output data regarding the smoking substitute device. Instead, the smoking substitute device can (in addition to, or instead of, providing such output data) provide at least one "input measurement" for use in managing and controlling operation of the auxiliary device, and/or for managing the outputs of an application being run on the auxiliary device.

The "output" that the auxiliary device is configured to provided may be visual, audible or tactile. The "output attribute" may be any adjustable property of the output of the auxiliary device. For example, the output attribute may be a characteristic or operational parameter of the auxiliary device, as distinct to actual output content. However, in some example, the output attribute may relate to content output by the auxiliary device.

The auxiliary device may comprise a visual display such as a screen, a visual image, a light, an LED or another type of visual display. The output for a visual display may comprise any visual output including still or moving images or lights. For example, when the auxiliary device comprises a visual display, and the output is a visual output, the attribute may comprise the brightness or contrast of the visual output. For example, the attribute may comprise the magnification of the visual output, wherein the smoking substitute device can be used to effectively "zoom in" or "zoom out" on the visual display. For example, the attribute may comprise the location or positioning of the visual output, on the visual display—for example, if the visual output is to be shown alongside other images on the visual display, the smoking substitute device may be configured to select the location or position of that visual output, relative to the other images. This may comprise arranging the visual output and other images vertically and/or horizontally within the two-dimensional plane of the visual display and/or arranging them in a third dimension by layering and/or superimposing the visual output and the other images.

The auxiliary device may comprise an audio emitter such as a loudspeaker, headphones, or another type of speaker, buzzer, alarm or audible alert signal. The output for an audio emitter may comprise any audible output. For example, when the auxiliary device comprises an audio emitter and the output is an audible output, the attribute may comprise the volume of the audible output. For example, the attribute may comprise the balance of sounds, when the audible output comprises a combination of different sounds (for example, in music or when there is a background music track in addition to gaming sounds.) For example, the attribute may comprise the voice type, or instrument type or style in which the audible output is to be emitted. For example, the attribute may comprise the frequency or pitch of the audible output.

The auxiliary device may comprise a tactile output means such as a component that vibrates or otherwise moves, to be felt by a user. The auxiliary device may comprise one or more moving parts such as wheels or robotic moving features.

The auxiliary device may includes an image capture apparatus. The output of the image capture apparatus may include a still image or a moving image. The output attribute may be a property of a digital image obtained by the image capture apparatus. For example, the output attribute may comprise the visual content of the output. For example, the smoking substitute device may be configured to add or superimpose an additional image or other visual item, onto the captured image, and produce a visual output that combines the captured image with the additional image. The input command may be indicative of a position and/or an orientation of the smoking substitute device within a field of view of the image capture apparatus. The input command may be configured to add a graphical feature to the digital image obtained by the image capture apparatus in a position in the digital image corresponding to the smoking substitute device. The relative position of the graphical image to the captured image may be determined in accordance with a position and/or an orientation of the smoking substitute device, within a field of view of the image capture apparatus of the auxiliary device.

A position and/or a relative position and/or an orientation of the smoking substitute device, within a field of view of an image capture apparatus of an auxiliary device, may be used for calibration purposes. The (relative) position or orientation may help determine how a user's inputs (or other motion), as detected by the positional sensing component and/or the orientation sensing component of the smoking substitute device, "translate" or correspond, for controlling adjustment of one or more attributes of an output of the auxiliary device.

The smoking substitute device may be configured so that manipulation, by a user, of the positional sensing component and/or the orientation sensing component to provide an input measurement, comprises a user action being made in relation to the positional sensing component and/or in relation to the orientation sensing component. It may comprise a plurality of user actions made in relation to the positional sensing component and/or in relation to the orientation sensing component. The user action or actions may be directed to the whole of the smoking substitute device, in which the positional sensing component and/or the orientation sensing component is comprised, or the user action or actions may be directed to a specific actuator or mechanism that comprises, or connects to, the positional sensing component and/or the orientation sensing component.

The positional sensing component and/or in the orientation sensing component may comprise any of an accelerometer, a gyroscope, a magnetometer or any component that can sense movement, (relative) position, orientation or direction for a smoking substitute device. In broad terms, and as will be known to the skilled reader, an accelerometer is configured to sense and measure acceleration, so can be used to detect movement of the smoking substitute device. A gyroscope is configured to measure and/or maintain orientation and angular velocity, so can be used to detect rotational movement of the smoking substitute device. A magnetometer is configured to measure magnetism, i.e., the direction, strength, or relative change of a magnetic field at a particular location. A magnetometer can be used as a compass for the smoking substitute device.

Some known smoking substitute devices already comprise a positional sensing component and/or an orientation sensing component. Such components can be used for management and control of the smoking substitute device. For example, an accelerometer may be comprised within a smoking substitute device and may be used, either in isolation or in combination with other components, to detect motion of the smoking substitute device of the type that is typical during a smoking substitute action. Information regarding such detected motion can be recorded, stored and/or analysed for the smoking substitute device in order to detect smoking substitute actions and, for example, to create a record of the number of smoking substitute actions that a user typically performs within a time period.

Therefore, the present disclosure makes use of components that already are comprised within, and/or which can be readily be comprised within, a smoking substitute device. A positional sensing component and/or an orientation sensing component, of the type required to embody the present disclosure, can be physically very small and compact. Therefore, their inclusion within a smoking substitute device would not cause significant physical restraint on the device. Nor would the inclusion of a positional sensing component and/or an orientation sensing component, of the type required to embody the present disclosure, require significant additional processing capability from the smoking substitute device.

Optionally, any changes or additions required in order to implement the present disclosure may be made to the auxiliary device, as opposed to being made to the smoking substitute device. For example, a software update may be applied to an auxiliary device or to an application running on the auxiliary device, to enable an input measurement received from a smoking substitute device to be used, at the auxiliary device, to adjust an attribute of an output of the auxiliary device.

The manipulation, by a user, of the positional sensing component and/or the orientation sensing component of the smoking substitute device may comprise the user performing a combination, pattern or sequence of actions in relation to the smoking substitute device, to be detected by the positional sensing component and/or in the orientation sensing component. For example, the manipulation by user may comprise rolling, turning or spinning the smoking substitute device, which could be sensed by a gyroscope and/or an accelerometer and/or a magnetometer. The manipulation by user may comprise a tapping movement such as tapping the smoking substitute device against a surface, which could be sensed by an accelerometer and/or a magnetometer.

For example, a gyroscope within a smoking substitute device may be used to position a graphical image or other visual item, that the user wishes to superimpose onto a captured image, by locating the smoking substitute device at a selected position within the field of view of the image capture apparatus of an auxiliary device, when the image is being captured.

A combination of two or more positional and/or orientation sensing components may be comprised within the smoking substitute device and may be operable, either separately or in combination, to help provide an input measurement for adjusting an attribute of an output of the auxiliary device. For example, both a gyroscope and an accelerometer may be employed in order to provide relative positional data for the smoking substitute device within a field of view, or other frame of reference, for the auxiliary device. For example, a gyroscope, an accelerometer and a magnetometer may all be employed, in order to enable the smoking substitute device to act as a rotatable actuator, for controlling an output of the auxiliary device. For example, the smoking substitute device may act as a volume control for an audible output of an auxiliary device, or as a dimmer for a visual output such as a light or a screen.

The smoking substitute device may comprise a control unit configured to generate the input command upon detection of a sequence of manipulations sensed by the positional sensing component and/or the orientation sensing component. The control unit may further transmit the input command to the auxiliary device. In this example, processing of the signals sensed by the positional sensing component and/or the orientation sensing component is performed on the smoking substitute device itself.

However, in another approach, the control system may comprise a computing component configured to determine a position and/or an orientation of the smoking substitute device. The computing component may be configured to generate the input command using the determined position and/or orientation of the smoking substitute device. The computing component can be configured to use a measurement or other indicator, as obtained by the positional sensing component and/or by the orientation sensing component, and to use that measurement or other indicator to make a determination relating to a position and/or an orientation of the smoking substitute device. That determination may then be used to control an adjustment of an attribute of an output of the auxiliary device.

The computing component may be within the auxiliary device, or the computer component may be comprised within an application being run on the auxiliary device or another remote device. For example, the computer component may be provided as a microprocessor or the like. Where the computing component is separate from the smoking substitute device, the processing burden on the smoking substitute device is reduced.

The computing component may be configured to determine a position and/or an orientation of the smoking substitute device relative to the auxiliary device, and generate the input command using the determined relative position and/or orientation. The relative position and/or relative orientation of the smoking substitute device, relative to the auxiliary device, may be obtained by performing a calibration process, for translating or corresponding the manipulation of the smoking substitute device to the adjustment of an attribute of an output of the auxiliary device.

A characteristic of the action or motion that is made in relation to the smoking substitute device, as detected by the positional sensing component and/or the orientation sensing component, can be used, by the computing component, to determine an adjustment of an attribute of an output of the auxiliary device. For example, the characteristic may comprise one or more of: the magnitude, speed, direction, frequency, number and force of the action or motion. For example, a fast movement of the smoking substitute device may result in a larger change to an attribute of an output of the auxiliary device (such as a more significant change in brightness or volume) than a slower movement of the smoking substitute device may result in. For example, repeating an action several times with respect to the smoking substitute device may result in a larger change to an attribute of an output of the auxiliary device (such as a more significant change in brightness or volume) than making that action fewer times (or just once) may result in.

The determination of an adjustment of an attribute of an output of the auxiliary device may make use of an absolute measure and/or a relative measure of one or more characteristics. For example, the characteristic may comprise actual speed, or change in speed (i.e., acceleration) from the beginning to the end of the motion or action.

A user may be able to provide calibration input to the smoking device or to the auxiliary device or to the application being run on the auxiliary device, to help determine how the subsequent user manipulations office smoking substitute device may affect one or more attributes of one or more outputs of the auxiliary device. For example, the user may be able to program the system so that a particular number of actuations, for example a particular number of taps of the smoking substitute device that would be detected by an accelerometer, would correspond to an instruction for an output of the auxiliary device to change in a particular way, for example for the volume of an audible output or for the brightness of a visual output to increase or decrease by a pre-determined amount.

In another aspect of the disclosure, there is provided a computer-implemented method of controlling an auxiliary device that is in communication with a smoking substitute device, wherein the smoking substitute device comprises a positional sensing component and/or an orientation sensing component, the method comprising: detecting a manipulation of the positional sensing component and/or the orientation sensing component; generating an input command using the detected manipulation; and transmitting the input command to the auxiliary device to cause an adjustment of an output attribute of the auxiliary device.

The method may further comprise establishing a reference position of the smoking substitute device relative to the auxiliary device, wherein the step of detecting a manipulation comprises detecting a position and/or orientation of the smoking substitute device relative to the auxiliary device.

In another aspect of the disclosure, there is provided a computer-implemented method of controlling an auxiliary device that is in communication with a smoking substitute device, wherein the smoking substitute device comprises a positional sensing component and/or an orientation sensing component, the method comprising: receiving, at the auxiliary device, an input command, wherein the input command is indicative of a manipulation of the positional sensing component and/or the orientation sensing component in the smoking substitute device; and adjusting, using the input command, an output attribute of the auxiliary device.

In a yet further aspect, the disclosure may provide a computer readable medium having computer readable instructions stored thereon, which, when executed by a processor, are configured to perform a method as set out herein.

The disclosure includes the combination of the aspects and preferred features described except where such a combination is clearly impermissible or expressly avoided.

The skilled person will appreciate that except where mutually exclusive, a feature or parameter described in relation to any one of the above aspects may be applied to any other aspect. Furthermore, except where mutually exclusive, any feature or parameter described herein may be applied to any aspect and/or combined with any other feature or parameter described herein.

DETAILED DESCRIPTION OF THE DISCLOSURE

Aspects and embodiments of the present disclosure will now be discussed with reference to the accompanying figures. Further aspects and embodiments will be apparent to those skilled in the art. All documents mentioned in this text are incorporated herein by reference.

FIG. 13 shows an example system 1 for managing a smoking substitute device 10, and for using a smoking substitute device to control auxiliary device in accordance with embodiments of the disclosure discussed herein.

The system 1 as shown in FIG. 13 includes a mobile device 2, an application server 4, an optional charging station 6, as well as the smoking substitute device 10. The system 1 further comprise a plurality of auxiliary devices. One of the auxiliary devices is a media playback device comprising a display 14 for showing visual content and one of more speakers 16 for outputting an audio signal. The media playback device may be a television, desktop computer, laptop computer, tablet computer, or the like. The auxiliary devices further comprise a light 18, e.g., a lamp or other lighting for illuminating a room. The auxiliary devices further comprise an image capture apparatus 20, e.g., a digital camera or the like.

The smoking substitute device 10 is configured to communicate wirelessly, e.g., via Bluetooth™, with an application (or "app") installed on the mobile device 2, e.g., via a suitable wireless interface (not shown) on the mobile device 2. The mobile device 2 may be a mobile phone, for example. The application on the mobile phone is configured to communicate with the application server 4, via a network 8. The application server 4 may utilise cloud storage, for example.

The network 8 may include a cellular network and/or the internet.

Each of the auxiliary devices may be network-enabled (i.e., "smart") to permit them to communicate wirelessly with the smoking substitute device 10. The wireless communication may be direct, as shown in by dotted lines in FIG. 13, e.g., of a short range wireless network. Alternatively, the devices may be controlled by signals received over the network 8 or from the mobile device 2. In this scenario, communication between the smoking substitute device 10 is relayed via the mobile device 2 and/or the application server 4.

A skilled person would readily appreciate that the mobile device 2 may be configured to communicate via the network 8 according to various communication channels, preferably a wireless communication channel such as via a cellular network (e.g., according to a standard protocol, such as 3G or 4G) or via a WiFi network.

The app installed on the mobile device and the application server 4 may be configured to assist a user with their smoking substitute device 10, based on information communicated between the smoking substitute device 10 and the app and/or information communicated between the app and the application server 4.

The charging station 6 (if present) may be configured to charge (and optionally communicate with) the smoking substitute device 10, via a charging port on the smoking substitute device 10. The charging port on the smoking substitute device 10 may be a USB port, for example, which may allow the smoking substitute device to be charged by any USB-compatible device capable of delivering power to the smoking substitute device 10 via a suitable USB cable (in this case the USB-compatible device would be acting as the charging station 6). Alternatively, the charging station could be a docking station specifically configured to dock with the smoking substitute device 10 and charge the smoking substitute device 10 via the charging port on the smoking substitute device 10.

In embodiments of the disclosure, the smoking substitute device 10 includes a positional sensing component and/or an orientation sensing component 12. The smoking substitute device 10 may be used to manipulate the positional sensing component and/or an orientation sensing component 12 (e.g., by performing certain movements or actions using the smoking substitute device 10) in a manner that causes an input command to be generated and communicated to one or more of the auxiliary devices. The input command may be generated at the smoking substitute device and communicated (e.g., transmitted wirelessly) directly to the auxiliary device(s). Alternatively, the input command may be generated in a computing component that is separate from the smoking substitute device. The computing component may be the mobile device 2, the application server 4, or even the auxiliary device itself. In this scenario, the computing component may be configured to receive information from the smoking substitute device 10 that is indicative of the manipulation sensed by the positional sensing component and/or an orientation sensing component 12.

FIG. 14A shows an example smoking substitute device 110 for use as the smoking substitute device 10 in the system 1 of FIG. 13.

In this example, the smoking substitute device 110 includes a main body 120 and a consumable 150. The consumable 150 may alternatively be referred to as a "pod".

In this example, the smoking substitute device 110 is a closed system vaping device, wherein the consumable 150 includes a sealed tank 156 and is intended for one-use only.

FIG. 14A shows the smoking substitute device 110 with the main body 120 physically coupled to the consumable 150.

FIG. 14B shows the main body 120 of the smoking substitute device 110 without the consumable 150.

FIG. 14C shows the consumable 150 of the smoking substitute device 110 without the main body 120.

The main body 120 and the consumable 150 are configured to be physically coupled together, in this example by pushing the consumable 150 into an aperture in a top end 122 of the main body 120, e.g., with the consumable 150 being retained in the aperture via an interference fit. In other examples, the main body 120 and the consumable could be physically coupled together by screwing one onto the other, through a bayonet fitting, or through a snap engagement mechanism, for example. An optional light 126, e.g., an LED located behind a small translucent cover, is located a bottom end 124 of the main body 120. The light 126 may be configured to illuminate when the smoking substitute device 110 is activated.

The consumable 150 includes a mouthpiece (not shown) at a top end 152 of the consumable 150, as well as one or more air inlets (not shown in FIG. 14) so that air can be drawn into the smoking substitute device 110 when a user inhales through the mouthpiece. At a bottom end 154 of the consumable 150, there is located a tank 156 that contains e-liquid. The tank 156 may be a translucent body, for example.

The tank 156 preferably includes a window 158, so that the amount of e-liquid in the tank 156 can be visually assessed. The main body 120 includes a slot 128 so that the window 158 of the consumable 150 can be seen whilst the rest of the tank 156 is obscured from view when the consumable 150 is inserted into the aperture in the top end 122 of the main body 120.

In this present embodiment, the consumable 150 is a "single-use" consumable. That is, upon exhausting the e-liquid in the tank 156, the intention is that the user disposes of the whole consumable 150. In other embodiments, the e-liquid (i.e., aerosol former) may be the only part of the system that is truly "single-use". In such embodiments, the tank 156 may be refillable with e-liquid or the e-liquid may be stored in a non-consumable component of the system. For example, the e-liquid may be stored in a tank located in the device or stored in another component that is itself not single-use (e.g., a refillable tank).

The tank 156 may be referred to as a "clearomizer" if it includes a window 158, or a "cartomizer" if it does not.

FIG. 15A is a schematic view of the main body 120 of the smoking substitute device 110.

FIG. 15B is a schematic view of the consumable 150 of the smoking substitute device 110.

As shown in FIG. 15A, the main body 120 includes a power source 128, a control unit 130, a memory 132, a wireless interface 134, a position and/or orientation sensor 135, an electrical interface 136, and, optionally, one or more additional components 138.

The power source 128 is preferably a battery, more preferably a rechargeable battery.

The control unit 130 may include a microprocessor, for example.

The memory 132 is preferably includes non-volatile memory.

The wireless interface 134 is preferably configured to communicate wirelessly with the mobile device 2, e.g., via Bluetooth. To this end, the wireless interface 134 could include a Bluetooth™ antenna. Other wireless communication interfaces, e.g., WiFi, are also possible.

The position and/or orientation sensor 135 corresponds to the positional sensing component and/or an orientation sensing component 12 discussed with reference to FIG. 13. The position and/or orientation sensor 135 may comprise a motion sensor and an orientation sensor. The motion sensor may be an accelerometer. The orientation sensor may be a gyroscope or a magnetometer. The position and/or orientation sensor 135 may be configured to output sensing signals that correspond to changes in position or orientation. The output sensing signals may be communicated to the control unit 130. The control unit 130 may determine, based on the received output sensing signals, a manipulation performed by the user. The control unit 130 may be further arranged to recognise a predetermined manipulation or a predetermined sequence of manipulations. For example, the control unit 130 may compare determined manipulations against a library of predetermined manipulations. Upon recognising a predetermined manipulation or a predetermined sequence of manipulations, the control unit 130 may trigger a process of generating an input command for an auxiliary device. As discussed above, the input command may be generated in the smoking substitute device, e.g., by the control unit 130, or may be generated by a separate computing component. In the latter scenario, the control unit 130 may be configured to communicate a signal indicative of the recognised predetermined manipulation or a predetermined sequence of manipulations to the computing component. This communication may be direct, or may be via a mobile device with which the smoking substitute device has a bonded communication link. As discussed in more detail below, the input command is provided to the auxiliary device to adjust an output attribute of the auxiliary device.

The control unit 130 may be configured to perform a calibration procedure using the position and/or orientation sensor 135. The calibration procedure may comprise setting a reference position, in which the smoking substitute device is held by the user in a predetermined position and/or orientation relative to an auxiliary device. After the calibration procedure is performed, the control unit 130 may use the sensing signals from the position and/or orientation sensor 135 to determine a relative position and/or orientation between the smoking substitute device and the auxiliary device. The relative position may be used to trigger generation of an input command, or may be used as part of the input command to adjust an output attribute of the auxiliary device.

The electrical interface 136 of the main body 120 may include one or more electrical contacts. The electrical interface 136 may be located in, and preferably at the bottom of, the aperture in the top end 122 of the main body 120. When the main body 120 is physically coupled to the consumable 150, the electrical interface 136 may be configured to pass electrical power from the power source 128 to (e.g., a heating device of) the consumable 150 when the smoking substitute device 110 is activated, e.g., via the electrical interface 160 of the consumable 150 (discussed below). When the main body 120 is not physically coupled to the consumable 150, the electrical interface may be configured to receive power from the charging station 6.

The additional components 138 of the main body 120 may include the optional light 126 discussed above.

The additional components 138 of the main body 120 may, if the power source 128 is a rechargeable battery, include a charging port configured to receive power from the charging station 6. This may be located at the bottom end 124 of the main body 120. Alternatively, the electrical interface 136 discussed above is configured to act as a charging port configured to receive power from the charging station 6 such that a separate charging port is not required.

The additional components 138 of the main body 120 may, if the power source 128 is a rechargeable battery, include a battery charging control circuit, for controlling the charging of the rechargeable battery. However, a battery charging control circuit could equally be located in the charging station 6 (if present).

The additional components 138 of the main body 120 may include an airflow sensor for detecting airflow in the smoking substitute device 110, e.g., caused by a user inhaling through a mouthpiece 166 (discussed below) of the smoking substitute device 110. The smoking substitute device 110 may be configured to be activated when airflow is detected by the airflow sensor. This optional sensor could alternatively be included in the consumable 150 (though this is less preferred where the consumable 150 is intended to be disposed of after use, as in this example).

The additional components 138 of the main body 120 may include an actuator, e.g., a button. The smoking substitute device 110 may be configured to be activated when the actuator is actuated. This provides an alternative to the airflow sensor noted, as a mechanism for activating the smoking substitute device 110.

The additional components 138 of the main body 120 may include a reader configured to read information associated with the consumable from a machine readable data source included in (e.g., contained in the body of, or attached to) the consumable 150.

The reader may be configured to read information from the machine readable data source wirelessly, e.g., via electromagnetic waves or optically. Thus, for example, the machine readable data source included in the consumable 150 could be an RFID tag (in which case the reader included in the main body 120 may be an RFID reader) or a visual data source such as a barcode (in which case the reader included in the main body may be an optical reader, e.g., a barcode scanner). Various wireless technologies and protocols may be employed to allow the reader to wirelessly read information from a machine readable data source included in or attached to the consumable 150, e.g., NFC, Bluetooth, Wi-Fi, as would be appreciated by a skilled person.

For avoidance of any doubt, the reader (if present) may be configured to read information from the machine readable data source non-wirelessly, e.g., using a direct electrical connection between the main body 120 and consumable 150.

As shown in FIG. 15B, the consumable 150 includes the tank 156, an electrical interface 160, a heating device 162, one or more air inlets 164, a mouthpiece 166, and, optionally, one or more additional components 168.

The electrical interface 160 of the consumable 150 may include one or more electrical contacts. The electrical interface 136 of the main body 120 and an electrical interface 160 of the consumable 150 are preferably configured to contact each other and therefore electrically couple the main body 120 to the consumable 150 when the main body 120 is physically coupled to the consumable 150. In this way, electrical energy (e.g., in the form of an electrical current) is able to be supplied from the power source 128 in the main body 120 to the heating device 162 in the consumable 150.

The heating device 162 is preferably configured to heat e-liquid contained in the tank 156, e.g., using electrical energy supplied from the power source 128. In one example, the heating device 162 may include a heating filament and a wick, wherein a first portion of the wick extends into the tank 156 in order to draw e-liquid out from the tank 156, and wherein the heating filament coils around a second portion of the wick located outside the tank 156. In this example, the heating filament is configured to heat up e-liquid drawn out of the tank 156 by the wick to produce an aerosol vapour.

The one or more air inlets 164 are preferably configured to allow air to be drawn into the smoking substitute device 110, when a user inhales through the mouthpiece 166.

The additional components 168 of the consumable 150 may include a machine readable data source, which may e.g., be contained in the body of, or attached to the consumable 150. The machine readable data source may store information associated with the consumable. The information associated with the consumable may include information concerning the content of the consumable (e.g., e-liquid type, batch number) and/or a unique identifier, for example.

The machine readable data source may be rewritable, e.g., a rewritable RFID chip, or read only, e.g., a visual data source such as a barcode. As indicated above, the additional components 138 of the main body 120 may include a reader configured to read information associated with the consumable from the machine readable data source.

In use, a user activates the smoking substitute device 110, e.g., through actuating an actuator included in the main body 120 or by inhaling through the mouthpiece 166 as described above. Upon activation, the control unit 130 may supply electrical energy from the power source 128 to the heating device 162 (via electrical interfaces 136, 166), which may cause the heating device 162 to heat e-liquid drawn from the tank 156 to produce a vapour which is inhaled by a user through the mouthpiece 166.

Of course, a skilled reader would readily appreciate that the smoking substitute device 110 shown in FIGS. 14 and 15 shows just one example implementation of a smoking substitute device, and that other forms of smoking substitute device could be used as the smoking substitute device 10 of FIG. 13.

By way of example, a HNB smoking substitute device including a main body and a consumable could be used as the smoking substitute device 10 of FIG. 13, instead of the smoking substitute device 110. One such HNB smoking substitute device is the IQOS™ smoking substitute device discussed above.

As another example, an open system vaping device which includes a main body, a refillable tank, and a mouthpiece could be used as the smoking substitute device 10 of FIG. 13, instead of the smoking substitute device 110. One such open system vaping device is the blu PROT™ e-cigarette discussed above.

As another example, an entirely disposable (one use) smoking substitute device could be used as the smoking substitute device 10 of FIG. 13, instead of the smoking substitute device 110.

Embodiments of the present disclosure relate to the management and use of a network-enabled smoking substitute device such as that discussed above in relation to FIG. 13. In particular, they relate to making use of a smoking substitute device to control an auxiliary device. Herein, the term "auxiliary device" is used to mean a network-enabled device that provides a user-detectable output or performs a function or service for the user. Examples of auxiliary devices include a mobile phone, smart phone, laptop computer, tablet computer, television, gaming device, or any smart appliance, e.g., lighting, media player, digital camera, etc.

The auxiliary devices discussed herein may be devices capable of remote control, i.e., capable of receiving wireless signals that encode input commands that cause the auxiliary device to adjust its operation. In embodiments of the disclosure, manipulation of the smoking substitute device causes generation of an input command to adjust an output attribute of the auxiliary device. The available input commands may vary depending on the type of auxiliary device. It is envisaged that a link between available input commands and manipulation of the smoking substitute device will be established upon forming a communication link between the smoking substitute device and the auxiliary device (noting that the communication link may be direct or may be via an intermediary, such as a mobile device). The link between available input commands and manipulation of the smoking substitute device may be fixed, i.e., predetermined, or may be adjustable by a user, i.e., a user may be able to selected a type of manipulation that causes generation of a certain input command. This functionality may be provided on an app that runs on the mobile device, for example.

The input command for the auxiliary device may relate to an application running on the auxiliary device (e.g., a gaming app or media player app on a smart phone or other computing device). In other examples, the input command may relate to a control operating system of the auxiliary device (e.g., for volume or brightness control of a television).

An embodiment will now be described in which a Bluetooth™ connection is employed for wireless communication between a smoking substitute device and an auxiliary device. Both devices have Bluetooth™ wireless interfaces. However other types of wireless connection are possible, and it is also possible that the communication may involve one or more intermediate devices, as described above in relation to FIG. 13.

The smoking substitute device in the following example embodiment is of the type described above in relation to FIGS. 13 and 15A, which can form a wireless connection to an auxiliary device capable of remote control, such as a mobile phone, smart phone, tablet, laptop computer, television or gaming device. At the beginning of the method, it is to be taken that the smoking substitute device does not yet have any established wireless communication links to any specific auxiliary devices. For the purpose of the described method, it is to be taken that the user has the requisite authority and/or permissions, to implement this method on his or her chosen devices.

In this example, a communication link is formed in any conventional manner between the smoking substitute device and a network-enabled television, which has both visual and audible outputs. Once the wireless communication link has been established, it can be used in accordance with the present disclosure to enable the smoking substitute device to be used as a remote controller for the television, in which manipulation of the position and/or orientation of the smoking substitute device is used to generate an input command to adjust an output attribute of the television.

In one example, the position sensor of the smoking substitute device comprises motion sensor, such as an accelerometer configured to detect acceleration of a body or object relative to a free fall direction. Some accelerometers are configured to measure static acceleration forces, like the continuous force of gravity. The accelerometer in this embodiment, comprised within the smoking substitute device, is configured to measure dynamic acceleration forces, and so can sense movement or vibrations. The accelerometer is configured to measure acceleration and its outputs may be used to determine position factors and/or orientation factors such as tilt, tilt angle, and incline, as well as being used to determine actions or events such as rotation, vibration and collision.

The accelerometer may be a piezoelectric accelerometer. However other types of accelerometer may be used in a smoking substitute device, such as a capacitance accelerometer. The accelerometer may comprise a three-axis model, to enable it to sense rotational tilt, as well as movement in a two-dimensional plane.

In this embodiment, the accelerator is configured to detect movement and, for example, collisions, and to provide an output sensing signal in the form of a voltage output to the control unit. The accelerometer can, for example, detect the action of the smoking substitute device being tapped against (i.e., relatively gently colliding with) a surface. When the user taps the device, the accelerometer transmits a corresponding voltage signal to the control unit. The control unit can then control the memory of the smoking substitute device to store (at least temporarily) a measure of the voltage signal, along with an indicator of the time at which it was received.

As mentioned above, the present disclosure embodies the recognition that smoking substitute device should not have to perform unduly complicated or computationally intensive determinations in order to be useable as an input to an auxiliary device. Therefore according to this embodiment, the control unit is configured to wirelessly transmit a signal to a separate computing component (which may be in the auxiliary device itself or in the mobile device), where that signal is indicative of the voltage signals that have been output by the accelerometer and the times at which they occurred. The control unit does not have to itself interpret the signals, although in some embodiments it may be configured to do so.

The computing component is configured to use the signal from the smoking substitute device to generate an input command to control an output attribute of the auxiliary device (e.g., a volume or brightness of the television). The computing component may use the signal to make a determination about movement (i.e., change in position) of the smoking substitute device. In this embodiment, that determination may comprise determining that the smoking substitute device has performed a certain sequence of movements, e.g., a series of taps or other gestures, which are linked to a certain input command.

The computing component may generate an input command based on the signal from the smoking substitute device, and may transmit it to the auxiliary device (or execute it if the computing component is on the auxiliary device itself) to adjust an output attribute of the auxiliary device. The generated input command preferably includes an instruction which requests an adjustment of an output attribute of the auxiliary device. Thus, certain movements (taps or gestures) of the smoking substitute device can be translated into a change in operation of an auxiliary device, e.g., brightness or volume of a television.

In another embodiment, the auxiliary device may be a mobile device that is running a game application. For example, the game application may be a memory game in which the mobile device outputs a sequence or sounds or images. The gameplay may involve the user mimic the sequence as closely as possible by using the smoking substitute device as an input device, e.g., where a tap of the smoking substitute device against a surface corresponds to a sound or image in the sequence. The user's tapping input can be checked against the sequence that it asked the user to mimic. The input command in this example is thus the user's gameplay response. The output attribute that is adjusted may be the next stage of gameplay, which depends on whether or not the user successfully mimics the sequence, or may be a representation of the user response, e.g., a series of markers depicted as a function of time.

In the game example above, the adjusted output attribute may be part of the gameplay. However, preferably, the output attribute referred herein is an operational parameter of the auxiliary device, i.e., a property of how the device functions rather than a property of the content is that is displayed or otherwise output. For example, the operational parameters of a television may include screen brightness and/or audio volume. The television may be configured to display a graduated scale indicating the current level of the relevant operational parameter. The user of the smoking substitute device can use movement of the device, as sensed by the accelerometer, in order to move the markers on one or more of the scales and thereby set operational parameters for the television.

According to another embodiment, the input command provided to the auxiliary device may be based on relative position and orientation of the smoking substitute device and the auxiliary device. In this embodiment, the smoking substitute device may include an orientation sensor (e.g., a gyroscopic sensor) in addition to the motion sensor mentioned above. A gyroscopic sensor can sense orientation, direction, angular motion and rotation. This enables a gyroscopic sensor to, for example, perform gesture recognition functions. Therefore, having a gyroscopic sensor incorporated into the smoking substitute device can provide an output signal indicative of particular movements, such as turning, spinning or rolling of the device. The computing component mentioned above may in turn use these output signals to determine a relative position and orientation of the smoking substitute device relative to the auxiliary device.

To determine relative position, it is desirable to set a reference position, e.g., in which the auxiliary device and smoking substitute device are in a predetermined spatial relationship (e.g., in contact with each other). The reference position may thus create a frame of reference within which subsequent manipulation of the position and/or orientation of the smoking substitute device can be translated to a relative position.

The reference position may be set using a calibration process that is performed before or after the establishment of the wireless link between the smoking substitute device and the auxiliary device. However, performing the calibration after establishment of the wireless link may be preferable so that an application running on the auxiliary device can access signals from the smoking substitute device during the calibration process. According to an embodiment, the calibration process can be run by an application on the computing component that translates the output signals from the accelerometer/gyroscope to the input comment. The calibration process may require the user to place the smoking substitute device in close proximity with the auxiliary device. Probably the application should guide the user as to how close the two devices should be to one another, in order to constitute them being located "together" (i.e., at a common location), during the calibration process. The more accurately that a user can follow such an instruction, the more accurate the calibration process should be. The application should instruct the user to provide an input to the application to inform the application that the two devices are currently "together".

Once the application has obtained position and orientation information from the smoking substitute device when it is located together with the auxiliary device, the application can subsequently use motion and orientation data from the smoking substitute device to ascertain any changes in position or orientation of the smoking substitute device relative to the auxiliary device. The application can thus generate an input command for adjusting an output attribute of the auxiliary device based on that relative change in position or orientation.

In a development of the embodiment discussed above, the auxiliary device itself may also have an accelerometer and/or a gyroscope incorporated therein. For example, the auxiliary device may comprise a smartphone or tablet, many of which are known to incorporate both accelerometer and gyroscopes. The application is then configured to calibrate both devices relative to a reference position or location, wherein the user must place both devices at the reference position or location during the calibration process. Once the calibration has been carried out, the application can then access position and orientation data for both devices from there accelerometer and or gyroscopes and use that data to determine relative positioning and orientation of the devices. It can then make determinations about how to adjust an attribute of an output of the auxiliary device accordingly.

According to embodiments, the orientation sensor of the smoking substitute device may comprise a magnetometer. A magnetometer is a device that measures magnetism, including the direction, strength, or relative change of a magnetic field at a particular location. A magnetometer enables position to be known for the smoking substitute device, relative to magnetic north. Therefore, it can effectively be used as a compass, by the smoking substitute device.

It will be appreciated that the smoking substitute device can comprise any combination of position and or orientation sensors such as accelerometers, gyroscopes and magnetometers. Outputs from a plurality of those sensors can be provided to computing component that generates an input command to control one or more output attributes of an auxiliary device. If the computing component is provided with outputs from a plurality of sensors, as inputs for its control of the outputs of the auxiliary device, it may be able to effect more sensitive and or more accurate control of the outputs and or it may be operable to perform apparently more complicated output control. For example, in an embodiment of the smoking substitute device that comprises a gyroscope and an accelerometer and a magnetometer, The inputs from those components can be used to act as a volume control input for a connected auxiliary device such as a television or other auxiliary device that has audible output. Alternatively or additionally, the combined input from those components can act like a rotatable dimmer switch, for controlling the brightness of lights or of a visual displays such as a screen.

The position and/or orientation sensing components to be comprised within a smoking substitute device in accordance with this disclosure should be incorporated with the other components of the device in any suitable manner. They should be provided in a physical form that does not take up too much space within the device or render the device overall too bulky or too heavy. For example, the position and orientation sensing component may embody Microelectromechanical systems (MEMS) technology, applies mechanical functions to small structures using dimensions in the micrometre scale.

The outputs of the position and/or orientation sensor components may be stored in a memory of the smoking substitute device, either temporarily or more permanently, and preferably at least until they have been wirelessly transmitted to the auxiliary device with which the smoking substitute device has established a wireless communication link.

An application or other computer program that is operable to access the outputs of the position and/or orientation sensor components within the smoking substitute device and use those output as input for determining control adjustment for an auxiliary device may be of any suitable form and may comprise any suitable processing and or memory means. The application may be configured to store the signals received from the sensor components of the smoking substitute device. Alternatively, it may be configured to either use those signals as applicable, but to subsequently forget or delete them within a relatively short period of time.

The system that comprises the smoking substitute device, the auxiliary device and the computing component may be configured so that the computing component has access to the outputs of the position and orientation sensor components within the smoking substitute device at all times, or at least at frequent regularly spaced intervals. For example, the computing component may be a mobile device that runs an application to receive and process a signal from the smoking substitute device that is indicative of the outputs for the positioning and/or orientation sensors. Alternatively, the system may be configured so that the computing component can only access the output of those positioning and/or orientation sensors in response to a specific user instruction or command. For example, the user may be able to provide an instruction to the application, via an interface of the auxiliary device or mobile device, that he or she wishes to use the smoking substitute device as an input and the computing component may be granted access to the outputs of the sensor components within the smoking substitute device as a result of that instruction.

It may be possible to configure the smoking substitute device to switch between being used for its core function and being used to provide control inputs to the auxiliary device. For example, the application on the auxiliary device may be able to switch off operation of the accelerometer for the purpose of detecting a typical smoking substitute action at times when the user wishes to instead use the accelerometer and its outputs for providing inputs to the auxiliary device, in order to adjust an attribute of an output of that auxiliary device.

FIG. 16 is a flow diagram depicting a method 400 of using a smoking substitute device to control an output attribute of an auxiliary device. The method begins with a step 402 of establishing a wireless communication link between the smoking substitute device and the auxiliary device. As discussed above, this communication link may be direct or may be via an intermediate computing component, such as the mobile device 2 or application server 4 discussed with reference to FIG. 13.

The method continues with a step 404 of establishing a reference position and/or orientation for the smoking substitute device. The reference position may be establishes as a time stamp at which the user indicates that the smoking substitute device and the auxiliary device are in a predetermined relationship, e.g., held together or in contact. Detected movement of the smoking substitute device after the time stamp can therefore be used to determine a relative position of the smoking substitute device and the auxiliary device (assuming that the auxiliary device remains static). If the auxiliary device is a portable device, the relative position may be determined by using motion/orientation information from both the smoking substitute device and the auxiliary device. Step 404 may be optional, in examples where the position and/or orientation of the smoking substitute device relative to the auxiliary device is not needed.

The method continues with a step 406 of detecting a manipulation of the position and/or orientation of the smoking substitute device. This may comprise outputting signals from the positional sensing component and orientation sensing component indicative of a change in position (i.e., movement) and orientation. The signals may be processed in any manner discussed above to determine the manipulation (or sequence of manipulations).

The method continues with a step 408 of generating an input command for the auxiliary device based on the detected manipulation. As discussed above, this step may be performed by the control unit of the smoking substitute device or, preferably, by a separate computing component, e.g., the mobile device or auxiliary device itself.

The method continues with a step 410 of adjusting an output attribute of the auxiliary device based on the input command. In other words, the input command is executed by the auxiliary device to adjust the output attribute.

FIG. 17 is a flow diagram depicting another method 500 of using a smoking substitute device to control an output attribute of an auxiliary device. The method begins with a step 502 of establishing, by a smoking substitute device, a wireless communication link between the smoking substitute device and the auxiliary device. As discussed above, this communication link may be direct or may be via an intermediate computing component, such as the mobile device 2 or application server 4 discussed with reference to FIG. 17.

The method continues with an optional step 504 of establishing a reference position and/or orientation for the smoking substitute device. This may be performed in the same manner as discussed with respect to optional step 404.

The method continues with a step 506 of detecting a manipulation of the position and/or orientation of the smoking substitute device. This step is performed at a computing component that is separate from the smoking substitute device. The computing component may be a mobile device with which the smoking substitute device has a bonded communication link. The smoking substitute device may transmit a signal indicative of an output of the positional sensing component and orientation sensing component of the smoking substitute device. For example, the signal may indicate a change in position (i.e., movement) and orientation. The signals may be processed by the computing component in any manner discussed above to determine a manipulation (or a sequence of manipulations) of the smoking substitute device.

The method continues with a step 508 of generating, by the computing component, an input command for the auxiliary device based on the detected manipulation.

The method continues with a step 510 of transmitting, by the computing component, the input command to the auxiliary device. The computing component may be in direct wireless communication with the auxiliary device, or may transmit the input command via an intermediary, e.g., via a cloud server or via the smoking substitute device.

The method continues with a step 512 of receiving the input command at the auxiliary device, and continues further with a step 514 of adjusting an output attribute of the auxiliary device based on the input command. In other words, the input command is received and executed by the auxiliary device to adjust the output attribute.

The features disclosed in the foregoing description, or in the following claims, or in the accompanying drawings, expressed in their specific forms or in terms of a means for performing the disclosed function, or a method or process for obtaining the disclosed results, as appropriate, may, separately, or in any combination of such features, be utilised for realising the disclosure in diverse forms thereof.

While the disclosure has been described in conjunction with the exemplary embodiments described above, many equivalent modifications and variations will be apparent to those skilled in the art when given this disclosure. Accordingly, the exemplary embodiments of the disclosure set forth above are considered to be illustrative and not limiting. Various changes to the described embodiments may be made without departing from the spirit and scope of the disclosure.

For the avoidance of any doubt, any theoretical explanations provided herein are provided for the purposes of improving the understanding of a reader. The inventors do not wish to be bound by any of these theoretical explanations.

Any section headings used herein are for organizational purposes only and are not to be construed as limiting the subject matter described.

Throughout this specification, including the claims which follow, unless the context requires otherwise, the word "comprise" and "include", and variations such as "comprises", "comprising", and "including" will be understood to imply the inclusion of a stated integer or step or group of integers or steps but not the exclusion of any other integer or step or group of integers or steps.

It must be noted that, as used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by the use of the antecedent "about," it will be understood that the particular value forms another embodiment. The term "about" in relation to a numerical value is optional and means for example +/− 10%.

The following statements, which form part of the description, provide general expressions of the disclosure herein:

D1. A control system comprising:
 a smoking substitute device having a positional sensing component and/or an orientation sensing component; and
 an auxiliary device configured to communicate with the smoking substitute device;
 wherein the positional sensing component and/or the orientation sensing component is manipulatable by a user of the smoking substitute device to cause generation of an input command;
 wherein the auxiliary device is configured to receive the input command, and
 wherein an output attribute of the auxiliary device is adjustable based on the input command received from the smoking substitute device.

D2. The control system of statement D1, wherein the auxiliary device includes a visual display, and wherein the output attribute comprises a brightness of the visual display.

D3. The control system of statement D1 or statement D2, wherein the auxiliary device includes an audio output device for emitting an audio signal, and wherein the output attribute comprises a volume of the audible signal.

D4. The control system of any preceding statement, wherein the auxiliary device includes an image capture apparatus, and wherein the output attribute is a property of a digital image obtained by the image capture apparatus.

D5. The control system of statement D4, wherein the output attribute is visible content of a digital image obtained by the image capture apparatus.

D6. The control system of statement D5, wherein the input command is indicative of a position and/or an orientation of the smoking substitute device within a field of view of the image capture apparatus, and wherein the input command is configured to add a graphical feature to the digital image obtained by the image capture apparatus in a position in the digital image corresponding to the smoking substitute device.

D7. The control system of any preceding statement, wherein the smoking substitute device comprises a control unit configured to:
   generate the input command upon detection of a sequence of manipulations sensed by the positional sensing component and/or the orientation sensing component; and
   transmit the input command to the auxiliary device.

D8. The control system of any one of statements D1 to D6 further comprising:
   a computing component configured to determine a position and/or an orientation of the smoking substitute device,
   wherein the computing component is configured to generate the input command using the determined position and/or orientation of the smoking substitute device.

D9. The control system of statement D8, wherein the computing component is configured to:
   determine a position and/or an orientation of the smoking substitute device relative to the auxiliary device, and
   generate the input command using the determined relative position and/or orientation.

D10. The control system of any preceding statement, wherein:
   the smoking substitute device and the auxiliary device are configured to communicate with each another via a short range wireless network; and/or
   the smoking substitute device comprises an accelerometer and a gyroscope configured to a determined position and orientation of the smoking substitute device.

D11. The control system of any preceding statement, wherein the input command includes an instruction which requests an adjustment of the output attribute of the auxiliary device, based on at least one manipulation of the smoking substitute device sensed by the positional sensing component and/or the orientation sensing component.

D12. A computer-implemented method of controlling an auxiliary device that is in communication with a smoking substitute device, wherein the smoking substitute device comprises a positional sensing component and/or an orientation sensing component, the method comprising:
   detecting a manipulation of the positional sensing component and/or the orientation sensing component;
   generating an input command using the detected manipulation; and
   transmitting the input command to the auxiliary device to cause an adjustment of an output attribute of the auxiliary device.

D13. The computer-implemented method of statement D12 further comprising establishing a reference position of the smoking substitute device relative to the auxiliary device, wherein the step of detecting a manipulation comprises detecting a position and/or orientation of the smoking substitute device relative to the auxiliary device.

D14. A computer-implemented method of controlling an auxiliary device that is in communication with a smoking substitute device, wherein the smoking substitute device comprises a positional sensing component and/or an orientation sensing component, the method comprising:
   receiving, at the auxiliary device, an input command, wherein the input command is indicative of a manipulation of the positional sensing component and/or the orientation sensing component in the smoking substitute device; and
   adjusting, using the input command, an output attribute of the auxiliary device.

D15. A computer readable medium having computer readable instructions stored thereon, which, when executed by a processor, are configured to perform a method according to any one of statements D12 to D14.

PART E (P01111US)

A System, Mobile Device and Method for Managing a Smoking Substitute Device

This application claims priority from EP19179909.7 filed 13 Jun. 2019, the contents and elements of which are herein incorporated by reference for all purposes.

Technical Field

The present disclosure relates to smoking substitute devices. In some examples, it relates to the management of network-enabled smoking substitute devices and their communication with other devices, and to locating a network-enabled smoking substitute device.

Background

The smoking of tobacco is generally considered to expose a smoker to potentially harmful substances. It is generally thought that a significant amount of the potentially harmful substances are generated through the heat caused by the burning and/or combustion of the tobacco and the constituents of the burnt tobacco in the tobacco smoke itself.

Conventional combustible smoking articles, such as cigarettes, typically comprise a cylindrical rod of tobacco comprising shreds of tobacco which is surrounded by a wrapper, and usually also a cylindrical filter axially aligned in an abutting relationship with the wrapped tobacco rod. The filter typically comprises a filtration material which is circumscribed by a plug wrap. The wrapped tobacco rod and the filter are joined together by a wrapped band of tipping paper that circumscribes the entire length of the filter and an adjacent portion of the wrapped tobacco rod. A conventional cigarette of this type is used by lighting the end opposite to the filter, and burning the tobacco rod. The smoker receives mainstream smoke into their mouth by drawing on the mouth end or filter end of the cigarette.

Combustion of organic material such as tobacco is known to produce tar and other potentially harmful by-products. There have been proposed various smoking substitute devices in order to avoid the smoking of tobacco.

Such smoking substitute devices can form part of nicotine replacement therapies aimed at people who wish to stop smoking and overcome a dependence on nicotine.

Smoking substitute devices may comprise electronic systems that permit a user to simulate the act of smoking by producing an aerosol (also referred to as a "vapour") that is drawn into the lungs through the mouth (inhaled) and then exhaled. The inhaled aerosol typically bears nicotine and/or flavourings without, or with fewer of, the odour and health risks associated with traditional smoking.

In general, smoking substitute devices are intended to provide a substitute for the rituals of smoking, whilst providing the user with a similar experience and satisfaction to those experienced with traditional smoking and tobacco products. Some smoking substitute systems use smoking substitute articles (also referred to as a "consumables") that are designed to resemble a traditional cigarette and are cylindrical in form with a mouthpiece at one end.

The popularity and use of smoking substitute devices has grown rapidly in the past few years. Although originally marketed as an aid to assist habitual smokers wishing to quit tobacco smoking, consumers are increasingly viewing smoking substitute devices as desirable lifestyle accessories. Some smoking substitute devices are designed to resemble a traditional cigarette and are cylindrical in form with a mouthpiece at one end. Other smoking substitute devices do not generally resemble a cigarette (for example, the smoking substitute device may have a generally box-like form).

There are a number of different categories of smoking substitute devices, each utilising a different smoking substitute approach. A smoking substitute approach corresponds to the manner in which the substitute system operates for a user.

One approach for a smoking substitute device is the so-called "vaping" approach, in which a vapourisable liquid, typically referred to (and referred to herein) as "e-liquid", is heated by a heating device to produce an aerosol vapour which is inhaled by a user. An e-liquid typically includes a base liquid as well as nicotine and/or flavourings. The resulting vapour therefore typically contains nicotine and/or flavourings. The base liquid may include propylene glycol and/or vegetable glycerin.

A typical vaping smoking substitute device includes a mouthpiece, a power source (typically a battery), a tank for containing e-liquid, as well as a heating device. In use, electrical energy is supplied from the power source to the heating device, which heats the e-liquid to produce an aerosol (or "vapour") which is inhaled by a user through the mouthpiece.

Vaping smoking substitute devices can be configured in a variety of ways. For example, there are "closed system" vaping smoking substitute devices which typically have a sealed tank and heating element which is pre-filled with e-liquid and is not intended to be refilled by an end user. One subset of closed system vaping smoking substitute devices include a main body which includes the power source, wherein the main body is configured to be physically and electrically coupled to a consumable including the tank and the heating element. In this way, when the tank of a consumable has been emptied, the main body can be reused by connecting it to a new consumable. Another subset of closed system vaping smoking substitute devices are completely disposable, and intended for one-use only.

There are also "open system" vaping smoking substitute devices which typically have a tank that is configured to be refilled by a user, so the device can be used multiple times.

An example vaping smoking substitute device is the Myblu™ e-cigarette. The Myblu™ e-cigarette is a closed system device which includes a main body and a consumable. The main body and consumable are physically and electrically coupled together by pushing the consumable into the main body. The main body includes a rechargeable battery. The consumable includes a mouthpiece, a sealed tank which contains e-liquid, as well as a heating device, which for this device is a heating filament coiled around a portion of a wick which is partially immersed in the e-liquid. The device is activated when a microprocessor on board the main body detects a user inhaling through the mouthpiece. When the device is activated, electrical energy is supplied from the power source to the heating device, which heats e-liquid from the tank to produce a vapour which is inhaled by a user through the mouthpiece.

Another example vaping smoking substitute device is the blu PRO™ e-cigarette. The blu PRO™ e-cigarette is an open system device which includes a main body, a (refillable) tank, and a mouthpiece. The main body and tank are physically and electrically coupled together by screwing one to the other. The mouthpiece and refillable tank are physically coupled together by screwing one of the other, and detaching the mouthpiece from the refillable tank allows the tank to be refilled with e-liquid. The device is activated by a button on the main body. When the device is activated, electrical energy is supplied from the power source to a heating device, which heats e-liquid from the tank to produce a vapour which is inhaled by a user through the mouthpiece.

Another approach for a smoking substitute system is the so-called Heated Tobacco ("HT") approach in which tobacco (rather than an "e-liquid") is heated or warmed to release vapour. HT is also known as "heat not burn" ("HNB"). The tobacco may be leaf tobacco or reconstituted tobacco. The vapour may contain nicotine and/or flavourings. In the HT approach the intention is that the tobacco is heated but not burned, i.e., the tobacco does not undergo combustion.

A typical HT smoking substitute system may include a device and a consumable. The consumable may include the tobacco material. The device and consumable may be configured to be physically coupled together. In use, heat may be imparted to the tobacco material by a heating element of the device, wherein airflow through the tobacco material causes components in the tobacco material to be released as vapour. A vapour may also be formed from a carrier in the tobacco material (this carrier may for example include propylene glycol and/or vegetable glycerine) and additionally volatile compounds released from the tobacco. The released vapour may be entrained in the airflow drawn through the tobacco.

As the vapour passes through the consumable (entrained in the airflow) from the location of vaporisation to an outlet of the consumable (e.g., a mouthpiece), the vapour cools and condenses to form an aerosol for inhalation by the user. The aerosol will normally contain the volatile compounds.

In HT smoking substitute systems, heating as opposed to burning the tobacco material is believed to cause fewer, or smaller quantities, of the more harmful compounds ordinarily produced during smoking. Consequently, the HT approach may reduce the odour and/or health risks that can arise through the burning, combustion and pyrolytic degradation of tobacco.

There may be a need for improved design of smoking substitute systems, in particular HT smoking substitute systems, to enhance the user experience and improve the function of the HT smoking substitute system.

An example of the HT approach is the IQOS™ smoking substitute device from Philip Morris Ltd. The IQOS™ smoking substitute device uses a consumable, including reconstituted tobacco located in a wrapper. The consumable includes a holder incorporating a mouthpiece. The consumable may be inserted into a main body that includes a heating device. The heating device has a thermally conductive heating knife which penetrates the reconstituted tobacco of the consumable, when the consumable is inserted into the heating device. Activation of the heating device heats the heating element (in this case a heating knife), which, in turn, heats the tobacco in the consumable. The heating of the tobacco causes it to release nicotine vapour and flavourings which may be drawn through the mouthpiece by the user through inhalation.

A second example of the HT approach is the device known as "Gb"™ from British American Tobacco p.l.c. Glo™ comprises a relatively thin consumable. The consumable includes leaf tobacco which is heated by a heating device located in a main body. When the consumable is placed in the main body, the tobacco is surrounded by a heating element of the heating device. Activation of the heating device heats the heating element, which, in turn, heats the tobacco in the consumable. The heating of the tobacco causes it to release nicotine vapour and flavourings which may be drawn through the consumable by the user through inhalation. The tobacco, when heated by the heating device, is configured to produce vapour when heated rather than when burned (as in a smoking apparatus, e.g., a cigarette). The tobacco may contain high levels of aerosol formers (carrier), such as vegetable glycerine ("VG") or propylene glycol ("PG").

The present inventor(s) have observed that most smoking substitute devices currently on the market are configured to operate in isolation of other devices, which limits the functions the smoking substitute devices can perform.

The present inventor(s) have also observed that, as smoking substitute devices become more sophisticated and are able to perform more functions, they may require more sophisticated management. Moreover, improved management should enable the user to enjoy enhanced functionality and convenience, in relation to their smoking substitute device.

The present disclosure has been devised in light of the above considerations.

SUMMARY OF THE DISCLOSURE

At its most general, the present disclosure provides systems, methods, computer implemented methods, computer programs and devices, which may enable a network-enabled smoking substitute device (that is, a smoking substitute device that is capable of wireless communication with other devices) to be managed in a secure and user-controllable manner. In particular, the smoking substitute device may be located more efficiently and/or easily, to reduce the risk of it being misplaced, lost or stolen, and to make it more readily available to the user, when he or she wishes to use it. This may be done via methods which embrace and incorporate the known existing functionality of mobile devices such as mobile phones, smart phones, laptop computers and tablet computers, to which the smoking substitute device can connect, and which does not impose undue processing demands or physical space demands on the smoking substitute device itself.

In one or more aspects of the present disclosure, a user may use the location of the mobile device, with which the smoking substitute device has established a wireless communication link, in order to determine the location of his or her smoking substitute device. For example, a determined location of the mobile device may be recorded as a proxy location of the smoking substitute device in certain circumstances, e.g., when a wireless communication link between the mobile device and the smoking substitute device is established or lost, or periodically while the wireless communication link is live.

It is known for mobile devices such as mobile phones, smart phones, laptop computers and tablet computers to include one or more location components such as a GPS (Global Positioning System) component. If an application is running on a mobile device that includes a location component, the location component may be configured to transmit information regarding the location of the mobile device to the application, or to at least make such information accessible to the application. Therefore, the application may be configured to record and store location information for the mobile device over a period of time, and/or to access location information that may be stored on the smoking substitute device and/or on the mobile device, either regularly or on demand.

One or more aspects of the present disclosure may embody the recognition that an application may be installed and run on a mobile device, wherein that application is configured for management of a smoking substitute device, and wherein that application is further configured to have access to location information for the mobile device. One or more aspects of the present disclosure may also embody the further recognition that, if a wireless communication link is established between a mobile device and a smoking substitute device, the distance range over which the two devices will be able to successfully communicate with one another, via that wireless communication link, will be limited. Therefore, if the wireless communication link between the two devices is active, and the application can determine the location of the mobile device, the user will be able to use that location information for the mobile device in order to determine the location of his or her smoking substitute device, at least to within a manageable distance range. Moreover, it is likely that, as part of his or her day-to-day routine, the user may store, carry or place relatively small devices that he or she uses on a repeated basis throughout the day, such as a mobile device and a smoking substitute device, relatively near to one another. For example, both devices may be stored in a user's pocket or bag, or the user may habitually place such devices on the same surface or in the same drawer, when he or she is at home or at work. Therefore, if the mobile device can be found, there is a likelihood that the smoking substitute will be found nearby.

The present inventor(s) have recognised that, if a user cannot find his or her smoking substitute device, he or she may be able to use the location information for the mobile device with which the smoking substitute device has established a wireless communication link, in order to narrow down the possible locations of the smoking substitute device. If the wireless communication link between the smoking substitute device and the mobile device is still active, this will enable the user to determine the location of the smoking substitute device as being physically remote from the mobile device by no more than the maximum permitted distance range, for those wireless communications.

If, on the other hand, the wireless communication link between the smoking substitute device and the mobile device has been lost, the location information for the mobile device can still be used. In one example, the application may be configured to record (or have access to) location information for the mobile device, over time, and it is further configured to record or access information regarding the times at which, or time periods over which, the wireless communication link between the mobile device and smoking substitute device is/was active. Therefore, the application can correspond the location of the mobile device at a particular time to whether or not the wireless communication link is/was active at that time. This enables it, at a given time at which the wireless communication link between the mobile device and smoking substitute device is found to be lost (i.e., a time at which the connection between the two devices has dropped), to determine the most recent location of the mobile device, at which it was wirelessly connected to the smoking substitute device, before that wireless communication link was lost. The user can use that most recent location, and/or the information on the time at which the devices were last connected, in order to guide his or her search for the smoking substitute device. This should enable the user to find his or her smoking substitute device more easily and more quickly and reduce the risk of the device being lost misplaced or stolen and of it being damaged, for example if it has been dropped on the floor or otherwise placed in a potentially dangerous position.

In another example, an application on the mobile device may run a background process to monitor the status of the wireless communication link with the smoking substitute device. The background process may be configured to record location information for the mobile device upon detecting a change in the status of the wireless communication link, e.g., a connection event (e.g., where a wireless communication link is established between a mobile device and a smoking substitute device) or a dropped connection event (e.g., where the previously established wireless communication link between the smoking substitute device and the mobile device has been lost). The application may store the recorded location information in a log so that a user can access information about the location of connection events with the smoking substitute device.

According to a first aspect of the disclosure, there may be provided a method performed by an application installed on a mobile device, wherein the application is for assisting a user with a smoking substitute device via a wireless communication link established between the smoking substitute device and the mobile device, the method comprising: determining, by a location component in the mobile device, a dropped connection location indicative of a location of the mobile device at which the wireless communication link was lost; and displaying the dropped connection location to a user using a display of the mobile device. The dropped connection location may comprise a location of the mobile device at which the wireless communication link was lost, or a 'most recent' location at which the mobile device recorded the existence of a wireless communication link with the smoking substitute device.

For avoidance of any doubt, "determining, by a location component in the mobile device, a dropped connection location", "determining, via a location component in the mobile device, a dropped connection location" and equivalent expressions are intended to cover any step that involves/uses the location component in determining the dropped connection location. For example, the determining of this location could be performed by a processing component in the mobile device, using data received from the location component. The term "by a location component", "via a location component", and similar expressions may therefore be replaced with "using a location component" herein (and vice versa).

According to a second aspect of the disclosure, there may be provided a computer readable medium containing instructions which, when executed by an application installed on a mobile device, are configured to cause the application to perform the method above, i.e., a method according to the first aspect of the disclosure.

According to a third aspect of the disclosure, there may be provided a mobile device including: a display; a processor configured to run an application for assisting a user with a smoking substitute device; a location component; and a wireless interface; wherein the wireless interface is configured to establish a wireless communication link between the smoking substitute device and the mobile device, and wherein the mobile device is configured to: determine, via the location component, a dropped connection location indicative of a location of the mobile device at which the wireless communication link was lost; and display the dropped connection location to a user using a display of the mobile device.

A mobile device according to the third aspect of the disclosure may be configured to perform any method or method step described in relation to the first aspect of the disclosure. Furthermore, a mobile device according to the third aspect of the disclosure may be configured to perform instructions contained on a computer readable medium according to the second aspect of the disclosure.

According to a fourth aspect of the disclosure, there may be provided a system comprising: a mobile device; and a smoking substitute device, wherein the mobile device comprises: a display; a processor configured to run an application for assisting a user with the smoking substitute device; a location component; and a first wireless interface, wherein the smoking substitute device comprises a second wireless interface, wherein a wireless communication link is established between the first and second wireless interfaces, and wherein the mobile device is configured to: determine, via the location component, a dropped connection location indicative of a location of the mobile device at which the wireless communication link was lost; and display the dropped connection location to a user using a display of the mobile device.

A system according to the fourth aspect of the disclosure may comprise a mobile device according to the third aspect of the disclosure. A system according to the fourth aspect of the disclosure may be configured to perform any method or method step described in relation to the first aspect of the disclosure. Furthermore, a system according to the fourth aspect of the disclosure may comprise a mobile device configured to perform instructions contained on a computer readable medium according to the second aspect of the disclosure.

In any of these aspects, the smoking substitute device may be network-enabled, in that it comprises a wireless interface which can communicate wirelessly, via a wireless network, with a communication terminal of the mobile device. Communication can be, for example, over a short-range network or protocol, such as Bluetooth™.

The term "lost" in relation to a wireless communication link may mean that the wireless communication link between the two devices is absent, e.g., discontinued, usually temporarily, or has become inactive, such that a wireless signal cannot be successfully transmitted by the first wireless interface, for example on the mobile device, and received by the second wireless interface, for example on the smoking substitute device, or vice versa. This occurrence may also be referred to as the (wireless) connection between the two devices being "dropped". The terms "lost" and "dropped" may be used interchangeably herein with respect to the wireless communication link.

A wireless communication link may be "lost" if, for example, the two devices are separated by too great a distance, which exceeds the maximum permitted distance range for the type of wireless signals that the devices are configured to transmit and receive. Alternatively, the wireless communication link may be "lost" if, for example, the wireless capability of one or both of the devices is switched off, meaning that the wires interface of the relevant device(s) could not function, at that time. This may occur due to a deliberate action by the user, in that the mobile device and/or the smoking substitute device may include an actuator or other input mechanism, via which the user can switch the wireless capability of the respective device on and off. Alternatively, it may occur due to an operational failure within a device, which means its wireless interface cannot function correctly. Alternatively, switching off the wireless capability of, for example, the smoking substitute device may occur when it is in a particular operating mode, for example a low power operating mode, wherein operation of non-core functions of the device may be switched off automatically or manually, to conserve battery power.

The term "dropped connection location" may mean a location that the location component data indicates as being the location of the mobile device, at a time at which the wireless connection between the mobile device and the smoking substitute device was "dropped". It may be the location of the mobile device at the most recent time at which the connection was dropped (i.e., at which the link was lost), if the link has been lost multiple times. Alternatively, in examples where the location component data records locations at which the wireless communication link exists, the dropped connection location may be the location of the last recorded connection.

The steps for establishing a wireless communication link between the smoking substitute device and a mobile device may follow any suitable protocol. For example, if Bluetooth™ is used, the user can activate the Bluetooth™ functionalities of the smoking substitute device and of his or her selected mobile device, with which a wireless communication link is to be established, and the two devices can identify themselves to one another, exchange Bluetooth™ messages, and form a wireless communication link. The exchange should preferably involve suitable security steps, to ensure that the correct two devices form the wireless communication link. For example, the two devices may form a paired wireless communication link, which is secure, and which is an exclusive communication link, between those two individual devices. In order to form a paired wireless communication link, the devices should exchange security data such as encryption keys, passwords or codes. The devices may each be configured to store the encryption key received from the respective other, and to re-use that encryption key each time a connection between the two devices is required. This is known as establishing a bonded wireless communication link.

The steps for establishing a wireless communication link between the smoking substitute device and a mobile device may comprise any suitable combination of user-implemented, computer-implemented and hardware-implemented steps. For example, specific user input should be required in order to identify the mobile device, with which the smoking substitute device may establish a wireless communication link. However, some or all of the steps involved in establishing wireless communication links between the smoking substitute device and the mobile device(s), and the subsequent wireless transmissions between the devices, may happen without any specific user input being required.

When a mobile device has established a wireless communication link with a smoking substitute device, the devices may share data via that link. For example, the smoking substitute device may submit data regarding some of its hardware components, such as its battery, to the mobile device. An application running on the mobile device may access some of that data for storage, or possibly for making determinations—for example, for determining remaining battery power from battery output voltage levels.

The step of displaying the dropped connection location may be performed upon receiving a request at the mobile device. For example, the application may include an option to "find my device". The step of determining the dropped connection location may be performed upon receiving the request. As explained below, the application may be arranged to run a process (e.g., in the background) that records events to assist in determining the dropped connection location.

The step of displaying the dropped connection location (using a display of the mobile device) may be performed automatically (i.e., without requiring user input) if the application determines that the wireless communication link has been lost (see e.g., FIGS. 23 and 24A described below).

Displaying the dropped connection location automatically each time the application determines that the wireless communication link has been lost could be distracting for a user of the mobile device, since a lost wireless communication link is not always indicative of a smoking substitute device being accidentally lost.

Accordingly, the step of displaying the dropped connection location may be performed automatically if (preferably only if) the application determines that the wireless communication link has been lost and that a misplacement criterion is met.

A misplacement criterion may be defined as a criterion indicative that the smoking substitute device has been misplaced, lost or stolen (other than the wireless communication link being lost).

Multiple misplacement criteria may exist, and the step of displaying the dropped connection location may be performed automatically (i.e., without requiring user input), if the application determines that the wireless communication link has been lost and any one or more of the multiple misplacement criteria is met.

By way of example, the application may determine that a misplacement criterion is met if the application determines that the location of the mobile device (e.g., as determined using the location component in the mobile device) is more than a predetermined distance (e.g., 100 metres) from the dropped connection location.

By way of example, the application may determine that a misplacement criterion is met if the application determines that more than a predetermined length of time (e.g., 30 minutes) has elapsed since a most recent dropped connection time, wherein a dropped connection time comprises a time at which the wireless connection between the smoking substitute device and the mobile device was lost (as determined by the application).

Such criteria may help to ensure that the dropped connection location is displayed at times that are more relevant to a user.

Automatically displaying the dropped connection location (using a display of the mobile device) as described above may be suppressed, if the relevant wireless capability of the mobile device (used to connect to the smoking substitute device) is switched off, to avoid distracting a user.

In one example, the method further comprises: monitoring, by the application, a status of the wireless communication link; and recording, in a log on the mobile device, a location of the mobile device obtained from the location component upon detecting that the wireless communication link is lost. The step of determining the dropped connection location may thus comprise reading an entry, e.g., the most recent entry, from the log. The log may be configured to store only one entry, which is overwritten each time the wireless communication link is lost.

The log may record a location or a data structure indicative of location. For example, the method may further comprise recording, in a log on the mobile device, a location identifier associated with activity on the wireless communication link. This activity need not be limited to loss of the wireless communication link. The step of determining the dropped connection location may comprise reading an entry from the log and obtaining a location corresponding to the location identifier. The location identifier may be a time stamp. For example, the mobile device may store telemetry data that includes a history of the location of the mobile device over time. The step of obtaining a location corresponding to the location identifier may therefore comprise determining a location from the telemetry data using the time stamp read from the log.

The application may also determine a dropped connection time, wherein the dropped connection time comprises a time at which the wireless connection between the smoking substitute device and the mobile device was lost, and the dropped connection time may be displayed to the user via a display of the mobile device.

Herein, the "time" at which the wireless communication link has been lost, or the connection dropped, may not be an instantaneous time. It may comprise a time range. For example, the magnitude of a first time interval between points when the location component determines the location of the mobile device may not be the same as a second time interval between points when the mobile device and smoking substitute device are configured to transmit or receive signals from one another. For example, the first time interval may be different from a predetermined time-out period for the wireless communication link, i.e., an amount of time required to elapse before the mobile device means determines that the wireless communication link has been lost or dropped. The "time", as determined by the application, at which the wireless communication link has been lost, or the connection dropped, may comprise a time range or period, which may represent the intersection or overlap between the time (interval) at which the wireless communication link is determined to have been lost and the closest time (interval) for which location of the mobile device has been determined, by the location component. The "time" may comprise, for example, a midpoint of a time period or an average of two or more time intervals.

The step of displaying the dropped connection location to a user via a display of the mobile device may comprise displaying the dropped connection location on a map. For example, the dropped connection location may be shown as a pointer or other marker on a map. The map may also show the user's current location.

Alternatively, or additionally, the dropped connection location may be displayed to the user, via a display of the mobile device, as an address and/or as GPS coordinates.

The step of displaying the dropped connection location to a user (using a display of the mobile device) may take the form of a step of displaying a notification, e.g., a pop-up notification, which includes the dropped connection location using a display of the mobile device.

This notification preferably also alerts the user that the wireless communication link has been lost (e.g., as discussed in relation to the fifth aspect of the disclosure, discussed below), though this is not essential.

This notification may also indicate a dropped connection time.

The dropped connection location displayed to a user (e.g., as included in a notification) may be a written description of a place associated with the dropped connection location (e.g., "Work", "Home"), rather than an address or GPS coordinates. A written description such as "Work" or "Home" may provide more meaning to a user, than an address or GPS coordinates. The application may be configured to derive the written description of a place associated with the dropped connection location based on usage data (e.g., concerning where/when the smoking device has been used), e.g., as collected by the application. The application may be configured to derive the written description of a place associated with the dropped connection location based on user input at the mobile device. The application may be configured to derive the written description of a place associated with the dropped connection location based on third party data, provided to the application (e.g., from a third party maps application).

The user may be able to provide inputs to the application, to select how the dropped connection location should be displayed.

The location component included in the mobile device, which is used to determine a dropped connection location, may comprise a GPS (Global Positioning System) device.

The location component may be configured to report location information for the mobile device, to the application, using any suitable steps and at any suitable time intervals. Such location information may be updated at regular intervals. The application may be configured so that the user can select whether and under what conditions the application can access location information, from the location component. The application may be configured so that the user can select whether the application has access to location information, from the location component, at all times or, for example, just when the application is open on the user's mobile device. Alternatively, the application may be configured to only access location data from the location component when there is a specific user command to the application that requires the output of location data.

According to an embodiment, the application may be granted access to location information, from the location component, at all times, or at least at regular intervals, regardless of whether the application is open on the user's mobile device. This may help enable the application to determine a location of the mobile device at a time at which a wireless communication link between the smoking substitute device and the mobile device was lost, regardless of whether the application was open on the mobile device, at that time.

If the wireless communication link is, for example, a bonded wireless communication link, which is an ongoing, secure wireless communication link between the two devices, there may be different options as to what 'mode' the wireless interfaces of the two devices operate in, as regards to how often they transmit messages to one another, and how often they look for messages from the respective other. For example, they may be configured to be in an "active mode" in which at least one device is actively transmitting (and the respective other device actively receiving) data at regular intervals. Alternatively, they may be configured to be in a power-saving mode, where the devices are less active. For example, in such a mode (which may be referred to as a "sniff mode") the wireless interfaces of the device(s) may only listen for transmissions from one another at a set interval (e.g., every 100 ms), and sleep in between. Alternatively, they may be configured, at certain times at least, to be in a "hold mode", which may be a temporary, power-saving mode wherein the wireless interface of a device sleeps for a defined period and then returns back to active mode when that interval has passed. Alternatively, they may be configured, at certain times at least, to be in a "park mode" which is a deep sleep mode for the wireless interface(s). For example, the mobile device (or an application running on the mobile device) may instruct the smoking substitute device to enter "hold mode" or "park mode" for operational reasons, for example to conserve battery power.

In order to determine whether the wireless communication link between a smoking substitute device and a mobile device has been lost or dropped, a control means on the mobile device, or within the application, may be configured to monitor, or at least to access a record of, the wireless transmissions between the wireless interfaces of the two devices (i.e., of the mobile device and the smoking substitute device). The control means may be configured to determine whether there is a discontinuity or gap in those transmissions, as compared to what would ordinarily be expected for the current operating modes of the wireless interfaces. For example, if the devices are configured to be in an "active mode", the control means may expect the devices to transmit/receive to/from the respective other, at regular time intervals of, for example, 1.0 ms. If the control means detects a time interval of greater than 1.0 ms, it may determine that the wireless communication link has been lost or dropped.

For example, a control means may be configured so that it must detect a gap or discontinuity of more than one "regular" transmission (or transmission opportunity) between the devices, before it determines that the wireless communication link has been lost, or the connection between the devices dropped. For example, the control means may be configured so that it must detect a gap or discontinuity of more than a predetermined amount of time, since the most recent transmission between the devices, before it determines that the wireless communication link has been lost or dropped.

The mobile device, and/or the application, may be configured to alert the user if it has been determined that the wireless communication link has been lost or dropped. For example, if the application determines that the wireless communication link has been lost or dropped, it may alert the user via an output of the mobile device. For example, it may prompt a message to flash up on the screen of the user's mobile device. For example, the application may be configured to determine whether the wireless capability of the smoking substitute device and/or of the mobile device has been deliberately switched off by the user, before it alerts the user that the wireless communication link has been lost or dropped.

The smoking substitute device itself may comprise a control means that is configured to detect if the wireless communication link between it and the mobile device is lost. The smoking substitute device may be configured to issue an alert to the user, if this happens. For example, the alert may comprise a flashing light or a warning message on an LED screen.

The application may be accessible to the user via more than one mobile device. Therefore, if the user misplaces both the mobile device to which the smoking substitute device is linked, and the smoking substitute device itself, he or she may access the application to carry out a method for finding the smoking substitute device via a second, different mobile device. In such an embodiment, the application may output a current location of the mobile device, even if the wireless communication link between it and the smoking substitute device is not currently active. The application may include security features such as user identification and password(s) to help prevent misuse of the methods described herein by a non-authorised user.

There will now be described further aspects of the disclosure, in which both the determining and displaying of a dropped connection location (as described in relation to previous aspects of the disclosure) are optional.

According to a fifth aspect of the disclosure, there may be provided a method performed by an application installed on a mobile device, wherein the application is for assisting a user with a smoking substitute device via a wireless communication link established between the smoking substitute device and the mobile device, the method comprising: automatically (i.e., without requiring user input) displaying a notification to alert the user that the wireless communication link has been lost using a display of the mobile device, if the application determines that the wireless communication link has been lost.

The notification may e.g., be a pop-up notification.

The notification preferably also includes a dropped connection location (e.g., determined using a location component in the mobile device, e.g., as discussed above in relation to the first-fourth aspects of the disclosure), though this is not essential. For example, instead of including a dropped connection location, the notification may merely indicate that the wireless communication link has been lost, with the user being left to determine the location of the smoking substitute device.

The notification may also indicate a dropped connection time.

In some embodiments, the notification may be configured to reveal a dropped connection location, only if the notification or an element of the notification is selected (e.g., via a touch screen interface of the mobile device) by the user. For example, the notification may be configured to open the application to reveal the dropped connection location (e.g., on a map), only if the notification or an element of the notification is selected (e.g., via a touch screen interface of the mobile device).

Displaying a notification (to alert the user that the wireless communication link has been lost) each time the application determines that the wireless communication link has been lost could be distracting for a user of the mobile device, since a lost wireless communication link is not always indicative of a smoking substitute device being accidentally lost or stolen.

Accordingly, the step of automatically displaying a notification (to alert the user that the wireless communication link has been lost), may be performed if (preferably only if) the application determines that the wireless communication link has been lost and that a misplacement criterion is met.

A misplacement criterion may be defined as a criterion indicative that the smoking substitute device has been misplaced, lost or stolen (other than the wireless communication link being lost).

Multiple misplacement criteria may exist, and the step of automatically displaying a notification to alert the user that the wireless communication link has been lost, may be performed if (preferably only if) the application determines that the wireless communication link has been lost and any one or more of the multiple misplacement criteria is met.

By way of example, the application may determine that a misplacement criterion is met if the application determines that the location of the mobile device (e.g., as determined using the location component in the mobile device) is more than a predetermined distance (e.g., 100 metres) from a dropped connection location determined using a location component in the mobile device.

By way of example, the application may determine that a misplacement criterion is met if the application determines that more than a predetermined length of time (e.g., 30 minutes) has elapsed since a most recent dropped connection time, wherein the most recent dropped connection time is a time at which the wireless connection between the smoking substitute device and the mobile device was most recently lost (as determined by the application).

Such criteria may help to ensure that the notification (to alert the user that the wireless communication link has been lost) is displayed only at times that are more relevant to a user.

Automatically displaying a notification as described above may be suppressed, if the relevant wireless capability of the mobile device (used to connect to the smoking substitute device) is switched off, to avoid distracting a user.

According to a sixth aspect of the disclosure, there may be provided a computer readable medium containing instructions which, when executed by an application installed on a mobile device, are configured to cause the application to perform a method according to the fifth aspect of the disclosure.

According to a seventh aspect of the disclosure, there may be provided a mobile device including: a display; a processor configured to run an application for assisting a user with a smoking substitute device; optionally, a location component; and a wireless interface; wherein the wireless interface is configured to establish a wireless communication link between the smoking substitute device and the mobile device, and wherein the mobile device is configured to: automatically (i.e., without requiring user input) display a notification to alert the user that the wireless communication link has been lost using a display of the mobile device, if the application determines that the wireless communication link has been lost.

Note that in this seventh aspect of the disclosure, the presence of a location component in the mobile device is optional, because the notification need not include a dropped connection location.

A mobile device according to the seventh aspect of the disclosure may be configured to perform a method according to the fifth aspect of the disclosure. Furthermore, a mobile device according to the seventh aspect of the disclosure may be configured to perform the instructions contained on a computer readable medium according to the sixth aspect of the disclosure. According to an eighth aspect of the disclosure, there may be provided a system comprising: a mobile device; and a smoking substitute device, wherein the mobile device comprises: a display; a processor configured to run an application for assisting a user with the smoking substitute device; optionally, a location component; and a first wireless interface, wherein the smoking substitute device comprises a second wireless interface, wherein a wireless communication link is established between the first and second wireless interfaces, and wherein the mobile device is configured to: automatically (i.e., without requiring user input) display a notification to alert the user that the wireless communication link has been lost using a display of the mobile device, if the application determines that the wireless communication link has been lost.

A system according to the eighth aspect of the disclosure may comprise a mobile device according to the seventh aspect of the disclosure. A system according to the eighth aspect of the disclosure may be configured to perform a method according to the fifth aspect of the disclosure. Furthermore, a system according to the eighth aspect of the disclosure may comprise a mobile device configured to perform the instructions contained on a computer readable medium according to the sixth aspect of the disclosure.

The disclosure includes the combination of the aspects and preferred features described except where such a combination is clearly impermissible or expressly avoided.

The skilled person will appreciate that except where mutually exclusive, a feature or parameter described in relation to any one of the above aspects may be applied to any other aspect. Furthermore, except where mutually exclusive, any feature or parameter described herein may be applied to any aspect and/or combined with any other feature or parameter described herein.

DETAILED DESCRIPTION OF THE DISCLOSURE

Aspects and embodiments of the present disclosure will now be discussed with reference to the accompanying figures. Further aspects and embodiments will be apparent to those skilled in the art. All documents mentioned in this text are incorporated herein by reference.

FIG. 18 shows an example system 1 for managing a smoking substitute device 10.

The system 1 as shown in FIG. 18 includes a mobile device 2, an application server 4, an optional charging station 6, as well as the smoking substitute device 10.

The smoking substitute device 10 is configured to communicate wirelessly, e.g., via Bluetooth™, with an application (or "app") installed on the mobile device 2, e.g., via a suitable wireless interface (not shown) on the mobile device 2. The mobile device 2 may be a mobile phone, for example. The application on the mobile phone is configured to communicate with the application server 4, via a network 8. The application server 4 may utilise cloud storage, for example.

The network 8 may include a cellular network and/or the internet.

A skilled person would readily appreciate that the mobile device 2 may be configured to communicate via the network 8 according to various communication channels, preferably a wireless communication channel such as via a cellular network (e.g., according to a standard protocol, such as 3G or 4G) or via a WiFi network. In embodiments of the disclosure, the mobile device 2 comprises a location tracking component configured to obtain location information for the mobile device 2, e.g., using GPS or the like. Other types of location components may be included in a mobile device 2, for example a GLONASS (Global Navigation Satellite System) component.

The app installed on the mobile device 2 and the application server 4 may be configured to assist a user with their smoking substitute device 10, based on information communicated between the smoking substitute device 10 and the app and/or information communicated between the app and the application server 4.

The charging station 6 (if present) may be configured to charge (and optionally communicate with) the smoking substitute device 10, via a charging port on the smoking substitute device 10. The charging port on the smoking substitute device 10 may be a USB port, for example, which may allow the smoking substitute device to be charged by any USB-compatible device capable of delivering power to the smoking substitute device 10 via a suitable USB cable (in this case the USB-compatible device would be acting as the charging station 6). Alternatively, the charging station could be a docking station specifically configured to dock with the smoking substitute device 10 and charge the smoking substitute device 10 via the charging port on the smoking substitute device 10.

FIG. 19A shows an example smoking substitute device 110 for use as the smoking substitute device 10 in the system 1 of FIG. 18.

In this example, the smoking substitute device 110 includes a main body 120 and a consumable 150. The consumable 150 may alternatively be referred to as a "pod".

In this example, the smoking substitute device 110 is a closed system vaping device, wherein the consumable 150 includes a sealed tank 156 and is intended for one-use only.

FIG. 19A shows the smoking substitute device 110 with the main body 120 physically coupled to the consumable 150.

FIG. 19B shows the main body 120 of the smoking substitute device 110 without the consumable 150.

FIG. 19C shows the consumable 150 of the smoking substitute device 110 without the main body 120.

The main body 120 and the consumable 150 are configured to be physically coupled together, in this example by pushing the consumable 150 into an aperture in a top end 122 of the main body 120, e.g., with the consumable 150 being retained in the aperture via an interference fit. In other examples, the main body 120 and the consumable could be physically coupled together by screwing one onto the other, through a bayonet fitting, or through a snap engagement mechanism, for example. An optional light 126, e.g., an LED located behind a small translucent cover, is located a bottom end 124 of the main body 120. The light 126 may be configured to illuminate when the smoking substitute device 110 is activated.

The consumable 150 includes a mouthpiece (not shown) at a top end 152 of the consumable 150, as well as one or more air inlets (not shown in FIG. 19) so that air can be drawn into the smoking substitute device 110 when a user inhales through the mouthpiece. At a bottom end 154 of the consumable 150, there is located a tank 156 that contains e-liquid. The tank 156 may be a translucent body, for example.

The tank 156 preferably includes a window 158, so that the amount of e-liquid in the tank 156 can be visually assessed. The main body 120 includes a slot 128 so that the window 158 of the consumable 150 can be seen whilst the rest of the tank 156 is obscured from view when the consumable 150 is inserted into the aperture in the top end 122 of the main body 120.

In this present embodiment, the consumable 302 is a "single-use" consumable. That is, upon exhausting the e-liquid in the tank 156, the intention is that the user disposes of the whole consumable 150. In other embodiments, the e-liquid (i.e., aerosol former) may be the only part of the system that is truly "single-use". In such embodiments, the tank 156 may be refillable with e-liquid or the e-liquid may be stored in a non-consumable component of the system. For example, the e-liquid may be stored in a tank located in the device or stored in another component that is itself not single-use (e.g., a refillable tank).

The tank 156 may be referred to as a "clearomizer" if it includes a window 158, or a "cartomizer" if it does not.

FIG. 20A is a schematic view of the main body 120 of the smoking substitute device 110.

FIG. 20B is a schematic view of the consumable 150 of the smoking substitute device 110.

As shown in FIG. 20A, the main body 120 includes a power source 128, a control unit 130, a memory 132, a wireless interface 134, an electrical interface 136, and, optionally, one or more additional components 138.

The power source 128 is preferably a battery, more preferably a rechargeable battery.

The control unit 130 may include a microprocessor, for example.

The memory 132 preferably includes non-volatile memory.

The wireless interface 134 is preferably configured to communicate wirelessly with the mobile device 2, e.g., via Bluetooth. To this end, the wireless interface 134 could include a Bluetooth™ antenna. Other wireless communication interfaces, e.g., WiFi, are also possible.

The electrical interface 136 of the main body 120 may include one or more electrical contacts. The electrical interface 136 may be located in, and preferably at the bottom of, the aperture in the top end 122 of the main body 120. When the main body 120 is physically coupled to the consumable 150, the electrical interface 136 may be configured to pass electrical power from the power source 128 to (e.g., a heating device of) the consumable 150 when the smoking substitute device 110 is activated, e.g., via the electrical interface 160 of the consumable 150 (discussed below). When the main body 120 is not physically coupled to the consumable 150, the electrical interface may be configured to receive power from the charging station 6.

The additional components 138 of the main body 120 may include the optional light 126 discussed above.

The additional components 138 of the main body 120 may, if the power source 128 is a rechargeable battery, include a charging port configured to receive power from the charging station 6. This may be located at the bottom end 124 of the main body 120. Alternatively, the electrical interface 136 discussed above is configured to act as a charging port configured to receive power from the charging station 6 such that a separate charging port is not required.

The additional components 138 of the main body 120 may, if the power source 128 is a rechargeable battery, include a battery charging control circuit, for controlling the charging of the rechargeable battery. However, a battery charging control circuit could equally be located in the charging station 6 (if present).

The additional components 138 of the main body 120 may include an airflow sensor for detecting airflow in the smoking substitute device 110, e.g., caused by a user inhaling through a mouthpiece 166 (discussed below) of the smoking substitute device 110. The smoking substitute device 110 may be configured to be activated when airflow is detected by the airflow sensor. This optional sensor could alternatively be included in the consumable 150 (though this is less preferred where the consumable 150 is intended to be disposed of after use, as in this example).

The additional components 138 of the main body 120 may include an actuator, e.g., a button. The smoking substitute device 110 may be configured to be activated when the actuator is actuated. This provides an alternative to the airflow sensor noted, as a mechanism for activating the smoking substitute device 110.

The additional components 138 of the main body 120 may include a reader configured to read information associated with the consumable from a machine readable data source included in (e.g., contained in the body of, or attached to) the consumable 150.

The reader may be configured to read information from the machine readable data source wirelessly, e.g., via electromagnetic waves or optically. Thus, for example, the machine readable data source included in the consumable 150 could be an RFID tag (in which case the reader included in the main body 120 may be an RFID reader) or a visual data source such as a barcode (in which case the reader included in the main body may be an optical reader, e.g., a barcode scanner). Various wireless technologies and protocols may be employed to allow the reader to wirelessly read information from a machine readable data source included in or attached to the consumable 150, e.g., NFC, Bluetooth, Wi-Fi, as would be appreciated by a skilled person.

For avoidance of any doubt, the reader (if present) may be configured to read information from the machine readable data source non-wirelessly, e.g., using a direct electrical connection between the main body 120 and consumable 150.

As shown in FIG. 20B, the consumable 150 includes the tank 156, an electrical interface 160, a heating device 162, one or more air inlets 164, a mouthpiece 166, and, optionally, one or more additional components 168.

The electrical interface 160 of the consumable 150 may include one or more electrical contacts. The electrical interface 136 of the main body 120 and an electrical interface 160 of the consumable 150 are preferably configured to contact each other and therefore electrically couple the main body 120 to the consumable 150 when the main body 120 is physically coupled to the consumable 150. In this way, electrical energy (e.g., in the form of an electrical current) is able to be supplied from the power source 128 in the main body 120 to the heating device 162 in the consumable 150.

The heating device 162 is preferably configured to heat e-liquid contained in the tank 156, e.g., using electrical energy supplied from the power source 128. In one example, the heating device 162 may include a heating filament and a wick, wherein a first portion of the wick extends into the tank 156 in order to draw e-liquid out from the tank 156, and wherein the heating filament coils around a second portion of the wick located outside the tank 156. In this example, the heating filament is configured to heat up e-liquid drawn out of the tank 156 by the wick to produce an aerosol vapour.

The one or more air inlets 164 are preferably configured to allow air to be drawn into the smoking substitute device 110, when a user inhales through the mouthpiece 166.

The additional components 168 of the consumable 150 may include a machine readable data source, which may e.g., be contained in the body of, or attached to the consumable 150. The machine readable data source may store information associated with the consumable. The information associated with the consumable may include information concerning the content of the consumable (e.g., e-liquid type, batch number) and/or a unique identifier, for example.

The machine readable data source may be rewritable, e.g., a rewritable RFID chip, or read only, e.g., a visual data source such as a barcode. As indicated above, the additional components 138 of the main body 120 may include a reader configured to read information associated with the consumable from the machine readable data source.

In use, a user activates the smoking substitute device 110, e.g., through actuating an actuator included in the main body 120 or by inhaling through the mouthpiece 166 as described above. Upon activation, the control unit 130 may supply electrical energy from the power source 128 to the heating device 162 (via electrical interfaces 136, 166), which may cause the heating device 162 to heat e-liquid drawn from the tank 156 to produce a vapour which is inhaled by a user through the mouthpiece 166.

Of course, a skilled reader would readily appreciate that the smoking substitute device 110 shown in FIGS. 19 and 20 shows just one example implementation of a smoking substitute device, and that other forms of smoking substitute device could be used as the smoking substitute device 10 of FIG. 18.

By way of example, a HNB smoking substitute device including a main body and a consumable could be used as the smoking substitute device 10 of FIG. 18, instead of the smoking substitute device 110. One such HNB smoking substitute device is the IQOS™ smoking substitute device discussed above.

As another example, an open system vaping device which includes a main body, a refillable tank, and a mouthpiece could be used as the smoking substitute device 10 of FIG. 18, instead of the smoking substitute device 110. One such open system vaping device is the blu PROT™ e-cigarette discussed above.

As another example, an entirely disposable (one use) smoking substitute device could be used as the smoking substitute device 10 of FIG. 18, instead of the smoking substitute device 110.

Embodiments of the present disclosure relate to the management and use of a network-enabled smoking substitute device such as that discussed above in relation to FIGS. 18 and 20A. In particular, they relate to providing a reliable and useful means for locating a user's smoking substitute device, if it has established a wireless communication link with a mobile device, for example a mobile phone, smart phone, laptop computer or tablet computer. The embodiments do not require any additional hardware or software to be incorporated into the smoking substitute device, in order for it to be locatable, as described herein. Instead, the embodiments utilise known, pre-existing functionality of a mobile device, and harness its usefulness in relation to a smoking substitute device with which the mobile device is configured to wirelessly communicate.

As described in more detail below, by using location information from a location component of a mobile device, such as a GPS component, an application running on the mobile device can record and store (or at least access) location information for the mobile device. In addition, by using information from the wireless interface of the mobile device, regarding the wireless transmissions transmitted and received between the mobile device and a smoking substitute device with which it is configured to communicate, the application can record and store (or at least access) telemetry data—such as whether the wireless communication link is in place and operating correctly. The application may operate to correlate location information with the telemetry data in order to match a particular functionality with a particular location. In embodiments of the disclosure, the functionality of interest is the existence or not of a wireless communication link to a smoking substitute device. The application may thus be used to find a smoking substitute device by determining a location that corresponds to a dropped connection event (e.g., where a previously established wireless communication link between the smoking substitute device and the mobile device has been lost) or a "last known connection" event (e.g., where a previously established wireless communication link between the smoking substitute device and the mobile device most recently existed).

In one example, if the user wishes to find his or her smoking substitute device, he or she can access the application to determine whether the wireless communication link is currently active—i.e., whether or not the connection has been lost or dropped. If the wireless communication link is currently active, the user can infer that the smoking substitute device will be located within the wireless transmission range for the devices and direct his or her search accordingly. If the user discovers that the wireless communication link is not currently active, but has been lost, the application can still assist in locating the smoking substitute device by correlating stored location information with the telemetry data and, as a result, informing the user as to the location of the mobile device, when the communication link to the smoking substitute device was lost. This information can then be used to direct his or her search for the smoking substitute device, e.g., by directing the user to close to (i.e., within the wireless transmission range of) the last known location of the mobile device when the communication link to the smoking substitute device was lost.

An embodiment will now be described in which a Bluetooth™ connection is employed for communications between a smoking substitute device and a mobile device. Both devices have Bluetooth™ wireless interfaces. However other types of connection are possible, as described above in relation to FIG. 18, and the operational considerations for Bluetooth™ communication will be relevant to other connection types.

The smoking substitute device in the following example embodiment is of the type described above in relation to FIGS. 18 and 20A, which can form a wireless connection to a device running an application, such as a mobile phone, smart phone, tablet or laptop computer. At the beginning of the method, it is to be taken that the smoking substitute device does not yet have any established wireless communication links to any specific mobile devices. For the purpose of the described method, it is to be taken that the user has the requisite authority and/or permissions, to implement this method on his or her chosen devices.

Referring to FIG. 21, at the initial step 410 of the method 400, the user of the smoking substitute device selects a first mobile device, which he or she wishes to use to wirelessly communicate with his or her smoking substitute device. In this embodiment, the selected (first) mobile device comprises the user's mobile phone. It includes a location component, which in this embodiment is a GPS component. Other types of location components may be included in a mobile device, for example a GLONASS (Global Navigation Satellite System) component.

At the second step 420 of the method 400, the user installs an application on the selected mobile device, for managing, and controlling communications with, the smoking substitute device. The process of installing (or "downloading") applications onto mobile devices is well known and will not be described further herein. It is noted that, in almost all cases, there will be at least one security step involved in installing an application onto a mobile device. For example, the user may have to input a password and/or use his or her biometric data such as a fingerprint or thumbprint to show that he or she has the authority and/or permissions to install the application onto the mobile device.

Although step 420 is shown and described as being the second step of the specific method 400 described herein, it may be performed either before or after step 430, detailed below. The establishment of a wireless communication link, as described below for step 430, can be performed without the application being installed on the user's mobile device.

At the next step 430 of the method 400, the user establishes a wireless communication link between the smoking substitute device and the mobile device. At this point, because there are no established communication links between it and any mobile devices, and because it is seeking to establish a communication link rather than seeking to transfer data as yet, the wireless interface (such as the Bluetooth™ antenna) of the smoking substitute device will be operating in a so-called "advertising" mode. It is known for so-called "peripheral" wireless devices, such as a smoking substitute device, which interface with so-called "host" wireless devices, such as a mobile device, to operate in an advertising operating mode, in order to broadcast information defining their intentions. In this case, the intention of the smoking substitute device is to establish a wireless communication link with a host device—i.e., the user's mobile device, on which the relevant application is running.

In order to prompt his or her smoking substitute device to begin operating in an advertising operating mode, the user may take any suitable steps, depending on the particulars of the device. For example, there may be a button or other actuator for switching on the Bluetooth™ capabilities of the device. The device may default to being in an advertising operating mode, when its Bluetooth™ capabilities are switched on, in the absence of any bonded communication links already being in place. For example, there may be a predetermined period of time, after the device is switched on (or Bluetooth™ capabilities are switched on), during which the smoking substitute device will operate in an advertising operating mode. For example, there may be a predetermined period of time after the user performs a certain predetermined input or action, such as shaking or tapping the device, during which it will operate in an advertising operating mode.

Because the smoking substitute device does not yet have an established wireless communication link with any particular mobile device, the advertisement message sent out by the smoking substitute device at step 430 will be a general advertisement message, which is receivable by any host device or potential host device within the wireless communication range of the smoking substitute device, at that time.

The manner in which a wireless interface of a peripheral device, such as a Bluetooth™ antenna, issues advertisement messages is well known and so will not be described in detail herein. In general terms, the user may have to provide an input to the smoking substitute device to activate its Bluetooth™ capabilities, in order for it to be 'found' by the user's mobile device. Or this may happen automatically.

Once the Bluetooth™ advertisement message has been sent by the smoking substitute device, the next step 440 is for the user's mobile device to issue a response, or series of responses, which results in a wireless communication link being formed between the smoking substitute device and the mobile device.

For example, the advertising message issued by the smoking substitute device may include instructions for a mobile device on what it expects or demands in a response from a mobile device, in order for it to connect to the smoking substitute device. The user should ensure that the mobile device, which he or she wishes to connect to the smoking substitute device, has its Bluetooth™ capabilities switched on, so that it can scan for and receive the advertising message from the smoking substitute device. Once the advertising message has been received by the mobile device, it can read the instructions therein and then respond by issuing an advertising message including whatever form of response the smoking substitute device has demanded. When the smoking substitute device has received a satisfactory response from the mobile device, it can then initiate a pairing process, wherein the two devices share an encryption key or other authorisation data, in order to identify each to the other and form a secure wireless communication link between the two devices. When this link has been established, the two devices are "paired". According to the present embodiment, the two devices will store the encryption keys, and reuse them each time they reconnect to one another. Because of this, they establish a "bonded" wireless communication link to one another. However, in other embodiments there need not be a bonded wireless communication link.

It will be appreciated that other protocols may be followed, in order to form a bonded wireless communication link between the smoking substitute device and the mobile device.

Once the bonded wireless communication link has been formed, at step 440, between the smoking substitute device and the user's mobile device, any subsequent advertising messages issued by the wireless interface of the smoking substitute device will be addressed to the user's mobile device. Moreover, any data transfer messages from the smoking substitute device will be directed only to the user's mobile device.

According to some embodiments, it may be possible for the user to permit the establishment of wireless communication links between the smoking substitute device and two or more, different mobile devices. However, for the purpose of illustration, the present embodiment comprises just one bonded wireless communication link, between the smoking substitute device and one mobile device.

The application on the mobile device in this embodiment is configured to have access to telemetry data regarding the wireless transmissions between the smoking substitute device and the mobile device, via the bonded wireless communication link. The application may be configured to record/store the telemetry data and/or it may have permission to access telemetry data that has been recorded/stored on a memory of the mobile device. It may be configured to monitor telemetry data as a function of time. In particular, it may run a background process that is configured to check for any anomalies that indicate that the wireless communication link may have been lost or become inactive. For example, it may compare the actual pattern of intervals (and/or times) at which the wireless communication link is opened up for signal transmission between the two devices, to an expected pattern for the current operating mode of the devices. If the comparison indicates that the wireless communication link is, or has been, inactive or "lost", this may be recorded by the application, along with the time (or time period) for which this inactivity or loss has occurred. The application may check for any anomalies that indicate that the wireless communication link may have been lost or become inactive on a regular basis, as part of its normal operation. Alternatively, it may only check for any anomalies that indicate that the wireless communication link may have been lost or become inactive when prompted to do so by the user.

The application on the mobile device in this embodiment is also configured to have access to location data for the mobile device, as obtained by the GPS component of the mobile device. The application may be configured to record/store the location data within its own memory and/or it may have permission to access location data that has been recorded/stored on a memory of the mobile device. The location data may be stored in any suitable memory type. The location data may comprise any suitable indicator of the mobile device's location as a function of time. For example, it may comprise GPS coordinates and/or locations on a map.

According to the embodiments described herein, a user may use the application on his or her mobile device in order to locate his or her smoking substitute device. This can be further understood in relation to FIG. 22, herein.

Referring to the method 500 of FIG. 22, at step 510, for example when the user has decided that he or she is unable to find his or her smoking substitute device, or when the user has been alerted that the wireless communication link has been lost (e.g., by a notification as described elsewhere herein), he or she accesses the application on the mobile device 2 which has an established wireless communication link with the smoking substitute device, and provides a command to the application, via an interface of the mobile device, to indicate that he or she wishes to locate the smoking substitute device. For example, the application may include an icon, displayed on the touchscreen of the user's mobile device, which the user can press to activate the routine for locating his or her smoking substitute device. The icon may comprise a symbol and or it may comprise text such as "Find my device" or any other suitable wording.

When the application has received a command from the user that he or she wishes to find the smoking substitute device, at step 520 the application determines whether the wireless communication link between the smoking substitute device and the mobile device is currently active or whether it has been lost. The application can perform such a determination by checking whether the wireless communication link between the two devices is currently operating as expected—for example, checking if the wireless communication link is being opened up for signal transmission between the two devices, at times/intervals that would be expected for the current operating mode of the devices. In order to perform this determination, the application will have to receive, or otherwise access, telemetry data from the wireless interface of the mobile phone. This can be done using any suitable combination of hardware and software means.

If it is determined at step 520 that the wireless communication link between the smoking substitute device and the mobile device is currently active ("YES" in step 520), at step 530 the application will output a message to the user, via an interface of the mobile device that he or she is using, to confirm that the wireless communication link is active.

The particular method shown in FIG. 22 comprises two additional steps that can be followed, if the wireless communication link has been found to be active. However, these two steps may be redundant—and therefore may be omitted by the application—if the user is accessing the application via the mobile device, to which the smoking substitute device has established a wireless communication link. That is; there may be no need to tell the user where the mobile device is located, if she or he is currently using that mobile device.

Therefore, steps 535 and 540 below are optional, but may be relevant to embodiments in which the user is accessing the application on a second mobile device, other than the (first) mobile device with which the smoking substitute device has established a wireless communication link.

At step 535, the application will determine the current location of the (first) mobile device. This can be done using any suitable combination of hardware and software means. For example, the application and the location component may be configured so that the location component provides regularly spaced, frequent updates to the application comprising location data for the mobile device. Alternatively, the application may be configured to access the location data only when there is a specific need, such as when the user wishes to find his or her smoking substitute device, in accordance with this method 500.

At step 540, the application will output the current location of the (first) mobile device, via an interface of the mobile device that the user is currently using.

The application may automatically determine and output the current location of the mobile device, after it has confirmed that the wireless communication link is currently active. Alternatively, the application may require a specific command from the user before it determines and outputs the current location of the mobile device. This may be because, for example, if the user is accessing the application from the (first) mobile device, with which the smoking substitute device has established a wireless communication link, steps 535 and 540 would be deemed by most users to be redundant.

According to another possible embodiment, the application will omit step 530 and will simply determine and output the current location of the mobile device, if it has determined that the wireless communication link is currently active. Alternatively, the application may be configured to output confirmation that the link is active at the same time as out putting the current location of the mobile device.

The user will be able to use the information that the link is active (and, if required and therefore provided, the information on the current location of the (first) mobile device) to determine that the smoking substitute device must be located relatively near to his or her mobile device and will be able to direct the further search for his or her smoking substitute device accordingly.

Returning to FIG. 22, if at step 520 the application determines that the wireless communication link between the smoking substitute device and the mobile device is no longer active (i.e., the link has been lost) ("NO" in step 520), the application then at step 550 determines a dropped connection location. The dropped connection location may be stored in the mobile device, e.g., in a log of location data associated with lost connection events. Determining the dropped connection location may comprise returning the most recent entry from this log. In another example, the location data in the log may be associated with communication events. In this case, determining the dropped connection location may comprise returning the most recent entry from this log.

In another example, determining the dropped connection location may include accessing the telemetry data for the wireless interface of the mobile device to determine when the connection between the smoking substitute device and the mobile device was lost or dropped. For example, the application may look for an indication of the time "t" of the most recent wireless transmission between the two devices. This can be done using any suitable combination of hardware and software means. The wireless interface and application may be configured so that the wireless interface provides regularly spaced, frequent updates to the application, comprising telemetry data which can be stored by the application.

Alternatively, the application may only access such telemetry data from the wireless interface in response to a specific user need or command. When the application has determined a time "t" (or a time interval) at which the wireless communication link became inactive, it can use that time "t" (or a time interval) to access a log of device location data (i.e., non-event specific location data), obtained by the location component for the mobile device, in order to ascertain the location of the mobile device at the time "t" (or within the time interval) at which the wireless communication link became inactive. This location is may be determined to be the dropped connection location. The application may already have location data stored on its memory, as a function of time, based on signals previously transmitted to it from the location component, or it may be configured to access stored location data on the mobile device in response to a specific user need or command.

At step 560 the application displays the determined dropped connection location to the user. The application may also provide an output to the user, via an interface of the mobile device, to indicate that the wireless communication link between the smoking substitute device and the mobile device is currently inactive or lost.

Step 560 may comprise displaying the dropped connection location on a map. For example, the dropped connection location may be shown as a pointer or other marker on a map.

Step 560 may comprise displaying the dropped connection location as an address, as GPS coordinates, and/or as a written description of a place associated with the dropped connection location, as described above.

The application may not provide a specific output to explicitly inform the user that the wireless communication link was lost, or has become inactive. Instead that information may be inferred by the user form the output of a dropped connection location for the mobile device.

Optionally, the application may also output the time at which the loss of connection between the two devices occurred. This may happen automatically or in response to a user request for the time information. The time "t" may be represented, in an output to the user, as an instantaneous time—for example, it may be the midpoint of a determined time interval. Alternatively, the time "t" may be represented by a time range or time interval, if and when it is output to the user via an interface of a mobile device.

Once the user knows where the mobile device was when the wireless communication link between it and the smoking substitute device was lost (i.e., the "dropped connection location"), he or she may use the information in order to inform his or her subsequent search for the smoking substitute device. The user may also find it useful to be informed of the time at which the wireless communication link was lost, as that information may also help to prompt the users recall as to where the smoking substitute device may have been left (or at least where it may have been lost or stolen from, if either of those events has indeed occurred).

Therefore, a useful and user-friendly method is provided for locating a smoking substitute device that has established a wireless communication link with a mobile device. The smoking substitute device itself needs no additional hardware or software features, in order for this method to be carried out. The method enables the user to save time and potentially to safeguard his or her device from being lost, stolen or damaged.

FIG. 23 is a flowchart of a method 600 for displaying the dropped connection location to a user.

At step 610, the application determines that the wireless communication link has been lost.

For example, the application may run in the background to periodically assess whether the wireless communication link is still present, so that the application can make this determination.

At step 620, the application determines whether a misplacement criterion (other than the wireless communication link being lost) is met.

By way of example, the application may determine that a misplacement criterion is met if the application determines that the location of the mobile device (e.g., as determined using the location component in the mobile device) is more than a predetermined distance (e.g., 100 metres) from the dropped connection location.

By way of example, the application may determine that a misplacement criterion is met if the application determines that more than a predetermined length of time (e.g., 30 minutes) has elapsed since a most recent dropped connection time, wherein a dropped connection time comprises a time at which the wireless connection between the smoking substitute device and the mobile device was lost (as determined by the application).

If a misplacement criterion is not met ("NO" in step 620), then at step 650 no notification is made.

If a misplacement criterion is met ("YES" in step 620), then at step 630 the application automatically (i.e., without requiring user input) displays a notification to alert the user that the wireless communication link has been lost using a display of the mobile device.

Optionally at step 635, the notification includes a dropped connection location, e.g., determined as described above in relation to FIG. 22, such that the dropped connection location is displayed using a display of the mobile device. Alternatively, the notification may be configured to reveal a dropped connection location, only if the notification or an element of the notification is selected (e.g., via a touch screen interface of the mobile device) by the user. For example, the notification may be configured to open the application to reveal the dropped connection location (e.g., on a map), only if the notification is selected (e.g., via a touch screen interface of the mobile device).

Optionally at step 640, the notification includes a dropped connection time, e.g., determined as described above in relation to FIG. 22, such that the dropped connection location is displayed using a display of the mobile device.

FIG. 24A shows a first example notification that could be displayed on a mobile device, according to step 630 of the method of FIG. 23.

In this example, the notification includes a written description of a place associated with the dropped connection location ("the office"), as well as text which alerts the user that the wireless communication link has been lost ("LEFT BEHIND"). The notification can be dismissed using a "DISMISS" button, or a user is able to find out more information by clicking the "More info" link. The "More info" link may, for example, display more information regarding the dropped connection, e.g., by providing more details regarding the dropped connection location and/or by providing a dropped connection time.

FIG. 24B shows a second example notification that could be displayed on a mobile device, according to step 630 of the method of FIG. 23.

In this example, the notification does not include a dropped connection location, but simply provides an alert that that the wireless communication link has been lost ("LEFT BEHIND"). Again, the notification can be dismissed using a "DISMISS" button. In this example, the notification is configured to reveal a dropped connection location, only if an element of the notification (in this case, the "More info" link) is selected (e.g., via a touch screen interface of the mobile device) by the user. The dropped connection location may be revealed by opening the application to display a map which displays the dropped connection location.

The notifications exemplified by FIGS. 24A and B, may be accompanied by an auditory and/or haptic signal to alert the user to the presence of the notification. For example, the application may cause the mobile device to vibrate and/or play a particular sound to alert the user that a notification is available.

The features disclosed in the foregoing description, or in the following claims, or in the accompanying drawings, expressed in their specific forms or in terms of a means for performing the disclosed function, or a method or process for obtaining the disclosed results, as appropriate, may, separately, or in any combination of such features, be utilised for realising the disclosure in diverse forms thereof.

While the disclosure has been described in conjunction with the exemplary embodiments described above, many equivalent modifications and variations will be apparent to those skilled in the art when given this disclosure. Accordingly, the exemplary embodiments of the disclosure set forth above are considered to be illustrative and not limiting. Various changes to the described embodiments may be made without departing from the spirit and scope of the disclosure.

For the avoidance of any doubt, any theoretical explanations provided herein are provided for the purposes of improving the understanding of a reader. The inventors do not wish to be bound by any of these theoretical explanations.

Any section headings used herein are for organizational purposes only and are not to be construed as limiting the subject matter described.

Throughout this specification, including the claims which follow, unless the context requires otherwise, the word "comprise" and "include", and variations such as "comprises", "comprising", and "including" will be understood to imply the inclusion of a stated integer or step or group of integers or steps but not the exclusion of any other integer or step or group of integers or steps.

It must be noted that, as used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by the use of the antecedent "about," it will be understood that the particular value forms another embodiment. The term "about" in relation to a numerical value is optional and means for example +/− 10%.

The following statements, which form part of the description, provide general expressions of the disclosure herein:

E1. A method performed by an application installed on a mobile device, wherein the application is for assisting a user with a smoking substitute device via a wireless communication link established between the smoking substitute device and the mobile device, the method comprising:
 determining, via a location component in the mobile device, a dropped connection location indicative of a location of the mobile device at which the wireless communication link was lost; and
 displaying the dropped connection location to a user using a display of the mobile device.

E2. The method of statement E1, wherein the step of displaying the dropped connection location is performed upon receiving a request at the mobile device.

E3. The method of statement E1, wherein the step of displaying the dropped connection location is performed automatically if the application determines that the wireless communication link has been lost.

E4. The method of statement E3, wherein the step of displaying the dropped connection location is performed automatically if the application determines that the wireless communication link has been lost and that a misplacement criterion is met.

E5. The method of any previous statement, wherein the method further comprises:
monitoring, by the application, a status of the wireless communication link; and
recording, in a log on the mobile device, a location of the mobile device obtained from the location component upon detecting that the wireless communication link is lost.

E6. The method of statement E5, wherein the step of determining the dropped connection location comprises reading an entry from the log.

E7. The method of any of previous statement, wherein the method further comprises recording, in a log on the mobile device, a location identifier associated with activity on the wireless communication link, and wherein the step of determining the dropped connection location comprises reading an entry from the log and obtaining a location corresponding to the location identifier.

E8. The method of statement E7, wherein the mobile device stores telemetry data that includes a history of the location of the mobile device over time, wherein the location identifier is a time stamp, and wherein the step of obtaining a location corresponding to the location identifier includes determining a location from the telemetry data using the time stamp read from the log.

E9. The method of any preceding statement, wherein the step of displaying the dropped connection location to a user via a display of the mobile device comprises displaying the dropped connection location on a map.

E10. The method of any preceding statement, wherein the step of displaying the dropped connection location to a user via a display of the mobile device comprises displaying the dropped connection location as an address.

E11. The method of any preceding statement, wherein the step of displaying the dropped connection location to a user via a display of the mobile device comprises displaying the dropped connection location as GPS coordinates.

E12. The method of any preceding statement, wherein the dropped connection location displayed to a user is a written description of a place associated with the dropped connection location.

E13. The method of any preceding statement, wherein the location component included in the mobile device comprises a GPS device.

E14. The method of any preceding statement, wherein the wireless communication link between the smoking substitute device and the mobile device uses a short-range communication protocol.

E15. A computer readable medium containing instructions configured to, when executed by an application installed on a mobile device, cause the application to perform a method according to any preceding statement.

E16. A mobile device including:
a display;
a processor configured to run an application for assisting a user with a smoking substitute device;
a location component; and
a wireless interface;
wherein the wireless interface is configured to establish a wireless communication link between the smoking substitute device and the mobile device, and
wherein the mobile device is configured to:
determine, via the location component, a dropped connection location indicative of a location of the mobile device at which the wireless communication link was lost; and
display the dropped connection location to a user using a display of the mobile device.

E17. A system comprising:
a mobile device; and
a smoking substitute device,
wherein the mobile device comprises:
a display;
a processor configured to run an application for assisting a user with the smoking substitute device;
a location component; and
a first wireless interface,
wherein the smoking substitute device comprises a second wireless interface,
wherein a wireless communication link is established between the first and second wireless interfaces, and
wherein the mobile device is configured to:
determine, via the location component, a dropped connection location indicative of a location of the mobile device at which the wireless communication link was lost; and
display the dropped connection location to a user using a display of the mobile device.

E18. A method performed by an application installed on a mobile device, wherein the application is for assisting a user with a smoking substitute device via a wireless communication link established between the smoking substitute device and the mobile device, the method comprising:
automatically displaying a notification to alert the user that the wireless communication link has been lost using a display of the mobile device, if the application determines that the wireless communication link has been lost.

E19. The method of statement E18, wherein the notification includes a dropped connection location determined using a location component in the mobile device.

E20. The method of statement E18, wherein the notification is configured to reveal a dropped connection location determined using a location component in the mobile device, only if the notification or an element of the notification is selected by the user.

E21. The method of any one of statements E18 to E20, wherein the step of automatically displaying a notification to alert the user that the wireless communication link has been lost is performed if the application determines that the wireless communication link has been lost and that a misplacement criterion is met.

E22. The method of statement E21, wherein the application determines that a misplacement criterion is met if the application determines that the location of the mobile device is more than a predetermined distance from a dropped connection location determined using a location component in the mobile device.

E23. The method of statement E21 or E22, wherein the application determines that a misplacement criterion is met if the application determines that more than a predetermined length of time has elapsed since a most recent dropped connection time, wherein the most recent dropped connection time is a time at which the wireless connection between the smoking substitute device and the mobile device was most recently lost.

E24. The method of any one of statements E18 to E23, wherein automatically displaying a notification as is suppressed, if the wireless capability of the mobile device used to connect to the smoking substitute device is switched off.

E25. A computer readable medium containing instructions which, when executed by an application installed on a mobile device, are configured to cause the application to perform the method of any one of statements E18 to E24.

E26. A mobile device including:
a display;
a processor configured to run an application for assisting a user with a smoking substitute device; and
a wireless interface;
wherein the wireless interface is configured to establish a wireless communication link between the smoking substitute device and the mobile device; and
wherein the mobile device is configured to automatically display a notification to alert the user that the wireless communication link has been lost using a display of the mobile device, if the application determines that the wireless communication link has been lost.

E27. A system comprising:
a mobile device; and
a smoking substitute device;
wherein the mobile device comprises:
a display;
a processor configured to run an application for assisting a user with the smoking substitute device; and
a first wireless interface,
wherein the smoking substitute device comprises a second wireless interface;
wherein a wireless communication link is established between the first and second wireless interfaces, and wherein the mobile device is configured to automatically display a notification to alert the user that the wireless communication link has been lost using a display of the mobile device, if the application determines that the wireless communication link has been lost.

PART F (P01015EP)

A System and Method for Managing a Smoking Substitute Device

Technical Field

The present disclosure relates to smoking substitute devices. In particular, although not exclusively, it relates to the management of network-enabled smoking substitute devices and their communication with other devices.

Background

The smoking of tobacco is generally considered to expose a smoker to potentially harmful substances. It is generally thought that a significant amount of the potentially harmful substances are generated through the heat caused by the burning and/or combustion of the tobacco and the constituents of the burnt tobacco in the tobacco smoke itself.

Conventional combustible smoking articles, such as cigarettes, typically comprise a cylindrical rod of tobacco comprising shreds of tobacco which is surrounded by a wrapper, and usually also a cylindrical filter axially aligned in an abutting relationship with the wrapped tobacco rod. The filter typically comprises a filtration material which is circumscribed by a plug wrap. The wrapped tobacco rod and the filter are joined together by a wrapped band of tipping paper that circumscribes the entire length of the filter and an adjacent portion of the wrapped tobacco rod. A conventional cigarette of this type is used by lighting the end opposite to the filter, and burning the tobacco rod. The smoker receives mainstream smoke into their mouth by drawing on the mouth end or filter end of the cigarette.

Combustion of organic material such as tobacco is known to produce tar and other potentially harmful by-products. There have been proposed various smoking substitute devices in order to avoid the smoking of tobacco.

Such smoking substitute devices can form part of nicotine replacement therapies aimed at people who wish to stop smoking and overcome a dependence on nicotine.

Smoking substitute devices may comprise electronic systems that permit a user to simulate the act of smoking by producing an aerosol (also referred to as a "vapour") that is drawn into the lungs through the mouth (inhaled) and then exhaled. The inhaled aerosol typically bears nicotine and/or flavourings without, or with fewer of, the odour and health risks associated with traditional smoking.

In general, smoking substitute devices are intended to provide a substitute for the rituals of smoking, whilst providing the user with a similar experience and satisfaction to those experienced with traditional smoking and tobacco products. Some smoking substitute systems use smoking substitute articles (also referred to as a "consumables") that are designed to resemble a traditional cigarette and are cylindrical in form with a mouthpiece at one end.

The popularity and use of smoking substitute devices has grown rapidly in the past few years. Although originally marketed as an aid to assist habitual smokers wishing to quit tobacco smoking, consumers are increasingly viewing smoking substitute devices as desirable lifestyle accessories. Some smoking substitute devices are designed to resemble a traditional cigarette and are cylindrical in form with a mouthpiece at one end. Other smoking substitute devices do not generally resemble a cigarette (for example, the smoking substitute device may have a generally box-like form).

There are a number of different categories of smoking substitute devices, each utilising a different smoking substitute approach. A smoking substitute approach corresponds to the manner in which the substitute system operates for a user.

One approach for a smoking substitute device is the so-called "vaping" approach, in which a vapourisable liquid, typically referred to (and referred to herein) as "e-liquid", is heated by a heating device to produce an aerosol vapour which is inhaled by a user. An e-liquid typically includes a base liquid as well as nicotine and/or flavourings. The resulting vapour therefore typically contains nicotine and/or flavourings. The base liquid may include propylene glycol and/or vegetable glycerin.

A typical vaping smoking substitute device includes a mouthpiece, a power source (typically a battery), a tank for containing e-liquid, as well as a heating device. In use, electrical energy is supplied from the power source to the heating device, which heats the e-liquid to produce an aerosol (or "vapour") which is inhaled by a user through the mouthpiece.

Vaping smoking substitute devices can be configured in a variety of ways. For example, there are "closed system" vaping smoking substitute devices which typically have a sealed tank and heating element which is pre-filled with e-liquid and is not intended to be refilled by an end user. One subset of closed system vaping smoking substitute devices include a main body which includes the power source, wherein the main body is configured to be physically and electrically coupled to a consumable including the tank and the heating element. In this way, when the tank of a consumable has been emptied, the main body can be reused by connecting it to a new consumable. Another subset of closed system vaping smoking substitute devices are completely disposable, and intended for one-use only.

There are also "open system" vaping smoking substitute devices which typically have a tank that is configured to be refilled by a user, so the device can be used multiple times.

An example vaping smoking substitute device is the Myblu™ e-cigarette. The Myblu™ e-cigarette is a closed system device which includes a main body and a consumable. The main body and consumable are physically and electrically coupled together by pushing the consumable into the main body. The main body includes a rechargeable battery. The consumable includes a mouthpiece, a sealed tank which contains e-liquid, as well as a heating device, which for this device is a heating filament coiled around a portion of a wick which is partially immersed in the e-liquid. The device is activated when a microprocessor on board the main body detects a user inhaling through the mouthpiece. When the device is activated, electrical energy is supplied from the power source to the heating device, which heats e-liquid from the tank to produce a vapour which is inhaled by a user through the mouthpiece.

Another example vaping smoking substitute device is the blu PROT™ e-cigarette. The blu PROT™ e-cigarette is an open system device which includes a main body, a (refillable) tank, and a mouthpiece. The main body and tank are physically and electrically coupled together by screwing one to the other. The mouthpiece and refillable tank are physically coupled together by screwing one of the other, and detaching the mouthpiece from the refillable tank allows the tank to be refilled with e-liquid. The device is activated by a button on the main body. When the device is activated, electrical energy is supplied from the power source to a heating device, which heats e-liquid from the tank to produce a vapour which is inhaled by a user through the mouthpiece.

Another approach for a smoking substitute system is the so-called Heated Tobacco ("HT") approach in which tobacco (rather than an "e-liquid") is heated or warmed to release vapour. HT is also known as "heat not burn" ("HNB"). The tobacco may be leaf tobacco or reconstituted tobacco. The vapour may contain nicotine and/or flavourings. In the HT approach the intention is that the tobacco is heated but not burned, i.e., the tobacco does not undergo combustion.

A typical HT smoking substitute system may include a device and a consumable. The consumable may include the tobacco material. The device and consumable may be configured to be physically coupled together. In use, heat may be imparted to the tobacco material by a heating element of the device, wherein airflow through the tobacco material causes components in the tobacco material to be released as vapour. A vapour may also be formed from a carrier in the tobacco material (this carrier may for example include propylene glycol and/or vegetable glycerine) and additionally volatile compounds released from the tobacco. The released vapour may be entrained in the airflow drawn through the tobacco.

As the vapour passes through the consumable (entrained in the airflow) from the location of vaporisation to an outlet of the consumable (e.g., a mouthpiece), the vapour cools and condenses to form an aerosol for inhalation by the user. The aerosol will normally contain the volatile compounds.

In HT smoking substitute systems, heating as opposed to burning the tobacco material is believed to cause fewer, or smaller quantities, of the more harmful compounds ordinarily produced during smoking. Consequently, the HT approach may reduce the odour and/or health risks that can arise through the burning, combustion and pyrolytic degradation of tobacco.

There may be a need for improved design of smoking substitute systems, in particular HT smoking substitute systems, to enhance the user experience and improve the function of the HT smoking substitute system.

An example of the HT approach is the IQOS™ smoking substitute device from Philip Morris Ltd. The IQOS™ smoking substitute device uses a consumable, including reconstituted tobacco located in a wrapper. The consumable includes a holder incorporating a mouthpiece. The consumable may be inserted into a main body that includes a heating device. The heating device has a thermally conductive heating knife which penetrates the reconstituted tobacco of the consumable, when the consumable is inserted into the heating device. Activation of the heating device heats the heating element (in this case a heating knife), which, in turn, heats the tobacco in the consumable. The heating of the tobacco causes it to release nicotine vapour and flavourings which may be drawn through the mouthpiece by the user through inhalation.

A second example of the HT approach is the device known as "Gb"™ from British American Tobacco p.l.c. Glo™ comprises a relatively thin consumable. The consumable includes leaf tobacco which is heated by a heating device located in a main body. When the consumable is placed in the main body, the tobacco is surrounded by a heating element of the heating device. Activation of the heating device heats the heating element, which, in turn, heats the tobacco in the consumable. The heating of the tobacco causes it to release nicotine vapour and flavourings which may be drawn through the consumable by the user through inhalation. The tobacco, when heated by the heating device, is configured to produce vapour when heated rather than when burned (as in a smoking apparatus, e.g., a cigarette). The tobacco may contain high levels of aerosol formers (carrier), such as vegetable glycerine ("VG") or propylene glycol ("PG").

The present inventor(s) have observed that most smoking substitute devices currently on the market are configured to operate in isolation of other devices, which limits the functions the smoking substitute devices can perform.

The present inventor(s) have also observed that, as smoking substitute devices become more sophisticated and are able to perform more functions, they may require more sophisticated management. For example, that management may need to consider security and integrity factors for smoking substitute devices that are configured for data acquisition, storage and transmission.

In particular, the management of wireless communication of data between smoking substitute devices and mobile devices requires secure and user-controllable management, to ensure accurate, efficient functioning and user peace of mind. In addition, the management of smoking substitute devices should consider the fact that a user may make use of several mobile devices at once and of the fact that a user is likely to periodically update the mobile devices which he or she uses. Any system for managing a smoking substitute device should be able to cope with the user's preferred mobile device(s) changing over time.

The present disclosure has been devised in light of the above considerations.

SUMMARY OF THE DISCLOSURE

At its most general, the present disclosure provides a system, method and devices, which enable a smoking substitute device to be network-enabled (that is, to be capable of wireless communication with other devices) in a secure and user-controllable manner. The smoking substitute device can be network-enabled in the sense that it can communicate wirelessly, via a wireless network, with the communication terminal of a mobile phone or other device in order to transmit information such as, for example, component status information. Communication can be, for example, over a short-range network.

The user can control the transmission of data by initially forming a bonded communication link between their smoking substitute device and a first mobile (or "portable") device, for example the user's mobile phone. The user may subsequently use the first mobile device in order to grant wireless communication permissions to multiple additional mobile devices, each of which should be specifically user-selected. As a result of the permissions, and upon implementation of predetermined steps by the user and by the devices concerned, each of the multiple additional mobile devices will form individual bonded communication links to the smoking substitute device. A record or "whitelist" of the devices with which it is permitted to communicate can be stored in a suitable memory means, within the smoking substitute device.

The present disclosure recognises, and embodies the recognition, that the identity or identities of the mobile devices that a user will want to authorise, to wirelessly communicate with his or her smoking substitute device, is likely to change over time. For example, a user may periodically upgrade his or her mobile device. For example, it is typical for a user to upgrade his or her mobile phone or smartphone every 12 to 36 months. Some users may upgrade more frequently than that. In addition, particularly since technology is currently changing at a fast pace, it is common for users to acquire new mobile devices such as mobile phones, smart phones, laptop computers or tablet computers regularly, in order to keep up with technological advances. In addition, users may change their mobile devices if, for example, they change their place of work or they experience a change personal circumstances, for example moving out of a family home into a home of one's own or with a partner. There is also unfortunately a risk of a user's mobile device being lost, damaged or stolen, which may result in the user having to replace that mobile device with another one.

According to a first aspect of the disclosure, there may be provided a smoking substitute device comprising a memory which stores a whitelist configured to identify one or more devices with which the smoking substitute device is permitted to wirelessly communicate and a hardware component other than a button. The smoking substitute device is configured to operate in either a whitelist operating mode, in which the smoking substitute device is configured to advertise to only the one or more devices identified by the whitelist, or in an advertising operating mode, in which the smoking substitute device is configured to advertise to devices regardless of whether those devices are identified by the whitelist; The smoking substitute device is configured to, upon detection of a predetermined action that involves the hardware component, transition from operating in the whitelist operating mode to operating in the advertising operating mode.

In another aspect, a method is provided of managing a smoking substitute device, wherein the smoking substitute device comprises a memory which stores a whitelist configured to identify one or more devices with which the smoking substitute device is permitted to wirelessly communicate and a hardware component other than a button. The smoking substitute device is configured to operate in either a whitelist operating mode, in which the smoking substitute device is configured to advertise to only the one or more devices identified by the whitelist, or in an advertising operating mode, in which the smoking substitute device is configured to advertise to devices regardless of whether those devices are identified by the whitelist. The method comprises, when the smoking substitute device is operating in the whitelist operating mode, detecting a predetermined action that involves the hardware component, and transitioning from operating in the whitelist operating mode to operating in the advertising operating mode.

The method may further comprise clearing contents of the whitelist from the memory upon transitioning from the whitelist operating mode to the advertising operating mode control unit. This step may be carried out by the control unit of the smoking substitute device.

The smoking substitute device may default to operating in the whitelist operating mode, unless the whitelist is empty. After the smoking substitute device has transitioned from operating in the whitelist operating mode to operating in the advertising operating mode, the smoking substitute device may subsequently be configured to establish a bonded wireless communication link with a first mobile device.

The steps for establishing a bonded wireless communication link between the smoking substitute device and a mobile device should preferably include security measures such as the sharing of encryption keys, passwords or codes, to ensure that the smoking substitute device only forms bonded communication links with mobile devices that have been specifically identified and authorised by the user. For example, an application installed on a mobile device may configured to control the communications permissions for the smoking substitute device, in response to user input provided to the application, via a user interface of the mobile device. For example, the user input may comprise typing and/or making selections via a touch screen, keypad, control pad or other suitable input means. The user input may comprise voice commands. The user input may include using biometric data for identification.

The steps for establishing a bonded wireless communication link between the smoking substitute device and a mobile device may comprise any suitable combination of user-implemented, computer-implemented and hardware-implemented steps. For example, specific user input should be required in order to identify the first mobile device, with which the smoking substitute device may establish a bonded communication link. Moreover, specific user input should be required in order to identify any additional (i.e., second or subsequent) mobile devices, for which permission to communicate with the smoking substitute device is to be granted. However, some or all of the steps involved in establishing bonded communication links between the smoking substitute device and the mobile device(s), and the subsequent wireless transmissions between the devices, may happen without any specific user input being required. Moreover, the smoking substitute device may be configured such that the storing of data identifying the one or more devices with which the smoking substitute device is permitted to wirelessly communicate, on the whitelist, happens automatically, without any user input.

The one or more hardware components s of the smoking substitute device, other than a button, which are used to effect the method, may include a port for connecting a cable for charging the smoking substitute device and an accelerometer. The step of performing a predetermined action, in order to cause the smoking substitute device to transition from operating in the whitelist operating mode to operating in the advertising operating mode, may comprise performing an action which uses the port and/or an action that uses the accelerometer.

In either the first aspect and/or in the second aspect, each of the one or more devices identified by the whitelist may comprise a mobile device, for example, a mobile phone, a smart phone, a tablet computer or a laptop computer.

The so-called "whitelist" may comprise any suitable list, group or record that clearly identifies the permitted devices. The memory may include security means to ensure the whitelist is only accessible to the authorised user of the smoking substitute device, in case the smoking substitute device is lost, borrowed or stolen.

The one or more devices with which the smoking substitute device is permitted to wirelessly communicate, as identified by the whitelist, may each have a bonded wireless communication link with the smoking substitute device.

The whitelist may be configured to identify a finite predetermined maximum number of devices, with which the smoking substitute device is permitted to communicate. For example, the predetermined maximum number of devices may be 10 or fewer. For example, the predetermined maximum number of devices may be 8 or fewer.

The so-called "whitelist operating mode" may be regarded as an operational mode in which the smoking substitute device is operable to issue advertising wireless communications only to the one or more devices identified by the whitelist. The communications may be issued via a wireless interface of the smoking substitute device and received by a wireless interface of a device identified on the whitelist. For example, the devices may have Bluetooth™ interfaces. However other wireless communication networks may be used such as a cellular network (e.g., according to a standard protocol, such as 3G or 4G) or a WiFi network. In terms of the wireless communication, the smoking substitute device may be regarded as being a "peripheral device" and a mobile device, such as any of those identified on the whitelist, can be regarded as being a "host device".

When the smoking substitute is in whitelist operating mode, it may be "invisible" to other mobile devices, which are not identified on the whitelist, within the relevant communication network. For example, this may be because its advertising messages are specifically addressed only to the devices on the whitelist. In such an embodiment, other mobile devices may not attempt to communicate with the smoking substitute device when it is in whitelist operating mode, because it has become "invisible" to those other mobile devices.

Alternatively, the smoking substitute device may remain "visible" to other mobile devices, which are not identified on the whitelist, when it is in whitelist operating mode. However, it will not specifically address any advertising communications to those other mobile devices, whilst it remains in whitelist operating mode. It may be configured not to receive any wireless communications from other mobile devices, which are not identified on the whitelist, when it is in whitelist operating mode. Alternatively, it may be that the other mobile devices can still send wireless communication attempts to the smoking substitute device, whilst it is in whitelist operating mode, but that it is configured to block or ignore any communication attempts from those other mobile devices unless and until they are identified on the whitelist, or until the smoking substitute device transitions to operating in the "advertising operating mode".

The so-called "advertising operating mode" may be regarded as an operational mode in which the smoking substitute device is operable to issue advertising wireless communications to devices regardless of whether those devices are identified by the whitelist. Again, the communications may be issued and received via suitable wireless interfaces and may be issued using Bluetooth™ or any other suitable communication network. When it is in "advertising operating mode" the smoking substitute device should be "visible" to a plurality of devices, within its wireless communication range, including devices that are identified on the whitelist (if the whitelist is not empty) and devices that are not identified on the whitelist. The smoking substitute device may also be able to receive communication attempts from each of the plurality of devices when it is in advertising operating mode.

The transition from operating in the whitelist operating mode to operating in the advertising operating mode may cause the whitelist to change. For example, it may cause the identities of one or more of the devices that were, before the transition, on the whitelist to be deleted. For example, it may cause the whitelist and/or the memory on which the whitelist is stored, to be "reset". For example, any data that is deleted or reset as a result of the smoking substitute device transitioning from operating in the whitelist operating mode to operating in the advertising operating mode may be stored in an archive memory, either within the smoking substitute device itself and/or within an external memory, such as within an application that is used on a mobile device to control communication with the smoking substitute device. For example, the application may require a user to have an ID and possibly a password, to access the application, and the application may store archive whitelist information associated with an individual user ID.

Although the smoking substitute device is configured both to operate in the whitelist operating mode and to operate in the advertising operating mode, it should be configured so that it is selectively operable in either the whitelist operating mode or in the advertising operating mode. It should not simultaneously operate in both modes. However, this does not preclude devices that are (or were) identified on the whitelist from seeing or receiving wireless communications from the smoking substitute device when it is in advertising operating mode. There may be other operating modes, for example there may be restrictions imposed in relation to wireless communication when the smoking substitute device is running at low power (i.e., at low battery charge level). Any such other operating modes are not discussed in detail herein.

The smoking substitute device may be "bonded" to each of the devices identified on the whitelist, when the device is in whitelist operating mode. Bonding of the smoking substitute device to a mobile device may comprise any steps. For example, it may comprise the sharing of an encryption key, a password or a code between the two devices. The smoking substitute device may initially be paired to the first mobile device, for example through the exchange of encryption keys, and thereafter it may be bonded to the first mobile device by virtue of the devices storing and remembering the exchanged encryption keys, and re-using those keys each time the devices connect to one another. Alternatively, or additionally, bonding may comprise the user inputting data to identify the smoking substitute device to an application installed on the mobile device. When there is already a first mobile device identified on the whitelist, bonded to the smoking substitute device, the identification of any additional (i.e., second or subsequent) mobile devices on the whitelist, and the bonding of those mobile devices to the smoking substitute device, may be user-controlled using inputs made via the first mobile device.

The smoking device may be configured to automatically connect to any device identified by the whitelist. Therefore, when the user chooses to use a particular mobile device from the whitelist, to connect to the smoking substitute device, the user would not have to go through a pairing or bonding process again, for that mobile device.

The term "other than a button" should be regarded as meaning "instead of or in addition to a button". Therefore, the smoking substitute device may or may not have a button. A so-called "button" may be understood to comprise a mechanical actuator—usually a depressible actuator—which can usually be used to switch the device on and/or off. If a smoking substitute device has no button, it may be activated by, for example, an airflow sensor which detects a user inhale action and prompts activation of the device in response to detecting an inhale action. If a smoking substitute device has no button, it may be deactivated by a timer—for example, it may be configured to switch off after a predetermined period of inactivity (e.g., of no inhales being detected). Alternatively, it may remain switched on unless and until it runs out of power, or until its remaining power reaches a predetermined low level.

The hardware component, other than a button, may include a port for connecting a cable for charging the smoking substitute device. A predetermined action, to transition the smoking substitute device from operating in the whitelist operating mode to operating in the advertising operating mode, may be a predetermined action that uses the port. For example, it may be (or it may include) connecting a cable for charging the smoking substitute device to the port.

It may not be necessary to electrically connect the other end of the cable (opposite the end that connects to the port) to a power supply such as an electrical socket, in order to complete the predetermined action that uses the port, in order to (or as part of a number of actions that combine to) effect the transition of the smoking substitute device from operating in the whitelist advertising mode to operating in the advertising operating mode. For example, the mechanical insertion of an end of the cable into the port may be sufficient to complete a predetermined action that uses the port. That is, the device may include a sensor that is configured to sense when the end of the cable has been inserted—for example, because of the mechanical connection that it forms with the receiving part of the charging port—and to notify the control unit, when the insertion has occurred. Preferably there should be a requirement in such an embodiment for a particular mechanical connection to have been formed—to avoid a user being able to insert something other than the correct charging cable into the port, in order to effect the transition of the device form operating in whitelist operating mode to operating in advertising operating mode.

The hardware component, other than a button, may include an accelerometer. A predetermined action, to transition the smoking substitute device from operating in the whitelist operating mode to operating in the advertising operating mode, may be a predetermined action that uses the accelerometer. For example, it may be (or it may include) performing one or more predetermined movements with the smoking substitute device to be detected by the accelerometer. For example, the one or more predetermined movements may include a tapping movement such as tapping the smoking substitute device against a surface.

The smoking substitute device may include at least two hardware components, other than a button. Multiple predetermined actions may have to be performed, using the at least two hardware mechanisms, in order to effect the transition of the smoking substitute device from operating in the whitelist operating mode to operating in the advertising operating mode. For example, both a port and an accelerometer may be included and, in order to effect the transition, the user may have to connect a cable for charging the smoking substitute device to the port and perform one or more predetermined movements with the smoking substitute device such as a tapping movement, for example tapping the smoking substitute device against a surface, to be detected by the accelerometer.

It may be necessary for the predetermined movements with the smoking substitute device, which are to be detected by the accelerometer, to meet particular criteria in order to prevent accidental transitioning of the smoking substitute device from operating in the whitelist operating mode to operating in the advertising operating mode. For example, the movements may have to be made with a predetermined force and/or have a predetermined magnitude and/or speed and or frequency and/or pattern. The predetermined movements required for effecting the transition should preferably be distinguishable from possible accidental movements which can occur, for example, when the device is accidentally dropped. The predetermined movements should also be distinguishable from typical movement that the device would encounter during use and from typical movement that would occur, for example, if the device was being moved or transported whilst it is stored in a user's pocket or bag. Moreover, creating a requirement for a charging cable to be inserted into the port in addition to the predetermined movements being detected, in order for the transition to be effected, reduces the risk of the transition happening accidentally since the user is less likely to transport the device, with the cable attached, as part of his or her normal day-to-day routine.

In another aspect, a system is provided comprising a smoking substitute device and a first mobile device, wherein the smoking substitute device is not, at first, configured to wirelessly communicate with the first mobile device. The smoking substitute device comprises a memory which stores a whitelist configured to identify one or more devices, with which the smoking substitute device is permitted to wirelessly communicate and one or more hardware components, other than a button. The smoking substitute device is configured to operate in a whitelist operating mode in which the smoking substitute device is configured to advertise to only the one or more devices identified by the whitelist, and therefore not to advertise to the first mobile device. The smoking substitute device is configured to operate in an advertising operating mode in which the smoking substitute device is configured to advertise to devices regardless of whether those devices are identified by the whitelist, and therefore to advertise to the first mobile device. The smoking substitute device is configured to upon detection of a predetermined action that involves the hardware component, transition from operating in the whitelist operating mode to operating in the advertising operating mode.

The smoking substitute device may be further configured so that, after it has transitioned from operating in the whitelist operating mode to operating in the advertising operating mode, it can be configured to wirelessly communicate with the first mobile device. It may form a bonded wireless communication link with the first mobile device. This does not have to happen, and certainly does not have to happen immediately after the transition to advertising operating mode occurs. There may be times or circumstances in which a user wishes to keep his or her smoking substitute device in advertising operating mode—for example, if the user wanted to sell or give away his or her smoking substitute device, it is likely that he or she would wish to effectively "reset" the device, erasing any stored data which previously limited the mobile devices to which it could communicate, and keep it open for the next user to decide how to manage communications of the smoking substitute device with one or more mobile devices.

If he or she wishes to take them, any suitable series of steps may be taken, by the user, in order to identify the first mobile device to the smoking substitute device—for example, the user may provide inputs to an application that is installed on the first mobile device, via one or more user interfaces of the first mobile device. Any suitable protocol, which may include security steps to prevent misuse by a non-authorised user, may be followed in order to establish a wireless communication link between the smoking substitute device and the first mobile device.

An application may have to be installed on the first mobile device in order to enable it to wirelessly communicate certain data and/or instructions to the smoking substitute device. However, the first mobile device should be operable to create a paired or bonded wireless communication link to the smoking substitute device, without having the application installed on the first mobile device.

If the smoking substitute device does become configured to wirelessly communicate with the first mobile device, the first mobile device will consequently be identified in the whitelist.

If it does become identified on the whitelist, and if it is the first device to become listed on the whitelist, after the transition to advertising operating mode occurs, the first mobile device may be configured to enable the user to add additional mobile devices to the whitelist. Thereafter, the smoking substitute device may be configured to form a bonded communication link to each of the devices that is identified on the whitelist.

Once the smoking substitute device has been configured to wirelessly communicate with the first mobile device, the smoking substitute will transition back to operating in the whitelist operating mode.

The disclosure includes the combination of the aspects and preferred features described except where such a combination is clearly impermissible or expressly avoided.

The skilled person will appreciate that except where mutually exclusive, a feature or parameter described in relation to any one of the above aspects may be applied to any other aspect. Furthermore, except where mutually exclusive, any feature or parameter described herein may be applied to any aspect and/or combined with any other feature or parameter described herein.

DETAILED DESCRIPTION OF THE DISCLOSURE

Aspects and embodiments of the present disclosure will now be discussed with reference to the accompanying figures. Further aspects and embodiments will be apparent to those skilled in the art. All documents mentioned in this text are incorporated herein by reference.

FIG. 25 shows an example system 1 for managing a smoking substitute device 10.

The system 1 as shown in FIG. 25 includes a mobile device 2, an application server 4, an optional charging station 6, as well as the smoking substitute device 10.

The smoking substitute device 10 is configured to communicate wirelessly, e.g., via Bluetooth™, with an application (or "app") installed on the mobile device 2, e.g., via a suitable wireless interface (not shown) on the mobile device 2. The mobile device 2 may be a mobile phone, for example. The application on the mobile phone is configured to communicate with the application server 4, via a network 8. The application server 4 may utilise cloud storage, for example.

The network 8 may include a cellular network and/or the internet.

A skilled person would readily appreciate that the mobile device 2 may be configured to communicate via the network 8 according to various communication channels, preferably a wireless communication channel such as via a cellular network (e.g., according to a standard protocol, such as 3G or 4G) or via a WiFi network.

The app installed on the mobile device and the application server 4 may be configured to assist a user with their smoking substitute device 10, based on information communicated between the smoking substitute device 10 and the app and/or information communicated between the app and the application server 4.

The charging station 6 (if present) may be configured to charge (and optionally communicate with) the smoking substitute device 10, via a charging port 9 on the smoking substitute device 10. The charging port on the smoking substitute device 10 may be a USB port, for example, which may allow the smoking substitute device to be charged by any USB-compatible device capable of delivering power to the smoking substitute device 10 via a suitable USB cable 7 (in this case the USB-compatible device would be acting as the charging station 6). Alternatively, the charging station could be a docking station specifically configured to dock with the smoking substitute device 10 and charge the smoking substitute device 10 via the charging port 9 on the smoking substitute device 10.

FIG. 26A shows an example smoking substitute device 110 for use as the smoking substitute device 10 in the system 1 of FIG. 25.

In this example, the smoking substitute device 110 includes a main body 120 and a consumable 150. The consumable 150 may alternatively be referred to as a "pod".

In this example, the smoking substitute device 110 is a closed system vaping device, wherein the consumable 150 includes a sealed tank 156 and is intended for one-use only.

FIG. 26A shows the smoking substitute device 110 with the main body 120 physically coupled to the consumable 150.

FIG. 26B shows the main body 120 of the smoking substitute device 110 without the consumable 150.

FIG. 26C shows the consumable 150 of the smoking substitute device 110 without the main body 120.

The main body 120 and the consumable 150 are configured to be physically coupled together, in this example by pushing the consumable 150 into an aperture in a top end 122 of the main body 120, e.g., with the consumable 150 being retained in the aperture via an interference fit. In other examples, the main body 120 and the consumable could be physically coupled together by screwing one onto the other, through a bayonet fitting, or through a snap engagement mechanism, for example. An optional light 126, e.g., an LED located behind a small translucent cover, is located a bottom end 124 of the main body 120. The light 126 may be configured to illuminate when the smoking substitute device 110 is activated.

The consumable 150 includes a mouthpiece (not shown) at a top end 152 of the consumable 150, as well as one or more air inlets (not shown in FIG. 26) so that air can be drawn into the smoking substitute device 110 when a user inhales through the mouthpiece. At a bottom end 154 of the consumable 150, there is located a tank 156 that contains e-liquid. The tank 156 may be a translucent body, for example.

The tank 156 preferably includes a window 158, so that the amount of e-liquid in the tank 156 can be visually assessed. The main body 120 includes a slot 128 so that the window 158 of the consumable 150 can be seen whilst the rest of the tank 156 is obscured from view when the consumable 150 is inserted into the aperture in the top end 122 of the main body 120.

In this present embodiment, the consumable 302 is a "single-use" consumable. That is, upon exhausting the e-liquid in the tank 156, the intention is that the user disposes of the whole consumable 150. In other embodiments, the e-liquid (i.e., aerosol former) may be the only part of the system that is truly "single-use". In such embodiments, the tank 156 may be refillable with e-liquid or the e-liquid may be stored in a non-consumable component of the system. For example, the e-liquid may be stored in a tank located in the device or stored in another component that is itself not single-use (e.g., a refillable tank).

The tank 156 may be referred to as a "clearomizer" if it includes a window 158, or a "cartomizer" if it does not.

FIG. 27A is a schematic view of the main body 120 of the smoking substitute device 110.

FIG. 27B is a schematic view of the consumable 150 of the smoking substitute device 110.

As shown in FIG. 27A, the main body 120 includes a power source 128, a control unit 130, a memory 132, a wireless interface 134, an electrical interface 136, and, optionally, one or more additional components 138.

The power source 128 is preferably a battery, more preferably a rechargeable battery.

The control unit 130 may include a microprocessor, for example.

The memory 132 is preferably includes non-volatile memory.

The wireless interface 134 is preferably configured to communicate wirelessly with the mobile device 2, e.g., via Bluetooth. To this end, the wireless interface 134 could include a Bluetooth™ antenna. Other wireless communication interfaces, e.g., WiFi, are also possible.

The electrical interface 136 of the main body 120 may include one or more electrical contacts. The electrical interface 136 may be located in, and preferably at the bottom of, the aperture in the top end 122 of the main body 120. When the main body 120 is physically coupled to the consumable 150, the electrical interface 136 may be configured to pass electrical power from the power source 128 to (e.g., a heating device of) the consumable 150 when the smoking substitute device 110 is activated, e.g., via the electrical interface 160 of the consumable 150 (discussed below). When the main body 120 is not physically coupled to the consumable 150, the electrical interface may be configured to receive power from the charging station 6.

The additional components 138 of the main body 120 may include the optional light 126 discussed above.

The additional components 138 of the main body 120 may, if the power source 128 is a rechargeable battery, include a charging port 137 configured to receive power from the charging station 6. This may be located at the bottom end 124 of the main body 120. Alternatively, the electrical interface 136 discussed above is configured to act as a charging port configured to receive power from the charging station 6 such that a separate charging port is not required.

The additional components 138 of the main body 120 may, if the power source 128 is a rechargeable battery, include a battery charging control circuit, for controlling the charging of the rechargeable battery. However, a battery charging control circuit could equally be located in the charging station 6 (if present).

The additional components 138 of the main body 120 may include an airflow sensor for detecting airflow in the smoking substitute device 110, e.g., caused by a user inhaling through a mouthpiece 166 (discussed below) of the smoking substitute device 110. The smoking substitute device 110 may be configured to be activated when airflow is detected by the airflow sensor. This optional sensor could alternatively be included in the consumable 150 (though this is less preferred where the consumable 150 is intended to be disposed of after use, as in this example).

The additional components 138 of the main body 120 may include an actuator, e.g., a button. The smoking substitute device 110 may be configured to be activated when the actuator is actuated. This provides an alternative to the airflow sensor noted, as a mechanism for activating the smoking substitute device 110.

The additional components 138 of the main body 120 may include a reader configured to read information associated with the consumable from a machine readable data source included in (e.g., contained in the body of, or attached to) the consumable 150.

The reader may be configured to read information from the machine readable data source wirelessly, e.g., via electromagnetic waves or optically. Thus, for example, the machine readable data source included in the consumable 150 could be an RFID tag (in which case the reader included in the main body 120 may be an RFID reader) or a visual data source such as a barcode (in which case the reader included in the main body may be an optical reader, e.g., a barcode scanner). Various wireless technologies and protocols may be employed to allow the reader to wirelessly read information from a machine readable data source included in or attached to the consumable 150, e.g., NFC, Bluetooth, Wi-Fi, as would be appreciated by a skilled person.

For avoidance of any doubt, the reader (if present) may be configured to read information from the machine readable data source non-wirelessly, e.g., using a direct electrical connection between the main body 120 and consumable 150.

In some embodiments discussed herein, the main body 120 includes a motion sensor 139, such as an accelerometer. The motion sensor 139 is arranged to detect movement of the main body 120 and send a signal indicative of movement to the control unit 130. The control unit 130 may be configured to monitor signals from the motion sensor 139 and take action upon detection of one or more predetermined trigger signals, as discussed in more detail below.

As shown in FIG. 27B, the consumable 150 includes the tank 156, an electrical interface 160, a heating device 162, one or more air inlets 164, a mouthpiece 166, and, optionally, one or more additional components 168.

The electrical interface 160 of the consumable 150 may include one or more electrical contacts. The electrical interface 136 of the main body 120 and an electrical interface 160 of the consumable 150 are preferably configured to contact each other and therefore electrically couple the main body 120 to the consumable 150 when the main body 120 is physically coupled to the consumable 150. In this way, electrical energy (e.g., in the form of an electrical current) is able to be supplied from the power source 128 in the main body 120 to the heating device 162 in the consumable 150.

The heating device 162 is preferably configured to heat e-liquid contained in the tank 156, e.g., using electrical energy supplied from the power source 128. In one example, the heating device 162 may include a heating filament and a wick, wherein a first portion of the wick extends into the tank 156 in order to draw e-liquid out from the tank 156, and wherein the heating filament coils around a second portion of the wick located outside the tank 156. In this example, the heating filament is configured to heat up e-liquid drawn out of the tank 156 by the wick to produce an aerosol vapour.

The one or more air inlets 164 are preferably configured to allow air to be drawn into the smoking substitute device 110, when a user inhales through the mouthpiece 166.

The additional components 168 of the consumable 150 may include a machine readable data source, which may e.g., be contained in the body of, or attached to the consumable 150. The machine readable data source may store information associated with the consumable. The information associated with the consumable may include information concerning the content of the consumable (e.g., e-liquid type, batch number) and/or a unique identifier, for example.

The machine readable data source may be rewritable, e.g., a rewritable RFID chip, or read only, e.g., a visual data source such as a barcode. As indicated above, the additional components 138 of the main body 120 may include a reader configured to read information associated with the consumable from the machine readable data source.

In use, a user activates the smoking substitute device 110, e.g., through actuating an actuator included in the main body 120 or by inhaling through the mouthpiece 166 as described above. Upon activation, the control unit 130 may supply electrical energy from the power source 128 to the heating device 162 (via electrical interfaces 136, 166), which may cause the heating device 162 to heat e-liquid drawn from the tank 156 to produce a vapour which is inhaled by a user through the mouthpiece 166.

Of course, a skilled reader would readily appreciate that the smoking substitute device 110 shown in FIGS. 26 and 27 shows just one example implementation of a smoking substitute device, and that other forms of smoking substitute device could be used as the smoking substitute device 10 of FIG. 25.

By way of example, a HNB smoking substitute device including a main body and a consumable could be used as the smoking substitute device 10 of FIG. 25, instead of the smoking substitute device 110. One such HNB smoking substitute device is the IQOS™ smoking substitute device discussed above.

As another example, an open system vaping device which includes a main body, a refillable tank, and a mouthpiece could be used as the smoking substitute device 10 of FIG. 25, instead of the smoking substitute device 110. One such open system vaping device is the blu PRO™ e-cigarette discussed above.

As another example, an entirely disposable (one use) smoking substitute device could be used as the smoking substitute device 10 of FIG. 25, instead of the smoking substitute device 110.

Embodiments of the present disclosure relate to the configuration and use of a network-enabled smoking substitute device such as that discussed above in relation to FIG. 25. In particular, they relate to providing secure, reliable and user-controllable communication links between a smoking substitute device and one or more mobile devices, for example mobile phones, smartphones, laptop computers or tablet computers, in accordance with user commands. They further relate to deleting and/or resetting a user's preferences in relation to communication links between his or her smoking substitute device and one or more mobile devices, if required, in a secure, reliable and user-controllable manner.

As described in more detail below, by providing a whitelist (or other user-authorised record) of permitted mobile devices with which the user's smoking substitute device can wirelessly communicate, the risk of the user's data being accessible via a non-authorised mobile device is reduced. Such a risk might otherwise exist if, for example, his or her smoking substitute device is lost, borrowed or stolen, or if the user is in a busy area with lots of mobile devices (with wireless communication interfaces) present.

The described system, method and devices enable a smoking substitute device to form bonded wireless communication links to one or more mobile devices. This removes any requirement for the smoking substitute device to repeatedly "advertise to", or look for, an unnecessarily large plurality of mobile devices, when it is seeking to transfer data to, or otherwise communicate with, one or more particular user-selected mobile devices. This improves efficiency and reduces load on the battery, hence extending battery life. However, the user is not limited to his or her smoking substitute device communicating with just one mobile device. It is common for users to own more than one mobile device—such as a tablet or laptop computer in addition to a mobile phone and/or separate mobile phones for personal and professional purposes respectively. It could therefore be unduly restrictive if a smoking substitute device was only configured to communicate with a single mobile device.

The above notwithstanding; the system, method and devices described herein also embody the recognition that there may be circumstances which cause a user to no longer want his or her smoking substitute device to be limited to communication with only the device(s) identified in the whitelist. For example, if a user owns or uses a lot of mobile devices, and/or if he or she changes those devices regularly, the whitelist (which may be deliberately limited to a small number of devices) may become full. Moreover, it may include one or more mobile devices that the user no longer owns or uses, hence making their inclusion on the whitelist redundant. If the user continues to own/use one of the mobile devices on the whitelist—in particular, the first mobile device to be listed, which may act as a "master controller" for adding or removing others from the whitelist—then the user may have an option of removing devices from the whitelist, via the application installed on the first mobile device (or possibly via accessing the application on another of the mobile devices on the whitelist). However, if the user no longer has access to the mobile devices on the whitelist (in particular if they no longer have access to the first "master controller" mobile device) because, for example, those devices have been lost or stolen or because they no longer function correctly, the user may require an alternative method for resetting the whitelist. The user may also require an alternative method for resetting the whitelist if, perhaps, there is a problem with accessing the application, for example if the user cannot remember his or her password or code for accessing the application on a mobile device.

As detailed further below, there is a system, method and device described herein that enables the user to reset his or her smoking substitute device, and to open up communications to mobile devices beyond those previously listed on the whitelist, by using the hardware of the smoking substitute device. This can be done in a user-controlled manner, preferably by using a combination of movements or other actions in relation to two or more hardware components (or "hardware mechanisms") of the smoking substitute device, and preferably wherein those movements or other actions comprise a non-routine set of steps, that the user is unlikely to carry out accidentally, and which a non-authorised user would struggle to guess.

Before the method for resetting the whitelist of a smoking substitute device using hardware means is described, a method for using an application and/or a mobile device in order to populate the whitelist, and to establish wireless communication links between a smoking substitute device and one or more mobile devices, will first be described.

As described above in relation to FIG. 25, it is known for a smoking substitute device to communicate with a mobile device and with an application running on a mobile device. To implement such communication, a wireless connection is established between the smoking substitute device and a mobile device. The wireless connection may be via any suitable wireless protocol that permits transmission of information. For example, the smoking substitute device may pair with the mobile device using a short range transmission protocol such as Bluetooth™ or the like. The smoking substitute device may be wirelessly connectable to a mobile device via any suitable personal area network.

The type of data that a smoking substitute device will communicate to a mobile device (including to an application running on a mobile device) may vary based on the particular type, nature, make and model of the smoking substitute device and/or on the particulars of the mobile device and/or of the particulars of the application running on that mobile device. However, almost invariably, the data being communicated to the mobile device will be particular to that individual smoking substitute device and will often be particular to its user, including, for example, the user's preferences, usage habits such as number of inhales and possibly also user personal or contact information. Similarly, the type of data communicated from a mobile device to a smoking substitute device may be bespoke to that smoking substitute device.

For example, a smoking substitute device may be configured to log component status data, for example data regarding the level of battery charge and/or data concerning the operational characteristics of the heating device and/or data read from a consumable such as the brand, type or flavouring of the current consumable and/or its current tank fill level. According to an embodiment, the smoking substitute device may transmit some or all of the logged component status data to a mobile device and, in response, the mobile device may be configured to issue instructions, warnings or commands to the smoking substitute device. For example, a mobile device may be configured to determine battery charge level, based on received component status data, and to warn the user if recharge is required. Similarly, the mobile device (or an application running on that mobile device) may be configured to assess operational parameters of certain components such as the heating device, on a repeated basis and preferably on a regular basis, and to issue a warning or other notification to the user via the smoking substitute device if any anomalies in those operational parameters are detected. Thus it can be seen that the data communicated between a smoking substitute device and a mobile device may be time-critical and/or it may be critical for the data to be safely received only by the intended recipient device(s), in order to ensure successful technical operation of the smoking substitute device, and to provide user satisfaction and peace of mind.

The present inventor(s) have recognised that it can be important for the communications between a smoking substitute device and a mobile device to be secure and reliable, so that all of the correct information is transmitted between the smoking substitute device and a user-selected mobile device and to ensure that none of that information is lost or is transmitted to a non-authorised device.

The present inventor(s) have further recognised that a user may wish to link more than one mobile device to his or her smoking substitute device, in order to offer user flexibility and to reflect the fact that users commonly now own/use more than one mobile device in their day-to-day lives. However, the inventor(s) have recognised the necessity for the number of mobile devices which communicate with an individual smoking substitute device to be limited and to be controllable by the user.

The present inventor(s) have further recognised that a user may wish to delete some or all of the wireless communication links that have previously been established for his or her smoking substitute device. In particular, it has been recognised that a solution may be required if one or more of the previously-accessible mobile devices, and/or the application which was used on one or more of those mobile devices to establish wireless communication links with the smoking substitute device, becomes inaccessible to the user.

In view of the above, a system is provided herein for managing the wireless communications between a smoking substitute device and two or more mobile devices. A bonded communication link may be established between the smoking substitute device and a first, user-selected, mobile device. In order to form a bonded communication link, the two devices must exchange suitable authorisation data, to each securely identify themselves to the respective other. The authorisation data may comprise, for example, an encryption key, a password or a code. An application may be installed on the first mobile device, wherein the application has access to the smoking substitute device, via the bonded communications link. The application may be used to control communication between the smoking substitute device and any other mobile devices.

The smoking substitute device is configured, after the initial bonding to the first mobile device, to avoid communicating with a second mobile device (or to any other mobile device that is not bonded to the smoking substitute device) unless the application installed on the first mobile device permits the smoking substitute device to communicate with the second mobile device.

An example embodiment will now be described in which a Bluetooth™ connection is employed for communications between a smoking substitute device and a mobile device. However other types of connection are possible, as described above in relation to FIG. 25, and the operational considerations for Bluetooth™ communication will be relevant to other connection types.

The smoking substitute device in the following example embodiment is of the type described above in relation to FIGS. 24 and 27A, which can form a wireless connection to a device running an application, such a mobile phone, smart phone, tablet or laptop computer. At the beginning of the method, it is to be taken that the smoking substitute device does not yet have any communication bonded communication links to any specific mobile devices.

Referring to FIG. 28, at the initial step 410 of the method 400, the user of the smoking substitute device selects a first mobile device, which he or she wishes to use as a "master controller" for controlling and limiting the identity and number of the mobile devices, which can communicate with his or her smoking substitute device. For the purpose of the described method, it is to be taken that the user has the requisite authority and/or permissions, to implement this method on his or her chosen devices.

At the second step 420 of the method 400, the user installs an application on the "master controller" mobile device, for controlling communications with the smoking substitute device. The process of installing (or "downloading") applications onto mobile devices is well known and will not be described further herein. It is noted that, in almost all cases, there will be at least one security step involved in installing an application onto a mobile device. For example, the user may have to input a password and/or use his or her biometric data such as a fingerprint or thumbprint to show that he or she has the authority and/or permissions to install the application onto the mobile device.

Although step 420 is shown and described as being the second step of the specific method 400 described herein, it may be performed either before or after step 430, detailed below. The bonding described below for step 430 can be performed without the application yet being installed on the first mobile device.

At the next step 430 of the method 400, the user establishes a wireless communication link between the smoking substitute device and the "master controller" first mobile device. At this point, because there are no established bonds between it and any particular mobile devices, and because it is seeking to establish a communication link rather than seeking to transfer data as yet, the wireless interface (such as the Bluetooth™ antenna) of the smoking substitute device will be operating in a so-called "advertising" mode. It is known for so-called "peripheral" wireless devices, such as a smoking substitute device, which interface with so-called "host" wireless devices, such as a mobile device, to operate in an advertising operating mode, in order to broadcast information defining their intentions. In this case, the intention of the smoking substitute device is to establish a two-way connection with a host device—i.e., the user's mobile device, on which the relevant application is running.

In order to prompt his or her smoking substitute device to begin operating in an advertising operating mode, the user may take any suitable steps, depending on the particulars of the device. For example, there may be a button or other actuator for switching on the Bluetooth™ capabilities of the device. The device may default to being in an advertising operating mode, when its Bluetooth™ capabilities are switched on, in the absence of any bonded communication links already being in place. For example, there may be a predetermined period of time, after the device is switched on (or Bluetooth™ capabilities are switched on), during which the smoking substitute device will operate in an advertising operating mode. For example, there may be a predetermined period of time after the user performs a certain predetermined input or action, such as shaking or tapping the device, during which it will operate in an advertising operating mode.

Because the smoking substitute device does not yet have an established bond with any particular mobile device, the advertisement message sent out by the smoking substitute device at step 430 will be a general advertisement message, which is receivable by any host device or potential host device within the wireless communication range of the smoking substitute device, at that time.

The manner in which a wireless interface of a peripheral device, such as a Bluetooth™ antenna, issues advertisement messages is well known and so will not be described in detail herein. In general terms, the user may have to provide an input to the smoking substitute device to activate its Bluetooth™ capabilities, in order for it to be 'found' by the user's mobile device. Or this may happen automatically.

Once the Bluetooth™ advertisement message has been sent by the smoking substitute device, the next step 440 is for the master controller mobile device to issue a response, or series of responses, which results in a wireless communication link being formed between the smoking substitute device and the mobile device.

For example, the advertising message issued by the smoking substitute device may include instructions for a mobile device on what it expects or demands in a response from a mobile device, in order for it to connect to the smoking substitute device. The user should ensure that the first mobile device, which he or she wishes to use as the master controller, has its Bluetooth™ capabilities switched on, so that it can scan for and receive the advertising message from the smoking substitute device. Once the advertising message has been received by the first mobile device, it can read the instructions therein and then respond by issuing an advertising message including whatever form of response the smoking substitute device has demanded. When the smoking substitute device has received a satisfactory response from the first mobile device, it can then initiate a pairing process, wherein the two devices share an encryption key or other authorisation data, in order to identify each to the other and form a secure wireless communication link between the two devices. When this link has been established, the two devices are "paired". Preferably, the two devices will store the encryption keys, and reuse them each time they reconnect to one another. If this happens, they will have established a "bonded" wireless communication link to one another.

It will be appreciated that other protocols may be followed, in order to form a bonded communication link between the smoking substitute device and the first mobile device.

Once the initial communication bonded communication link has been formed, at step 440, between the smoking substitute device and the master controller mobile device, the devices will be configured to ensure that said communication bond is exclusive. When the smoking substitute is operating in this manner, it is in its so-called "whitelist operating mode". The identity of the master controller will, in this embodiment, be stored in a whitelist in the memory of the smoking substitute device and the device will be configured to communicate only with the devices identified on the whitelist (which, at this point in the method 400, is just the master controller mobile device.) Once it is operating in whitelist operating mode, subsequent advertising messages issued by the wireless interface of the smoking substitute device will only "look for" the master controller mobile device, unless the user permits communication between the smoking substitute device and another, different mobile device. This means that no other mobile devices will be able to "see" the smoking substitute device unless instructed by the master controller mobile device. Moreover, any data transfer messages from the smoking substitute device will be directed only to the master controller mobile device, unless instructed to the contrary by the master controller mobile device, as detailed further below.

Ensuring that the wireless communication bond between the smoking substitute device and the master controller mobile device is exclusive—unless the user permits a selected exception—can be achieved through any suitable combination of hardware and/or software means. For example, by virtue of having established a bonded communication link with the first mobile device, the smoking substitute device may be configured to limit its advertisement messages to that mobile device only, for example by using the address or other identifying information for the first mobile device—unless a further instruction regarding a selected exception to that rule is issued by the master controller mobile device to the smoking substitute device.

As discussed above, it is possible that a user will want his or her smoking substitute device to be configured for communication with more than one mobile device, at a given time. At step 450, therefore, the user can determine which other mobile device(s) he or she wishes to authorise, for communication with his or her smoking substitute device. This step 450 does not have to be taken at all and, if taken, it does not have to happen immediately after the initial communication bond between the smoking substitute device and the master controller mobile device has been established. It can be done at any time, once that initial bond has been established, in accordance with user preferences.

If and when the user wishes to implement it, the next step 460 is to use the application on the master controller mobile device, to authorise one or more additional mobile devices, specifically selected by the user, to also communicate with the user's smoking substitute device. As mentioned above, the additional mobile devices could be, for example, mobile phones, smart phones, tablets or laptop. The user will then issue instructions, from the master controller mobile device, to allow communication between the smoking substitute device and the selected additional mobile devices. The user can issue those instructions via the user interface(s) of the master controller mobile device, using input options provided by the application.

Depending on the particulars of the devices and of the application concerned, there may be several options as to how the user's instructions are implemented, to permit one or more selected additional mobile devices to communicate with the smoking substitute device. For example, the application on the master controller mobile device may instruct the smoking substitute device to send an advertising Bluetooth™ message that specifically "looks for" the selected additional mobile devices, for bonding. For example, the user may, via the application, provide address information or other identifying information for the selected additional mobile device(s), to the smoking substitute device, which it can use to direct its advertising message. In such an embodiment, the selected additional mobile device(s) should be in wireless communication with the first mobile device, for their address information to be known to it. The selected additional mobile device(s) may have to have the application installed, in order to effect transmission of data such as address information, to the first mobile device. The smoking substitute device may be configured to, upon receipt of address information or other identifying information for the selected additional mobile device(s), initiate a bonding process with the selected additional mobile device(s), as described above at step 440 for the first mobile device. Once the bonding process has been successfully completed for each selected additional mobile device, the smoking substitute device will add the device(s) to its whitelist, which is a stored record of devices with which it is permitted to wirelessly communicate. Thereafter, the device's advertising messages would be directed to all the devices on the whitelist.

Alternatively, for example, the master controller mobile device may instruct the smoking substitute device to switch back to being in an "advertising operating mode" and to temporarily advertise to any devices, when it is initiating the process of bonding to a second mobile device, but to accept responses only from the selected additional mobile device(s) to be bonded to it. When it is in an advertising operating mode, a plurality of other mobile devices would be able to "see" signals from the smoking substitute device, but the smoking substitute device would only accept response from, and initiate bonding with, the devices that the user has selected.

The first mobile device may provide instructions to the selected additional mobile device(s)—for example, via the application—regarding the type or form of response that the smoking substitute demands, in response to its advertising messages, in order for it to initiate the establishment of a bonded communication link with a mobile device. The smoking substitute device may only initiate a bonding process with the selected additional mobile devices if and when they provide a suitable response to its advertising message.

Whichever steps are followed, it will be understood that, at step 470, the smoking substitute device can pair with, and preferably bond with, the user's selected additional mobile device(s), based on instructions input via the application on the master controller mobile device.

Any suitable combination of hardware and software means can be used to implement the communications described above. The pairing between the smoking substitute device and the selected additional mobile devices can include any suitable security measures such as the sharing of encryption keys, codes or passwords. Moreover, installation and running of the application on the user's selected additional mobile devices can include any suitable security measures. For example, the application may be configured such that the user needs to create and ID and password, wherein there can only be one master controller device for that ID and password and/or wherein a particular mobile device can only be associated with (or registered to) a single ID for that application. Moreover, the application may be configured such that it can only communicate with an individual smoking substitute device from a limited number of mobile devices. Or there may be a limit on the number of mobile devices that the application can be run on, for an individual user ID.

When the application is downloaded to the user's selected additional mobile devices, the user may have to log in using their already-established ID and password and/or may have to identify the selected additional mobile devices as being "subordinate" or additional to the master controller. Or any other suitable steps may be taken, to ensure that there is a single "master controller" mobile device that oversees and controls the bonded communication links that can be made between the user's smoking substitute device and any other mobile devices. This enables the connections between the smoking substitute device and any mobile devices to be restricted and securely managed. The number of permitted mobile devices that can communicate with an individual smoking substitute device should be finite, and relatively small. For example, there may be a maximum of 10 so-called "permitted" mobile devices per smoking substitute device, with which it is paired for communication. According to an embodiment, there may be a maximum of 8 permitted mobile devices per smoking substitute device.

The list of permitted mobile devices, with which has established bonded communication links, is stored in the memory of the smoking substitute device. This step may happen automatically, or it may require user input, for example via the application on the master controller mobile device. The stored list of permitted mobile devices may be referred to as a "whitelist". The smoking substitute will be configured such that future communications from it may be sent to, and seen by, all the devices on the stored whitelist, without the need to manually reconnect or re-pair with each device, every time a connection is required. Instead, that connection will happen automatically and securely. This is more efficient from a user perspective and from a processing perspective, for the control unit of the smoking substitute device.

The smoking substitute device may be configured so that it defaults to operating in whitelist operating mode, if there are one or more mobile devices identified in the whitelist. According to an embodiment, there may be an option to temporarily override this default position, for example via a user input to the application, running on the master controller mobile device.

The predetermined maximum number of devices that may be recorded on the whitelist should be large enough to enable a user to communicate with his or her smoking substitute device from a number of mobile devices that the typical user it likely to own or use. For example, the user may wish to communicate from his or her personal mobile phone, work mobile phone, tablet computer and/or laptop computer. The size of the predetermined maximum number should also give some scope for the user adding a new mobile device to the permitted list, without necessarily having to delete a pre-existing permitted mobile device (for example, an old device that no longer functions.) It should also give some scope for multiple users to communicate from their mobile devices to a single smoking substitute device. However, the whitelist should not present a disproportionate burden on the memory or control unit of the smoking substitute device, such that the list should be relatively small. Keeping the list relatively small also enhances the security of the system, by inherently limiting the number of communication permissions that can be granted at a given time, for an individual smoking substitute device.

The type of data that can be passed between the smoking substitute device and its bonded mobile devices has already been discussed, above. The smoking substitute device may be configured not to send all data to all its bonded mobile devices, at all times. For example, it may be configured to send data just to the master controller mobile device but for that data to be subsequently accessible to the other mobile devices, via the application. Moreover, although it will be automatically paired for communication with the permitted mobile devices on the stored whitelist, the smoking substitute device may be configured not to accept all types of instruction from all the devices on the list. For example, according to an embodiment, the additional/subordinate mobile devices should not be permitted to add further devices to the whitelist, or to remove any devices from the existing whitelist. Certain of the mobile devices on the whitelist may have further restrictions on them, in terms of what instructions they can send to the smoking substitute device and/or on the specific data from the smoking substitute device that they can access. For example, there may be a restricted permission for some devices, wherein they can use the application to look at, for example, tank fill level data for the smoking substitute device but they cannot access usage data.

According to an embodiment, which varies from the particular example of FIG. 28, it may be possible for an additional (or a "second") mobile device to "see" the smoking substitute device, within the wireless communication network, even after it has bonded with the first "master controller" mobile device. That additional mobile device may attempt communication with the smoking substitute device. However, the application on the master controller mobile device will ensure that any such communication attempt(s) will be ignored or blocked by the smoking substitute device, unless the additional mobile device that sent the communication attempt(s) has been granted a specific communication permission for the smoking substitute device, by the application that has been installed on the master controller mobile device. For example, the application may be configured to set a flag in the smoking substitute device, to prohibit communication with other devices that are not in the whitelist, even if the smoking substitute device is "visible", i.e., receptive to inquiry, from such devices.

Although the specific embodiments described herein involve establishing "bonded" communication links, in which the devices store the exchanged encryption keys, and use them again for future connection, it may be possible for one or more "paired" communication links to be formed instead, between the smoking substitute device and a mobile device. In a "paired" communication link, the devices exchange encryption keys or other authorisation data, in order to establish a secure communication link therebetween, but they do not store the encryption keys for re-use in future. For example, it may be preferable, in some embodiments, for one or more of the user's selected additional mobile devices to establish a paired communication link with the smoking substitute device, instead of a bonded communication link.

According to an embodiment, the whitelist stored on a smoking substitute device can be altered using hardware means within the smoking substitute device. In particular, the identities of one or more mobile devices that are currently, at any given time, listed on the whitelist can be deleted from the whitelist. According to a particular embodiment, operation of hardware means can be used to cause deletion of the identities of all of the mobile devices that are currently, at any given time, listed on the whitelist. This has the effect of resetting the smoking substitute device. As a result of this resetting, and because the whitelist will consequently be empty, the smoking substitute device will transition from its previous state (or "whitelist operating mode"), in which it wirelessly communicated exclusively with the mobile device(s) listed on the whitelist as described in detail above, to a more general state (or "advertising operating mode") in which it does not have any specific user-selected wireless communication links. The smoking substitute device therefore will revert back to directing its wireless advertising communications, and therefore broadcasting information defining its intentions, to a plurality of mobile devices within the wireless communication range of the smoking substitute device. The mobile devices that can "see" or respond to the smoking substitute device when it is in this more general state will not be filtered or user-selected, except that they will each need to have a wireless interface configured for communication over the communications network via which the smoking substitute device issues its wireless communications, and be located within the requisite distance range for those wireless communications.

Referring back to FIG. 27A, it can be seen that the main body 120 of a smoking substitute device can comprise some additional components 138. These may be software components and/or hardware components. Some examples of possible additional hardware components include one or more lights, an LED screen, a battery charging control circuit, an air flow sensor for sensing an inhale action, a consumable data reader for reading data from a consumable (or "pod") inserted into the smoking substitute device, a charging port 137 for insertion of a cable for charging the smoking substitute device, and a motion sensor (e.g., accelerometer) 139 for detecting movement of, or in relation to, the device. The smoking substitute device may also include a button or switch, such as an "on/off" button, for activating and deactivating operation of the smoking substitute device. Alternatively, a smoking substitute device may be provided without a button. In such embodiments, the other components of the smoking substitute device may be useable for activation and deactivation. For example, detection of an inhale action by the air flow sensor may activate operation of the smoking substitute device. Moreover, some of the additional components listed here may be comprised within a consumable, in embodiments in which there is a consumable separable from the main body of the smoking substitute device.

According to an embodiment of the present disclosure, one or more of the hardware components (or "hardware mechanisms") of a smoking substitute device may be used to reset the device from being in a whitelist operating mode into being in a more general advertising operating mode. According to such an embodiment, the hardware components are configured to detect a particular user input or action or series of actions and, in response to that detection, trigger the resetting of the smoking substitute device. The user input, action or actions may have to occur in a pre-defined order and/or they may all have to occur within a predetermined time period. In order to prevent accidental resetting of the device, and to ensure greater reliability and greater chance of success when a user wishes to deliberately reset the device, there should be a pre-determined list of actions or movements, to be made in relation to specific hardware components of the device, in order to effect the resetting.

FIG. 29 is a flowchart that illustrates a method 500 of resetting the whitelist that is an embodiment of the disclosure. The method begins with a step 502 of establishing a bonded communication link between the smoking substitute device and a first mobile device, e.g., using the technique discussed above with reference to FIG. 28. When the bonded communication link is established, the method continues with a step 504 of entering the whitelist operating mode, in which the smoking substitute device is prevented from establishing a communication link with another mobile device unless that mobile device is identified in the whitelist or a communication link is otherwise permitted by an instruction from an application on the first mobile device.

The method continues with a step 506 of determining a predetermined action or a combination of predetermined actions that are indicative of a reset instruction. For example, according to a specific embodiment, the additional hardware components of the smoking substitute device include a port for insertion of a cable for electrically charging the device and an accelerometer for detecting movement of, or in relation to, the smoking substitute device. In this embodiment, a specified sequential combination of actions must be carried out with respect to the port and the accelerometer. The sequence of required actions is as follows: Inserting (or "plugging in") a charging cable, into the port; and, within 10 seconds of carrying out step 1, above, and Detecting 3 taps at the accelerometer.

The charging cable may not need to be connected, at its other end, to an electrical power supply. Rather, the requirement for step 1 may simply be the mechanical insertion of a suitable charging cable into the receiving means of the port. The control unit, or a suitable sensor that communicates with the control unit, is configured, in such an embodiment, to detect the mechanical connection between the end of the charging cable and the receiving part of the port. For example, the cable and port may be shaped so that the insertion of the cable into the port causes a switch to be depressed or causes some other physical actuation, which generates a detectable signal for the control unit to receive. The control unit can use that received signal to help determine next steps.

Alternatively, there may be a requirement for the cable to be connected to an electrical power supply. In such an embodiment, the control unit, or a suitable sensor that communicates with the control unit, is configured to detect the activation of an external electrical power supply to the device, via the charging cable. The control unit can use that detection to help determine next steps.

As regards Step 2; the smoking substitute device is configured so that a so-called "tap" movement is recognisable from a signal received by the control unit from the accelerometer. For example, there may be specific parameters stored within the smoking substitute device that determine what type, magnitude, speed or frequency of motion constitutes a "tap" within the meaning of step 2. The tap may comprise the (gentle) hitting of the device against a surface. The surface may have to be of sufficient hardness, in order for the tap to be recognised by the accelerometer. For example, it may have to be a tap against a relatively hard surface such as a wooden table as opposed to a relatively soft surface such as a pillow.

Preferably, the "tap" movement should be readily distinguishable from other types of movement that the accelerometer may detect during routine use or transportation of the smoking substitute device. Moreover, the user should preferably be provided with clear instructions as to how to perform a "tap" movement as part of the resetting process. Those instructions may, for example, be provided in a user instruction manual.

When it is determined, by the control unit, that the correct sequence of steps 1 and 2 have been detected, the method continues with a step 508 of clearing the contents of the whitelist. The control unit can implement any suitable steps in order to clear the whitelist, i.e., by deleting the identities of any mobile devices stored thereon, thereby effectively resetting the smoking substitute device. According to an embodiment, the identities of the mobile devices that had been stored on the whitelist, before reset, may be transferred to an archive memory either within the smoking substitute device or externally, for example on an application.

It should be appreciated that the example above of steps 1 and 2 is just one possible sequence of steps that may be required in order to reset the smoking substitute device. Any other suitable combination of steps, instead of or in addition to steps 1 and 2 above, may be required for reset. Such steps may involve the charging port and/or the accelerometer and/or they may involve other hardware components such as the air flow sensor or any of the other example additional hardware components listed earlier herein. Preferably, the required combination of steps should be different to any usual or routine patterns of action or movement that a user of the smoking substitute device may make during routine use of the device, in order to avoid accidental reset.

According to an embodiment, there may be an option to undo reset if the required combination of steps is done by accident, or if the user changes his or her mind. For example, a warning light on the device may flash for a short period of time, or example 10 seconds, to warn the user that whitelist reset is about to happen. Alternatively, the warning may be delivered via a mobile device currently on the whitelist, for example via an application running on that mobile device. If the user detects a whitelist reset warning and does not want reset to happen, he or she may be able to take some other steps, possibly again using the hardware components that are operable to initiate reset, in order to undo the instruction and thereby maintain the whitelist and avoid reset.

Initiating reset using a predetermined combination of steps performed using hardware components of the smoking substitute device can be particularly useful if the device does not have an on/off button. In embodiments that do have an on/off button, that button may have a role to play in the reset process, either on its own or in combination with other hardware components of the device. For example, holding the on off button time for a pre-determined length of time may form part of the reset process.

Preferably the combination of steps required to effect reset of a smoking substitute device should be non-obvious to a non-authorised user. According to an embodiment, there may be security steps involved in the process in order to ensure that the person carrying out the reset is the authorised user. For example, the user may have an email address to which the smoking substitute device was registered when the user purchased the device, or when he or she began using the application for linking mobile devices to the smoking substitute device. There may be a requirement for the user to provide confirmation via that email address, or for example by logging in to the application on any mobile device and providing security information, before the smoking substitute device can execute the reset.

According to an embodiment, the smoking substitute device may be configured to permit the user to record a combination of hardware-related steps that the control unit of the smoking substitute device will subsequently recognise as being the required combination of hardware-related steps in order to effect reset of the device. Alternatively, the smoking substitute device may be configured to permit the user to select a reset operation from among a plurality of preset combinations of hardware-related steps. For example, the reset operation may be selected as one or a combination of two or more actions from 5 possible hardware-related steps. Once selected, the combination may then be stored as the required steps for effecting reset. The selection may be done directly at the smoking substitute device or done, for example, via the application.

What is reset has occurred, the whitelist will be empty and the method continues with a step 510 of entering the advertising operating mode, i.e., the smoking substitute device transitions back to operating a mode in which it can establish a new communication link between the smoking substitute device and one or more mobile devices. As will be understood from the detailed description of FIG. 28 above, when a user-selected bonded wireless communication link is established between the smoking substitute device and a mobile device, the smoking substitute device will transition once more to operating in whitelist operating mode, wherein it will only communicate with the selected device(s) on the whitelist and will not broadcast to non-linked mobile devices.

The term "user" referred to in the method of FIG. 28 is intended to be illustrative and not to be limiting. In general, the term "user" is to be understood to mean the person or persons who have the authority to determine which mobile device(s) a smoking substitute device should communication with. For example, the "user" may be the person, person(s) or entity who own, use and/or control the use of the smoking substitute device. It is possible for the person who has the authority to determine which mobile device(s) a smoking substitute device should communicate with to be different to the person who actually uses the smoking substitute device for smoking substitute action.

The term "master controller" is intended to be illustrative and not to be limiting. In general, the term "master controller" is to be understood to mean the first mobile device that the user selects to establish an exclusive communication link with his or her smoking substitute device. It should be the device via which the user can grant communications permissions to a restricted number of other mobile devices, for communication between those devices and the smoking substitute device. In practice, the user may wish to select the mobile device which he or she uses most often—such as his or her personal mobile phone or smartphone—to be the "first" or "master controller" mobile device.

The term "whitelist" is intended to be illustrative and not to be limiting. In general, the term "whitelist" is to be understood to mean a recorded group, list or other collection of data, which identifies the mobile devices to which the smoking substitute device is bonded (or paired), and therefore with which it is permitted to communicate. The precise nature of the data that is stored can vary, dependent on the particulars of the devices concerned. The concept of the so-called "whitelist" is intended to represent the opposite of a "blacklist", which is a well known term that is indicative of items or actions being banned or non-authorised.

The features disclosed in the foregoing description, or in the following claims, or in the accompanying drawings, expressed in their specific forms or in terms of a means for performing the disclosed function, or a method or process for obtaining the disclosed results, as appropriate, may, separately, or in any combination of such features, be utilised for realising the disclosure in diverse forms thereof.

While the disclosure has been described in conjunction with the exemplary embodiments described above, many equivalent modifications and variations will be apparent to those skilled in the art when given this disclosure. Accordingly, the exemplary embodiments of the disclosure set forth above are considered to be illustrative and not limiting. Various changes to the described embodiments may be made without departing from the spirit and scope of the disclosure.

For the avoidance of any doubt, any theoretical explanations provided herein are provided for the purposes of improving the understanding of a reader. The inventors do not wish to be bound by any of these theoretical explanations.

Any section headings used herein are for organizational purposes only and are not to be construed as limiting the subject matter described.

Throughout this specification, including the claims which follow, unless the context requires otherwise, the word "comprise" and "include", and variations such as "comprises", "comprising", and "including" will be understood to imply the inclusion of a stated integer or step or group of integers or steps but not the exclusion of any other integer or step or group of integers or steps.

It must be noted that, as used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by the use of the antecedent "about," it will be understood that the particular value forms another embodiment. The term "about" in relation to a numerical value is optional and means for example +/− 10%.

The following statements, which form part of the description, provide general expressions of the disclosure herein:

F1. A smoking substitute device comprising:
 a memory which stores a whitelist configured to identify one or more devices with which the smoking substitute device is permitted to wirelessly communicate; and
 a hardware component other than a button;
wherein the smoking substitute device is configured to operate in either:
 a whitelist operating mode in which the smoking substitute device is configured to advertise to only the one or more devices identified by the whitelist; or
 an advertising operating mode in which the smoking substitute device is configured to advertise to devices regardless of whether those devices are identified by the whitelist; and wherein the smoking substitute device is configured to, upon detection of a predetermined action that involves the hardware component, transition from operating in the whitelist operating mode to operating in the advertising operating mode.

F2. The smoking substitute device of statement F1, wherein the smoking substitute device has no button.

F3. The smoking substitute device of statement F1 or statement F2, wherein the hardware component includes a port for connecting a cable for charging the smoking substitute device, and wherein the predetermined action includes connecting a cable for charging the smoking substitute device to the port.

F4. The smoking substitute device of any of statements F1 to F3, wherein the one or more hardware components includes an accelerometer, and wherein the predetermined action includes performing a predetermined movement with the smoking substitute device that is detectable by the accelerometer F5. The smoking substitute device of statement F4, wherein the predetermined movement includes a tapping movement.

F6. The smoking substitute device of any of statements F1 to F5, wherein the smoking substitute device includes a plurality of hardware components, other than a button, and wherein the predetermined action comprises a combination of predetermined actions that involve the plurality of hardware components.

F7. The smoking substitute device of statement F6, wherein the plurality of hardware components include a port for connecting a cable for charging the smoking substitute device and an accelerometer, and wherein the combination of predetermined actions includes an action which uses the port and an action that uses the accelerometer.

F8. The smoking substitute device of statement F6 or F7, wherein the transition from the whitelist operating mode to the advertising operating mode occurs upon detection of the combination of predetermined actions within a predetermined time window.

F9. The smoking substitute device of any preceding statement further comprising a control unit configured to monitor the hardware component, wherein the control unit is configured to receive a signal from the hardware component that is indicative of the predetermined action.

F10. The smoking substitute device of any preceding statement further configured to clear contents of the whitelist from the memory upon transitioning from the whitelist operating mode to the advertising operating mode control unit.

F11. A method of managing a smoking substitute device, wherein the smoking substitute device comprises a memory which stores a whitelist configured to identify one or more devices with which the smoking substitute device is permitted to wirelessly communicate, and a hardware component other than a button, wherein the smoking substitute device is configured to operate in either: a whitelist operating mode in which the smoking substitute device is configured to advertise to only the one or more devices identified by the whitelist; or an advertising operating mode in which the smoking substitute device is configured to advertise to devices regardless of whether those devices are identified by the whitelist, and wherein the method comprises:
 when operating in the whitelist operating mode, detecting a predetermined action that involves the hardware component; and
 transitioning from operating in the whitelist operating mode to operating in the advertising operating mode.

F12. The method of statement F11, further comprising clearing contents of the whitelist from the memory upon transitioning from the whitelist operating mode to the advertising operating mode control unit.

F13. The method of statement F11 or F12 further comprising, after transitioning to the advertising operating mode, configuring the smoking substitute device to establish a wireless communication link with a first mobile device.

F14. The method of any of statements F11 to F13, wherein the hardware component includes a port for connecting a cable for charging the smoking substitute device and an accelerometer, and wherein the predetermined action uses the port and/or the accelerometer.

F15. The method of any of statements F11 to F14, wherein the step of transitioning from the whitelist operating mode to the advertising operating mode occurs upon detection of the combination of predetermined actions within a predetermined time window.

PART G (P01014EP)

A System and Method for Managing a Smoking Substitute Device

Technical Field

The present disclosure relates to smoking substitute devices. In particular, although not exclusively, it relates to the management of data recording and storage for smoking substitute devices.

Background

The smoking of tobacco is generally considered to expose a smoker to potentially harmful substances. It is generally thought that a significant amount of the potentially harmful substances are generated through the heat caused by the burning and/or combustion of the tobacco and the constituents of the burnt tobacco in the tobacco smoke itself.

Conventional combustible smoking articles, such as cigarettes, typically comprise a cylindrical rod of tobacco comprising shreds of tobacco which is surrounded by a wrapper, and usually also a cylindrical filter axially aligned in an abutting relationship with the wrapped tobacco rod. The filter typically comprises a filtration material which is circumscribed by a plug wrap. The wrapped tobacco rod and the filter are joined together by a wrapped band of tipping paper that circumscribes the entire length of the filter and an adjacent portion of the wrapped tobacco rod. A conventional cigarette of this type is used by lighting the end opposite to the filter, and burning the tobacco rod. The smoker receives mainstream smoke into their mouth by drawing on the mouth end or filter end of the cigarette.

Combustion of organic material such as tobacco is known to produce tar and other potentially harmful by-products. There have been proposed various smoking substitute devices in order to avoid the smoking of tobacco.

Such smoking substitute devices can form part of nicotine replacement therapies aimed at people who wish to stop smoking and overcome a dependence on nicotine.

Smoking substitute devices may comprise electronic systems that permit a user to simulate the act of smoking by producing an aerosol (also referred to as a "vapour") that is drawn into the lungs through the mouth (inhaled) and then exhaled. The inhaled aerosol typically bears nicotine and/or flavourings without, or with fewer of, the odour and health risks associated with traditional smoking.

In general, smoking substitute devices are intended to provide a substitute for the rituals of smoking, whilst providing the user with a similar experience and satisfaction to those experienced with traditional smoking and tobacco products. Some smoking substitute systems use smoking substitute articles (also referred to as a "consumables") that are designed to resemble a traditional cigarette and are cylindrical in form with a mouthpiece at one end.

The popularity and use of smoking substitute devices has grown rapidly in the past few years. Although originally marketed as an aid to assist habitual smokers wishing to quit tobacco smoking, consumers are increasingly viewing smoking substitute devices as desirable lifestyle accessories. Some smoking substitute devices are designed to resemble a traditional cigarette and are cylindrical in form with a mouthpiece at one end. Other smoking substitute devices do not generally resemble a cigarette (for example, the smoking substitute device may have a generally box-like form).

There are a number of different categories of smoking substitute devices, each utilising a different smoking substitute approach. A smoking substitute approach corresponds to the manner in which the substitute system operates for a user.

One approach for a smoking substitute device is the so-called "vaping" approach, in which a vapourisable liquid, typically referred to (and referred to herein) as "e-liquid", is heated by a heating device to produce an aerosol vapour which is inhaled by a user. An e-liquid typically includes a base liquid as well as nicotine and/or flavourings. The resulting vapour therefore typically contains nicotine and/or flavourings. The base liquid may include propylene glycol and/or vegetable glycerin.

A typical vaping smoking substitute device includes a mouthpiece, a power source (typically a battery), a tank for containing e-liquid, as well as a heating device. In use, electrical energy is supplied from the power source to the heating device, which heats the e-liquid to produce an aerosol (or "vapour") which is inhaled by a user through the mouthpiece.

Vaping smoking substitute devices can be configured in a variety of ways. For example, there are "closed system" vaping smoking substitute devices which typically have a sealed tank and heating element which is pre-filled with e-liquid and is not intended to be refilled by an end user. One subset of closed system vaping smoking substitute devices include a main body which includes the power source, wherein the main body is configured to be physically and electrically coupled to a consumable including the tank and the heating element. In this way, when the tank of a consumable has been emptied, the main body can be reused by connecting it to a new consumable. Another subset of closed system vaping smoking substitute devices are completely disposable, and intended for one-use only.

There are also "open system" vaping smoking substitute devices which typically have a tank that is configured to be refilled by a user, so the device can be used multiple times.

An example vaping smoking substitute device is the Myblu™ e-cigarette. The Myblu™ e-cigarette is a closed system device which includes a main body and a consumable. The main body and consumable are physically and electrically coupled together by pushing the consumable into the main body. The main body includes a rechargeable battery. The consumable includes a mouthpiece, a sealed tank which contains e-liquid, as well as a heating device, which for this device is a heating filament coiled around a portion of a wick which is partially immersed in the e-liquid. The device is activated when a microprocessor on board the main body detects a user inhaling through the mouthpiece. When the device is activated, electrical energy is supplied from the power source to the heating device, which heats e-liquid from the tank to produce a vapour which is inhaled by a user through the mouthpiece.

Another example vaping smoking substitute device is the blu PROT™ e-cigarette. The blu PROT™ e-cigarette is an open system device which includes a main body, a (refillable) tank, and a mouthpiece. The main body and tank are physically and electrically coupled together by screwing one to the other. The mouthpiece and refillable tank are physically coupled together by screwing one of the other, and detaching the mouthpiece from the refillable tank allows the tank to be refilled with e-liquid. The device is activated by a button on the main body. When the device is activated, electrical energy is supplied from the power source to a heating device, which heats e-liquid from the tank to produce a vapour which is inhaled by a user through the mouthpiece.

Another approach for a smoking substitute system is the so-called Heated Tobacco ("HT") approach in which tobacco (rather than an "e-liquid") is heated or warmed to release vapour. HT is also known as "heat not burn" ("HNB"). The tobacco may be leaf tobacco or reconstituted tobacco. The vapour may contain nicotine and/or flavourings. In the HT approach the intention is that the tobacco is heated but not burned, i.e., the tobacco does not undergo combustion.

A typical HT smoking substitute system may include a device and a consumable. The consumable may include the tobacco material. The device and consumable may be configured to be physically coupled together. In use, heat may be imparted to the tobacco material by a heating element of the device, wherein airflow through the tobacco material causes components in the tobacco material to be released as vapour. A vapour may also be formed from a carrier in the tobacco material (this carrier may for example include propylene glycol and/or vegetable glycerine) and additionally volatile compounds released from the tobacco. The released vapour may be entrained in the airflow drawn through the tobacco.

As the vapour passes through the consumable (entrained in the airflow) from the location of vaporisation to an outlet of the consumable (e.g., a mouthpiece), the vapour cools and condenses to form an aerosol for inhalation by the user. The aerosol will normally contain the volatile compounds.

In HT smoking substitute systems, heating as opposed to burning the tobacco material is believed to cause fewer, or smaller quantities, of the more harmful compounds ordinarily produced during smoking. Consequently, the HT approach may reduce the odour and/or health risks that can arise through the burning, combustion and pyrolytic degradation of tobacco.

There may be a need for improved design of smoking substitute systems, in particular HT smoking substitute systems, to enhance the user experience and improve the function of the HT smoking substitute system.

An example of the HT approach is the IQOS™ smoking substitute device from Philip Morris Ltd. The IQOS™ smoking substitute device uses a consumable, including reconstituted tobacco located in a wrapper. The consumable includes a holder incorporating a mouthpiece. The consumable may be inserted into a main body that includes a heating device. The heating device has a thermally conductive heating knife which penetrates the reconstituted tobacco of the consumable, when the consumable is inserted into the heating device. Activation of the heating device heats the heating element (in this case a heating knife), which, in turn, heats the tobacco in the consumable. The heating of the tobacco causes it to release nicotine vapour and flavourings which may be drawn through the mouthpiece by the user through inhalation.

A second example of the HT approach is the device known as "Gb"™ from British American Tobacco p.l.c. Glo™ comprises a relatively thin consumable. The consumable includes leaf tobacco which is heated by a heating device located in a main body. When the consumable is placed in the main body, the tobacco is surrounded by a heating element of the heating device. Activation of the heating device heats the heating element, which, in turn, heats the tobacco in the consumable. The heating of the tobacco causes it to release nicotine vapour and flavourings which may be drawn through the consumable by the user through inhalation. The tobacco, when heated by the heating device, is configured to produce vapour when heated rather than when burned (as in a smoking apparatus, e.g., a cigarette). The tobacco may contain high levels of aerosol formers (carrier), such as vegetable glycerine ("VG") or propylene glycol ("PG").

The present inventor(s) have observed that most smoking substitute devices currently on the market are configured to operate in isolation of other devices, which limits the functions the smoking substitute devices can perform.

The present inventor(s) have observed that, in order to ensure safe and technically correct functioning of a smoking substitute device, it may be necessary for the user to carry out certain steps, for example towards the start of the lifetime of the device. Moreover, the present inventor(s) have observed that smoking substitute devices may unfortunately be at risk of misuse, for example by non-authorised users. It would be beneficial to limit the potential risk for such misuse.

The present disclosure has been devised in light of the above considerations.

SUMMARY OF THE DISCLOSURE

At its most general, the present disclosure provides a smoking substitute device configured to retain certain data in memory even after performing a factory reset or a clear memory or a memory overwrite operation in order to facilitate adherence to certain safety requirements or other regulations. The disclosure may help to prevent misuse of the smoking substitute device, for example by under-aged (and therefore non-permitted) users. It can also help to ensure that, for network-enabled smoking substitute devices, the relevant application, that is available for data transmission to and from the smoking substitute device, is accessed by the user. This enables the user to more completely and reliably utilise all the potential functions of the smoking substitute device and the application and to receive all the possible information that the application could provide. For example, it may enable the application to alert the user to any safety concerns in relation to the smoking substitute device.

The disclosure may thus operate to prevent a user from erasing or overwriting all the information that has been recorded by a control unit of the smoking substitute device. Therefore, it can prevent a user from regularly erasing or overwriting all such information, and thereby from circumventing safety requirements or other regulations for the device. For example, it is known for some network-enabled smoking substitute devices to have an inbuilt requirement for the user to connect to the relevant application on a mobile device, within a short time of the user beginning to use the device. For example, a smoking substitute device may be configured so that the user is only allowed to take a maximum of 15 inhales from the smoking substitute device, from the point of it first use, before connecting to the application. A key purpose of this requirement is for the application to perform age verification for the user, to try to prevent misuse of the smoking substitute device by underage users. By preventing the user from erasing or overwriting all the recorded information in the device's memory, and therefore removing the option to delete or obscure all usage data, the disclosure can therefore prevent the user from circumventing such important requirements.

According to one aspect of the disclosure, there is provided a smoking substitute device comprising a control unit and a memory. The control unit is configured to record, in the memory, usage information relating to operation of the smoking substitute device. The control unit is further configured to permit a first portion of the usage information to be overwritten or cleared from the memory while retaining a second portion of the usage information in the memory. For example, upon receiving an instruction to clear the memory, the control unit may be configured to clear a first portion of the usage information from the memory and retain a second portion of the usage information in the memory. In another example, the control unit may be configured to permit overwriting of an uploaded part of the first portion of the usage information with newly recorded usage information, while retaining the second portion of the usage information intact.

According to another aspect of the disclosure, there is provided method of managing a smoking substitute device comprising a control unit and a memory. The method comprising storing, by the control unit, usage information in the memory. The usage information relates to operation of the smoking substitute device. The method further comprises clearing or overwriting a first portion of the usage information from the memory while retaining a second portion of the usage information in the memory. For example, the method may comprise receiving, by the control unit, an instruction to clear the memory; clearing the first portion of the usage information from the memory; and retaining the second portion of the usage information in the memory.

By retaining the second portion of the recorded information relating to the smoking substitute device, the control unit ensures that the user cannot change all the recorded information or delete all the recorded information, either of which actions might otherwise lead to safety concerns, technical malfunction of the device, or misuse of the device. As a result, if the device is configured such that there are required actions that the user must carry out, for example within a predefined period of time after he or she begins using the device, or by the time he or she has taken a predetermined number of inhalations from the device, the user will not be able to avoid taking those required actions by merely deleting all data from the device and effectively returning it to its factory settings. Instead, because it has retained a second portion of its usage information in the memory, the smoking substitute device and any linked application or mobile device will have a record that the device has been in use, even if some of the usage information has been deleted, and it will therefore be operable to impose any relevant restrictions or regulations on the user. Because the smoking substitute device will know that it has been in use, even if some of its usage information has been deleted, it will also be able to provide the user with more accurate messages and/or warnings and therefore the overall user experience, and the efficiency and successful functioning of the smoking substitute device, will be improved.

The first and second portions of the usage information may be stored in separate locations in the memory. For example the first portion of usage information may be non-retainable data stored in a first portion of the memory. The second portion of usage information may be retainable data stored in a second portion of the memory. The first portion of the memory and the second portion of the memory may be independently addressable. For example, the first and second portions of the memory may be physically separate memory units, e.g., of differing memory types, or may be separate partitions or logically distinct portions of a single memory unit. The first portion of memory may be volatile or non-volatile memory. The second portion of memory may be non-volatile memory or some type of permanent (e.g., non-erasable) memory.

The control unit may be configured to extract, calculate or otherwise obtain the retainable data from the usage information. For example, the recorded usage information may be in a form that combines non-retainable data (e.g., time and duration of inhalation event) with retainable data (e.g., simple inhalation event count). The control unit may thus strip the non-retainable data from the usage information so that only the retainable data is stored in the second portion of the memory. The method disclosed herein may thus include determining, by the control unit from the usage information, the non-retainable data and retainable data, and storing the non-retainable data in a first portion of the memory and storing the retainable data in a second portion of the memory. The step of clearing a first portion of the usage information from the memory may comprise erasing the non-retainable data from the first portion of memory.

In one example, the non-retainable data may be uploaded (periodically or in an ad hoc manner) to a remote device, e.g., an application on a mobile device or a remote server. The control unit may be configured to flag uploaded non-retainable data as overwritable, whereby, upon receipt of new usage data, the uploaded non-retainable data may be overwritten without affecting the retainable data. In this manner, the memory in the smoking substitute device can be managed efficiently whilst providing the security advantages mentioned above.

The usage information may relate to any aspect of operation of the smoking substitute device. For example, for a network enabled smoking substitute device that includes a wireless interface, the control unit may be configured to record a communication log in the memory. In another example, for a smoking substitute device that includes a consumable data reader, the control unit may also be configured to record consumable data, read from a consumable inserted into the main body of the smoking substitute device, in the memory. In yet other examples, the smoking substitute device may include additional operation components configured to output telemetry data indicative of operation of the device. The usage information may include telemetry data from these additional components.

The usage information may comprise information regarding inhalation events. For example, the usage information may comprises: a total number of inhalation events or a number of inhalation events performed within a predetermined time period.

The total number of inhalation events may be the number of inhalations performed using the device during the lifetime of the device. The so-called "lifetime" may be regarded as the period of time since the device was first used for an inhalation or other smoking substitute action.

In one example, the smoking substitute device may be configured to wirelessly transmit synchronisation data to an application installed on a mobile device. The usage information may comprise a number of inhalations performed since the most recent wireless transmission of synchronisation data to the application. As mentioned above, following the wireless transmission of synchronisation data, the control unit may be configured to permit overwriting in the memory of the first portion of the usage information included in the uploaded usage information.

The device may comprise an airflow sensor, wherein the control unit is configured to detect an inhalation event using measurement data from the airflow sensor.

The usage information may comprise information regarding a time and/or a date of one more inhalations. Such information may be utilised by the control unit in conjunction with information regarding the time and or date or a pre-determined event. Therefore, the control unit may be configured to record the number of inhalations that have occurred since a pre-determined event.

The usage information may comprise information regarding an orientation of the device. For example, the device may comprise an accelerometer, wherein the usage information regarding an orientation of the device comprises measurement data obtained by the accelerometer.

The usage information may comprise information relating to the battery. For example, it may comprise information regarding battery charge status.

The second portion of information, which is retained in the memory, may include information regarding a number of inhalations performed using the device within a defined time period. For example, the defined time period may be the period of time since the first inhalation occurred for the device or, in other words, the lifetime of the device. For example, the defined time period may be the period of time since a predetermined event has occurred, for example since the most recent occurrence of a predetermined event such as the most recent occurrence of a synchronisation data transfer from the smoking substitute device to an application running on a mobile device.

A so-called "synchronisation data transfer" may be regarded as the transfer of some or all of the data stored within a memory of the smoking substitute device to the application, to ensure that the information, for example usage information, stored on the application is synchronised with the data that has been stored within the memory of the device itself. According to an embodiment, some of the data that is transferred to the application from the smoking substitute device during a synchronisation data transfer will subsequently be deleted from or overwritten in the memory of the smoking substitute device, in order to reduce the load on its memory, increase efficiency and avoid redundancy with the application.

The control unit may be further configured to compare a usage parameter of the usage information to a predetermined threshold. For example, the recorded information relate to the usage of the smoking substitute device may comprise a number of inhalations and the predetermined threshold may comprise a maximum permitted number of inhalations for a defined period of time. The control unit may cause the smoking substitute device to enter a locked state if the usage parameter exceeds the predetermined threshold. The second portion of the usage information may comprise the usage parameter so that the user cannot avoid entering the locked state by clearing the memory.

In one example, the usage parameter may be the total number of inhalation events, and the predetermined threshold may correspond to a maximum permitted number of inhalations, after the user first switches on the device, or first uses the device.

There may be a requirement for a user to take a particular action—such as accessing an application on a mobile device, in order to provide user identification and/or age verification—before (or by the time that) the maximum permitted number of inhalations has been exceeded or reached. The control unit may thus be configured to determine whether or not a predetermined action has been performed. The control unit may be configured to cause the smoking substitute device to enter the locked state if the usage parameter exceeds the predetermined threshold and the predetermined action has not been performed.

In the locked state, the control unit may disable a hardware component such as the heating device, so that the liquid and/or tobacco of the smoking substitute device cannot be heated. In an embodiment in which the air flow sensor is used for activation of the device, wherein an inhalation is sensed by the air flow sensor, the control unit may temporarily disable operation of the air flow sensor and/or may temporarily switch off an electrical path between the air flow sensor and the control unit, which would result in the device not being activatable for smoking substitute action. It will be understood that the control unit may take any suitable steps in order to temporarily disable the smoking substitute device. For example, it may use a switch, or it might otherwise reroute an electrical power supply between the hardware components of the device, so that normal operation of the device, for smoking substitute action, is not possible at that time.

The user may have to take a predetermined action or combination of actions in order to "unlock" the device and re-enable smoking substitute action. The required predetermined action or combination of actions in order to "unlock" the device may be referred to as a re-enablement procedure. The control unit may be configured to require the re-enablement procedure to be performed, before it will re-enable smoking substitute action using the device. Usually, the re-enablement procedure will comprise the action or combination of actions that the user should have performed, and the non-performance of which has led to the device being locked.

For example, a re-enablement procedure may comprise an action or combination of actions that the manufacturer or other provider of the smoking substitute device has determined is required for safe use of the device.

The smoking substitute device may be configured to enter the locked state if, and only if, the re-enablement procedure has not been performed when the smoking substitute device determines that the actual usage of the smoking substitute device has exceeded the predetermined threshold. According to an embodiment, a warning may be issued to the user that the control unit is going to transition the device to its locked state unless the re-enablement procedure is performed. Usually the warning will have an associated relatively short time period in which the re-enablement procedure has to be performed in order to prevent subsequent locking of the device. The warning may be provided to the user directly by the smoking substitute device, for example via a flashing light or a message on an LED screen. Alternatively, the warning may be provided via the application or via the mobile device with which the smoking substitute device is configured to wirelessly communicate.

The instruction to clear the memory of the smoking substitute device may comprise any suitable instruction. It should preferably be a user-initiated instruction however there may be circumstances in which it is an automatically initiated instruction, for example if there has been a technical malfunction and the device needs to reset itself in order to resume normal functioning.

An instruction to clear the memory of the smoking substitute device may be conveyed, from the user to the smoking substitute device, using any suitable combination of hardware and or software implemented steps. For example, the user may use an application or a mobile device that communicates wirelessly with the smoking substitute device, in order to convey the instruction. Alternatively, the user may deliver the instruction directly to the device itself. For example, there may be a pre-determined action or combination of actions using hardware components of the smoking substitute device that should be carried out in order to convey the instruction that the memory should be cleared. For example, if the smoking substitute device has an on/off button, the user may be able to depress the on/off button for a pre-determined period in order to instruct the device to clear its memory. Alternatively, the instruction to clear the memory may be implemented using other hardware means, for example by tapping the device or otherwise moving it in a certain way, which could be detected by an accelerometer. The pre-determined combination of actions may involve a combination of different hardware components. For example, the user may have to plug a charging cable into an electrical charging port of the device and at the same time move or tap the device in a predefined manner, in order to effect the memory clear instruction.

The instruction to clear the memory of the smoking substitute device may comprise a so called "factory reset" instruction. According to an embodiment, a factory reset instruction may reset some or all of the operational parameters of the device to mirror the operational parameters that were in place when the device was manufactured, apart from of course the fact that a (second) portion of information relating to usage would be retained in the memory of the smoking substitute device. A factory reset instruction may therefore cause the smoking substitute to forget any user preferences or user-initiated instructions that it had previously learned, during usage of the device. Alternatively, the instruction to clear the memory of the smoking substitute device may simply comprise a "clear memory" instruction. A clear memory instruction may not cause changes to all the operational parameters of the device, and it may enable certain user preferences to be retained whilst at the same time still deleting a first portion of other usage data from the memory.

The smoking substitute device may operate to upload, by the control unit, the usage information to an application installed on a mobile device. The uploading step may be done using a wireless interface in any conventional manner. The control unit may include a memory management module configured to monitor the upload process and flag any part of the first portion of usage information that is uploaded as being overwritable. Upon detecting, by the control unit after the usage information is uploaded, new usage information of the smoking substitute device, the smoking substitute device may operate to overwrite the first portion of the usage information included in the uploaded usage information with the new usage information.

The disclosure includes the combination of the aspects and preferred features described except where such a combination is clearly impermissible or expressly avoided.

The skilled person will appreciate that except where mutually exclusive, a feature or parameter described in relation to any one of the above aspects may be applied to any other aspect. Furthermore, except where mutually exclusive, any feature or parameter described herein may be applied to any aspect and/or combined with any other feature or parameter described herein.

DETAILED DESCRIPTION OF THE DISCLOSURE

Aspects and embodiments of the present disclosure will now be discussed with reference to the accompanying figures. Further aspects and embodiments will be apparent to those skilled in the art. All documents mentioned in this text are incorporated herein by reference.

FIG. 30 shows an example system 1 for managing a smoking substitute device 10.

The system 1 as shown in FIG. 30 includes a mobile device 2, an application server 4, an optional charging station 6, as well as the smoking substitute device 10.

The smoking substitute device 10 is configured to communicate wirelessly, e.g., via Bluetooth™, with an application (or "app") installed on the mobile device 2, e.g., via a suitable wireless interface (not shown) on the mobile device 2. The mobile device 2 may be a mobile phone, for example. The application on the mobile phone is configured to communicate with the application server 4, via a network 8. The application server 4 may utilise cloud storage, for example.

The network 8 may include a cellular network and/or the internet.

A skilled person would readily appreciate that the mobile device 2 may be configured to communicate via the network 8 according to various communication channels, preferably a wireless communication channel such as via a cellular network (e.g., according to a standard protocol, such as 3G or 4G) or via a WiFi network.

The app installed on the mobile device and the application server 4 may be configured to assist a user with their smoking substitute device 10, based on information communicated between the smoking substitute device 10 and the app and/or information communicated between the app and the application server 4.

The charging station 6 (if present) may be configured to charge (and optionally communicate with) the smoking substitute device 10, via a charging port on the smoking substitute device 10. The charging port on the smoking substitute device 10 may be a USB port, for example, which may allow the smoking substitute device to be charged by any USB-compatible device capable of delivering power to the smoking substitute device 10 via a suitable USB cable (in this case the USB-compatible device would be acting as the charging station 6). Alternatively, the charging station could be a docking station specifically configured to dock with the smoking substitute device 10 and charge the smoking substitute device 10 via the charging port on the smoking substitute device 10.

FIG. 31A shows an example smoking substitute device 110 for use as the smoking substitute device 10 in the system 1 of FIG. 30.

In this example, the smoking substitute device 110 includes a main body 120 and a consumable 150. The consumable 150 may alternatively be referred to as a "pod".

In this example, the smoking substitute device 110 is a closed system vaping device, wherein the consumable 150 includes a sealed tank 156 and is intended for one-use only.

FIG. 31A shows the smoking substitute device 110 with the main body 120 physically coupled to the consumable 150.

FIG. 31B shows the main body 120 of the smoking substitute device 110 without the consumable 150.

FIG. 31C shows the consumable 150 of the smoking substitute device 110 without the main body 120.

The main body 120 and the consumable 150 are configured to be physically coupled together, in this example by pushing the consumable 150 into an aperture in a top end 122 of the main body 120, e.g., with the consumable 150 being retained in the aperture via an interference fit. In other examples, the main body 120 and the consumable could be physically coupled together by screwing one onto the other, through a bayonet fitting, or through a snap engagement mechanism, for example. An optional light 126, e.g., an LED located behind a small translucent cover, is located a bottom end 124 of the main body 120. The light 126 may be configured to illuminate when the smoking substitute device 110 is activated.

The consumable 150 includes a mouthpiece (not shown) at a top end 152 of the consumable 150, as well as one or more air inlets (not shown in FIG. 31) so that air can be drawn into the smoking substitute device 110 when a user inhales through the mouthpiece. At a bottom end 154 of the consumable 150, there is located a tank 156 that contains e-liquid. The tank 156 may be a translucent body, for example.

The tank 156 preferably includes a window 158, so that the amount of e-liquid in the tank 156 can be visually assessed. The main body 120 includes a slot 128 so that the window 158 of the consumable 150 can be seen whilst the rest of the tank 156 is obscured from view when the consumable 150 is inserted into the aperture in the top end 122 of the main body 120.

In this present embodiment, the consumable 150 is a "single-use" consumable. That is, upon exhausting the e-liquid in the tank 156, the intention is that the user disposes of the whole consumable 150. In other embodiments, the e-liquid (i.e., aerosol former) may be the only part of the system that is truly "single-use". In such embodiments, the tank 156 may be refillable with e-liquid or the e-liquid may be stored in a non-consumable component of the system. For example, the e-liquid may be stored in a tank located in the device or stored in another component that is itself not single-use (e.g., a refillable tank).

The tank 156 may be referred to as a "clearomizer" if it includes a window 158, or a "cartomizer" if it does not.

FIG. 32A is a schematic view of the main body 120 of the smoking substitute device 110.

FIG. 32B is a schematic view of the consumable 150 of the smoking substitute device 110.

As shown in FIG. 32A, the main body 120 includes a power source 128, a control unit 130, a memory 132, a wireless interface 134, an electrical interface 136, and, optionally, one or more additional components 138.

The power source 128 is preferably a battery, more preferably a rechargeable battery.

The control unit 130 may include a microprocessor, for example.

The memory 132 preferably includes non-volatile memory, and may be partitioned or otherwise physically or logically separated into a first portion 1322 and a second portion 1324, whose function is described below.

The wireless interface 134 is preferably configured to communicate wirelessly with the mobile device 2, e.g., via Bluetooth. To this end, the wireless interface 134 could include a Bluetooth™ antenna. Other wireless communication interfaces, e.g., WiFi, are also possible. The wireless interface 134 may be configured to receive instructions, commands or other data from a remote device, e.g., mobile phone or the like.

The electrical interface 136 of the main body 120 may include one or more electrical contacts. The electrical interface 136 may be located in, and preferably at the bottom of, the aperture in the top end 122 of the main body 120. When the main body 120 is physically coupled to the consumable 150, the electrical interface 136 may be configured to pass electrical power from the power source 128 to (e.g., a heating device of) the consumable 150 when the smoking substitute device 110 is activated, e.g., via the electrical interface 160 of the consumable 150 (discussed below). When the main body 120 is not physically coupled to the consumable 150, the electrical interface may be configured to receive power from the charging station 6.

The additional components 138 of the main body 120 may include the optional light 126 discussed above.

The additional components 138 of the main body 120 may, if the power source 128 is a rechargeable battery, include a charging port configured to receive power from the charging station 6. This may be located at the bottom end 124 of the main body 120. Alternatively, the electrical interface 136 discussed above is configured to act as a charging port configured to receive power from the charging station 6 such that a separate charging port is not required.

The additional components 138 of the main body 120 may, if the power source 128 is a rechargeable battery, include a battery charging control circuit, for controlling the charging of the rechargeable battery. However, a battery charging control circuit could equally be located in the charging station 6 (if present).

The additional components 138 of the main body 120 may include an airflow sensor for detecting airflow in the smoking substitute device 110, e.g., caused by a user inhaling through a mouthpiece 166 (discussed below) of the smoking substitute device 110. The smoking substitute device 110 may be configured to be activated when airflow is detected by the airflow sensor. This optional sensor could alternatively be included in the consumable 150 (though this is less preferred where the consumable 150 is intended to be disposed of after use, as in this example).

The additional components 138 of the main body 120 may include an actuator, e.g., a button. The smoking substitute device 110 may be configured to be activated when the actuator is actuated. This provides an alternative to the airflow sensor noted, as a mechanism for activating the smoking substitute device 110.

The additional components 138 of the main body 120 may include a reader configured to read information associated with the consumable from a machine readable data source included in (e.g., contained in the body of, or attached to) the consumable 150.

The reader may be configured to read information from the machine readable data source wirelessly, e.g., via electromagnetic waves or optically. Thus, for example, the machine readable data source included in the consumable 150 could be an RFID tag (in which case the reader included in the main body 120 may be an RFID reader) or a visual data source such as a barcode (in which case the reader included in the main body may be an optical reader, e.g., a barcode scanner). Various wireless technologies and protocols may be employed to allow the reader to wirelessly read information from a machine readable data source included in or attached to the consumable 150, e.g., NFC, Bluetooth, Wi-Fi, as would be appreciated by a skilled person.

For avoidance of any doubt, the reader (if present) may be configured to read information from the machine readable data source non-wirelessly, e.g., using a direct electrical connection between the main body 120 and consumable 150.

As shown in FIG. 32B, the consumable 150 includes the tank 156, an electrical interface 160, a heating device 162, one or more air inlets 164, a mouthpiece 166, and, optionally, one or more additional components 168.

The electrical interface 160 of the consumable 150 may include one or more electrical contacts. The electrical interface 136 of the main body 120 and an electrical interface 160 of the consumable 150 are preferably configured to contact each other and therefore electrically couple the main body 120 to the consumable 150 when the main body 120 is physically coupled to the consumable 150. In this way, electrical energy (e.g., in the form of an electrical current) is able to be supplied from the power source 128 in the main body 120 to the heating device 162 in the consumable 150.

The heating device 162 is preferably configured to heat e-liquid contained in the tank 156, e.g., using electrical energy supplied from the power source 128. In one example, the heating device 162 may include a heating filament and a wick, wherein a first portion of the wick extends into the tank 156 in order to draw e-liquid out from the tank 156, and wherein the heating filament coils around a second portion of the wick located outside the tank 156. In this example, the heating filament is configured to heat up e-liquid drawn out of the tank 156 by the wick to produce an aerosol vapour.

The one or more air inlets 164 are preferably configured to allow air to be drawn into the smoking substitute device 110, when a user inhales through the mouthpiece 166.

The additional components 168 of the consumable 150 may include a machine readable data source, which may e.g., be contained in the body of, or attached to the consumable 150. The machine readable data source may store information associated with the consumable. The information associated with the consumable may include information concerning the content of the consumable (e.g., e-liquid type, batch number) and/or a unique identifier, for example.

The machine readable data source may be rewritable, e.g., a rewritable RFID chip, or read only, e.g., a visual data source such as a barcode. As indicated above, the additional components 138 of the main body 120 may include a reader configured to read information associated with the consumable from the machine readable data source.

In use, a user activates the smoking substitute device 110, e.g., through actuating an actuator included in the main body 120 or by inhaling through the mouthpiece 166 as described above. Upon activation, the control unit 130 may supply electrical energy from the power source 128 to the heating device 162 (via electrical interfaces 136, 166), which may cause the heating device 162 to heat e-liquid drawn from the tank 156 to produce a vapour which is inhaled by a user through the mouthpiece 166.

Of course, a skilled reader would readily appreciate that the smoking substitute device 110 shown in FIGS. 31 and 32 shows just one example implementation of a smoking substitute device, and that other forms of smoking substitute device could be used as the smoking substitute device 10 of FIG. 30.

By way of example, a HNB smoking substitute device including a main body and a consumable could be used as the smoking substitute device 10 of FIG. 30, instead of the smoking substitute device 110. One such HNB smoking substitute device is the IQOS™ smoking substitute device discussed above.

As another example, an open system vaping device which includes a main body, a refillable tank, and a mouthpiece could be used as the smoking substitute device 10 of FIG. 30, instead of the smoking substitute device 110. One such open system vaping device is the blu PROT™ e-cigarette discussed above.

As another example, an entirely disposable (one use) smoking substitute device could be used as the smoking substitute device 10 of FIG. 30, instead of the smoking substitute device 110.

Embodiments of the present disclosure relate to data storage and data preservation for a smoking substitute device, for example a network-enabled smoking substitute device such as that discussed above in relation to FIG. 30. In particular, they relate to preserving at least a portion of recorded usage data even if instruction has been issued for the memory of the smoking substitute device to be cleared. As a result, the risk of misuse of the device is lowered and it is harder for a user to avoid or circumnavigate important regulatory and/or safety requirements for the device.

In an embodiment of the disclosure, the control unit 130 is configured to record or otherwise obtain, measure or calculate usage data relating to operation of the device. The usage data may comprise telemetry data relating to operation of any of the additional components 138 mentioned above. In one example, the additional components 138 of the main body 120 of the smoking substitute device 110 comprises an airflow sensor for detecting airflow in the smoking substitute device 110, e.g., caused by a user inhaling through a mouthpiece 166. This action is may be referred to herein as being "an inhalation". The smoking substitute device 110 is configured, according to this embodiment, to be activated when an inhalation is detected by the airflow sensor. This is a particularly useful feature as it allows the device 110 to be provided without an on/off switch, which saves on both physical space and processing capacity. In this case, the usage data obtained by the control unit 130 may include, but need not be limited to, information regarding inhalations. For example, the control unit may record the number of inhalations that occur per unit time. For example, it may record the number of inhalations per hour or per day. Optionally, the control unit 130 may be configured to record the time and or the date of each inhalation however it may be deemed to be unnecessary to record an exact time for every inhalation. It may instead be more efficient, and sufficient for any subsequent data analysis or computations, to allocate each inhalation event to a particular time range, for example a particular hour or a particular day.

The usage data may comprise information about the identity of one or more mobile devices with which the smoking substitute device is configured to wirelessly communicate. For example, the usage data may comprise a routine or schedule for the transmission of synchronisation data between the smoking substitute device and an application running on a mobile device. The transmission of synchronisation data may be performed regularly in order to transfer usage data or other information from the smoking substitute device to the application, to ensure that the information stored on the application is synchronised with that which has been recorded by the smoking substitute device. This can be of particular importance if the application is configured to make calculations or other determinations, for example if the application is configured to monitor battery charge status and to issue a warning if the battery of the smoking substitute device is running low.

The usage data may comprise measurement data relating to certain of the components of the smoking substitute device. For example, it may record a battery output voltage level in order to monitor battery charge status. It may be configured to record and store other measurement data so that operation of certain components may be monitored, and any faults detected. For example, it may measure operational data for the heating device. The control unit 130 may also be configured to store data from an accelerometer in the memory. It will be understood that data from the accelerometer may be used to sense certain movements of the device, which in turn may prompt certain control instructions. For example, there may be a hardware reset process that involves repeated tapping of the device against a surface, which the accelerometer would be configured to sense.

The control unit 130 is configured to store the usage data in the memory 132. The usage data may be stored in any suitable form, e.g., as a log or the like. As discussed above, the memory 132 may comprise a plurality of separate portions, e.g., a first portion 1322 and a second portion 1324 as shown in FIG. 32A. The portions may be either physically or logically separate so as to be independently addressable by the control unit 130. The portions may comprise different memory types and/or different partitions within the same logical volume.

In embodiments of the disclosure, the different portions of the memory 132 are used to store different types of usage data. In particular, the first portion 1322 may be configured to store non-retainable (i.e., erasable) data, whereas the second portion 1324 may be configured to store retainable (i.e., non-erasable) data. The control unit 130 may be configured to determine, from the recorded usage data, retainable data and non-retainable data, and store the retainable data and the non-retainable data is a corresponding portion of the memory, depending on the determined usage data type. The retainable data and the non-retainable data may be stored in different formats in the first portion 1322 and second portion 1324 of the memory 132. For example, the control unit 130 and memory 132 may be configured so that the non-retainable data is stored temporarily, for example only until after it has been wirelessly transmitted to a mobile device in communication with the smoking substitute device or, for example, only for a limited period of time. For example, non-retainable data may be stored in a buffer wherein the oldest data therein is continually being replaced by newer, more up-to-date data.

It may be desirable to provide a user with control over the data stored on the smoking substitute device. For example, for security reasons a user may wish to limit the storage of any personal data on the device, or on the mobile device and/or the application with which the smoking substitute device is configured to wirelessly communicate. The user may deem it unnecessary to record or store particular types of data, or a user may deem it unnecessary to keep any data stored on the smoking substitute device itself, after that data has been transmitted to a mobile device or application for storage. For example, a user may deem it unnecessary to record any data which has been read from a consumable which is inserted into the main body of the smoking substitute device. He or she may therefore wish to opt, for simplicity and/or in order to reduce processing load on the device, not to record or not to store such data. According to an embodiment, it may be possible to implement user choice regarding data recordal or storage, either directly at the smoking substitute device or via a mobile device or an application with which it wirelessly communicates. Alternatively, when purchasing a smoking substitute device, a user may opt for a simpler model of device, which has limited data recording and/or storage capacity.

The present inventors have recognised that, although providing user choice and flexibility can be very important, this must be balanced against the fact that certain usage data is particularly useful as evidence of actual use of a smoking substitute device. Moreover, they have recognised that it is important for users to respect and adhere to safety rules and other regulations that are intended to govern the use of his or her smoking substitute device. As detailed further below, actual usage data can provide an accurate and highly useful resource, for ensuring that this happens. Therefore, to ensure that safety rules and other regulations are adhered to, the present inventors have recognised that certain usage data should be retained within the memory of a smoking substitute device in a manner and/or in a location that prevent the user from deleting it. Accordingly, the smoking substitute device may be configured to provide control over the ability of the control unit to record and/or store non-retainable data, whilst always recording retainable data. Similarly, the control unit may be configured to permit erasure of non-retainable data, but prohibit erasure of retainable data.

The smoking substitute device may be a network-enabled device, which is configured to communicate with an application running on a mobile device, such as a mobile phone, smart phone, laptop computer or tablet computer. The communication with the mobile device may be used for user identification, which may include user age verification. It will be understood that it is important to reduce the potential risk of misuse of a smoking substitute device by underage users. The user identification may also be useful for registration of the device, for example for warranty or insurance purposes in case the device is lost, stolen or damaged or in case it does not function correctly. The user identification can also play an important role in the security of the smoking substitute device. For example, the user identification process may involve setting up a unique user ID and/or password, which the user may subsequently have to use when he or she wishes to submit control inputs, which may include submitting user preferences for operation of the device, via the application or mobile device.

The control unit may include a security function requires the smoking substitute device to communicate with an application on a mobile device before a number of detected inhalations exceeds a predetermined threshold. The predetermined threshold, i.e., the number of inhalations permitted before connection, may be 15 or fewer. It will be appreciated that numerical limits other than 15 inhalations may be imposed but, in principle, the limit should be relatively low so that the user is compelled to communicate with the application very soon after he or she begins to use the smoking substitute device. Therefore if, for example, the user is underage and would therefore be unable to provide the requisite age verification via the application, his or her use of the smoking substitute device would be for a very limited time and therefore the risk of potential harm would be reduced. If the number of inhalations is detected before communicate with an application on a mobile device, the control unit may be configured to disable or otherwise lock the smoked substitute device.

As mentioned above, it is possible that a user will wish to exert control over data recording and storage for his or her smoking substitute device. Furthermore, it is known for smoking substitute devices to provide the user with an option to clear the memory of their device. Clearing the memory can be comprised within a 'reset' option, via which the factory settings of the device would be restored. Alternatively, a 'clear memory' option may be provided, separate to a complete 'reset' option.

Instructions to clear the memory may be provided directly by the user to the device, for example by taking one or more pre-determined actions with respect to hardware components of the device. Alternatively, a "clear memory" instruction may be issued via a mobile device, or an application running on a mobile device, with which the smoking substitute device wirelessly communicates. When a smoking substitute device is network-enabled, and when it transfers data from its memory to an application running on a mobile device, the application may be configured to automatically send a "clear memory" instruction to the control unit of the device, when it has safely received a transfer of such data. The principle of such an instruction is to limit the load on the memory of the device, which will inherently be limited, and to avoid redundancy, by ensuring that the device memory does not retain information that is also being stored by the application.

Clearing a device memory can be useful if, for example, the processor within a device seems to be running slowly, as a result of the memory being overloaded. It can also be useful if the user wishes to sell or loan his or her device and therefore wishes to remove certain personal data from the memory to prevent it being accessed by non authorised persons. However, the present inventor(s) have recognised that providing an unrestricted option to clear the memory of, or to reset, a smoking substitute device can also, in known devices, provide the potential for misuse, e.g., by enabling circumvention of the limited inhalation security feature mentioned above.

Therefore, according to the embodiments described herein, although the user will be provided with the option to clear the memory of their device, it is a restricted option in that the control unit 130 is configured not to entirely clear all data from the memory 132 of the device. Instead, in response to an instruction to clear the memory 132 of the smoking substitute device, the control unit 130 operates to clear only the non-retainable data, i.e., the data stored in the first portion 1322 of the memory. The retainable data in the second portion 1324 of the memory 1322 thus remains.

According to one particular example, the retainable data in the second portion 1324 of the memory 132 comprises a number of inhalations taken by the user, using the device, during the lifetime of the device (i.e., since the time at which the user first began using the device). Other information regarding inhalations may be included in the non-retainable data. For example, if precise times and dates of inhalations have been recorded, they may be in the non-retainable data and hence may be deleted when a clear memory instruction is received. If there is information recorded regarding usage patterns, and/or number of inhalations per day, such information may also be deleted. Therefore, even if the user "clears" the memory, the device will retain the information on number of inhalations and therefore the control unit will be able to detect when the total number of inhalations exceeds the predetermined threshold.

The present disclosure may also find use in preserving important data in memory in conjunction with efficient use of local (i.e., on-device) and remote storage (e.g., memory on a mobile device or a remote server). As discussed above, the smoking substitute device may include a wireless communication function that may be used to upload collected usage data (stored on the memory of the device) to a mobile device and/or remote application server. The uploading can occur periodically or on an ad hoc basis. Once usage data is uploaded, there may no longer be any need to store it on the device itself, so for efficient on-device memory management, it is desirable to be able to overwrite data that has already been uploaded.

The control unit 130 may include a memory management module that is configured to flag data that can be overwritten. However, for reasons similar to those explained above, it may be desirable to retain some elements or the usage data, including some elements that may have been uploaded to the mobile device or application server, on the smoking substitute device itself. Thus, in some embodiments of the disclosure, the control unit 13 may be arranged to prohibit or otherwise prevent overwriting of data in the second portion of the memory. If new usage data is recorded, the control unit 130 may be configured to ensure that only uploaded data in the first portion of the memory can be overwritten with new usage data.

The control unit 130 is configured so that, when it is detected that the number of inhalations has exceeded 15, a check will be performed to see whether the device has yet communicated with an application running on a mobile device. This check can be performed, for example, by obtaining information from the wireless interface of the device and/or by checking the telemetry data stored in the memory, to see if any communication links have been established. If it is determined that the device has not yet communicated with the application, the control unit can take steps to prevent further use of the device for smoking substitute action, until the requirement for communication with the application has been fulfilled.

The control unit may be configured to transition the smoking substitute device into a "locked state" upon detection that communication with the application has not been made, when the number of inhalations exceeds the predetermined threshold. When the device is in a locked state, the user will not be able to use it for a smoking substitute action. For example, the control unit may temporarily disable the operation of the air flow sensor, so that no inhalations can be detected and therefore smoking substitute action cannot be activated. For example, the control unit may reroute an electrical path away from the heating device, such that the heating device will not be operable to heat liquid or tobacco, when the device is in its locked state. For example, the control unit may use a switch to deactivate any relevant electrical path, so that smoking substitute action cannot be performed when the device is in its locked state.

Once the device has been locked, in order to unlock it the user will have to perform the required action, the non-performance of which has led to the control unit locking the device. This action can therefore be referred to as a "re-enablement procedure". In this embodiment, therefore, the user will have to access the relevant application, on a mobile device, and communicate with the device via the application, before the device can be unlocked. Once the user accesses the application and performs the requisite steps—such as user identification, age verification and so on—the application will provide instructions to the control unit, that the device may be unlocked. The control unit can then take any suitable steps to reverse the temporary disablement of smoking substitute action, for the device.

The device may provide the user with a final warning before it locks the smoking substitute device. That is, for the particular embodiment described herein, when the control unit detects that the number of inhalations is approaching the predetermined threshold, it may issue a warning to the user that the device will be locked unless the required steps (in this case communication with the application) are carried out. The warning may take the form of a flashing light, for example, or a message on an LED screen.

Optionally, the application may require the user to take additional steps, before it will issue an instruction to the control unit of the device, to unlock it. For example, the fact that communication with the application was not initiated by the user within the limited number of available inhalations may prompt suspicion, at the application, the user is underage or is otherwise non-authorised. Therefore the application may request an additional, more thorough input from the user than would have been required, had the user communicated with the application before the predetermined threshold was exceeded. For example, it may ask the user for additional age-verification evidence.

Although the particular embodiment described herein uses certain inhalation data, specifically number of inhalations, as the retainable data, it will be appreciated that other types of data may be used instead. For example, the time and date of inhalations may be used, wherein the control unit is configured to lock the device if the required steps have not been carried out by the time the device has been used for smoking substitute action for a particular total number of days. Alternatively, or additionally, battery information may be used. For example, the control unit may trigger locking of the device if the required steps have not been carried out by the time the battery charge reaches (or falls below) a predetermined level. Alternatively, or additionally, information regarding the orientation of the device may be used. For example, the control unit may be configured to recognise the orientation that the smoking device will be in for a smoking substitute action. It may use that orientation information to track the number of substitute smoking actions and/or the time period over which smoking substitute action has been performed using the device, and it may trigger locking of the device if the required steps have not been carried out by the time the number of, or the time period of, smoking substitute actions reaches or exceeds a pre-determined level.

Although the particular embodiment described herein has "communication with an application" as its required step, and therefore as its "re-enablement procedure", it will be appreciated that other requirements are possible, in addition to or instead of such communication. For example, the user may be required to register the device, online or otherwise, within a pre-determined time limit or before he or she reaches a pre-determined amount of usage of the device. For example, there may be a requirement for the user to provide user identification and or age verification directly to the smoking substitute device, not via an application stop. This may be a requirement for simple devices that are not network enabled. The retention of important usage data and the related requirements that must be fulfilled before the usage reaches or exceeds pre-determined levels may be particularly important for simpler models of smoking substitute device, which are likely to be less expensive and therefore to be more attractive and accessible too underage persons.

The locking of the smoking substitute device may happen at other times, and in relation to other requirements, apart from towards the beginning of the lifetime of the device. For example, locking and subsequent re-enablement may be employed in order to ensure that the user keeps his or her device up to date or, for network-enabled devices, that the device performs sufficiently regular data transfers to the application or mobile device with which it communicates wirelessly.

For example, the user may need to log into the application on a repeated or regular basis, in order for the application to retrieve the synchronisation data from the smoking substitute device. If the control unit determines that a synchronisation data transfer has not happened for a predetermined period of time, or for a predetermined amount of data that is accumulating on the memory of the device, it may lock the device and require a re-enablement procedure to be performed, in order to unlock it. In this case, the re-enablement procedure may include implementing a data synchronisation transfer from the smoking substitute device to an application on the mobile device.

Alternatively, or additionally, a re-enablement procedure may include connecting the smoking substitute device to an electrical power supply. Therefore, the control unit may lock the device when the battery is running low, to prompt the user to take action and recharge the device.

Alternatively or additionally, a re-enablement procedure may include updating the software on the smoking substitute device or running an application software update, to ensure that the smoking substitute device is being controlled using the most up to date software and to avoid potential errors which using older versions might otherwise cause. Therefore, the control unit may lock the device if it determines that a particular update has not been performed by a deadline, or for a predetermined length of time.

A re-enablement procedure may comprise taking a break from using the device for a predetermined period of time. Therefore, the control unit may be configured to lock the device when the usage exceeds a predetermined level within a defined period of time, and only to unlock it and allow continued use of the device for smoking substitute action after a predetermined time period has elapsed.

According to an embodiment, the user may determine bespoke conditions for his or her device, as regards the locking and unlocking of the device. For example, the user may pre-set usage restrictions for his or her device. For example, he or she may wish to set a limit on the number of inhalations per day or per week etc. Therefore, the control unit may be configured to lock the device if those limits are exceeded. The re-enablement procedure may comprise the user re-setting, or re-confirming those limits, or confirming ether via the device or via an application connected mobile device that it is permissible for those limits to be exceeded, on this occasion. Or the user may have to take a break from using the device. The user's bespoke conditions may include security measures, wherein the control unit is configured to lock the device if it is detected that a user, other than the authorised user, is using the device. The re-enablement procedure in this case would require user authentication, ether directly at the device or at the mobile device or application with which it corresponds.

Although the focus of the particular embodiment described herein has been the preservation of important usage data in order to prevent potential misuse of the smoking substitute device, it will be appreciated that the preservation of a portion of the usage information, within a memory of the smoking substitute device, can have other important advantages as well.

For example, by preserving a portion of the information relating to usage of a smoking substitute device, and by using that information to determine if certain required steps have been performed within a usage limit or time limit, the disclosure can enable the device to be operated more safely and efficiently. For example, in embodiments in which the required steps include communicating with an application, the application will usually enable the device to perform better. For example, the application may take some of the data storage burden away from the smoking substitute device. It may also take away some processing burden, wherein calculations or other determinations may be made by the application, not by the control unit of the device itself. Moreover, communication of data to the application may enable the application to have a better picture of the operating parameters of the device's components and to alert the user to any safety concerns in relation to the smoking substitute device.

For example, as mentioned above, it is known for an application that communicates wirelessly with a smoking substitute device to store information that had previously been stored in the device's memory and to instruct the device to clear that information from its memory, once it has been safely received by the application. However, such an approach has a potential pitfall in that, if there is a malfunction of the application or if the user is left without access to the application, for example if he or she forgets the username and password required to access the application, or if the mobile device via which he or she accesses the application is lost, stolen or damaged, the user would be left potentially without any information regarding the usage history of the device. With the present disclosure however, the user would always retain some information on usage within the device itself and therefore any reliance on a separate mobile device or application would not be absolute.

The preservation of a portion of usage information within the memory of a smoking substitute device can also be very useful if there is a technical malfunction and if the device is subsequently sent to the manufacturer or other third party to be fixed. Understandably, many users would be uncomfortable with a manufacturer or other third party accessing all the information that may be available via an application. If, however, the memory of the device has retained certain information relating to its usage, the third party may have no need to access the application or to request additional information from the user. Therefore, efficiency, user security and user peace of mind are enhanced.

FIG. 33 is a flow diagram of a method 400 for managing a smoking substitute device that is an embodiment of the disclosure. The method 400 begins with a step 402 of recording, by a control unit in a smoking substitute device of the type discussed above, usage information relating to operation of the device. The usage information may be of any of the types discussed above.

The method continues with a step 404 of determining, by the control unit from the recorded usage information, non-retainable data and retainable data. The retainable data may be extracted, calculated or otherwise obtained from the usage information.

The method continues with a step 406 of storing, by the control unit, the non-retainable data in a first portion of memory and the retainable data in a second portion of memory. The first and second portions of memory may be of any of the types discussed above. For example, the non-retainable data may be stored by overwriting non-retainable data in the first portion that is flagged as having been uploaded to the mobile device or remote application server.

The method continues with a step 408 of receiving, by the control unit, an instruction or command to clear or overwrite the memory of the smoking substitute device. As discussed above, the instruction may be sent wirelessly from a mobile device, or may be provided by pressing a reset button on the device, or by manipulating the device in a certain manner. In one example, the device is configured automatically to permit overwriting of the memory after non-retainable usage data has been downloaded to a mobile device or remote server. The device may be configured to flag all or part of the non-retainable data as overwritable, e.g., by setting an appropriate flag after an upload operation is complete.

The method continues with a step 410 of erasing or overwriting, in response to the instruction to clear memory, the non-retainable data from the first portion of memory. The retainable data in the second portion of memory is not erased and is configured to prohibit overwriting thereof.

The features disclosed in the foregoing description, or in the following claims, or in the accompanying drawings, expressed in their specific forms or in terms of a means for performing the disclosed function, or a method or process for obtaining the disclosed results, as appropriate, may, separately, or in any combination of such features, be utilised for realising the disclosure in diverse forms thereof.

While the disclosure has been described in conjunction with the exemplary embodiments described above, many equivalent modifications and variations will be apparent to those skilled in the art when given this disclosure. Accordingly, the exemplary embodiments of the disclosure set forth above are considered to be illustrative and not limiting. Various changes to the described embodiments may be made without departing from the spirit and scope of the disclosure.

For the avoidance of any doubt, any theoretical explanations provided herein are provided for the purposes of improving the understanding of a reader. The inventors do not wish to be bound by any of these theoretical explanations.

Any section headings used herein are for organizational purposes only and are not to be construed as limiting the subject matter described.

Throughout this specification, including the claims which follow, unless the context requires otherwise, the word "comprise" and "include", and variations such as "comprises", "comprising", and "including" will be understood to imply the inclusion of a stated integer or step or group of integers or steps but not the exclusion of any other integer or step or group of integers or steps.

It must be noted that, as used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by the use of the antecedent "about," it will be understood that the particular value forms another embodiment. The term "about" in relation to a numerical value is optional and means for example +/− 10%.

The following statements, which form part of the description, provide general expressions of the disclosure herein:

G1. A smoking substitute device comprising:
a control unit; and
a memory;
wherein the control unit is configured to:
record, in the memory, usage information relating to operation of the smoking substitute device; and
permit a first portion of the usage information to be overwritten or cleared from the memory while retaining a second portion of the usage information in the memory.

G2. The smoking substitute device of statement G1, wherein the first portion of the usage information is non-retainable data stored in a first portion of the memory, and wherein the second portion of the usage information is retainable data stored in a second portion of the memory, wherein the first portion of the memory and the second portion of the memory are independently addressable.

G3. The smoking substitute device of statement G1, wherein the control unit is further configured to extract the retainable data from the recorded usage information.

G4. The smoking substitute device of any preceding statement, wherein the second portion of the usage information comprises:
a total number of inhalation events; or
a number of inhalation events performed within a predetermined time period.

G5. The smoking substitute device of any preceding statement, wherein the usage information comprises any one or more of:
a number of inhalations performed using the device within a defined time period;
a number of inhalations performed using the device since an occurrence of a predetermined event; or
a number of inhalations performed using the device since the most recent occurrence of a predetermined event; or
information regarding a time and/or a date of one more inhalations; or
information regarding an orientation of the device; or
information relating to the battery.

G6. The smoking substitute device of any preceding statement, wherein the control unit is configured, upon receiving an instruction to clear the memory, to:
clear the first portion of the usage information from the memory; and
retain the second portion of the usage information in the memory.

G7. The smoking substitute device of any preceding statement configured to wirelessly transmit synchronisation data to an application installed on a mobile device, wherein the usage information comprises a number of inhalations performed since the most recent wireless transmission of synchronisation data to the application.

G8. The smoking substitute device of statement G7, wherein the wireless transmission of synchronisation data includes uploading the usage information to the application installed on the mobile device, and wherein, following the wireless transmission of synchronisation data, the control unit is configured to permit overwriting in the memory of the first portion of the usage information included in the uploaded usage information.

G9. The smoking substitute device of any preceding statement, wherein the control unit is further configured to:
compare a usage parameter of the usage information to a predetermined threshold; and
cause the smoking substitute device to enter a locked state if the usage parameter exceeds the predetermined threshold,
wherein the second portion of the usage information comprises the usage parameter.

G10. The smoking substitute device of statement G9, wherein the control unit is configured to determine whether or not a predetermined action has been performed, and wherein the control unit is configured to cause the smoking substitute device to enter a locked state if the usage parameter exceeds the predetermined threshold and the predetermined action has not been performed.

G11. The smoking substitute device of statement G9 or G10, wherein the usage parameter is a total number of inhalation events, or a number of inhalation events performed within a predetermined time period.

G12. A method of managing a smoking substitute device comprising a control unit and a memory, the method comprising:
storing, by the control unit, usage information in the memory, wherein the usage information relates to operation of the smoking substitute device; and
clearing or overwriting a first portion of the usage information from the memory while retaining a second portion of the usage information in the memory.

G13. The method of statement G12 further comprising:
receiving, by the control unit, an instruction to clear the memory;
clearing the first portion of the usage information from the memory; and
retaining the second portion of the usage information in the memory.

G14. The method of statement G12 or G13 further comprising:
uploading, by the control unit, the usage information to an application installed on a mobile device;
detecting, by the control unit after the usage information is uploaded, new usage information of the smoking substitute device; and
overwriting the first portion of the usage information included in the uploaded usage information with the new usage information.

G15. The method of any one of statements G12 to G14 further comprising:
determining, by the control unit from the usage information, non-retainable data and retainable data,
wherein the step of storing the usage information in the memory comprises storing the non-retainable data in a first portion of the memory and storing the retainable data in a second portion of the memory, wherein the first portion of the memory and the second portion of the memory are independently addressable, and
wherein the step of clearing or overwriting the first portion of the usage information from the memory comprises either (i) erasing the non-retainable data from the first portion of memory, or (ii) overwriting the non-retainable data in the first portion or memory.

PART H (P01011EP)

A System and Method for Managing a Smoking Substitute Device

Technical Field

The present disclosure relates to smoking substitute devices. In particular, although not exclusively, it relates to the management of network-enabled smoking substitute devices and their communication with other devices.

Background

The smoking of tobacco is generally considered to expose a smoker to potentially harmful substances. It is generally thought that a significant amount of the potentially harmful substances are generated through the heat caused by the burning and/or combustion of the tobacco and the constituents of the burnt tobacco in the tobacco smoke itself.

Conventional combustible smoking articles, such as cigarettes, typically comprise a cylindrical rod of tobacco comprising shreds of tobacco which is surrounded by a wrapper, and usually also a cylindrical filter axially aligned in an abutting relationship with the wrapped tobacco rod. The filter typically comprises a filtration material which is circumscribed by a plug wrap. The wrapped tobacco rod and the filter are joined together by a wrapped band of tipping paper that circumscribes the entire length of the filter and an adjacent portion of the wrapped tobacco rod. A conventional cigarette of this type is used by lighting the end opposite to the filter, and burning the tobacco rod. The smoker receives mainstream smoke into their mouth by drawing on the mouth end or filter end of the cigarette.

Combustion of organic material such as tobacco is known to produce tar and other potentially harmful by-products. There have been proposed various smoking substitute devices in order to avoid the smoking of tobacco.

Such smoking substitute devices can form part of nicotine replacement therapies aimed at people who wish to stop smoking and overcome a dependence on nicotine.

Smoking substitute devices may comprise electronic systems that permit a user to simulate the act of smoking by producing an aerosol (also referred to as a "vapour") that is drawn into the lungs through the mouth (inhaled) and then exhaled. The inhaled aerosol typically bears nicotine and/or flavourings without, or with fewer of, the odour and health risks associated with traditional smoking.

In general, smoking substitute devices are intended to provide a substitute for the rituals of smoking, whilst providing the user with a similar experience and satisfaction to those experienced with traditional smoking and tobacco products. Some smoking substitute systems use smoking substitute articles (also referred to as a "consumables") that are designed to resemble a traditional cigarette and are cylindrical in form with a mouthpiece at one end.

The popularity and use of smoking substitute devices has grown rapidly in the past few years. Although originally marketed as an aid to assist habitual smokers wishing to quit tobacco smoking, consumers are increasingly viewing smoking substitute devices as desirable lifestyle accessories.

Some smoking substitute devices are designed to resemble a traditional cigarette and are cylindrical in form with a mouthpiece at one end. Other smoking substitute devices do not generally resemble a cigarette (for example, the smoking substitute device may have a generally box-like form).

There are a number of different categories of smoking substitute devices, each utilising a different smoking substitute approach. A smoking substitute approach corresponds to the manner in which the substitute system operates for a user.

One approach for a smoking substitute device is the so-called "vaping" approach, in which a vapourisable liquid, typically referred to (and referred to herein) as "e-liquid", is heated by a heating device to produce an aerosol vapour which is inhaled by a user. An e-liquid typically includes a base liquid as well as nicotine and/or flavourings. The resulting vapour therefore typically contains nicotine and/or flavourings. The base liquid may include propylene glycol and/or vegetable glycerin.

A typical vaping smoking substitute device includes a mouthpiece, a power source (typically a battery), a tank for containing e-liquid, as well as a heating device. In use, electrical energy is supplied from the power source to the heating device, which heats the e-liquid to produce an aerosol (or "vapour") which is inhaled by a user through the mouthpiece.

Vaping smoking substitute devices can be configured in a variety of ways. For example, there are "closed system" vaping smoking substitute devices which typically have a sealed tank and heating element which is pre-filled with e-liquid and is not intended to be refilled by an end user. One subset of closed system vaping smoking substitute devices include a main body which includes the power source, wherein the main body is configured to be physically and electrically coupled to a consumable including the tank and the heating element. In this way, when the tank of a consumable has been emptied, the main body can be reused by connecting it to a new consumable. Another subset of closed system vaping smoking substitute devices are completely disposable, and intended for one-use only.

There are also "open system" vaping smoking substitute devices which typically have a tank that is configured to be refilled by a user, so the device can be used multiple times.

An example vaping smoking substitute device is the Myblu™ e-cigarette. The Myblu™ e-cigarette is a closed system device which includes a main body and a consumable. The main body and consumable are physically and electrically coupled together by pushing the consumable into the main body. The main body includes a rechargeable battery. The consumable includes a mouthpiece, a sealed tank which contains e-liquid, as well as a heating device, which for this device is a heating filament coiled around a portion of a wick which is partially immersed in the e-liquid. The device is activated when a microprocessor on board the main body detects a user inhaling through the mouthpiece. When the device is activated, electrical energy is supplied from the power source to the heating device, which heats e-liquid from the tank to produce a vapour which is inhaled by a user through the mouthpiece.

Another example vaping smoking substitute device is the blu PRO™ e-cigarette. The blu PRO™ e-cigarette is an open system device which includes a main body, a (refillable) tank, and a mouthpiece. The main body and tank are physically and electrically coupled together by screwing one to the other. The mouthpiece and refillable tank are physically coupled together by screwing one of the other, and detaching the mouthpiece from the refillable tank allows the tank to be refilled with e-liquid. The device is activated by a button on the main body. When the device is activated, electrical energy is supplied from the power source to a heating device, which heats e-liquid from the tank to produce a vapour which is inhaled by a user through the mouthpiece.

Another approach for a smoking substitute system is the so-called Heated Tobacco ("HT") approach in which tobacco (rather than an "e-liquid") is heated or warmed to release vapour. HT is also known as "heat not burn" ("HNB"). The tobacco may be leaf tobacco or reconstituted tobacco. The vapour may contain nicotine and/or flavourings. In the HT approach the intention is that the tobacco is heated but not burned, i.e., the tobacco does not undergo combustion.

A typical HT smoking substitute system may include a device and a consumable. The consumable may include the tobacco material. The device and consumable may be configured to be physically coupled together. In use, heat may be imparted to the tobacco material by a heating element of the device, wherein airflow through the tobacco material causes components in the tobacco material to be released as vapour. A vapour may also be formed from a carrier in the tobacco material (this carrier may for example include propylene glycol and/or vegetable glycerine) and additionally volatile compounds released from the tobacco. The released vapour may be entrained in the airflow drawn through the tobacco.

As the vapour passes through the consumable (entrained in the airflow) from the location of vaporisation to an outlet of the consumable (e.g., a mouthpiece), the vapour cools and condenses to form an aerosol for inhalation by the user. The aerosol will normally contain the volatile compounds.

In HT smoking substitute systems, heating as opposed to burning the tobacco material is believed to cause fewer, or smaller quantities, of the more harmful compounds ordinarily produced during smoking. Consequently, the HT approach may reduce the odour and/or health risks that can arise through the burning, combustion and pyrolytic degradation of tobacco.

There may be a need for improved design of smoking substitute systems, in particular HT smoking substitute systems, to enhance the user experience and improve the function of the HT smoking substitute system.

An example of the HT approach is the IQOS™ smoking substitute device from Philip Morris Ltd. The IQOS™ smoking substitute device uses a consumable, including reconstituted tobacco located in a wrapper. The consumable includes a holder incorporating a mouthpiece. The consumable may be inserted into a main body that includes a heating device. The heating device has a thermally conductive heating knife which penetrates the reconstituted tobacco of the consumable, when the consumable is inserted into the heating device. Activation of the heating device heats the heating element (in this case a heating knife), which, in turn, heats the tobacco in the consumable. The heating of the tobacco causes it to release nicotine vapour and flavourings which may be drawn through the mouthpiece by the user through inhalation.

A second example of the HT approach is the device known as "Gb"™ from British American Tobacco p.l.c. Glo™ comprises a relatively thin consumable. The consumable includes leaf tobacco which is heated by a heating device located in a main body. When the consumable is placed in the main body, the tobacco is surrounded by a heating element of the heating device. Activation of the heating device heats the heating element, which, in turn, heats the tobacco in the consumable. The heating of the tobacco causes it to release nicotine vapour and flavourings which may be drawn through the consumable by the user through inhalation. The tobacco, when heated by the heating device, is configured to produce vapour when heated rather than when burned (as in a smoking apparatus, e.g., a cigarette). The tobacco may contain high levels of aerosol formers (carrier), such as vegetable glycerine ("VG") or propylene glycol ("PG").

The present inventor(s) have observed that most smoking substitute devices currently on the market are configured to operate in isolation of other devices, which limits the functions the smoking substitute devices can perform.

The present inventor(s) have also observed that, as smoking substitute devices become more sophisticated and are able to perform more functions, they may require more sophisticated management. For example, that management may need to consider security and integrity factors for smoking substitute devices that are configured for data acquisition, storage and transmission. In particular, the management of wireless communication of data between smoking substitute devices and mobile devices requires secure and user-controllable management, to ensure accurate, efficient functioning and user peace of mind.

The present disclosure has been devised in light of the above considerations.

SUMMARY OF THE DISCLOSURE

At its most general, the present disclosure provides a system, method and devices, which enable a smoking substitute device to be network-enabled (that is, to be capable of wireless communication with other devices) in a secure and user-controllable manner. The smoking substitute device can be network-enabled in the sense that it can communicate wirelessly, via a wireless network, with the communication terminal of a mobile phone or other device in order to transmit information such as, for example, component status information. Communication can be, for example, over a short-range network.

The user can control the transmission of data by initially pairing their smoking substitute device with a first mobile (or "portable") device, for example the user's mobile phone. The pairing can follow a suitable safety protocol. For example, the smoking substitute device and the first mobile device can exchange encryption keys and encrypt the communication link between them. Once a secure link has been established, the two devices can be regarded as being "paired". They may also become "bonded", wherein they store the encryption keys or other secure identifiers that they exchanged when they paired and use those again the next time they connect.

Once it has been paired or bonded to the smoking substitute device, the first mobile device can then act as a central device, or so-called "master controller", wherein the user's smoking substitute device will only be able to communicate with a second mobile device if the first mobile device has granted permission for that line of communication to be established. Such permission may be granted, for example, by the user inputting a command into an application that is being run on the first mobile device. The command may comprise identifying the second mobile device, thereby enabling it to be added to a so-called "whitelist" of mobile devices that the smoking substitute device is permitted to communicate with. The user may grant such permission to multiple additional mobile devices, each of which should be specifically user-selected and individually paired or bonded to the smoking substitute device. A record or "whitelist" of the devices with which it is permitted to communicate should be stored in a suitable memory means, within the smoking substitute device. The whitelist may also be stored, for example, on the first mobile device and/or within an application.

According to a first aspect of the disclosure, there may be provided a system for managing a smoking substitute device including: a smoking substitute device; and a first mobile device on which an application is installed. The smoking substitute device has a bonded wireless communication link with the first mobile device. The smoking substitute device is configured to prevent a communication link with a second mobile device from being established unless permitted by the application installed on the first mobile device. The smoking substitute device may be configured to prevent a communication link from being established with the second mobile device in a particular scenario where the second mobile device does not have a bonded wireless communication link with the smoking substitute device.

The first mobile device may comprise, for example, a mobile phone, a smart phone, a tablet or a laptop. Bonding of the smoking substitute device to the first mobile device may comprise any suitable steps. For example, it may comprise the sharing of an encryption key, a password or a code between the two devices. The smoking substitute device may be paired to the first mobile device, for example through the exchange of encryption keys, and thereafter it may be bonded to the first mobile device by virtue of the devices storing and remembering the exchanged encryption keys, and re-using those keys each time the devices connect to one another. Alternatively, or additionally, bonding may comprise the user inputting data to identify the smoking substitute device to the application installed on the first mobile device. Once it has been bonded to the smoking substitute device, the first mobile device can be regarded as being a "master controller", in the sense that any user permissions for permitting communication between the smoking substitute device and any additional mobile devices (including the afore-mentioned second mobile device) need to come from the first mobile device. These permissions may be issued in response to the user providing inputs to the application installed on the first mobile device.

The smoking substitute device may be configured to only send advertising wireless communications to the first mobile device, with which it has a bonded communication link, and to any other mobile devices with which has a bonded communication link.

The smoking substitute device may be configured to be "invisible" to the second mobile device and to any other devices which it does not have a bonded communication link. In such a configuration, the advertising communications issued by the smoking substitute device would be address-specific, for receipt only by bonded devices. So any non-bonded devices would not be able to "see" or receive advertising wireless communications, within a wireless communication network, from the smoking substitute device, once it has been bonded to the first mobile device. Alternatively, the smoking substitute device may be configured to send advertising communications that are visible to a plurality of mobile devices, including the first mobile device to which it is bonded and one or more non-bonded mobile devices, but to ignore or block requests or other communication attempts from all devices except the first mobile device to which it is bonded, unless the first mobile device has issued a specific permission for communication with one or more identified other mobile devices.

The smoking substitute device may be configured to begin to wirelessly communicate with the second mobile device, as a result of a permission having been issued by the application installed on the first mobile device. Once it has been given permission to communicate with the smoking substitute device, a second or other additional mobile device may become paired or bonded to the smoking substitute device. Any suitable steps may be followed, for issuing a communication to permit wireless communication between the smoking substitute device and a second mobile device, and for the bonding between them to occur. The steps should preferably include security measures such as the sharing of encryption keys, passwords or codes, to ensure that the smoking substitute only bonds to, and subsequently communicates with, mobile devices that have been specifically identified and authorised by the user.

The smoking substitute device may have a memory which stores a so-called "whitelist" configured to identify one or more devices with which the smoking substitute device is permitted to wirelessly communicate. The whitelist may comprise any suitable list, group or record that clearly identifies the permitted devices. The memory may include security means to ensure the whitelist is only accessible to the authorised user of the smoking substitute device, in case the smoking substitute device is lost, borrowed or stolen.

The smoking substitute device may be bonded to each of the devices identified on the whitelist.

The whitelist may be configured to identify a predetermined maximum number of devices, with which the smoking substitute device is permitted to communicate. For example, the predetermined maximum number of devices may be 10 or fewer. For example, the predetermined maximum number of devices may be 8 or fewer.

The smoking substitute device may be configured to automatically connect to any device identified by the whitelist. Therefore, when the user chooses to use a particular mobile device from the whitelist, to connect to the smoking substitute device, the user would not have to go through a pairing or bonding process again, for that mobile device.

The smoking substitute device may be configured to wirelessly communicate with the first mobile device via a wireless interface included in the smoking substitute device and a wireless interface included in the first mobile device. For example, they may have Bluetooth™ interfaces. However other wireless communication networks may be used such as a cellular network (e.g., according to a standard protocol, such as 3G or 4G) or a WiFi network. In terms of the wireless communication, the smoking substitute device may be regarded as a "peripheral device" and the first mobile device be regarded as being a "host device".

The application installed on the first mobile device may configured to permit the smoking substitute device to communicate with the second mobile in response to user input provided to the application, via a user interface of the first mobile device. For example, the user input may comprise typing and/or making selections via a touch screen, keypad, control pad or other suitable input means. The user input may comprise voice commands. The user input may include using biometric data for identification.

In another aspect, a method is provided of managing a smoking substitute device, using a first mobile device on which an application is installed. The method includes establishing a bonded communication link between the smoking substitute device and the first mobile device, via which the smoking substitute device is wirelessly accessible by the application installed on the first mobile device. The method further comprises selectively controlling communication between the smoking substitute device and a second mobile device, with which the smoking substitute device does not have a bonded communication link, wherein the smoking substitute device is configured to prevent a communication link with the second mobile device from being established unless permitted by the application installed on the first mobile device.

The method may further comprise issuing a permission, from the application installed on the first mobile device, to permit the smoking substitute device to wirelessly communicate with the second mobile device. The smoking substitute device may comprise a whitelist configured to identify the one or more devices with which the smoking substitute device is permitted to wirelessly communicate.

The method may comprise any suitable combination of user-implemented, computer-implemented and hardware-implemented steps. For example, specific user input should be required in order to identify the first mobile device, to which the smoking substitute device should be bonded. Moreover, specific user input should be required in order to identify a second any subsequent mobile devices, for which permission to communicate with the smoking substitute device is to be granted. However, some or all of the steps involved in bonding the smoking substitute device with the mobile device(s), and the subsequent wireless transmissions between the devices, may happen without any specific user input being required. Moreover, the smoking substitute device may be configured such that the storing of data identifying the one or more devices with which the smoking substitute device is permitted to wirelessly communicate, on the whitelist, happens automatically, without any user input.

In another aspect, a smoking substitute device is provided comprising a power source, a memory, a control unit and a wireless interface. The smoking substitute device has a bonded communication link with the first mobile device, via which the smoking substitute device is wirelessly accessible by the application installed on the first mobile device. The smoking substitute device is configured so that the application can selectively control communication between the smoking substitute device and a second mobile device that does not have a bonded communication link with the smoking substitute device.

The smoking substitute device is configured to prevent a communication link with the second mobile device from being established unless permitted by the application installed on the first mobile device.

The smoking substitute device may be configured to bond to, and begin to communicate wirelessly with, the second device if (and not unless) the application installed on the first mobile device issues a permission for the smoking substitute device to communicate with the second mobile device. The whitelist may be configured to identify the one or more devices with which the smoking substitute device is permitted to wirelessly communicate. The smoking substitute device may further comprise, or be connectable to, a heating element, for heating liquid and/or tobacco for a smoking substitute action.

In another aspect, a computer implemented method is provided for controlling wireless communication links between a smoking substitute device and one or more mobile devices. The method comprises exchanging, via a wireless communication channel between the smoking substitute device and a first mobile device, authorisation data to identify the smoking substitute device and the first mobile device to one another. It further comprises establishing a bonded communication link, over the wireless communication channel, between the smoking substitute device and the first mobile device as a result of the exchange of authorisation data. It further comprises restricting the smoking substitute device to only communicate, over the wireless communication channel, with the first mobile device, with which it has established a bonded communication link.

The authorisation data exchanged between the smoking substitute device and the first mobile device may be of any suitable type. For example, it may comprise an encryption key, a password, or a code.

The computer implemented method may further comprise issuing a permission, to the smoking substitute device from the first mobile device, over the wireless communication channel, to permit the establishment of a bonded communication link, over the wireless communication channel, between the smoking substitute device and a second mobile device.

In another aspect, a computer program product is provided comprising a computer-readable storage medium having computer readable instructions stored thereon. The computer-readable instructions are executable as an app in a first mobile device to perform the method according to any of the aspects described herein, for controlling wireless communication between a smoking substitute device and one or more mobile devices.

The disclosure includes the combination of the aspects and preferred features described except where such a combination is clearly impermissible or expressly avoided.

The skilled person will appreciate that except where mutually exclusive, a feature or parameter described in relation to any one of the above aspects may be applied to any other aspect. Furthermore, except where mutually exclusive, any feature or parameter described herein may be applied to any aspect and/or combined with any other feature or parameter described herein.

DETAILED DESCRIPTION OF THE DISCLOSURE

Aspects and embodiments of the present disclosure will now be discussed with reference to the accompanying figures. Further aspects and embodiments will be apparent to those skilled in the art. All documents mentioned in this text are incorporated herein by reference.

FIG. 34 shows an example system 1 for managing a smoking substitute device 10.

The system 1 as shown in FIG. 34 includes a mobile device 2, an application server 4, an optional charging station 6, as well as the smoking substitute device 10.

The smoking substitute device 10 is configured to communicate wirelessly, e.g., via Bluetooth™, with an application (or "app") installed on the mobile device 2, e.g., via a suitable wireless interface (not shown) on the mobile device 2. The mobile device 2 may be a mobile phone, for example. The application on the mobile phone is configured to communicate with the application server 4, via a network 8. The application server 4 may utilise cloud storage, for example.

The network 8 may include a cellular network and/or the Internet.

A skilled person would readily appreciate that the mobile device 2 may be configured to communicate via the network 8 according to various communication channels, preferably a wireless communication channel such as via a cellular network (e.g., according to a standard protocol, such as 3G or 4G) or via a WiFi network.

The app installed on the mobile device and the application server 4 may be configured to assist a user with their smoking substitute device 10, based on information communicated between the smoking substitute device 10 and the app and/or information communicated between the app and the application server 4.

The charging station 6 (if present) may be configured to charge (and optionally communicate with) the smoking substitute device 10, via a charging port on the smoking substitute device 10. The charging port on the smoking substitute device 10 may be a USB port, for example, which may allow the smoking substitute device to be charged by any USB-compatible device capable of delivering power to the smoking substitute device 10 via a suitable USB cable (in this case the USB-compatible device would be acting as the charging station 6). Alternatively, the charging station could be a docking station specifically configured to dock with the smoking substitute device 10 and charge the smoking substitute device 10 via the charging port on the smoking substitute device 10.

FIG. 35A shows an example smoking substitute device 110 for use as the smoking substitute device 10 in the system 1 of FIG. 34.

In this example, the smoking substitute device 110 includes a main body 120 and a consumable 150. The consumable 150 may alternatively be referred to as a "pod".

In this example, the smoking substitute device 110 is a closed system vaping device, wherein the consumable 150 includes a sealed tank 156 and is intended for one-use only.

FIG. 35A shows the smoking substitute device 110 with the main body 120 physically coupled to the consumable 150.

FIG. 35B shows the main body 120 of the smoking substitute device 110 without the consumable 150.

FIG. 35C shows the consumable 150 of the smoking substitute device 110 without the main body 120.

The main body 120 and the consumable 150 are configured to be physically coupled together, in this example by pushing the consumable 150 into an aperture in a top end 122 of the main body 120, e.g., with the consumable 150 being retained in the aperture via an interference fit. In other examples, the main body 120 and the consumable could be physically coupled together by screwing one onto the other, through a bayonet fitting, or through a snap engagement mechanism, for example. An optional light 126, e.g., an LED located behind a small translucent cover, is located a bottom end 124 of the main body 120. The light 126 may be configured to illuminate when the smoking substitute device 110 is activated.

The consumable 150 includes a mouthpiece (not shown) at a top end 152 of the consumable 150, as well as one or more air inlets (not shown in FIG. 35) so that air can be drawn into the smoking substitute device 110 when a user inhales through the mouthpiece. At a bottom end 154 of the consumable 150, there is located a tank 156 that contains e-liquid. The tank 156 may be a translucent body, for example.

The tank 156 preferably includes a window 158, so that the amount of e-liquid in the tank 156 can be visually assessed. The main body 120 includes a slot 128 so that the window 158 of the consumable 150 can be seen whilst the rest of the tank 156 is obscured from view when the consumable 150 is inserted into the aperture in the top end 122 of the main body 120.

In this present embodiment, the consumable 302 is a "single-use" consumable. That is, upon exhausting the e-liquid in the tank 156, the intention is that the user disposes of the whole consumable 150. In other embodiments, the e-liquid (i.e., aerosol former) may be the only part of the system that is truly "single-use". In such embodiments, the tank 156 may be refillable with e-liquid or the e-liquid may be stored in a non-consumable component of the system. For example, the e-liquid may be stored in a tank located in the device or stored in another component that is itself not single-use (e.g., a refillable tank).

The tank 156 may be referred to as a "clearomizer" if it includes a window 158, or a "cartomizer" if it does not.

FIG. 36A is a schematic view of the main body 120 of the smoking substitute device 110.

FIG. 36B is a schematic view of the consumable 150 of the smoking substitute device 110.

As shown in FIG. 36A, the main body 120 includes a power source 128, a control unit 130, a memory 132, a wireless interface 134, an electrical interface 136, and, optionally, one or more additional components 138.

The power source 128 is preferably a battery, more preferably a rechargeable battery.

The control unit 130 may include a microprocessor, for example.

The memory 132 is preferably includes non-volatile memory.

The wireless interface 134 is preferably configured to communicate wirelessly with the mobile device 2, e.g., via Bluetooth. To this end, the wireless interface 134 could include a Bluetooth™ antenna. Other wireless communication interfaces, e.g., WiFi, are also possible.

The electrical interface 136 of the main body 120 may include one or more electrical contacts. The electrical interface 136 may be located in, and preferably at the bottom of, the aperture in the top end 122 of the main body 120. When the main body 120 is physically coupled to the consumable 150, the electrical interface 136 may be configured to pass electrical power from the power source 128 to (e.g., a heating device of) the consumable 150 when the smoking substitute device 110 is activated, e.g., via the electrical interface 160 of the consumable 150 (discussed below). When the main body 120 is not physically coupled to the consumable 150, the electrical interface may be configured to receive power from the charging station 6.

The additional components 138 of the main body 120 may include the optional light 126 discussed above.

The additional components 138 of the main body 120 may, if the power source 128 is a rechargeable battery, include a charging port configured to receive power from the charging station 6. This may be located at the bottom end 124 of the main body 120. Alternatively, the electrical interface 136 discussed above is configured to act as a charging port configured to receive power from the charging station 6 such that a separate charging port is not required.

The additional components 138 of the main body 120 may, if the power source 128 is a rechargeable battery, include a battery charging control circuit, for controlling the charging of the rechargeable battery. However, a battery charging control circuit could equally be located in the charging station 6 (if present).

The additional components 138 of the main body 120 may include an airflow sensor for detecting airflow in the smoking substitute device 110, e.g., caused by a user inhaling through a mouthpiece 166 (discussed below) of the smoking substitute device 110. The smoking substitute device 110 may be configured to be activated when airflow is detected by the airflow sensor. This optional sensor could alternatively be included in the consumable 150 (though this is less preferred where the consumable 150 is intended to be disposed of after use, as in this example).

The additional components 138 of the main body 120 may include an actuator, e.g., a button. The smoking substitute device 110 may be configured to be activated when the actuator is actuated. This provides an alternative to the airflow sensor noted, as a mechanism for activating the smoking substitute device 110.

The additional components 138 of the main body 120 may include a reader configured to read information associated with the consumable from a machine readable data source included in (e.g., contained in the body of, or attached to) the consumable 150.

The reader may be configured to read information from the machine readable data source wirelessly, e.g., via electromagnetic waves or optically. Thus, for example, the machine readable data source included in the consumable 150 could be an RFID tag (in which case the reader included in the main body 120 may be an RFID reader) or a visual data source such as a barcode (in which case the reader included in the main body may be an optical reader, e.g., a barcode scanner). Various wireless technologies and protocols may be employed to allow the reader to wirelessly read information from a machine readable data source included in or attached to the consumable 150, e.g., NFC, Bluetooth, Wi-Fi, as would be appreciated by a skilled person.

For avoidance of any doubt, the reader (if present) may be configured to read information from the machine readable data source non-wirelessly, e.g., using a direct electrical connection between the main body 120 and consumable 150.

As shown in FIG. 36B, the consumable 150 includes the tank 156, an electrical interface 160, a heating device 162, one or more air inlets 164, a mouthpiece 166, and, optionally, one or more additional components 168.

The electrical interface 160 of the consumable 150 may include one or more electrical contacts. The electrical interface 136 of the main body 120 and an electrical interface 160 of the consumable 150 are preferably configured to contact each other and therefore electrically couple the main body 120 to the consumable 150 when the main body 120 is physically coupled to the consumable 150. In this way, electrical energy (e.g., in the form of an electrical current) is able to be supplied from the power source 128 in the main body 120 to the heating device 162 in the consumable 150.

The heating device 162 is preferably configured to heat e-liquid contained in the tank 156, e.g., using electrical energy supplied from the power source 128. In one example, the heating device 162 may include a heating filament and a wick, wherein a first portion of the wick extends into the tank 156 in order to draw e-liquid out from the tank 156, and wherein the heating filament coils around a second portion of the wick located outside the tank 156. In this example, the heating filament is configured to heat up e-liquid drawn out of the tank 156 by the wick to produce an aerosol vapour.

The one or more air inlets 164 are preferably configured to allow air to be drawn into the smoking substitute device 110, when a user inhales through the mouthpiece 166.

The additional components 168 of the consumable 150 may include a machine readable data source, which may e.g., be contained in the body of, or attached to the consumable 150. The machine readable data source may store information associated with the consumable. The information associated with the consumable may include information concerning the content of the consumable (e.g., e-liquid type, batch number) and/or a unique identifier, for example.

The machine readable data source may be rewritable, e.g., a rewritable RFID chip, or read only, e.g., a visual data source such as a barcode. As indicated above, the additional components 138 of the main body 120 may include a reader configured to read information associated with the consumable from the machine readable data source.

In use, a user activates the smoking substitute device 110, e.g., through actuating an actuator included in the main body 120 or by inhaling through the mouthpiece 166 as described above. Upon activation, the control unit 130 may supply electrical energy from the power source 128 to the heating device 162 (via electrical interfaces 136, 166), which may cause the heating device 162 to heat e-liquid drawn from the tank 156 to produce a vapour which is inhaled by a user through the mouthpiece 166.

Of course, a skilled reader would readily appreciate that the smoking substitute device 110 shown in FIGS. 35 and 36 shows just one example implementation of a smoking substitute device, and that other forms of smoking substitute device could be used as the smoking substitute device 10 of FIG. 34.

By way of example, a HNB smoking substitute device including a main body and a consumable could be used as the smoking substitute device 10 of FIG. 34, instead of the smoking substitute device 110. One such HNB smoking substitute device is the IQOS™ smoking substitute device discussed above.

As another example, an open system vaping device which includes a main body, a refillable tank, and a mouthpiece could be used as the smoking substitute device 10 of FIG. 34, instead of the smoking substitute device 110. One such open system vaping device is the blu PRO™ e-cigarette discussed above.

As another example, an entirely disposable (one use) smoking substitute device could be used as the smoking substitute device 10 of FIG. 34, instead of the smoking substitute device 110.

Embodiments of the present disclosure relate to the configuration and use of a network-enabled smoking substitute device such as that discussed above in relation to FIG. 34. In particular, they relate to providing secure, reliable and user-controllable communication links between a smoking substitute device and one or more mobile devices, for example mobile phones (including smartphones), laptops or tablets, in accordance with user commands. They further relate to eliminating the need to re-establish or reauthorise a communication link between a smoking substitute device and a user-selected mobile device, every time a connection is required between the two devices.

According to embodiments of the disclosure, and as described in more detail below, the risk of the user's data being accessible via a non-authorised mobile device if, for example, the smoking substitute device is lost, borrowed or stolen, or if the user is in a busy area with lots of mobile devices (with wireless communication interfaces) present, is reduced. Moreover, the embodiments remove any requirement for a smoking substitute device to repeatedly "advertise to", or look for, an unnecessarily large plurality of mobile devices, when it is seeking to transfer data to, or otherwise communicate with, a user-selected mobile device. This improves efficiency and reduces load on the battery, hence extending battery life. At the same time, the embodiments ensure that the user is not limited to his or her smoking substitute device communicating with just one mobile device. It is common for users to own more than one mobile device—such as a tablet or laptop in addition to a mobile phone and/or separate mobile phones for personal and professional purposes respectively. It can therefore be unduly restrictive when a smoking substitute device is only configured to communicate with a single mobile device.

As described above in relation to FIG. 34, it is known for a smoking substitute device to communicate with a mobile device and with an application running on a mobile device. To implement such communication, a wireless connection is established between the smoking substitute device and a mobile device. The wireless connection may be via any suitable wireless protocol that permits transmission of information. For example, the smoking substitute device may pair with the mobile device using a short range transmission protocol such as Bluetooth™ or the like. The smoking substitute device may be wirelessly connectable to a mobile device via any suitable personal area network.

The type of data that a smoking substitute device will communicate to a mobile device (including to an application running on a mobile device) may vary based on the particular type, nature, make and model of the smoking substitute device and/or on the particulars of the mobile device and/or of the particulars of the application running on that mobile device. However, almost invariably, the data being communicated to the mobile device will be particular to that individual smoking substitute device and will often be particular to its user, including, for example, the user's preferences, usage habits such as number of inhales and possibly also user personal or contact information. Similarly, the type of data communicated from a mobile device to a smoking substitute device may be bespoke to that smoking substitute device.

For example, a smoking substitute device may be configured to log component status data, for example data regarding the level of battery charge and/or data concerning the operational characteristics of the heating device and/or data read from a consumable such as the brand, type or flavouring of the current consumable and/or its current tank fill level. According to an embodiment, the smoking substitute device may transmit some or all of the logged component status data to a mobile device and, in response, the mobile device may be configured to issue instructions, warnings or commands to the smoking substitute device. For example, a mobile device may be configured to determine battery charge level, based on received component status data, and to warn the user if recharge is required. Similarly, the mobile device (or an application running on that mobile device) may be configured to assess operational parameters of certain components such as the heating device, on a repeated basis and preferably on a regular basis, and to issue a warning or other notification to the user via the smoking substitute device if any anomalies in those operational parameters are detected. Thus it can be seen that the data communicated between a smoking substitute device and a mobile device may be time-critical and/or it may be critical for the data to be safely received only by the intended recipient device(s), in order to ensure successful technical operation of the smoking substitute device, and to provide user satisfaction and peace of mind.

The present inventor(s) have recognised that it can be important for the communications between a smoking substitute device and a mobile device to be secure and reliable, so that all of the correct information is transmitted between the smoking substitute device and a user-selected mobile device and to ensure that none of that information is lost or is transmitted to a non-authorised device.

The present inventor(s) have further recognised that a user may wish to link more than one mobile device to his or her smoking substitute device, in order to offer user flexibility and to reflect the fact that users commonly now own/use more than one mobile device in their day-to-day lives. However, the inventor(s) have recognised the necessity for the number of mobile devices which communicate with an individual smoking substitute device to be limited and to be controllable by the user.

In view of the above, a system is provided herein for managing the wireless communications between a smoking substitute device and two or more mobile devices. A bonded communication link may be established between the smoking substitute device and a first, user-selected, mobile device. In order to form a bonded communication link, the two devices must exchange suitable authorisation data, to each securely identify themselves to the respective other. The authorisation data may comprise, for example, an encryption key, a password or a code. An application may be installed on the first mobile device, wherein the application, has access to the smoking substitute device, via the bonded communications link. The application may be used to control communication between the smoking substitute device and any other mobile devices.

The smoking substitute device is configured, after the initial bonding to the first mobile device, to avoid communicating with a second mobile device (or to any other mobile device that is not bonded to the smoking substitute device) unless the application installed on the first mobile device permits the smoking substitute device to communicate with the second mobile device.

An example embodiment will now be described in which a Bluetooth™ connection is employed for communications between a smoking substitute device and a mobile device. However other types of connection are possible, as described above in relation to FIG. 34, and the operational considerations for Bluetooth™ communication will be relevant to other connection types.

The smoking substitute device in the following example embodiment is of the type described above in relation to FIGS. 34 and 36A, which can form a wireless connection to a device running an application, such a mobile phone, smart phone, tablet or laptop. At the beginning of the method, it is to be taken that the smoking substitute device does not yet have any bonded communication links to any specific mobile devices.

Referring to FIG. 37, at the initial step 410 of the method 400, the user of the smoking substitute device selects a first mobile device, which he or she wishes to use as a "master controller" for controlling and limiting the identity and number of the mobile devices, which can communicate with his or her smoking substitute device. For the purpose of the described method, it is to be taken that the user has the requisite authority and/or permissions, to implement this method on his or her chosen devices.

At the second step 420 of the method 400, the user installs an application on the "master controller" first mobile device, for controlling communications with the smoking substitute device. The process of installing (or "downloading") applications onto mobile devices is well known and will not be described further herein. It is noted that, in almost all cases, there will be at least one security step involved in installing an application onto a mobile device. For example, the user may have to input a password and/or use his or her biometric data such as a fingerprint or thumbprint to show that he or she has the authority and/or permissions to install the application onto the mobile device.

Although step 420 is shown and described as being the second step of the specific method 400 described herein, it may be performed either before or after step 430, detailed below. The bonding described below for step 430 can be performed without the application yet being installed on the first mobile device.

At the next step 430 of the method 400, the user establishes a wireless communication link between the smoking substitute device and the "master controller" first mobile device. At this point, because there are no established bonds between it and any particular mobile devices, and because it is seeking to establish a communication link rather than seeking to transfer data as yet, the wireless interface (such as the Bluetooth™ antenna) of the smoking substitute device will be operating in a so-called "advertising" mode. It is known for so-called "peripheral" wireless devices, such as a smoking substitute device, which interface with so-called "host" wireless devices, such as a mobile device, to operate in an advertising operating mode, in order to broadcast information defining their intentions. In this case, the intention of the smoking substitute device is to establish a two-way connection with a host device—i.e., the user's mobile device, on which the relevant application is running.

In order to prompt his or her smoking substitute device to begin operating in an advertising operating mode, the user may take any suitable steps, depending on the particulars of the device. For example, there may be a button or other actuator for switching on the Bluetooth™ capabilities of the device. The device may default to being in an advertising operating mode, when its Bluetooth™ capabilities are switched on, in the absence of any bonded communication links already being in place. For example, there may be a predetermined period of time, after the device is switched on (or Bluetooth™ capabilities are switched on), during which the smoking substitute device will operate in an advertising operating mode. For example, there may be a predetermined period of time after the user performs a certain predetermined input or action, such as shaking or tapping the device, during which it will operate in an advertising operating mode.

Because the smoking substitute device does not yet have an established bond with any particular mobile device, the advertisement message sent out by the smoking substitute device at step 430 will be a general advertisement message, which is receivable by any host device or potential host device within the wireless communication range of the smoking substitute device, at that time.

The manner in which a wireless interface of a peripheral device, such as a Bluetooth™ antenna, issues advertisement messages is well known and so will not be described in detail herein. In general terms, the user may have to provide an input to the smoking substitute device to activate its Bluetooth™ capabilities, in order for it to be 'found' by the user's mobile device. Or this may happen automatically.

Once the Bluetooth™ advertisement message has been sent by the smoking substitute device, the next step 440 is for the master controller mobile device to issue a response, or series of responses, which results in a wireless communication link being formed between the smoking substitute device and the mobile device.

For example, the advertising message issued by the smoking substitute device may include instructions for a mobile device on what it expects or demands in a response from a mobile device, in order for it to connect to the smoking substitute device. The user should ensure that the first mobile device, which he or she wishes to use as the master controller, has its Bluetooth™ capabilities switched on, so that it can scan for and receive the advertising message from the smoking substitute device. Once the advertising message has been received by the first mobile device, it can read the instructions therein and then respond by issuing an advertising message including whatever form of response the smoking substitute device has demanded. When the smoking substitute device has received a satisfactory response from the first mobile device, it can then initiate a pairing process, wherein the two devices share an encryption key or other authorisation data, in order to identify each to the other and form a secure wireless communication link between the two devices. When this link has been established, the two devices are "paired". Preferably, the two devices will store the encryption keys, and reuse them each time they reconnect to one another. If this happens, they will have established a "bonded" wireless communication link to one another.

It will be appreciated that other protocols may be followed, in order to form a bonded communication link between the smoking substitute device and the first mobile device.

Once the bonded communication link has been formed, at step 440, between the smoking substitute device and the master controller mobile device, the devices will be configured to ensure that said communication bond is exclusive. When the smoking substitute is operating in this manner, it is in its so-called "whitelist operating mode". The identity of the master controller will, in this embodiment, be stored in a whitelist in the memory of the smoking substitute device and the device will be configured to communicate only with the devices identified on the whitelist (which, at this point in the method 400, is just the master controller mobile device.) Once it is operating in whitelist operating mode, subsequent advertising messages issued by the wireless interface of the smoking substitute device will only "look for" the master controller mobile device, unless the user permits communication between the smoking substitute device and another, different mobile device. This means that no other mobile devices will be able to "see" the smoking substitute device unless instructed by the master controller mobile device. Moreover, any data transfer messages from the smoking substitute device will be directed only to the master controller mobile device, unless instructed to the contrary by the master controller mobile device, as detailed further below.

Ensuring that the wireless communication bond between the smoking substitute device and the master controller mobile device is exclusive—unless the user permits a selected exception—can be achieved through any suitable combination of hardware and/or software means. For example, by virtue of having established a bonded communication link with the first mobile device, the smoking substitute device may be configured to limit its advertisement messages to that mobile device only, for example by using the address or other identifying information for the first mobile device, unless a further instruction regarding a selected exception to that rule is issued by the mobile device to the smoking substitute device.

As discussed above, it is possible that a user will want his or her smoking substitute device to be configured for communication with more than one mobile device, at a given time. At step 450, therefore, the user can determine which other mobile device(s) he or she wishes to authorise, for communication with his or her smoking substitute device. This step 450 does not have to be taken at all and, if taken, it does not have to happen immediately after the initial communication bond between the smoking substitute device and the master controller mobile device has been established. It can be done at any time, once that initial bond has been established, in accordance with user preferences.

If and when the user wishes to implement it, the next step 460 is to use the application on the master controller mobile device, to authorise one or more additional mobile devices, specifically selected by the user, to also communicate with the user's smoking substitute device. As mentioned above, the additional mobile devices could be, for example, mobile phones, smart phones, tablets or laptops. The user will then issue instructions, from the master controller mobile device, to allow communication between the smoking substitute device and the selected additional mobile devices. The user can issue those instructions via the user interface(s) of the master controller mobile device, using input options provided by the application.

Depending on the particulars of the devices and of the application concerned, there may be a number of options as to how the user's instructions are implemented, to permit one or more selected additional mobile devices to communicate with the smoking substitute device. For example, the application on the master controller mobile device may instruct the smoking substitute device to send an advertising Bluetooth™ message that specifically "looks for" the selected additional mobile device(s), for bonding. For example, the user may, via the application, provide address information or other identifying information for the selected additional mobile device(s), to the smoking substitute device, which it can use to direct its advertising message. In such an embodiment, the selected additional mobile device(s) should be in wireless communication with the first mobile device, for their address information to be known to it. The selected additional mobile device(s) may have to have the application installed, in order to effect transmission of data such as address information, to the first mobile device. The smoking substitute device may be configured to, upon receipt of address information or other identifying information for the selected additional mobile device(s), initiate a bonding process with the selected additional mobile device(s), as described above at step 440 for the first mobile device. Once the bonding process has been successfully completed for each selected additional mobile device, the smoking substitute device will add the device(s) to its whitelist, which is a stored record of devices with which it is permitted to wirelessly communicate. Thereafter, the device's advertising messages would be directed to all the devices on the whitelist.

Alternatively, for example, the master controller mobile device may instruct the smoking substitute device to switch back to being in an "advertising operating mode" and to temporarily advertise to any devices, when it is initiating the process of bonding to a second mobile device, but to accept responses only from the selected additional mobile device(s) to be bonded to it. When it is in an advertising operating mode, a plurality of other mobile devices would be able to "see" signals from the smoking substitute device, but the smoking substitute device would only accept response from, and initiate bonding with, the devices that the user has selected.

The first mobile device may provide instructions to the selected additional mobile device(s)—for example, via the application—regarding the type or form of response that the smoking substitute demands, in response to its advertising messages, in order for it to initiate the establishment of a bonded communication link with a mobile device. The smoking substitute device may only initiate a bonding process with the selected additional mobile devices if and when they provide a suitable response to its advertising message.

Whichever steps are followed, it will be understood that, at step 470, the smoking substitute device can pair with, and preferably bond with, the user's selected additional mobile device(s), based on instructions input via the application on the master controller mobile device.

Any suitable combination of hardware and software means can be used to implement the communications described above. The pairing between the smoking substitute device and the selected additional mobile devices can include any suitable security measures such as the sharing of encryption keys, codes or passwords. Moreover, installation and running of the application on the user's selected additional mobile devices can include any suitable security measures. For example, the application may be configured such that the user needs to create and ID and password, wherein there can only be one master controller device for that ID and password and/or wherein a particular mobile device can only be associated with (or registered to) a single ID for that application. Moreover, the application may be configured such that it can only communicate with an individual smoking substitute device from a limited number of mobile devices. Or there may be a limit on the number of mobile devices that the application can be run on, for an individual user ID.

When the application is downloaded to the user's selected additional mobile devices, the user may have to log in using their already-established ID and password and/or may have to identify the selected additional mobile devices as being "subordinate" or additional to the master controller. Or any other suitable steps may be taken, to ensure that there is a single "master controller" mobile device that oversees and controls the bonded communication links that can be made between the user's smoking substitute device and any other mobile devices. This enables the connections between the smoking substitute device and any mobile devices to be restricted and securely managed. The number of permitted mobile devices that can communicate with an individual smoking substitute device should be finite, and relatively small. For example, there may be a maximum of 10 so-called "permitted" mobile devices per smoking substitute device, with which it is paired for communication. According to an embodiment, there may be a maximum of 8 permitted mobile devices per smoking substitute device.

The list of permitted mobile devices, with which it has established bonded communication links, is stored in the memory of the smoking substitute device. This step may happen automatically, or it may require user input, for example via the application on the master controller mobile device. The stored list of permitted mobile devices may be referred to as a "whitelist". The smoking substitute will be configured such that future communications from it may be sent to, and seen by, all the devices on the stored whitelist, without the need to manually reconnect or re-pair with each device, every time a connection is required. Instead, that connection will happen automatically and securely. This is more efficient from a user perspective and from a processing perspective, for the of smoking substitute device.

The predetermined maximum number of devices that may be recorded on the whitelist should be large enough to enable a user to communicate with his or her smoking substitute device from a number of mobile devices that the typical user it likely to own or use. For example, the user may wish to communicate from his or her personal mobile phone, work mobile phone, tablet computer and/or laptop computer. The size of the predetermined maximum number should also give some scope for the user adding a new mobile device to the permitted list, without necessarily having to delete a pre-existing permitted mobile device (for example, an old device that no longer functions.) It should also give some scope for multiple users to communicate from their mobile devices to a single smoking substitute device. However, the whitelist should not present a disproportionate burden on the memory or control unit of the smoking substitute device, such that the list should be relatively small. Keeping the list relatively small also enhances the security of the system, by inherently limiting the number of communication permissions that can be granted at a given time, for an individual smoking substitute device.

The type of data that can be passed between the smoking substitute device and its bonded mobile devices has already been discussed, above. The smoking substitute device may be configured not to send all data to all its bonded mobile devices, at all times. For example, it may be configured to send data just to the master controller mobile device but for that data to be subsequently accessible to the other mobile devices, via the application. Moreover, although it will be automatically paired for communication with the permitted mobile devices on the stored whitelist, the smoking substitute device may be configured not to accept all types of instruction from all the devices on the list. For example, according to an embodiment, the additional/subordinate mobile devices should not be permitted to add further devices to the whitelist, or to remove any devices from the existing whitelist. Certain of the mobile devices on the whitelist may have further restrictions on them, in terms of what instructions they can send to the smoking substitute device and/or on the specific data from the smoking substitute device that they can access. For example, there may be a restricted permission for some devices, wherein they can use the application to look at, for example, tank fill level data for the smoking substitute device but they cannot access usage data.

According to an embodiment, which varies from the particular example of FIG. 37, it may be possible for an additional (or a "second") mobile device to "see" the smoking substitute device, within the wireless communication network, even after it has bonded with the first "master controller" mobile device. That additional mobile device may attempt communication with the smoking substitute device. However, the application on the master controller mobile device will ensure that any such communication attempt(s) will be ignored or blocked by the smoking substitute device, unless the additional mobile device that sent the communication attempt(s) has been granted a specific communication permission for the smoking substitute device, by the application that has been installed on the master controller mobile device. For example, the application may be configured to set a flag in the smoking substitute device, to prohibit communication with other devices that are not in the whitelist, even if the smoking substitute device is "visible", i.e., receptive to inquiry, from such devices.

Although the specific embodiments described herein involve establishing "bonded" communication links, in which the devices store the exchanged encryption keys, and use them again for future connection, it may be possible for one or more "paired" communication links to be formed instead, between the smoking substitute device and a mobile device. In a "paired" communication link, the devices exchange encryption keys or other authorisation data, in order to establish a secure communication link therebetween, but they do not store the encryption keys for re-use in future. For example, it may be preferable, in some embodiments, for one or more of the user's selected additional mobile devices to establish a paired communication link with the smoking substitute device, instead of a bonded communication link.

The application and/or the smoking substitute device may be configured to implement a protocol for changing the identity of the master controller mobile device, for example if that device is lost or stolen or if the user wishes to "upgrade" to a new or replacement device. If this is done via the application, it should preferably include enough security features (such as ID's, passwords, codes etc) to reduce the risk of the change being made by a non-authorised user. For example, a user may use the application to select another device in the whitelist and input a security code on the newly-selected other device, for example via the application on the other device, to confirm the switch. Alternatively, the user may be able to implement the change via hardware and/or software means within the smoking substitute device itself. Again, any such means should preferably be secure.

The term "user" referred to in the method of FIG. 37 is intended to be illustrative and not to be limiting. In general, the term "user" is to be understood to mean the person or persons who have the authority to determine which mobile device(s) a smoking substitute device should communication with. For example, the "user" may be the person, person(s) or entity who own, use and/or control the use of the smoking substitute device. It is possible for the person who has the authority to determine which mobile device(s) a smoking substitute device should communicate with to be different to the person who actually uses the smoking substitute device for smoking substitute action.

The term "master controller" is intended to be illustrative and not to be limiting. In general, the term "master controller" is to be understood to mean the first mobile device that the user selects to establish an exclusive communication link with his or her smoking substitute device. It should be the device via which the user can grant communications permissions to a restricted number of other mobile devices, for communication between those devices and the smoking substitute device. In practice, the user may wish to select the mobile device which he or she uses most often—such as his or her personal mobile phone or smartphone—to be the "first" or "master controller" mobile device.

The term "whitelist" is intended to be illustrative and not to be limiting. In general, the term "whitelist" is to be understood to mean a recorded group, list or other collection of data, which identifies the mobile devices to which the smoking substitute device is bonded, and therefore with which it is permitted to communicate. The precise nature of the data that is stored can vary, dependent on the particulars of the devices concerned. The concept of the so-called "whitelist" is intended to represent the opposite of a "blacklist", which is a well known term that is indicative of items or actions being banned or non-authorised.

The features disclosed in the foregoing description, or in the following claims, or in the accompanying drawings, expressed in their specific forms or in terms of a means for performing the disclosed function, or a method or process for obtaining the disclosed results, as appropriate, may, separately, or in any combination of such features, be utilised for realising the disclosure in diverse forms thereof.

While the disclosure has been described in conjunction with the exemplary embodiments described above, many equivalent modifications and variations will be apparent to those skilled in the art when given this disclosure. Accordingly, the exemplary embodiments of the disclosure set forth above are considered to be illustrative and not limiting. Various changes to the described embodiments may be made without departing from the spirit and scope of the disclosure.

For the avoidance of any doubt, any theoretical explanations provided herein are provided for the purposes of improving the understanding of a reader. The inventors do not wish to be bound by any of these theoretical explanations.

Any section headings used herein are for organizational purposes only and are not to be construed as limiting the subject matter described.

Throughout this specification, including the claims which follow, unless the context requires otherwise, the word "comprise" and "include", and variations such as "comprises", "comprising", and "including" will be understood to imply the inclusion of a stated integer or step or group of integers or steps but not the exclusion of any other integer or step or group of integers or steps.

It must be noted that, as used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by the use of the antecedent "about," it will be understood that the particular value forms another embodiment. The term "about" in relation to a numerical value is optional and means for example +/− 10%.

The following statements, which form part of the description, provide general expressions of the disclosure herein:

H1. A system for managing a smoking substitute device including:
  a smoking substitute device; and
  a first mobile device on which an application is installed;
  wherein the smoking substitute device has a bonded wireless communication link with the first mobile device, and
  wherein the smoking substitute device is configured to prevent a communication link with a second mobile device from being established unless permitted by the application installed on the first mobile device.

H2. The system of statement H1, wherein the smoking substitute device is configured to only send advertising wireless communications to the first mobile device, with which it has a bonded communication link, and to any other mobile devices with which it has a bonded communication link.

H3. The system of statement H1 or statement H2, wherein the smoking substitute device is configured to prevent a communication link from being established with the second mobile device by being invisible to the second mobile device within a wireless communication network.

H4. The system of statement H1 or statement H2, wherein the smoking substitute device is configured to prevent a communication link from being established with the second mobile device by blocking requests or other communication attempts from the second mobile device.

H5. The system of any preceding statement, wherein the smoking substitute device is configured to prevent a communication link from being established with the second mobile device if the second mobile device does not have a bonded wireless communication link with the smoking substitute device.

H6. The system of any preceding statement, wherein the smoking substitute device has a memory which stores a whitelist configured to identify one or more devices with which the smoking substitute device is permitted to wirelessly communicate.

H7. The system of statement H6, wherein the smoking substitute device has a bonded communication link to each of the devices identified on the whitelist.

H8. The system of statement H7, wherein the whitelist is configured to identify a predetermined maximum number of devices, wherein the predetermined maximum number of devices is 10 or fewer.

H9. The system of any of statements H1 to H8, wherein the smoking substitute device is configured to wirelessly communicate with the first mobile device via a wireless interface included in the smoking substitute device and a wireless interface included in the first mobile device.

H10. A method of managing a smoking substitute device, using a first mobile device on which an application is installed, wherein the method includes:
establishing a bonded communication link between the smoking substitute device and the first mobile device; and
preventing a communication link from being established between the smoking substitute device and a second mobile device unless permitted by the application installed on the first mobile device.

H11. The method of statement H10 further comprising issuing a permission, from the application installed on the first mobile device, to permit the smoking substitute device to wirelessly communicate with the second mobile device.

H12. The method of statement H10 or statement H11 further comprising storing, at the smoking substitute device, a whitelist configured to identify the one or more devices with which the smoking substitute device is permitted to wirelessly communicate.

H13. A smoking substitute device comprising:
a power source;
a memory;
a control unit; and
a wireless interface,
wherein the smoking substitute device is configured to establish a bonded communication link with a first mobile device, and
wherein the smoking substitute device is configured to prevent a communication link with a second mobile device from being established unless permission from the application installed on the first mobile device is received by the smoking substitute device.

H14. A computer implemented method for controlling wireless communication links between a smoking substitute device and one or more mobile devices, the method comprising:
exchanging, via a wireless communication channel between the smoking substitute device and a first mobile device, authorisation data to identify the smoking substitute device and the first mobile device to one another;
establishing a bonded communication link, over the wireless communication channel, between the smoking substitute device and the first mobile device as a result of the exchange of authorisation data; and
restricting the smoking substitute device to communicate, over the wireless communication channel, only with the first mobile device, with which it has established a bonded communication link.

H15. A computer program product comprising a computer-readable storage medium having computer readable instructions stored thereon, wherein the computer-readable instructions are executable as an app in a first mobile device to perform the method of any one of statements H10 to H12 or H14.

The invention claimed is:

1. A system for managing a plurality of smoking substitute devices, the system comprising:
a plurality of smoking substitute devices, each smoking substitute device comprising:
a control unit;
a memory configured to store firmware for operating the smoking substitute device and a device-specific encryption key; and
a communications interface; and
an application server configured to communicate to the smoking substitute device a firmware update message that is encrypted with the device-specific encryption key,
wherein the smoking substitute device is configured to obtain an encrypted firmware image,
wherein the firmware update message includes a firmware key for decrypting the encrypted firmware image, and
wherein the smoking substitute device is configured to use the device-specific encryption key to decrypt the firmware update message, to obtain the firmware key for decrypting the encrypted firmware image,
wherein the same firmware key is included in the firmware update message for each of the plurality of smoking substitute devices.

2. The system of claim 1, wherein the application server is configured to communicate a firmware update notification that includes a firmware image location identifier and the firmware update message, and wherein the encrypted firmware image is obtainable using the firmware image location identifier.

3. The system of claim 1 further comprising a mobile device on which an application is installed, wherein the smoking substitute device is in wireless communication with the mobile device via the communications interface, wherein the application server is configured to be communicate to the smoking substitute device via the application.

4. The system of claim 1, wherein the smoking substitute device is in wireless communication with the application server.

5. The system of claim 1, wherein the smoking substitute device is further configured to:
decrypt the encrypted firmware image using the firmware key; and
update the firmware for operating the smoking substitute device using the decrypted firmware image.

6. The system of claim 5, wherein the smoking substitute device is further configured to:
verify the update firmware using identification data in the firmware update message; and
report an outcome of verification.

7. The system of claim 6, wherein the smoking substitute device has a wireless communication link with an application server or a mobile device running an application, and wherein the outcome of verification is reported in a hello message sent via the wireless communication link.

8. The system of claim 1 further comprising a signing server in communication with the application server, wherein the signing server is configured to encrypt the firmware image with the firmware key, and wherein access to the firmware key by the application server is prohibited.

9. The system of claim 1, wherein the smoking substitute device is configured to transition into an update mode, and wherein the smoking substitute device is configured to receive the encrypted firmware image and firmware update message when in the update mode.

10. A method for managing a system, the method comprising, for each of a plurality of smoking substitute devices:
  encrypting, using a device-specific encryption key, a firmware update message, wherein the firmware update message includes a firmware key;
  transmitting the encrypted firmware update message to the smoking substitute device;
  obtaining, by the smoking substitute device, an encrypted firmware image; and
  decrypting, by the smoking substitute device using the device-specific encryption key, the firmware update message in order to obtain the firmware key, wherein the firmware key is for decrypting the encrypted firmware image; and
  wherein the same firmware key is included in the firmware update message for each of the plurality of smoking substitute devices.

11. The method of claim 10 further comprising:
  decrypting, by the smoking substitute device, the firmware image using the firmware key; and
  updating the firmware of the smoking substitute device using the decrypted firmware image.

12. The method of claim 11 further comprising:
  verifying the update firmware using identification data in the firmware update message; and
  reporting an outcome of verification.

13. A plurality of smoking substitute devices, each smoking substitute device comprising:
  a control unit;
  a memory configured to store firmware for operating the smoking substitute device, and to store a device-specific encryption key; and
  a communications interface;
  wherein, for each of the plurality of smoking substitute devices:
    the smoking substitute device is configured to obtain an encrypted firmware image;
    the smoking substitute device is configured to receive, from an application server, a firmware update message;
    the firmware update message includes a firmware key for decrypting the encrypted firmware image; and
    the firmware update message is decryptable using the device-specific encryption key; and
  wherein the same firmware key is included in the firmware update message for each of the plurality of smoking substitute devices.

14. The smoking substitute device of claim 13, wherein the smoking substitute device is configured to:
  decrypt, with the device-specific encryption key, the firmware update message in order to obtain the firmware key;
  decrypt, with the firmware key, the encrypted firmware image; and
  update, with the decrypted firmware image, the firmware for operating the smoking substitute device.

* * * * *

UNITED STATES PATENT AND TRADEMARK OFFICE
CERTIFICATE OF CORRECTION

PATENT NO. : 12,495,838 B2
APPLICATION NO. : 17/549455
DATED : December 16, 2025
INVENTOR(S) : Oliver Talbot et al.

It is certified that error appears in the above-identified patent and that said Letters Patent is hereby corrected as shown below:

In the Specification

Column 5, Line 22: Delete "Myblu™ e-cigarette. The Myblu™" and replace with
-- myblu™ e-cigarette. The myblu™ --

Column 5, Line 38: Delete "PROT™ e-cigarette. The blu PROT™" and replace with
-- PRO™ e-cigarette. The blu PRO™ --

Column 6, Line 38: Delete ""Gb"™" and replace with -- "Glo"™ --

Column 17, Line 3: Delete "PROT™" and replace with -- PRO™ --

Column 28, Line 48: Delete "Myblu™ e-cigarette. The Myblu™" and replace with
-- myblu™ e-cigarette. The myblu™ --

Column 28, Line 64: Delete "PROT™ e-cigarette. The blu PROT™" and replace with
-- PRO™ e-cigarette. The blu PRO™ --

Column 29, Line 64: Delete ""Gb"™" and replace with -- "Glo"™ --

Column 40, Line 3: Delete "PROT™" and replace with -- PRO™ --

Column 51, Line 22: Delete "Myblu™ e-cigarette. The Myblu™" and replace with
-- myblu™ e-cigarette. The myblu™ --

Column 51, Line 38: Delete "PROT™ e-cigarette. The blu PROT™" and replace with
-- PRO™ e-cigarette. The blu PRO™ --

Signed and Sealed this
Tenth Day of February, 2026

John A. Squires
*Director of the United States Patent and Trademark Office*

Column 52, Line 37: Delete ""Gb"™" and replace with -- "Glo"™ --

Column 62, Line 3: Delete "PROT™" and replace with -- PRO™ --

Column 71, Line 15: Delete "Myblu™ e-cigarette. The Myblu™" and replace with -- myblu™ e-cigarette. The myblu™ --

Column 71, Line 31: Delete "PROT™ e-cigarette. The blu PROT™" and replace with -- PRO™ e-cigarette. The blu PRO™ --

Column 72, Line 32: Delete ""Gb"™" and replace with -- "Glo"™ --

Column 85, Line 53: Delete "PROT™" and replace with -- PRO™ --

Column 95, Line 65: Delete "Myblu™ e-cigarette. The Myblu™" and replace with -- myblu™ e-cigarette. The myblu™ --

Column 96, Line 14: Delete "PROT™ e-cigarette. The blu PROT™" and replace with -- PRO™ e-cigarette. The blu PRO™ --

Column 97, Line 14: Delete ""Gb"™" and replace with -- "Glo"™ --

Column 112, Line 24: Delete "PROT™" and replace with -- PRO™ --

Column 125, Line 15: Delete "Myblu™ e-cigarette. The Myblu™" and replace with -- myblu™ e-cigarette. The myblu™ --

Column 125, Line 31: Delete "PROT™ e-cigarette. The blu PROT™" and replace with -- PRO™ e-cigarette. The blu PRO™ --

Column 126, Line 32: Delete ""Gb"™" and replace with -- "Glo"™ --

Column 137, Line 66: Delete "PROT™" and replace with -- PRO™ --

Column 154, Line 22: Delete "Myblu™ e-cigarette. The Myblu™" and replace with -- myblu™ e-cigarette. The myblu™ --

Column 154, Line 38: Delete "PROT™ e-cigarette. The blu PROT™" and replace with -- PRO™ e-cigarette. The blu PRO™ --

Column 155, Line 39: Delete ""Gb"™" and replace with -- "Glo"™ --

Column 165, Line 40: Delete "PROT™" and replace with -- PRO™ --

CERTIFICATE OF CORRECTION (continued)
U.S. Pat. No. 12,495,838 B2

Column 177, Line 45: Delete "Myblu™ e-cigarette. The Myblu™" and replace with
-- myblu™ e-cigarette. The myblu™ --

Column 177, Line 61: Delete "PROT™ e-cigarette. The blu PROT™" and replace with
-- PRO™ e-cigarette. The blu PRO™ --

Column 178, Line 61: Delete ""Gb"™" and replace with -- "Glo"™ --

Column 187, Line 29: Delete "PROT™" and replace with -- PRO™ --